US009213687B2

(12) United States Patent
Au

(10) Patent No.: US 9,213,687 B2
(45) Date of Patent: Dec. 15, 2015

(54) COMPASSION, VARIETY AND COHESION FOR METHODS OF TEXT ANALYTICS, WRITING, SEARCH, USER INTERFACES

(76) Inventor: Lawrence Au, Vienna, VA (US)

(*) Notice: Subject to any disclaimer, the term of this patent is extended or adjusted under 35 U.S.C. 154(b) by 985 days.

(21) Appl. No.: 13/167,640

(22) Filed: Jun. 23, 2011

(65) Prior Publication Data

US 2012/0166180 A1 Jun. 28, 2012

Related U.S. Application Data

(63) Continuation-in-part of application No. 12/382,754, filed on Mar. 23, 2009, now Pat. No. 8,463,594.

(60) Provisional application No. 61/344,284, filed on Jun. 23, 2010, provisional application No. 61/388,351, filed on Sep. 30, 2010, provisional application No. 61/498,963, filed on Jun. 20, 2011.

(51) Int. Cl.
*G06F 17/27* (2006.01)

(52) U.S. Cl.
CPC .............. *G06F 17/27* (2013.01); *G06F 17/274* (2013.01)

(58) Field of Classification Search
CPC ....... G06F 17/20; G06F 17/21; G06F 17/211; G06F 17/2241; G06F 17/27; G06F 17/274; G06F 17/2745; G06F 17/2785
USPC ........ 704/9; 707/736–738, 748–751; 715/256
See application file for complete search history.

(56) References Cited

U.S. PATENT DOCUMENTS

| | | | |
|---|---|---|---|
| 6,199,034 B1 * | 3/2001 | Wical | 704/9 |
| 7,987,188 B2 * | 7/2011 | Neylon et al. | 707/739 |
| 8,166,032 B2 * | 4/2012 | Sommer et al. | 707/736 |
| 8,239,189 B2 * | 8/2012 | Skubacz et al. | 704/9 |
| 2006/0069589 A1 * | 3/2006 | Nigam et al. | 705/1 |
| 2006/0200342 A1 * | 9/2006 | Corston-Oliver et al. | 704/10 |
| 2008/0215571 A1 * | 9/2008 | Huang et al. | 707/5 |
| 2008/0249764 A1 * | 10/2008 | Huang et al. | 704/9 |
| 2008/0270116 A1 * | 10/2008 | Godbole et al. | 704/9 |
| 2009/0077069 A1 * | 3/2009 | Polanyi et al. | 707/5 |
| 2009/0306967 A1 * | 12/2009 | Nicolov et al. | 704/9 |
| 2009/0319342 A1 * | 12/2009 | Shilman et al. | 705/10 |
| 2010/0017391 A1 * | 1/2010 | Mizuguchi et al. | 707/5 |
| 2011/0137906 A1 * | 6/2011 | Cai et al. | 707/740 |
| 2011/0196677 A1 * | 8/2011 | Deshmukh et al. | 704/246 |
| 2011/0246179 A1 * | 10/2011 | O'Neil | 704/9 |
| 2012/0041937 A1 * | 2/2012 | Dhillon et al. | 707/708 |
| 2012/0121021 A1 * | 5/2012 | Jung et al. | 375/240.16 |
| 2012/0191730 A1 * | 7/2012 | Parikh et al. | 707/754 |
| 2012/0278064 A1 * | 11/2012 | Leary et al. | 704/9 |

* cited by examiner

*Primary Examiner* — Paras D Shah
(74) *Attorney, Agent, or Firm* — Arent Fox; Wilburn Chesser; Juliana Haydoutova

(57) ABSTRACT

The present invention is a computer implemented system for analyzing text, for computing aspects of sentiment via chord transitions, such as prissiness, bombast and sarcasm via underlying multiple dimensions of sentiment, computing compassionate rhetoric via successive areas of sentiment in text, for automatically computing normalization of polysemous dictionary entries to provide lookup of meanings for text analysis of words and phrases, and for automatically computing the degree of theme interweave in text via computation of conceptual crossings of paragraphs.

2 Claims, 91 Drawing Sheets

Example Of Speech Synthesizer Directive Array

A quotation from Shakespeare's <u>Hamlet:</u>

*"To be or not to be, that is the question; Whether 'tis nobler in the mind to suffer The slings and arrows of outrageous fortune Or to take arms against a sea of troubles, And by opposing, end them. To die, to sleep; No more; and by a sleep to say we end The heart-ache and the thousand natural shocks That flesh is heir to, 'tis a consummation Devoutly to be wished. To die, to sleep; To sleep, perchance to dream. Ay, theres the rub, For in that sleep of death what dreams may come, When we have shuffled off this mortal coil, Must give us pause."*

(1)

Exemplar Speech Synthesizer Directive Array, formatted for a specific speech synthesizer:

(2) [[ volume 0.575 ]] [[ rate 154.000 ]] [[ pitch 52.500 ]] To be or not to be, [[ volume 0.3 ]] [[ pitch 48.5 ]] that [[ rate 160.5 ]] is [[ volume 0.2 ]] [[ rate 260.3 ]] tha question [[ pitch 48.0 ]] ; [[ volume 0.2 ]] Whether [[ inpt PHON ]] tt1lHz [[ inpt TEXT ]] nobler in [[ volume 0.2 ]] [[ pitch 49.7 ]] tha mind to [[ volume 0.3 ]] [[ rate 159.6 ]] suffer [[ volume 0.2 ]] tha [[ pitch 48.5 ]] slings [[ rate 251.8 ]] [[ pitch 50.5 ]] [[ inpt PHON ]] AXnd [[ inpt TEXT ]] [[ pitch 49.2 ]] arrows [[ rate 246.5 ]] uf [[ rate 258.5 ]] outrageous [[ pitch 49.8 ]] fortune [[ volume 0.2 ]] [[ rate 252.9 ]] Or [[ rate 259.6 ]] to take [[ volume 0.3 ]] arms against uh [[ pitch 48.5 ]] sea [[ volume 0.4 ]] [[ pitch 49.9 ]] uf [[ volume 0.2 ]] [[ rate 161.4 ]] [[ pitch 48.9 ]] troubles [[ rate 267.9 ]] , [[ pitch 49.6 ]] [[ inpt PHON ]] AXnd [[ inpt TEXT ]] [[ pitch 48.8 ]] by [[ pitch 50.6 ]] opposing, [[ volume 0.4 ]] end [[ pitch 50.3 ]] them [[ volume 0.2 ]] . [[ inpt PHON ]] %% [[ inpt TEXT ]] [[ pitch 51.8 ]] To [[ volume 0.4 ]] [[ pitch 50.5 ]] die [[ volume 0.2 ]] [[ pitch 52.0 ]] , to (3) [[ pitch 51.7 ]] sleep [[ volume 0.3 ]] [[ pitch 53.4 ]] ; No more [[ volume 0.2 ]] ; [[ inpt PHON ]] AXnd [[ inpt TEXT ]] [[ volume 0.4 ]] by [[ volume 0.3 ]] uh [[ pitch 51.7 ]] sleep [[ volume 0.5 ]] to [[ volume 0.4 ]] [[ pitch 54.6 ]] say we [[ volume 0.5 ]] end [[ volume 0.4 ]] [[ rate 159.2 ]] tha [[ pitch 52.6 ]] heart-ache [[ inpt PHON ]] AXnd [[ inpt TEXT ]] [[ rate 279.0 ]] tha thousand natural [[ rate 160.8 ]] [[ pitch 54.4 ]] shocks That [[ pitch 53.7 ]] flesh [[ pitch 54.3 ]] is [[ rate 255.2 ]] heir [[ pitch 52.7 ]] to, [[ inpt PHON ]] tt1lHz [[ inpt TEXT ]] uh [[ volume 0.5 ]] consummation Devoutly to [[ volume 0.2 ]] [[ pitch 53.3 ]] be wished [[ volume 0.6 ]] . [[ inpt PHON ]] %% [[ inpt TEXT ]] [[ volume 0.3 ]] [[ rate 243.4 ]] [[ pitch 50.5 ]] To [[ rate 251.4 ]] die [[ volume 0.4 ]] [[ rate 235.6 ]] , [[ volume 0.4 ]] [[ pitch 54.5 ]] to [[ volume 0.6 ]] sleep; To sleep [[ rate 240.2 ]] , perchance [[ volume 0.4 ]] to [[ inpt PHON ]] ddrr1lYlYmmm [[ inpt TEXT ]] . [[ inpt PHON ]] %% [[ inpt TEXT ]] Ay, [[ volume 1.0 ]] theres tha [[ rate 142.0 ]] rub (4) [[ volume 0.5 ]] , [[ rate 227.7 ]] [[ pitch 52.9 ]] For [[ rate 206.8 ]] [[ pitch 57.0 ]] in [[ rate 138.5 ]] [[ pitch 52.6 ]] that [[ volume 0.8 ]] [[ pitch 54.9 ]] sleep uf [[ volume 0.6 ]] death [[ volume 0.9 ]] [[ rate 130.7 ]] [[ pitch 54.2 ]] what [[ rate 135.3 ]] dreams [[ pitch 54.9 ]] may [[ pitch 51.5 ]] come [[ volume 0.7 ]] [[ pitch 52.1 ]] , When [[ pitch 50.1 ]] we have [[ rate 202.8 ]] shuffled off [[ volume 1.0 ]] [[ pitch 52.4 ]] this [[ rate 131.8 ]] [[ pitch 50.9 ]] mortal [[ volume 0.9 ]] [[ rate 128.0 ]] coil [[ rate 132.1 ]] [[ pitch 51.8 ]] , [[ volume 1.0 ]] Must [[ volume 0.9 ]] [[ rate 128.8 ]] [[ pitch 51.4 ]] give [[ rate 130.3 ]] us pause [[ pitch 53.6 ]] . [[ inpt PHON ]] %% [[ inpt TEXT ]] [[ pitch 52.9 ]]

FIG. 2

Example Of A Matched Meaning Token

| Branch Phrase | Meaning | Match |
|---|---|---|
| reverse | to overrule the decision of a court of law | the district court |
| reverse | to overrule the decision of a court of law | a judgment reached by a court of law by a judge |
| reverse | to overrule the decision of a court of law | the decision |
| the decision | a judgment reached by a court of law by a judge | the district court |
| the decision | a judgment reached by a court of law by a judge | a court of law with authority over a region |
| of | caused-by power of authority | a court of law with authority over a locale |
| of | with-focus-on locale | a court of law with authority over a locale |

FIG. 6

Part Of Speech Transition Table

| From Part Of Speech | To Parts Of Speech |
|---|---|
| verb | object, adjective, preposition, noun, caused-by, focusing-on |
| subject | adverb, verb, preposition, adjective |
| caused-by | caused-by, preposition, noun, adjective, adverb, verb |
| focusing-on | focusing-on, preposition, noun, adjective, adverb, verb |
| cause-of | cause-of, preposition, noun, adjective, adverb, verb |
| article | noun, adjective |
| preposition | noun, adjective |

FIG. 9

Admissible Bridge Transition Table

| From Part Of Speech | To Part Of Speech | Examples |
|---|---|---|
| subject | object | Photographers took her picture |
| object | subject | Photographers took her picture |
| verb | object | took her picture |
| verb | subject | Photographers took her picture |
| subject | verb | Photographers took her picture |
| object | verb | Photographers took her picture |
| focusing-on | noun phrase | the woman talked on the phone |
| noun phrase | focusing on | the woman talked on the phone |
| cause-of | noun phrase | I know haste can make waste |
| object | cause-of | He took a picture for the yearbook. |
| subject | cause-of | He took a picture for the yearbook. |
| verb | cause-of | He took a picture for the yearbook. |
| compared-to | noun phrase | The bag is bigger than a breadbox |
| caused-by | noun phrase | Jim is dizzy from hunger |
| with-focus-on | noun phrase | Near the door , he smelled flowers |
| subject | noun phrase | Jim is dizzy from hunger |
| noun phrase | subject | Jim is dizzy from hunger |
| verb | noun phrase | Jim is dizzy from hunger |
| noun phrase | verb | Jim is dizzy from hunger |
| object | noun phrase | Jim is dizzy from hunger |
| noun phrase | object | Jim is dizzy from hunger |

FIG. 10

Example Of Sentence Bigrams Bridge Relevance Ordering
*for "We reverse the decision of the District Court"*

| From Phrase | From Sentiment Magnitude | To Phrase | To Sentiment Magnitude | Bridge Phrase Type | Bridge Relevance | Bridge Order |
|---|---|---|---|---|---|---|
| We | 10 | the decision | 8 | Subject / Object | 18 | |
| the decision | 8 | We | 10 | Object / Subject | 18 | |
| reverse | 12 | the decision | 8 | Verb / Object | 20 | 2 |
| the decision | 8 | reverse | 12 | Object / Verb | 20 | 2 |
| We | 10 | reverse | 12 | Subject /Verb | 22 | 1 |
| reverse | 12 | We | 10 | Verb / Subject | 22 | 1 |
| the decision | 5 | of | 8 | Object / cause-of | 13 | |
| of | 8 | the decision | 5 | cause-of / Object | 13 | |
| of | 8 | the District Court | 6 | cause-of / noun | 14 | 3 |
| the District Court | 6 | of | 8 | noun / cause-of | 14 | 3 |
| the District Court | 6 | reverse | 12 | noun / Verb | 18 | 4 |
| We | 10 | of | 18 | Subject / cause-of | 18 | |
| reverse | 12 | of | 8 | Verb / cause-of | 20 | |
| reverse | 12 | the District Court | 6 | Verb / noun | 18 | 4 |
| We | 10 | the District Court | 6 | Subject / noun | 16 | |
| the District Court | 6 | We | 10 | noun / Subject | 16 | |

FIG. 12

Example Of Text Relevance Index
for "We reverse the decision of the District Court"

Example Of A Search Engine Portal Web Page with Search-By-Narrative

"Search By Narrative" Web Portal

*Enter Your Narrative Here:*

I'm looking for a yoga studio teaching the mind body connection.

*See Your Narrative's Meaning:*

| Sentiment | |
|---|---|
| 3 | teaching {verb-subject} a yoga studio <br> teaching {verb-object} the mind body connection. <br><br> I'm looking for a yoga studio teaching the mind body connection. |
| 12 | am {verb-subject} I <br> am {verb-object} looking for |
| 15 | looking for {focusing-on} a yoga studio |

*See Your Results sorted by Relevance:*

| Relevance: | Quotation: | |
|---|---|---|
| 42% | Welcome to The Yoga Center. The Yoga Center is a spiritual home, providing a safe, nurturing atmosphere for the individual to discover the inner connection between the body, mind and spirit. | more... ▶ |
| 39% | Ever since our meeting, I have been teaching and continually learning about yoga and the importance of the mind-body-breath connection in realizing our true potential. | more... ▶ |
| 33% | The mind becomes focused on where the connection (shtiram) is with the body and where the lightness(sukham)is. | more... ▶ |

◀ ...previous    page 1 of 3    next... ▶

FIG. 15

Example Of Prior-art Dictionary Definitions verb meanings for feel
1: [or care] to be aware of a general emotion within oneself
2: [or palpate] to touch with fingers to diagnose a medical condition
3: [or grope ] to rub with fingers for a sexual sensation
4: [or perceive] to sense a condition in a place or object
5: [or experience] to undergo the effects of something verb meanings of beat
1: [or strike] hit repeatedly
2: [or scare ] to repeatedly strike bushes or hitting water, herding animals for hunting
3: [or tap] to make a precise musical rhythm by wildly hitting something
4: [or forge] to shape with blows
5: [or mix)] to scramble
6: [or avoid] to not compensate for something
7: [or flog] to physically punish or intimidate
8: [or be exhausted] to be overcome
9: [or sail smoothly] to sail effortlessly

FIG. 24

Examples Of Normalized Noun Dictionary Definitions A to G

*italics show links to resonant meanings*
bold *shows indexed meanings followed by sense numbers,*
*parentheses ( ) show parts of speech,*
*brackets [ show synonyms ],*
~~strikethrough~~ *shows stopwords ignored by index* noun meanings of bypass
1: (n)diversion:1a
1a: [~~or~~ (n)shunt:3b] (n)surgery:1a ~~making a~~ (n)diversion:1a ~~of~~ (n)fluids:1a (prep)flowing past:1a a (adj)damaged:1a (n)body:1a (n)vessel:1a
1b: [~~or~~ (n)beltway:2b] a (n)road:1a ~~making a~~ (n)diversion:1a ~~of~~ (n)vehicle traffic:1a (adj)avoiding:1a ~~a~~ (n)congestion:1a (n)area:3b
1c: [~~or~~ (n)shunt:1a] a (adj)lower:1a (n)resistance:1a (n)conductor:1b ~~making a~~ diversion: 1a ~~of~~ (n)electricity:1a (prep)away from:1a a (adj)higher:1a (n)resistance:1a conductor:1b noun meanings for condition
1: (n)*being:1a*
1a: [~~or~~ (n)state:1a] a (n)form:1a ~~of a~~ *being:1a*
2: (n)medicine:1a
2a: [~~or~~ diagnosis:2a] a (adj)medical:1a (n)illness:1a ~~or~~ (n)disease:1a
3a: (~~or~~ (n)input:1a) a (n)variable:1a ~~in an~~ (n)experiment:1a or (n)test:2b
4: (n)agreement:1a
4a: [~~or~~ (n)clause:3a] a (n)consideration ~~of an~~ (n)agreement:1a noun meaning of everything
1: (n)thing:1
1a: [(n)all:1] (det)each (adj)possible:1a (n)thing:1 noun meaning of experience
1: (n)participation:1a
1a: (~~or~~ (n)skill:1a) (n)accumulation:1a of (n)knowledge:1a ~~from~~ (n)participation:1a
1b: (~~or~~ (n)information:1a) (adj)directly:1a (n)witnessed:1a (n)observation:1a ~~from~~ (n)participation:1a noun meanings for finger
1: (n)hand:3b
1a: [~~or~~ (n)glove finger:1a] (adj)part:1a ~~of a~~ (n)glove:1a ~~for~~ (n)digits:1b ~~of a~~ (n)hand:3b
2a: [~~or~~ (n)hand finger:1a] (adj)member:1a ~~of the~~ (n)hand:3b (adj)opposite ~~the~~ (n)thumb: 1b
2: (n)shape:1a
3a: [~~or~~ (n)finger shape:1b] a (adj)long:1a (adj)slender:2a shape:1a

FIG. 25

Examples Of Normalized Noun Dictionary Definitions H to M

*bold* shows indexed meanings followed by sense numbers,
parentheses ( ) show parts of speech,
brackets [ show synonyms ],
~~strikethrough~~ shows stopwords ignored by index noun meanings of heart
1: (adj)important:1
1a: [~~or~~ spirit:1a] ~~an~~ (adj)important:1 (adj)underlying:2a ~~or~~ (adj)overarching:1a (adj)motivational:1a (n)character:1a ~~of~~ (n)being:1a
1b: [~~or~~ (n)essence:1a ~~or~~ (n)core:1a] ~~the~~ (adj)most:1a (adj)essential:1a ~~and~~ (adj)important:1 part:5a ~~of an~~ (n)idea:2b or (n)event:5a
2: (adj)central:2a
2a: [~~or~~ (n)center:2a or (n)eye:5a] ~~a~~ (adj)centrally:2a (adj)located:1a (n)region:1a (prep)within:1a an (adj)enclosing:2a (n)area:3a
3: (n)intuition:1a
3a: [~~or~~ (n)bosom:3a] (adj)personal:3a (n)feeling:1a ~~and~~ (n)intuition:1a
4: (n)pump:2a
4a: [~~or~~ (n)vascular pump:1a] a (adj)muscular:1a (n)pump:3a (v)moving:1a (n)blood:1a in (adj)rhythmic:1a (n)contractions:1a (prep)through:1a the (n)lungs:1a and (n)body:1a
5: (n)shape:1a
5a: [~~or~~ (n)valentine heart:1a] a (n)shape:1a ~~with~~ (adv)twice:1a adj)rounded:1a (n)top:1a ~~and~~ (adj)pointed:1b (n)bottom:1a
6: (n)playing card:1a
6a: [~~or~~ (n)heart suit:1a] a (n)group:2b of (adj)playing:5a (n)card:3a s ~~with a~~ (adj)red:1a (n)heart:5a noun meanings of intuition
1: (n)*opinion*:1a
1a: (~~or~~ (n)instinct:1a) ~~an~~ ability:1a ~~to~~ (adv)directly:1a (v)arrive:1a ~~at an~~ (n)opinion:1a
1b: (~~or~~ (n)impression:1a) a (adj)significant:1a (adj)categoric:1a (n)opinion:1a

FIG. 26

Examples Of Normalized Noun Dictionary Definitions P to Z

*bold* shows indexed meanings followed by sense numbers,
parentheses ( ) show parts of speech,
brackets [ show synonyms ],
~~strikethrough~~ shows stopwords ignored by index noun meanings of pump
1: fluid pressure:1a
1a: (~~or~~ piston) (n)device:1a to (v)increase:1a fluid pressure:1a ~~to~~ (v)move:1a (n)fluid:1a
1b: (~~or~~ (n)contractile organ:1a) ~~an~~ organ:1a ~~to~~ (v)increase:1a fluid pressure:1a ~~to~~
(v)move:1a (n)fluid:1a ~~in a~~ (n)body:1a
2: shoe:1a
2a: (~~or~~ women's shoe:1a) (adj)low-cut:1a (n)footwear:1a ~~with a~~ (n)heel:1a noun meanings of task
1: (n)work:1a
1a: [~~or~~ (n)job:1a, (n)chore:1a, (n)undertaking:1a] a (n)piece:1a of (n)work:1a noun meanings of thing
1: (adj)special:1
1a: [(n)entity:1] ~~a~~ (adj) important:1 (adj)self-contained:1 being:1a
1b: [(n)aspect:1] ~~a~~ (adj)important:1 (n)attribute:1a of (n)something:1a noun meaning of something
1: (adj)important:1
1a: ( ~~or a~~ topic:1a ) (adj)unspecified:1 (conj)yet:1a (adj)important:1 noun meanings of surgery
1: treatment:1a
1a: [ ~~or~~ (n)operation:1a ] (n)treatment:1a ~~for a~~ (adj)medical:1a (n)condition:1a (v)using:1a
~~a~~ (adj)mechanical:1a (n)procedure:1a
1b: [ ~~or~~ (n)operating room:1a ] ~~a~~ (adj)clean:1a (adj)aseptic:1a (n)place ~~where~~ (n)patients:
1a ~~for~~ (n)treatment:1a (v)using:1(adj)invasive:1a cutting:1b procedures:1a
1c: [~~or~~ (n)delicate procedure:1a] a (adj)difficult:1a (n)treatment:1a (v)requiring:1a
(adj)special skills:1a ~~and~~ (adj)intense:1a (n)concentration:1a

FIG. 27

Examples Of Normalized Adjective Dictionary Definitions A to O

*bold shows indexed meanings followed by sense numbers,*
*parentheses ( ) show parts of speech,*
*brackets [ show synonyms ],*
*~~strikethrough~~ shows stopwords ignored by index* adjective meanings of effective
1a: [~~or~~ (adj efficient:1a] (adj)accomplished:1a ~~and~~ (adj)able ~~to~~ (v)perform:1a ~~a~~ (n)task
2a: [~~or~~(adj realized:1a] ~~a~~ (adj)true:1a (n)event:1a (v)compared:2a ~~to a~~ (adj predicted:1a (n)event:1a
3a: [~~or~~(adj operative:1a] ~~an~~ (adj)significant:1a (adj)applicable:1a (n)agreement:1a
3b: [~~or~~(adj)instrumental] ~~an~~ (adj)crucial:1a (adj)causal (n)force:1a adjective meanings of effortless
1: (adj) facile:1a
1a: [~~or~~ (adj)grace:1a] elegant:1a, graceful:1a ~~and~~ facile:1a
2: (adj) avoiding:1a
1b: [~~or~~ (adj)ease:1a] avoiding:1a ~~the~~ (adj)usual:1a (n)exertion:1a
1b: [~~or~~ (adj)pass:1a] avoiding:1a ~~the~~ (adj)usual:1a (n)compensation:1a adjective meaning of fundamental
1: something:1a
1a: [~~or~~ (adj)far-reaching:1a] naturally:1a (adj)thoroughgoing:1a ~~in~~ effect:1a ~~on~~ something:1a adjective meanings of important
1: (adj) significant:1a
1b: [~~or~~ (adj)essential:1a] (adv)fundamentally:1a (adv)significant:1a
1a: [~~or~~ (adj)valuable:1a] (adv)expensively:1a (adj)costly:1a ~~and~~ (adv)significant:1a adjective meaning of muscular
1: (adj)brawny:1a
1a: [~~or~~ (adj)rugged:1a] (adj)brawny:1a (adj)powerful:1a
2: (adj)contractile:1a
2a: [~~or~~(adj)tensor:3b] ~~a~~ (adj)contractile:1a organ:1a ~~of a~~ (n)body:1a adjective meaning of overarching
1: (adj)fundamental:1a
1a: [~~or~~ (adj)dominating:1a] (adj)orchestrating:1a ~~the~~ (adj)fundamental:1a (n)structure:1a ~~of~~ (n)something:1a

FIG. 28

Examples Of Normalized Adjective Dictionary Definitions P to Z bold shows indexed meanings followed by sense numbers,
parentheses ( ) show parts of speech,
brackets [ show synonyms ],
~~strikethrough~~ shows stopwords ignored by index adjective meanings of relevant
1: (adj) special:1
1a: [(adj) connected:1] ~~a~~ (adj)special:1 ~~and~~ (adj)connected:1a (n)thing:1
1b: [(adj) applicable:1] ~~a~~ (adj)special:1 ~~and~~ (adj)germane:1a (n)condition:1a adjective meanings of rhythmic
1: (adj)recurring:1a
1a: [~~or~~ (adj)cadenced:1a] (adj)recurring:1a ~~with~~ (n)regularity:1a adjective meanings of significant
1: (adj)crucial:1a
1a: [~~or~~ important:1a ] ~~a~~ (adj)crucial:1a (prep)part of:1a (n)something:1a adjective meanings of traditional
1: (n)method:1a ~~to~~ (v)accomplish:1a (n)task:1a
1a: [~~or~~ (adj)prior art:1a] ~~a~~ (adj)previous:1a (adj)earlier:1a (n)method:1a ~~to~~ (v)accomplish:1a (n)task:1a
1b: [~~or~~ (adj)conventional:1a] a (adj)prevalent:1a (n)method:1a ~~to~~ (v)accomplish:1a (n)task:1a adjective meanings of unspecified
1: important:1
1a: (or (adj)mysterious:1a) important:1 ~~and~~ (adj)salient:1a ~~yet~~ (adj)incompletely:1a ~~detailed~~:1a adjective meanings of unusual
1: (adj)intriguing:1a
1a: [~~or~~ mysterious:1a] (adj)intriguing:1a ~~and~~ (adj)deep:1a ~~and~~ (adj)significant:1a
1b: [~~or~~ strange:1a] (adj)intriguing:1a ~~and~~ (adj)unexpected:1a ~~and~~ (adj) weird:1a

FIG. 29

Examples Of Normalized Verb Dictionary Definitions A to N

*bold shows indexed meanings followed by sense numbers,
parentheses ( ) show parts of speech,
brackets [ show synonyms ],
~~strikethrough~~ shows stopwords ignored by index* verb meanings of accomplish
1: (v) complete:1a
1a: [~~or~~ (v)carry out:1a, (v)execute:2a, (v)fulfill:1a, (v)attain:1a] ~~to~~ (v)complete:1a ~~a~~ (n)task: 1a verb meanings of beat
1: (adv)repeatedly:1a (v)move:1a
1a: [~~or~~ (v)hit:1a] ~~to~~ (adv)repeatedly:1a ~~and~~ (adv)quickly:1a (v)move:1a
1b: [~~or~~ (v)pulsate:1a] ~~to~~ (adv)rhythmically (adv)repeatedly:1a (v)move:1a by (v)swelling:1a ~~and~~ (v)contracting:1a
2: (adv)greater:1a (n)power:1a
2a: [or (v)overcome:1a ] ~~to~~ (v)intimidate:a1 and (v)surpass:1a by (adv)greater:1a (n)power:1a
2b: [~~or~~ (v)impress:1a ] ~~to~~ (v)show:1a (adv)greater:1a (n)power:1a
3: (v)mix:1a
3a: [ ~~or~~ (v)scramble:1a] ~~to~~ mix:1a (adv)thoroughly:1a
4: (v)avoiding:1a
4a: [~~or~~ (v)escape:1a] (v)avoiding:1a ~~making~~ (adj)usual:1a (n)compensation:a1
4b: [~~or~~ (v)smooth sailing:1a] (v)avoiding:1a ~~making~~ (n)effort:1a ~~while~~ (v)sailing:1a verb meanings for feel
1: (n)feeling:1a
1a: [or (v)care:1] ~~to~~ be (v)aware:1a of ~~an~~ (adj)emotional (n)feeling:1a (prep)within:2a (n)oneself:1a
2: (v)sense:3b
2a: [~~or~~ (v)palpate:1a ~~or~~ (v)grope:1a] ~~to~~ (v)sense:3b ~~the~~ (n)shape:2b, (n)softness:1a ~~and~~ (n)texture:2b ~~with~~ ~~a~~ (n)finger:1a
2b: [~~or~~ (v)perceive:1a] ~~to~~ (v)sense:3b ~~a~~ (n)condition:1a ~~in~~ ~~a~~ (n)place:2a ~~or~~ (n)object:2b verb meaning of figure
1: (v)understand:1a
1a: [~~or~~ (v)comprehend:1a] (adv)comfortably:1a (v)understand:1a (n)something:1a
2: (v)participate:1a
2a: [~~or~~ (v)take part:1a] ~~to~~ (adv)significantly:1a (v)participate:1a ~~in an~~ (n)event:1a
3: (v)calculate:1a
3a: [~~or~~ (v)do the math:1a] ~~to~~ (adv)mathematically:1a (v)calculate:1a ~~a~~ (adj)significant:1a

FIG. 30

Examples Of Normalized Verb Dictionary Definitions O to Z bold shows indexed meanings followed by sense numbers,
parentheses ( ) show parts of speech,
brackets [ show synonyms ],
~~strikethrough~~ shows stopwords ignored by index verb meaning of overarch
1: (adv)fundamentally:1a
1a: [~~or~~ (v)dominate:1a] (adv)fundamentally:1a (v)orchestrate:1a ~~the~~ (n)structure:1a ~~of~~ (n)something:1a verb meanings of perform
1: (v)entertain:1a
1a:[~~or~~ (v)play:6c] (v)entertain:1a ~~by~~ (v)creating:1a (n)art:1a
2: (v)execute:1a
2a:[~~or~~ carry out:1a] (v)accomplish:1a ~~or~~ (v)execute:1a ~~a~~ (n)task:1a ~~or~~ (n)function:1a verb meanings of pertain
1: *something:1a directly relevant:1a*
1a: (~~or~~ (v)apply:2b) is:1a ~~a~~ *directly relevant:1a* part:1a ~~or~~ condition:1a ~~of~~ something:1a
1b: (~~or~~ (v)relate:1a) is:1a *directly relevant:1a* ~~to~~ something:1a verb meanings of predict
1: forecast:1a
1a: [~~or~~ (v)bet:1a] ~~make a~~ wager (v)based on:1a ~~a~~ forecast:1a
1b: [~~or~~ (v)foretell:1a] (v)forecast:1a ~~by~~ (v)indicating:1a ~~an~~ (n)omen:1a

FIG. 31

Examples Of Normalized Conjunction Dictionary Definitions

*bold shows indexed meanings followed by sense numbers,*
*parentheses ( ) show parts of speech,*
*brackets [ show synonyms ],*
*~~strikethrough~~ shows stopwords ignored by index* conjunction meaning of how
1: (n)way to accomplish:1a (n)something:1a
1a: [or thusly:1a] a (n)specific method:1a ~~and~~ (n)way to accomplish:1a (n)something:1a conjunction meaning of what
1: (prep)part of:1a
1a: [or (prep)that which:1a] a (adj)specific:1a (n)aspect:1a ~~which is~~ (prep)part of:1a (n)something:1a

FIG. 32

Prior Art Venn Diagram Of Verb Meanings of Feel verb meanings for feel
1: (or care) to be aware of a general emotion within oneself
2: (or palpate) to touch with fingers to diagnose a medical condition
3: (or grope ) to rub with fingers for a sexual sensation
4: (or perceive) to sense a condition in a place or object
5: (or experience) to undergo the effects of something

Venn Diagram Normalized Verb Meanings of Feel verb meanings for feel
1: (n)*feeling:1a*
1a: [or (v)care:1] ~~to~~ be (v)aware:1a of ~~an~~ (adj)emotional (n)feeling:1a (prep)within:2a (n)oneself:1a
2: (v)*sense:3b*
2a: [~~or~~ (v)palpate:1a ~~or~~ (v)grope:1a] ~~to~~ (v)sense:3b ~~the~~ (n)shape:2b, (n)softness:1a ~~and~~ (n)texture:2b ~~with a~~ (n)finger:1a
2b: [~~or~~ (v)perceive:1a] ~~to~~ (v)sense:3b a (v)condition:1a ~~in a~~ (n)place:2a ~~or~~ (n)object:2b

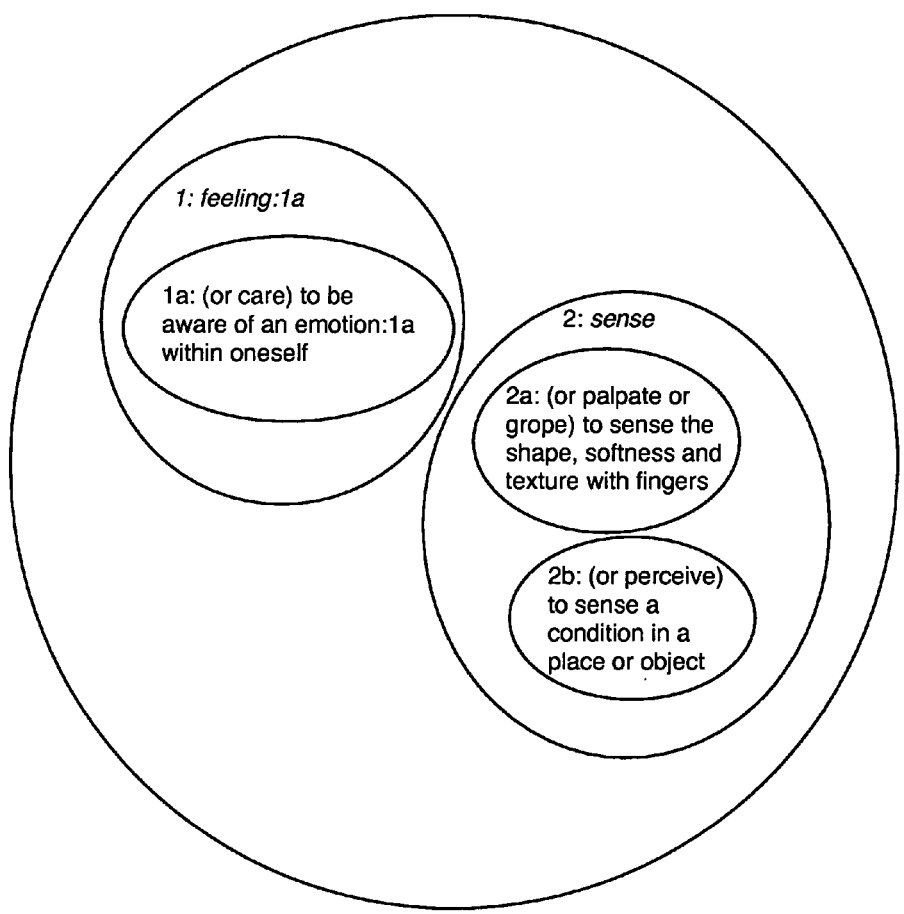

FIG. 34

Prior Art Venn Diagram Of Verb Meanings of Beat verb meanings of beat verb meanings of beat
1: (or strike) hit repeatedly
2: (or scare) to repeatedly strike bushes or hitting water, herding animals for hunting
3: (or tap) to make a precise musical rhythm by wildly hitting something
4: (or forge) to shape with blows
5: (or mix) to scramble
6: (or avoid) to not compensate for something
7: (or flog) to physically punish or intimidate
8: (or be exhausted) to be overcome
9: (or sail smoothly) to sail effortlessly

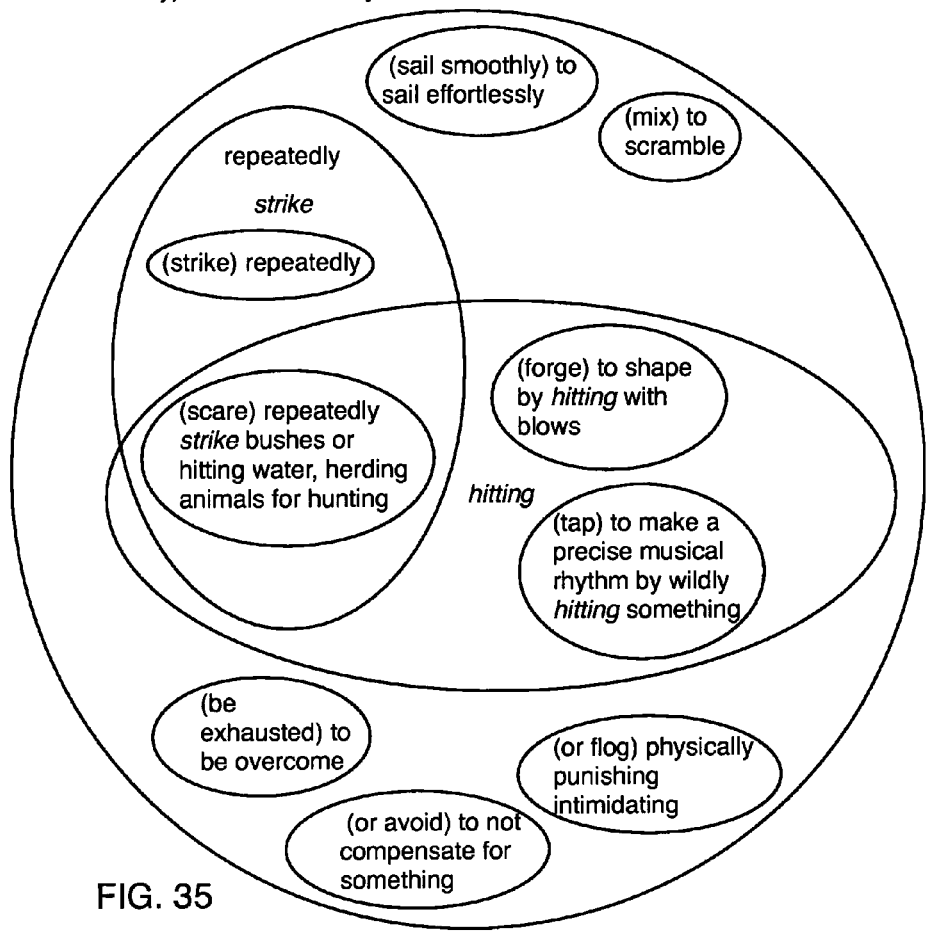

FIG. 35

Venn Diagram Of Normalized Verb Meanings of Beat verb meanings of beat

1: (adv)repeatedly:1a (v)move:1a
1a: [or (v)hit:1a] to (adv)repeatedly:1a and (adv)quickly:1a (v)move:1a
1b: [or (v)pulsate:1a] to (adv)rhythmically (adv)repeatedly:1a (v)move:1a by (v)swelling:1a and (v)contracting:1a
2: (adv)greater:1a (n)power:1a
2a: [or (v)overcome:1a ] to (v)intimidate:a1 and (v)surpass:1a by (adv)greater:1a (n)power:1a
2b: [or (v)impress:1a ] to (v)show:1a (adv)greater:1a (n)power:1a
3: (v)mix:1a
3a: [ or (v)scramble:1a] to mix:1a (adv)thoroughly:1a
4: (v)avoiding:1a
4a: [or (v)escape:1a] (v)avoiding:1a making (adj)usual:1a (n)compensation:a1
4b: [or (v)smooth sailing:1a] (v)avoiding:1a making (n)effort:1a while (v)sailing:1a

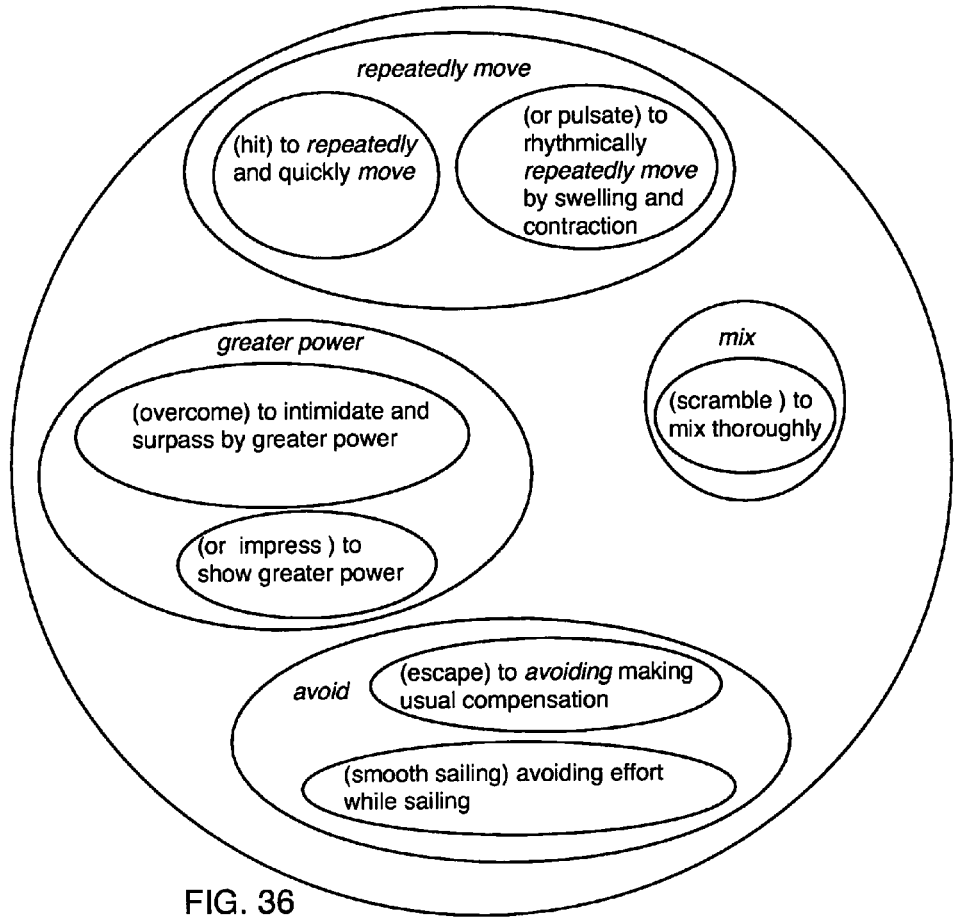

FIG. 36

Examples Of Venn Diagrams of Polysemy
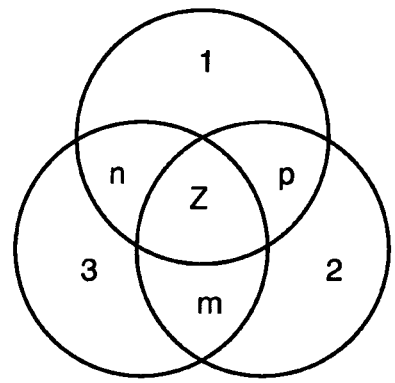
(a) All Possible Overlaps (Prior Art)
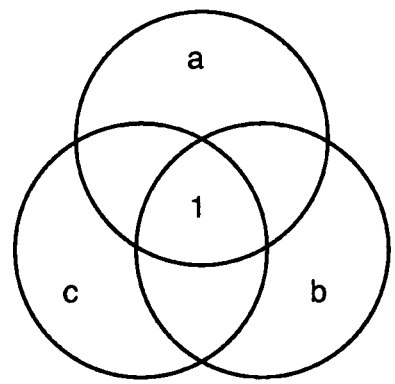
(b) Normalized Overlaps (Present Invention)
FIG. 37

Method To Disambiguate Word Sense Candidates

Example Of Poetic Meaning
And did you feel it, in your heart, how it pertained to everything?
And have you too finally figured out what beauty is for?
And have you changed your life?

© Mary Oliver. "The Swan" From <u>The Paris Review</u> # 124, Fall, 1992.

*italics show links to resonant meanings*

Poetic Resonance in First Level
verb meanings for feel
1: (n)*feeling:1a*
1a: [or (v)care:1] to be (v)aware:1a of an (adj)emotional (n)feeling:1a *[(n)heart:3a]*
(prep)within:2a (n)being:1a *[(n)heart:1a]*
2: (v)*sense:3b*
2b: [or (v)perceive:1a] to (v)sense:3b a (n)condition:1a *[(v)pertain:1a]* in a
(n)place:2a or (n)object:1a noun meanings of heart
1: (adj)*important:1*,
1a: [or (n)spirit:1a] an (adj)*important:1* (adj)fundamental:2a or (adj)overarching:
1a (adj)motivational:1a (n)character:1a of (n)being:1a *[(n)feeling:1a]*
3: (n)*intuition:1a*
3a: [or (n)bosom:3a] (adj)personal:3a (n)feeling:1a *[(n)feeling:1a]* and (n)intuition:
1a conjunction meaning of how
1: (n)*way to accomplish:1a (n)something:1a*
1a: [or thusly:1a] a (n)specific method:1a and (n)*way to accomplish:1a
(n)something:1a [(v)pertain:1a]* verb meanings of pertain
1: *something:1a directly relevant:1a*
1a: [or (v)apply:2b] is:1a a *directly relevant:1a* part:1a or condition:1a *[feel:2b]* of
something:1a
1b: [or (v)relate:1a] is:1a *directly relevant:1a* to something:1a *[(conj)how:1a]* noun meaning of everything
1: (n)thing:1
1a: [(n)all:1] (det)each (adj)possible:1a (n)thing:1

FIG. 46

Example Of Poetic Meaning Poetic Resonance

*italics show links to resonant meanings*

Poetic resonance in second level
noun meanings for condition
1: (n)being:1a
1a: (or (n)state:1a) a (n)form:1a of a being:1a *[(n)heart:1a] [(v)pertain:1a] [(v)feel:1a]* noun meanings of thing
1: (adj)special:1
1a: [(n)entity:1] a (adj) important:1 *[(n)heart:1a]* (adj)self-contained:1 being:1a *[(n)everything:1a]*
1b: [(n)aspect:1] a (adj)important:1 *[(n)heart:1a]* (n)attribute:1a of (n)something:1a *[how: 1a]* adjective meanings of directly relevant
1: (adj) important:1
1a: [(adj) connected:1] a (adj))important:1 *[heart:1a]* and (adj)connected:1a (n)thing:1
1b: [(adj) applicable:1] a (adj))important:1 *[heart:1a]* and (adj)germane:1a (n)condition:1a

Poetic resonance in third level
adjective meanings of important
1: significant:1a
1b: [or (adj)essential:1a] *[heart:1b]*, (adj)fundamental:2a, *[(n)heart:1a]*(adj)significant:1a ]
1a: [or (adj)valuable:1a] (adj)expensive:1a, (adj)costly:1a and (adv)significant:1a noun meaning of something
1: (adj)important:1
1a: ( or a topic:1a ) (adj)unspecified:1 (conj)yet:1a (adj)important:1 *[heart:1a] [(n)relevant: 1] [how:1a]*

Poetic resonance in fourth level
adjective meanings of unspecified

FIG. 47

Example Of Poetic Meaning Poetic Relevance

| | | |
|---|---|---|
| | (n)thing:1 | |
| | (n)being:1a | |
| | (n)state:1a | |
| (n)being:1a | (n)form:1 | (n)something:1a |
| (n)state:1a | (n)part:1 | (n)condition:2a |
| (n)form:1a | (adj)mysterious:1a | (n)mystery:1b |
| (n)emotion:1a | (adj)salient:1a | (n)unspecified:2a |
| (v)perceive:1a | (n)spirit:1a | (n)topic:1a |
| (v)sense:1a | (adv)incompletely:1a | (n)significance:1a |
| (n)condition:1a | (v)detailed:1a | (n)essence:1a |
| (n)object:1a | (adj)important:1 | (n)fundamental:1a |
| (v)aware:1a | (adj)connected:1 | (n)importance:2a |
| (v)care:1a | (v)overarching:1a | (n)connection:2b |
| (adj)emotional:1a | (n)character:1a | (n)applicability:1a |
| (n)feeling:1a | (n)bosom:1a | (n)germaneness:1c |
| (n)place:1a | (adj)personal:1a | (n)direct relevance:1a |
| | (n)feeling:1a | (n)relation:1c |

*And did you feel it, in your heart, how it pertained to everything?*

FIG. 48

Example Of Literal Meaning

"Bypass surgery on a beating heart is no more effective than traditional surgery."

*italics show links to resonant meanings*

Poetic Resonance in First Level
noun meanings of bypass
1: (n)diversion:1a
1a: [or (n)shunt:3b] (n)surgery:1a *[surgery:1a]* ~~making a~~ (n)diversion:1a ~~of~~ (n)fluids: 1a (prep)flowing past:1a a (adj)damaged:1a (n)body:1a (n)vessel:1a noun meanings of surgery
1: treatment:1a (n)method:1a
1a: [ ~~or~~ (n)operation:1a ] *[bypass:1a]* (n)treatment:1a ~~for a~~ (adj)medical:1a (n)condition:1a (v)using:1a a (adj)mechanical:1a (n)method:1a verb meanings of beat
1: (adv)repeatedly:1a (v)move:1a
1b: [~~or~~ (v)pulsate:1a] ~~via~~ (adv)repeated:1a (adv)rhythmic:1a *[heart:4a]* (n)contractions:1 *[(n)heart:4a]* ~~and~~ (n)swellings:1a noun meanings of heart
4: (n)*pump:2a*
4a: [~~or~~ (n)vascular pump:1a] a (adj)muscular:1a (n)pump:3a (v)moving:1a (n)blood: 1a in (adj)rhythmic:1a *[(v)beat:1b]* (n)contractions:1a *[(v)beat:1b]* (prep)through:1a ~~the~~ (n)lungs:1a ~~and~~ (n)body:1a adjective meanings of effective
1a: [~~or~~ (adj efficient:1a] (adj)accomplished:1a *[(adj) traditional:1a]* ~~and~~ (adj)able to (v)perform:1a ~~a~~ (n)task
2a: [~~or~~(adj realized:1a] ~~a~~ (adj)true:1a (n)event:1a (v)compared:2a *[than:1]* ~~to a~~ (adj predicted:1a (n)event:1a preposition meanings of than
1: [or (prep)compared to:1a] (v)compared:2a *[effective:2a]* ~~in~~ (n)comparison with:1a adjective meanings of traditional
1: (n)method:1a ~~to~~ (v)accomplish:1a *[(adj)effective:1a]* (n)something:1a
1a: [~~or~~ (adj)prior art:1a] ~~a~~ (adj)previous:1a (adj)earlier:1a (n)method:1a *[surgery:1a]* ~~to~~ (v)accomplish:1a (n)task:1a
1b: [~~or~~ (adj)conventional:1a] a (adj)prevalent:1a (n)method:1a *[surgery:1a]* ~~to~~ (v)accomplish:1a *[effective:1a]* (n)a (n)task:1a

FIG. 49

Example Of Literal Meaning Poetic Resonance

*italics show links to resonant meanings*

Poetic Resonance in Second Level verb meanings of predict
1: forecast:1a
1a: [or (v)bet:1a] make a wager (v)based on:1a a *forecast:1a*
1b: [or (v)foretell:1a] (v)forecast:1a by (v)indicating:1a an (n)omen:1a noun meanings of method
1: (n)way:1
1a: [or (n)procedure:1a] a (adj)systematic:1a (n)way:1a to (v)accomplish:1a *[(v)perform:2a]* a (n)task:1a *[(v)perform:2a]* noun meaning of something
1: (adj)important:1
1a: ( or a topic:1a ) (adj)unspecified:1 (conj)yet:1a (adj)important:1 verb meanings of accomplish
1: (v) complete:1a
1a: [or (v)carry out:1a, (v)execute:2a, (v)fulfill:1a, (v)attain:1a] to (v)complete:1a a (n)task:1a *[(v)perform:1a]* verb meanings of perform
2: (v)execute:1a
2a: [or carry out:1a] (v)accomplish:1a *[method:1a]* or (v)execute:1a a (n)task:1a *[(v)accomplish:1a]* or (n)function:1a noun meanings of task
1: (n)work:1a
1a: [or (n)job:1a, (n)chore:1a, (n)undertaking:1a] a (n)piece:1a of (n)work:1a

FIG. 50

Example Of Literal Meaning Poetic Relevance (n)operation:1a
(n)treatment:1a
(adj)medical:1a
(n)condition:1a
(adj)mechanical:1a
(v)perform:1a
(n)method:1a
(n)procedure:1a (n)vascular pump:1a
(adj)muscular:1a
(n)pump:1a
(v)moving:1a
(n)blood:1a
(adj)rhythmic:1a
(n)contraction:1a
(prep)through:1a
(n)lung:1a
(n)body:1a (n)method:1a
(n)performance:1a
(n)accomplishing:1a
(n)convention:1a
(n)earliness:1a
(n)prevalence:1a
(n)task:1a

    

"Bypass surgery on a beating heart is no more effective than traditional surgery."

FIG. 51

Example Of Dictionary Entry Editing User Interface

| verb meanings of beat | *size of font shows relative conceptual abstractness* |
|---|---|
| Sense Synonyms | Definitions |
| 1a  strike:1a | *(v)hitting:1b* (adv)repeatedly:1a |
| 2a  scare:1a | to (adv)repeatedly:1a (v)*strike:1a* (n)bushes:1a |
|   | or (n)water:1a, (v)herding:1a (n)animals:1a for (n)hunt:1a |
| 3a  tap:1a | to (v)make:1a a (adj)precise:1a (adj)musical:1a |
|   | (n)rhythm:1a by (adv)wildly:1a (v)*hitting:1b* |
|   | (n)something:1a |
| 4a  forge:2b | to (v)shape:1a by (v)*hitting:1b* with (n)blows:1a |
| 5a  mix:3b | to (v)scramble:3a |
| 6a  avoid:1a | to not (v)compensate:1a for (n)something:1a |
| 7a  flog:1a | (adv)physically:1a (v)punishing:2b, *(v)hitting:1b*, |
| 8a   | (v)intimidating:1a |
|   exhaust:2a | to (v)overcome:2a |
| 9a  sail smoothly:1a | *(adj)effortless:1a* (v)sailing:1a |

| Total Quality Issues: 7 | Good Senses: 3 | Total Quality: 40% |
|---|---|---|

Substitutions Recommended

| Sense | Current Term | Proposed Term | Reason |
|---|---|---|---|
| 2a | (n)hunt:1a | (v)hunting:1a | matches *(v)beat* part of speech |
| 1a, 4a, 7a | (v)hitting:1b | (adv)repeatedly:1a | more abstract (108 vs. 80) |
| 1a, 2a | (v)strike:1a | (adv)repeatedly:1a | more abstract (108 vs. 54) |
| 6a, 9a | (adv)effortless:1a | (v)avoid:1a | more abstract hypernym (253 vs 93) |
| 2a | (n)hunt:1a | (n)power:1a | also covers (v)herding, (v)strike, (v)scare |
| 3a | (adv)wildly:a1 | (adv)loudly:1a | conflicts with (adj)precise:1a |
| 1a, 1a, 4a, 7a | (v)strike:1a | (adv)repeatedly:1a | removes overlap with (v)hitting:1b |

Outlier Meanings

| Sense | Term | Reason |
|---|---|---|
| 2a | (v)herding:2b | below abstract threshold (59 vs. 25), |
| 2a | (v)hunt:3c | below abstract threshold (101 vs. 64), |
| 7a | (adv) physically:1a | above abstract threshold (300 vs. 255) |
| 9a | (v)sail:2a | below abstract threshold (101 vs. 35) |
| 9a | (v)sailing:1a | below abstract threshold (101 vs. 75) |

Stopwords: or for a

FIG. 52

Example Of A Search Engine Portal Web Page with Search-By-Metaphor

```
● ○ ○                    "Search By Metaphor" Web Portal

More abstract:                    (n)thing:1
                                  (n)being:1a
218                               (n)state:1a
                   (n)being:1a    (n)form:1        (n)something:1a
                   (n)state:1a    (n)part:1        (n)condition:2a
                   (n)form:1a     (adj)mysterious:1a (n)mystery:1b
                   (n)emotion:1a  (adj)salient:1a  (n)unspecified:2a
                   (v)perceive:1a (n)spirit:1a     (n)topic:1a
                   (v)sense:1a    (adv)incompletely:1a (n)significance:1a
                   (n)condition:1a (v)detailed:1a  (n)essence:1a
                   (n)object:1a   (adj)important:1 (n)fundamental:1a
                   (v)aware:1a    (adj)connected:1 (n)importance:2a
                   (v)care:1a     (v)overarching:1a (n)connection:2b
                   (adj)emotional:1a (n)character:1a (n)applicability:1a
                   (n)feeling:1a  (n)bosom:1a      (n)germaneness:1c
                   (n)place:1a    (adj)personal:1a (n)direct relevance:1a
26                                (n)feeling:1a    (n)relation:1c
                        ↑              ↑                ↑
Enter Your              |              |                |
Sentence: And did you feel it, in your heart, how it pertained to everything?
                        |              |                |
                        ↓              ↓                ↓
Less abstract:
23                 (v)embrace:1a  (n)welcome:1a    (n)question:1a
                   (n)lover:1a    (n)longing:1a    (n)comment:1a
                   (n)family:2a   (v)condole:1a    (v)respond:1a
10                 (n)home:3b     (n)romance:1a    (n)focus:1a Results sorted by Relevance:
Query: Relevance: Quotation:
  ○     42%       In this great Heart Sutra, we feel what all sentient beings perceive as the  ⇒ source
                  grace and gifts of nature as they pertained to the excitement of life.

○     39%       The skill to feel, identify, process and communicate our needs are          ⇒ source
                  developed from daydreams pertaining to the heart.

○     20%       The meditation pertains to feelings deep in the heart, where                ⇒ source
                  connections between mind and body are clearest.
                  ← ...previous    page 1 of 3    next... →
```

FIG. 55

Musical Letter Chromo-num Hash Table

| Letter | Chromo-Num |
|---|---|
| a | 1 |
| b | 2 |
| c | 3 |
| d | 4 |
| e | 5 |
| f | 8 |
| g | 3 |
| h | 5 |
| i | 1 |
| j | 1 |
| k | 2 |
| l | 3 |
| m | 4 |
| n | 5 |
| o | 7 |
| p | 8 |
| q | 1 |
| r | 2 |
| s | 3 |
| t | 4 |
| u | 6 |
| v | 6 |
| w | 6 |
| x | 5 |
| y | 1 |
| z | 7 |

| Letter | Chromo-Num |
|---|---|
| ? | 0 |
| . | 0 |
| " | 0 |
| ' | 0 |
| ! | 0 |
| & | 1 |
| - | 0 |

FIG. 58

Examples A-B-C Of Chord Transition Independent Sentiments

(A)

"reasoned satisfaction" from-chord: 10 to-chord: 17 story-line: "mood"
feeling: 1/4 thinking: 1/2 needs: 1
Examples:
"day after we checked out.", "a bunch of other people on",
"here again although I think I", "not a single negative thing that",
"I will admit it did serve", "tap into some Bohemian energy",
"good for those on a budget", ", but be prepared to be",
"was always kept clean daily and", "and for a nice trendy night"

(B)

"mature advice" from-chord: 12 to-chord: 26 storyline: "ego"
feeling: 1/16 thinking: 1/4 needs: 1/8
Examples:
"a cookie-cutter corporate chain hotel,", "basic hotel- you aren't paying for",
"interesting international clientele. My only", ". All that would have gotten",
"has its own butler, for", "morning before check-in and instead of",
"are nearly impossible to get rid", "was stocked daily with generous portions",
"us a free breakfast for two", "hotel has friendly, knowledgable staff",
"will also help you avoid contracting", "needed something in writing from the",
"cheaper for what it is though", "year for fifteen years and would",
"definitely didn't reach its chic and", "with numbers corresponding to each bathroom"

(C)

"anticipating unmet needs" from-chord: 14 to-chord: 16 storyline: "ego"
feeling: -3/8 thinking: 1/4 needs: -7/8
Examples:
"death shuttle from the airport to the", "in the bathroom in the middle",
"the bathroom in the middle of", "a cat nap for an hour",
"and it's still relatively cheap for", "not ok, and there wasn't",
"the three miserable rooms they showed", "also really small. One of",
"path. My exposure with this", "helped me to discover that I",
"is if I called my bank", "as this hotel tries to convince",
"elevator is super small and probably"

FIG. 61

Examples D-E Of Confirmation Chord Transition Sentiments

(D)

"unfair tradeoff" from-chord: 6 to-chord: 15 storyline: "ego"
feeling: -3/16 thinking: 1/16 needs: -3/8

Examples:
"charming and nice, but has" (inner conflict) confirmed by "and nice, but has nothing",
"chocolates. I am afraid to" (unfair tradeoff) confirmed by ". I am afraid to say",
"staying. It was a terrible" (deeper issues) confirmed by ". It was a terrible experience",
"horrified by the harsh, almost" (confirming opinion) confirmed by
"by the harsh, almost clinical",
"reservation had indeed been" (strange mystery) confirmed by
"had indeed been cancelled, I'd",
"( so don't get drunk and run" (problematic idea) confirmed by "so don't get drunk and run",
"to love, but when you" (supporting hope) confirmed by "love, but when you sacrifice",
"been cancelled, I was told" (asking questions) confirmed by "cancelled, I was told that",
"again, for whatever reason," (cautiousness) confirmed by ", for whatever reason, I'll"

(E)

"anomaly resolved" from-chord: 6 to-chord: 15 storyline: "discovery"
feeling: 1/8 thinking: 1/8 needs: 3/16

Examples:
"maid was either vaccuuming or spraying" (delicate situation) confirmed by "was either vaccuuming or spraying something", "if other Manhattan options were too" (catchy underlying tension) confirmed by "other Manhattan options were too expensive"

"but I've never been bothered too" (minor success) confirmed by "I've never been bothered too much"

"and they seem to be kept" (important context) confirmed by "they seem to be kept clean"

"were willing to hold our bags" (revealing talk) confirmed by "willing to hold our bags until"

"and walked around in night slippers" (alluring but unnecessary) confirmed by "walked around in night slippers rather"

"and gave me some time to" (knowingly taking a risk) confirmed by "gave me some time to check"

"helpful otherwise . The most important" (tricky guidance) confirmed by "otherwise . The most important point"

FIG. 62

Example Of Sentence B Sentiment Index Trigrams

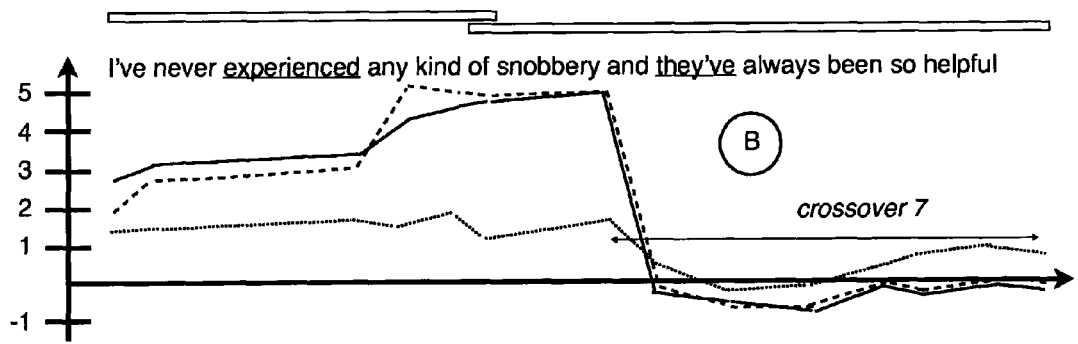

Verb Section B1
Index under
Feeling = 3.3
Thinking = 1.6
Needs = 3.2 experience, kind, never
experience, kind, snobbery
experience, never, snobbery feel, kind, never
feel, kind, snobbery
feel, never, snobbery participate, kind, never
participate, kind, snobbery
participate, never, snobbery

Verb Section B2
Index under
Feeling = 1.2
Thinking = 0.3
Needs = 1.1 help, experience, kind
help, experience, snobbery
help, kind, snobbery encourage, experience, kind
encourage, experience, snobbery
encourage, kind, snobbery accommodate, experience, kind
accommodate, experience, snobbery
accommodate, kind, snobbery

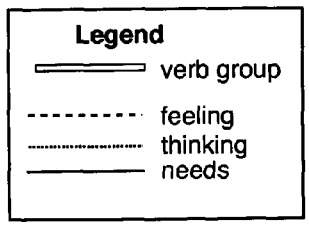

FIG. 67

Example Of Paragraph F Sentiment Index Trigrams

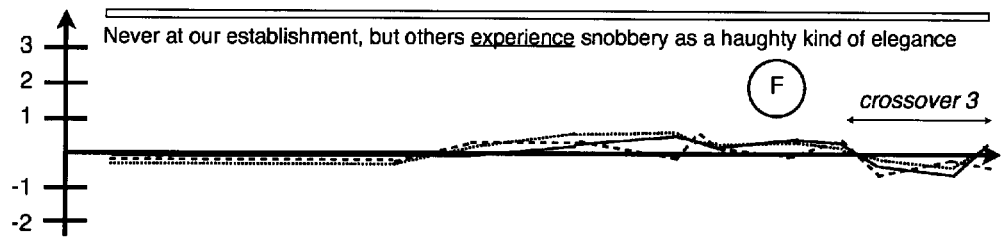

Verb Section F1
Index under
Feeling = -0.1
Thinking = 0.3
Needs = 0.1 experience, elegance, establishment
experience, elegance, haughty
experience, elegance, kind,
experience, elegance, never
experience, elegance, others
experience, elegance, snobbery
experience, establishment, haughty
experience, establishment, kind
experience, establishment, never
experience, establishment, others
experience, establishment, snobbery
experience, haughty, kind
experience, haughty, never
experience, haughty, others
experience, haughty, snobbery
<u>experience, kind, never</u>
experience, kind, others
<u>experience, kind, snobbery</u>
experience, others, snobbery
experience, others, never
<u>experience, never, snobbery</u> feel, elegance, establishment
feel, elegance, haughty
feel, elegance, kind,
feel, elegance, never
feel, elegance, others
feel, elegance, snobbery
feel, establishment, haughty
feel, establishment, kind
feel, establishment, never
feel, establishment, others
feel, establishment, snobbery
feel, haughty, kind
feel, haughty, never
feel, haughty, others
feel, haughty, snobbery
<u>feel, kind, never</u>
feel, kind, others
<u>feel, kind, snobbery</u>
feel, others, snobbery
feel, others, never
<u>feel, never, snobbery</u>

FIG. 69

Example Of Paragraph G Sentiment Index Trigrams

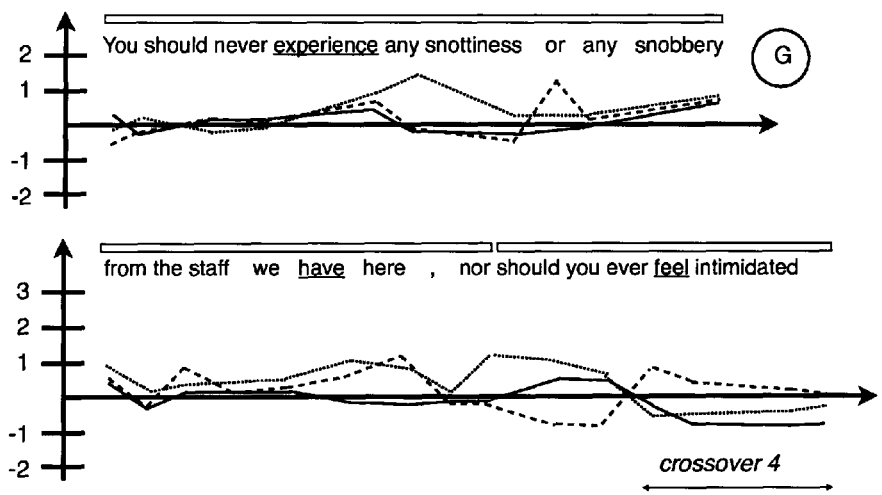

You should never <u>experience</u> any snottiness or any snobbery (G)

from the staff we have here , nor should you ever <u>feel</u> intimidated crossover 4

Verb Section G1
Index under
Feeling = 0.6
Thinking = 0.7
Needs = 0.3 experience, never, should
experience, never, snottiness
<u>experience, never, snobbery</u>
experience, should, snottiness
experience, should, snobbery feel, never, should
feel, never, snottiness
<u>feel, never, snobbery</u>
feel, should, snottiness
feel, should, snobbery

Verb Section G2
Index under
Feeling = 0.6
Thinking = 0.8
Needs = -0.1

<u>staff, experience, feel</u>
staff, experience, here
staff, experience, nor
staff, feel, here
staff, feel, nor
staff, here, nor provide, experience, feel
provide, experience, here
provide, experience, nor
provide, feel, here
provide, feel, nor
provide, here, nor

Verb Section G3
Index under
Feeling = -0.15
Thinking = 0.05
Needs = -0.2 feel, ever, intimidated
feel, ever, should
feel, intimidated, should experience, ever, intimidated
experience, ever, should
experience, intimidated, should sense, ever, intimidated
sense, ever, should
sense, intimidated, should perceive, ever, intimidated
perceive, ever, should
perceive, intimidated, should

FIG. 70

Example Of Paragraph H Sentiment Index Trigrams

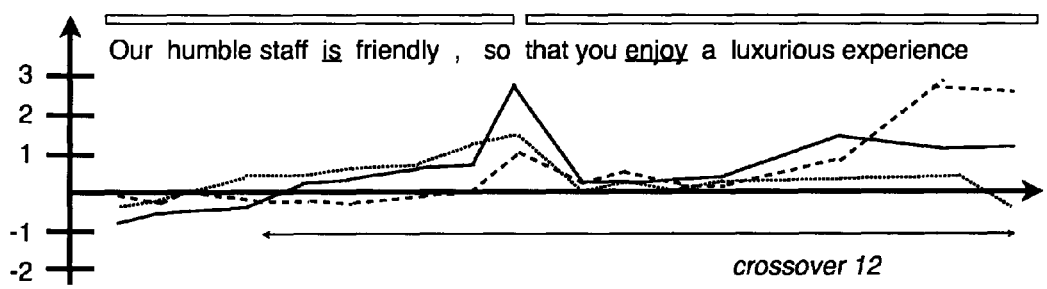

Verb Section H1
Index under
Feeling = -0.05
Thinking = 0.5
Needs = 0.4 staff, enjoy, experience
staff, enjoy, friendly
staff, enjoy, humble
staff, experience, friendly
staff, experience, humble,
staff, friendly, humble provide, enjoy, experience
provide, enjoy, friendly
provide, enjoy, humble
provide, experience, friendly
provide, experience, humble,
provide, friendly, humble

Verb Section H2
Index under
Feeling = 1.0
Thinking = 0.4
Needs = 0.8 enjoy, experience, friendly
enjoy, experience, luxurious
enjoy, experience, staff
enjoy, friendly, luxurious
enjoy, friendly, staff
enjoy, luxurious, staff feel, experience, friendly
feel, experience, luxurious
<u>feel, experience, staff</u>
feel, friendly, luxurious
feel, friendly, staff
feel, luxurious, staff

FIG. 71

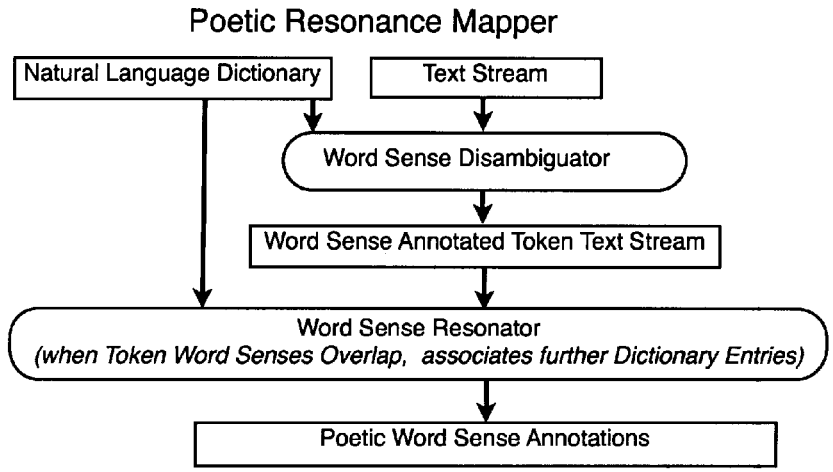

Poetic Resonance Mapper

Poetic Sample
(n)being, (n)state, (n)form, (n)emotion, (v)perceive, (v)sense, (n)condition, (n)object, (v)aware, (v)care, (adj)emotional, (n)feeling, (n)place, (n)being, (n)state, (n)form, (n)part, (adj)mysterious, (adj)salient, (n)spirit, (v)detailed, (adj)important, (adj)connected, (v)overarching, (n)character, (n)bosom, (adj)personal, (n)feeling, (n)intuition (n)something, (n)condition, (n)mystery, (n)topic, (n)significance, (n)essence, (n)fundamental, (n)importance, (n)connection, (n)applicability, (n)germaneness, (n)direct relevance, (n)relation "And did you feel it, in your heart, how it pertained to everything?"

Literal Meaning Sample
(n)operation, (n)treatment, (adj)medical, (n)condition, (adj)mechanical, (v)perform, (n)method, (n)procedure, (adj)systematic, (v)accomplish (adj)vascular, (adj)muscular, (adj)mechanical, (n)pump, (v)moving, (n)blood, (adj)rhythmic, (n)contraction, (prep)through, (n)lung, (n)method, (n)performance, (v)accomplish, (n)convention, (n)precedence, (n)prevalence, (n)task "Bypass surgery on a beating heart is no more effective than traditional surgery."

FIG. 77

Examples Of Sentiment Constants

| Constant: | Value: |
|---|---|
| Min Admiration Thinking | -0.36 |
| Min Saturation | 0.24 |
| Min Admiration Span | 2.6 |
| Min Sarcasm Span | 1.8 |
| Min Sarcasm Thinking | -0.48 |
| Min Bombast Magnitude | 3.6 |
| Coldness Limit | 0.036 |
| Min Reaction Limit | -1.2 |
| Min Vehemence Magnitude | 2.4 |
| Min Confusion Thinking | -0.18 |
| Implicit Thinking | 0.14 |

FIG. 91

COMPASSION, VARIETY AND COHESION FOR METHODS OF TEXT ANALYTICS, WRITING, SEARCH, USER INTERFACES

RELATED APPLICATIONS

This application is a continuation-in-part of U.S. utility patent application Ser. No. 12/382,754 filed Mar. 23, 2009 by Au, titled "SYSTEM AND METHOD FOR ANALYZING TEXT USING EMOTIONAL INTELLIGENCE FACTORS", hereinafter referred to as the "Au Patent".

This patent application also claims priority to the U.S. provisional patent application 61/344,284 filed on Jun. 23, 2010 by Au, titled "METHODS OF INDEXING MEMORY PRECURSORS FOR SEARCH ENGINE RELEVANCE", hereinafter referred to as the "Au Memory Patent".

This patent application also claims priority to the U.S. provisional patent application 61/388,351 filed on Sep. 30, 2010 by Au, titled "Methods Of Indexing For Logical and Rhetorical and Metaphoric Relevance", hereinafter referred to as the "Au Metaphor Patent". Each of these preceding patent applications is incorporated by reference in its entirety herein.

This patent application also claims priority to the U.S. provisional patent application 61/498,963 filed on Jun. 20, 2011, by Au, titled "Compassion, Variety and Cohesion For Methods Of Text Analytics, Writing, Search", which is hereby incorporated by reference, in its entirety.

BACKGROUND OF THE INVENTION

Some have said, that in the final analysis, all we truly have is our stories. But without compassion, these stories are suspiciously one-sided. Compassion gives stories gravitas and inspire us to look deeper into their relevance. Compassion serves as a convergence point for gravitas, around specific concepts. By expressing concepts in a variety of manners, the gravitas of compassion blossoms into passions, and passions, sufficiently validated for consistency, illuminate the cognitive basis of truth.

Compassion and its underlying sentiments are thus foundations of memorable expressive language. Even short passages convey story lines which express compassion. Extensive research into story line analysis, using accurate word-by-word sentiment analysis, shows that story lines gather tension and resolve tension in passages as short as a few sentences, to foreshadow or resonate with more significant themes. Literary editors have long known that foreshadowing a theme can make a story more memorable, especially when an item, not logically part of the theme, foreshadows a theme, thus increasing readers' suspense, to find out how the item fits into the theme.

Cognitive psychology research confirms this, showing that memory retention is strongly influenced by emotional valence, so that items with positive or negative valence are better remembered than neutral items. As readers continue reading a story, they retain memory of the items with greatest valence, and from these items, elaborate possible ways that foreshadowed sentiments fit into known themes. Cognitive psychology research also confirms that items are recalled by people more clearly, whenever items resonate with larger mental themes, thus enabling people's minds to elaborate connections to these larger themes.

Stories of compassion are among the deepest and more meaningful elaborations of themes, such as memories of saving lives, saving our self-respect, saving the meaning of our existence. However, traditional search engine indices have ignored compassion and even sentiment, since scientific tradition has biased research toward analysis of logic, grammar, and Aristotelian hierarchy. Sentiment is clearly independent of, and scarcely follows these rigid structures, for as cognitive research shows, sentiment continues to operate within many patients whose capabilities of logic, grammar and speech have vanished, showing that sentiment operates on a cognitive level more fundamental than levels of logic, grammar, and Aristotelian hierarchy.

For example, our logical scientific tradition provide no practical efficient way to recognize the negative sentiment in sentences such as this: "This hotel has a policy which, if another guest overstays their reservation, allows them to change your reservation, and check you into a different room the size of a large bathtub." Yes, there are costly impractical methods, such as modeling the grammar and real-world sizes of all dictionary nouns, together with creating models of all possible expectations related to hotel stays. However, it would be more practical and cost-effective to sense the complaining tone of this sentence, which arises from the word order and sound of the words, and conveys sentiment directly through musical and repetitive cadences of language.

Consider that, from birth, humans are imprinted with sounds of baby-talk, a kind of rhythmic encouraging cooing soothing, or stoccato warning, or rising and falling tones of encouragement. Mommies and daddies use this pre-verbal speech to communicate with babies before they can talk, to convey dramatic messages or soothings in a primal compassionate way that babies can understand. Consistency with these initial rhythmic and tonal patterns of empathy and compassion persists as babies acquire language, becoming a permanent underlying component of language.

Text analytics for detecting such underlying rhythmic and tonal patterns can take a variety of forms more computationally efficient and flexible for recognizing emotion and sentiment than logic, grammar and hierarchy. Regardless, however, of the sentiment detection methods used to recognize phrases of dramatic tension and resolution that elaborate themes of compassion, there is great utility in tracking dramatic tension and resolution that elaborates themes of compassion.

Even methods based on traditional manual annotation, or automated by computers to classify words by negative and positive valence, and modification of valence by sign for nearby words such as "no" and "but", can reveal useful measurements of sentiments for many practical purposes.

For instance, in the fields of eDiscovery and social media monitoring, intentions surrounding actions are among the most valuable dramatic items to recognize. In eDiscovery, these are illegal or unethical intentions. In social media monitoring, these are intentions propelling purchasing decisions. Significantly, these actionable intentions depend greatly on the grammar of verbs, and the cluster of words around these verbs which convey the intention which makes actions illegal, or the intention behind a purchasing decision.

Similarly, from a traditional story analysis perspective, motivational intentions converge upon actions associated with people and dramatic tension and resolution components of compassion analysis. For instance, a product reviewer may have problems with one product that are overcome by switching to another product. The swings in sentiment in this story enhance a story's credibility, and a sense of compassion (about the product category) from the reviewer. One-sided stories lacking in compassion sentiments are less credible to readers. Accurately tracking the sentiments occurring around themes in stories would enable eDiscovery of credibly illegal intentions, or monitoring of credibly specific purchasing intentions.

Cognitive research shows that items with stronger sentiment valences, which are germane to tracking compassion sentiments, are more likely to be remembered. Similar to page-rank in the Google algorithm, which tags and retrieves web pages by how many pages link to them, human minds tag and retrieve memory according to how strong the sentiments are surrounding those memories. Enormous amounts of data have no page-by-page links, such as the millions of free downloadable eBooks on the web. For these books, summaries of their themes with strong sentiments would be useful, as would ratings based on compassion (wholesomeness) and variety (interestingness), especially if rated for specific concepts (themes) that readers are already curious about.

Accurate sentiment annotations are also used to seek relationships between the most salient concept relationships within text. Concentrating on relationships between salient concepts is essentially what editors do when boiling text down to its essence, for improved readability and to write catchy, pithy description to market books. In book reviews and literary criticism, compassion and variety of opinions expressed are useful measures of how useful those opinions are, as search engine results.

Search engine results quality is now crucial for consumers relying upon customer reviews. For instance, consumers read reviews, and dismiss them for bad writing, emotional bias, or suspiciously fabricated appearance. Research has shown that even the presence of spelling errors reduces consumer confidence to the point of driving purchase rates significantly downward, so that some commercial web sites have manually edited product reviews to correct spelling mistakes. Given the importance of writing quality in reviews, selectively presenting customer reviews having cohesive, unbiased, compassionate and in-depth commentary could even more powerfully promote sales and better educate consumers.

In-depth commentaries are characterized by a variety of different observations. Rather than promoting a narrow or cliched view, in-depth commentaries describe a variety of unusual aspects woven into the story of the review. Monitoring the cohesion of reviews excludes reviews whose comments are merely concatenations of unrelated opinions, which could generated by an automatic review generating program. Monitoring reviews for compassion would also exclude reviews based upon malicious or obnoxious sentiments.

Related criteria have been used by major search engines when filtering out web pages which are fabricated solely to mislead search engine algorithms. For instance, by artificially generating millions of web pages linked to target web pages, the traditional rankings based on link popularity can be forced upwards, though the links themselves can be meaningless. This technique is known as "black hat search engine optimization (SEO)."

Search engine portals such as Google therefore have spent considerable resources to review the quality of web page links. By comparing the relevance of web pages on both sides of each web link, it is useful to deprecate links in the search engine algorithm, when pages on both sides of a web link are irrelevant to each other, thus reducing the page rank of results from those links.

Similar writing standards also can bridge between literary readers and writers. Due to increasing population, literacy rates, and ease of access to publications through e-books, both writers and readers of literature have become far too numerous for publishing companies to serve as intermediaries. No longer can manual methods consistently categorize genre and quality of all literature; only automated methods can do that now. However, readability, credibility and genre thematic quality traditionally vetted by publishing houses cannot be categorized by traditional probability and keyword analysis of text analytics. Viewed through its writings, society has evolved a greater sense of compassion by positing problems, then solutions, over and over, while increasing both the variety and cohesion of this Socratic discourse. Automation to validate this social progress, concept by concept, by vigilantly reviewing blogs and social media, could be instrumental in bringing about needed social changes, by showing where human efforts and resources are most needed, on a consistent conceptual basis.

SUMMARY OF THE INVENTION

The present invention increases the precision and recall of search engine indices, while decreasing hardware resources needed to store them, by using musical rhythmic analysis to detect sentiment and emotion, as well as using poetic and metaphoric resonances with dictionary meanings, to annotate, distinguish and summarize n-grams of word meanings, then intersecting n-grams to locate mutually salient sentences. With this advanced foundation of metaphor salience analysis to cluster sentences and paragraphs into automatically named concepts, the present invention automatically characterizes quality and depth to which documents have conveyed the meaning of concepts, in editorial metrics of compassionate narrative, variety of perspectives and logical cohesion. Using compassion, cohesion and variety as a universal homeostatic figure of merit of the value of writing, the present invention automatically sets pricing for written works and their copyrights, and automatically monitors blogs, "voice of the customer" reviews and social media for newsworthy in-depth commentary.

BRIEF DESCRIPTION OF THE DRAWINGS

FIG. 2 shows an example of text to be converted to speech, as well as a transcript of speech synthesizer commands produced by the method of FIG. 1 for this sample of text.

FIG. 6 shows an example of intermediary values for FIG. 4 in a table listing the Meaning Matched Token Index of the method of FIG. 4 for the example of a polysemy tagged word phrase tree of FIG. 5.

FIG. 9 shows an example of a Part Of Speech Transition Table of FIG. 8, which maps examples of names of syntactic objects tracked by the present invention in FIG. 8.

FIG. 10 shows an example of an Admissible Bridge Translation Table of FIG. 8, which maps examples of names of syntactic objects which are candidates for representing relevant units of syntactic meaning.

FIG. 12 shows an example of FIG. 11 trigram bridge relevance ordering for filtering relevant syntactic objects stored for the sentence "We reverse the decision of the District Court."

FIG. 15 shows an example of a search engine portal web page using the methods of FIG. 11 and FIG. 14 to provide Search-by-narrative querying.

FIG. 24 Example of Prior-art Dictionary Definitions

FIG. 25 Examples of Normalized Noun Dictionary Definitions A to G

FIG. 26 Examples of Normalized Noun Dictionary Definitions H to M

FIG. 27 Examples of Normalized Noun Dictionary Definitions P to Z

FIG. 28 Examples of Normalized Adjective Dictionary Definitions A to O

FIG. 29 Examples of Normalized Adjective Dictionary Definitions P to Z

FIG. 30 Examples of Normalized Verb Dictionary Definitions A to N

FIG. 31 Examples of Normalized Verb Dictionary Definitions O to Z

FIG. 32 Examples of Normalized Conjunction Dictionary Definitions

FIG. 34 Venn Diagram Of Normalized Verb Meanings of Feel

FIG. 35 Prior Art Venn Diagram Of Verb Meanings of Beat

FIG. 36 Venn Diagram Of Normalized Verb Meanings of Beat

FIG. 37 Examples Of Venn Diagrams Of Polysemy

FIG. 46 Example of Poetic Meaning

FIG. 47 Example of Poetic Meaning Resonance

FIG. 48 Example of Poetic Meaning Relevance

FIG. 49 Example of Literal Meaning

FIG. 50 Example Of Literal Meaning Poetic Resonance

FIG. 51 Example Of Literal Meaning Poetic Relevance

FIG. 52 Example Of Dictionary Entry Editing User Interface

FIG. 55 Example Of a Search Engine Portal Web Page with Search-by-Metaphor

FIG. 58 Musical Letter Chromo-num Hash Table

FIG. 61 Examples A-B-C Of Chord Transition Independent Sentiments

FIG. 62 Examples D-E Of Chord Transition Independent Sentiments

FIG. 67 Example Of Sentence B Sentiment Index Trigrams

FIG. 69 Example Of Paragraph F Sentiment Index Trigrams

FIG. 70 Example Of Paragraph G Sentiment Index Trigrams

FIG. 71 Example Of Paragraph G Sentiment Index Trigrams

FIG. 77 Poetic Resonance Mapper

FIG. 91 Examples Of Sentiment Constants

DESCRIPTION OF THE INVENTION

Traditional editorial values and writing standards can be summarized in terms of how well genre themes have been presented in terms of compassion (conceptual depth), increased variety (freshness) and cohesion (consistency), and those summaries could serve as a universal currency of written values to serve any of the self-publishing networks linking writers to readers, assuring them of quality works focused on specific genres or themes they find most compelling.

Beyond the quality of writing, the quality of conversation could also be measured by characteristics of compassion, variety and cohesion, to enable conversational robots or chatbots to gather and deliver useful information with the ease that comes with compassion. Current conversational robots choose from a wide selection of stock responses. Filtering those responses for maximum compassion would enable robots to sense and ameliorate unhappy feelings. Filtering responses for maximum variety would prevent boring responses. Filtering responses for maximum cohesion would prevent the conversation from straying.

Characteristics of compassion, variety and cohesion thus function well together to form a balanced and self-balancing measure of achievement, or a universal homeostatic system, for measuring acquisition and reflection of useful story knowledge, in the tremendous sense that stories support all passionate meaning.

Figure 76:
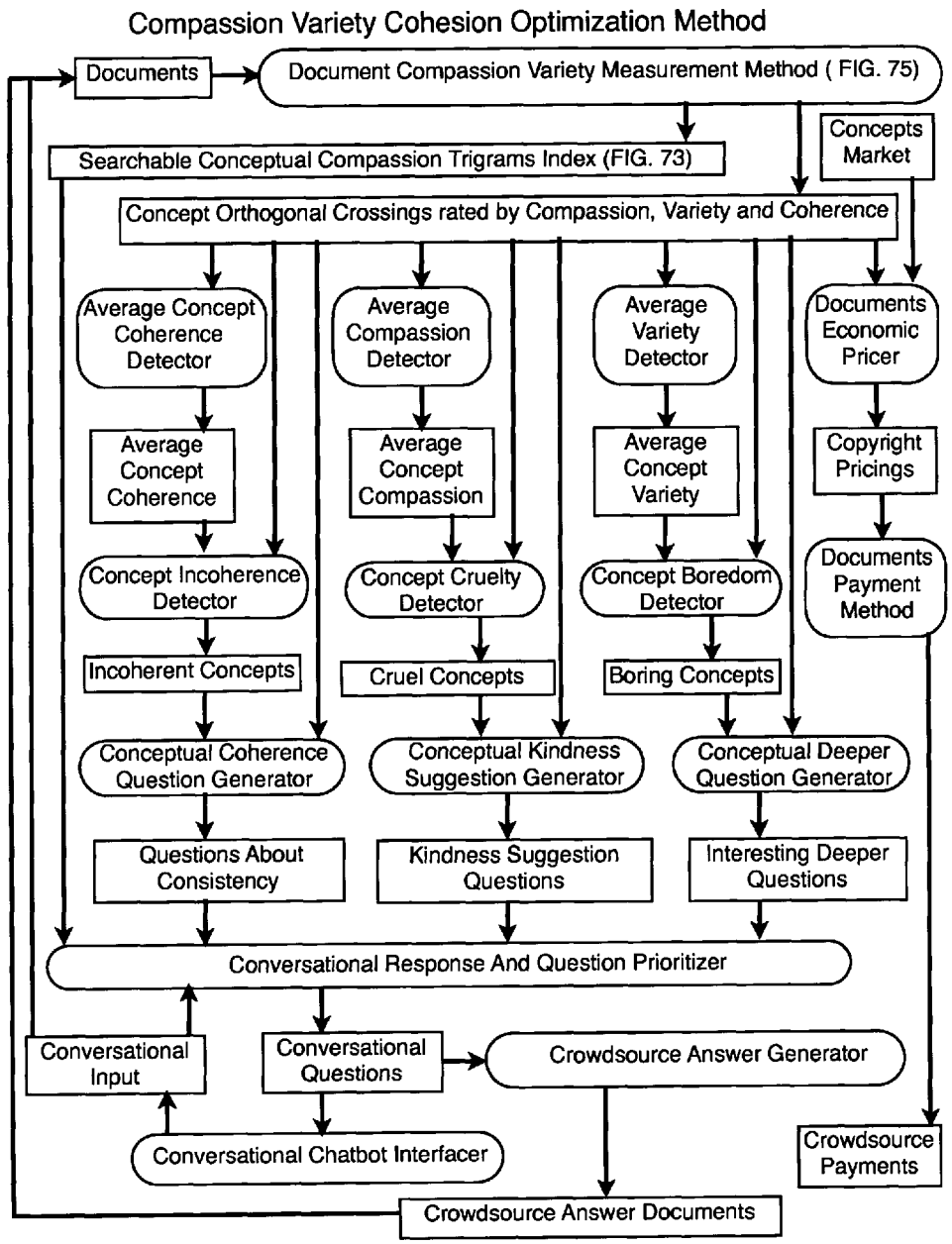
FIG. 76 Compassion Variety Cohesion Optimization Method

Documents are the way story knowledge is generally preserved, and even the story knowledge of oral histories can generally be successfully transcribed into written documents, for indexing purposes. FIG. 76 diagrams a method to coordinate document flows, document payments and conversations about documents, using methods measuring conceptual Compassion, Variety and Cohesion within documents.

Characteristics of compassion, variety and cohesion, so crucial to the quality of customer reviews, could also rate the quality of web page link relevance. A cohesion filter could find links where pages are non-sequiturs to each other. A variety filter could find links between pages of narrow or cliched opinions. A compassion filter could find links between pages which are emotionally unbalanced. Ranking search engine results for how well they pass these three filters would be an effective way to get better search engine results and avoid "black hat search engine optimization" pages.

Based on prevailing Concepts Market pricing, and summing qualities of Concept Coherence, Concept Variety and Conceptual Compassion in each document, a Documents Economic Pricer can compute a Copyright Pricing for the Documents Payment Method to send payments to authors. This enables various ways for authors to become paid writers, for both small and large works, and for both full copyrights and rights to percentages of sales. By automatically monetizing the development of concepts on a consistent homeostatic basis, human efforts and resources are directed to the concepts most crucial for true needs for social progress, enabling research, product development and social change to be driven directly by blogs, social media and "voice of the customer" writings, on an up-to-the-minute newsworthy basis.

Figure 75:
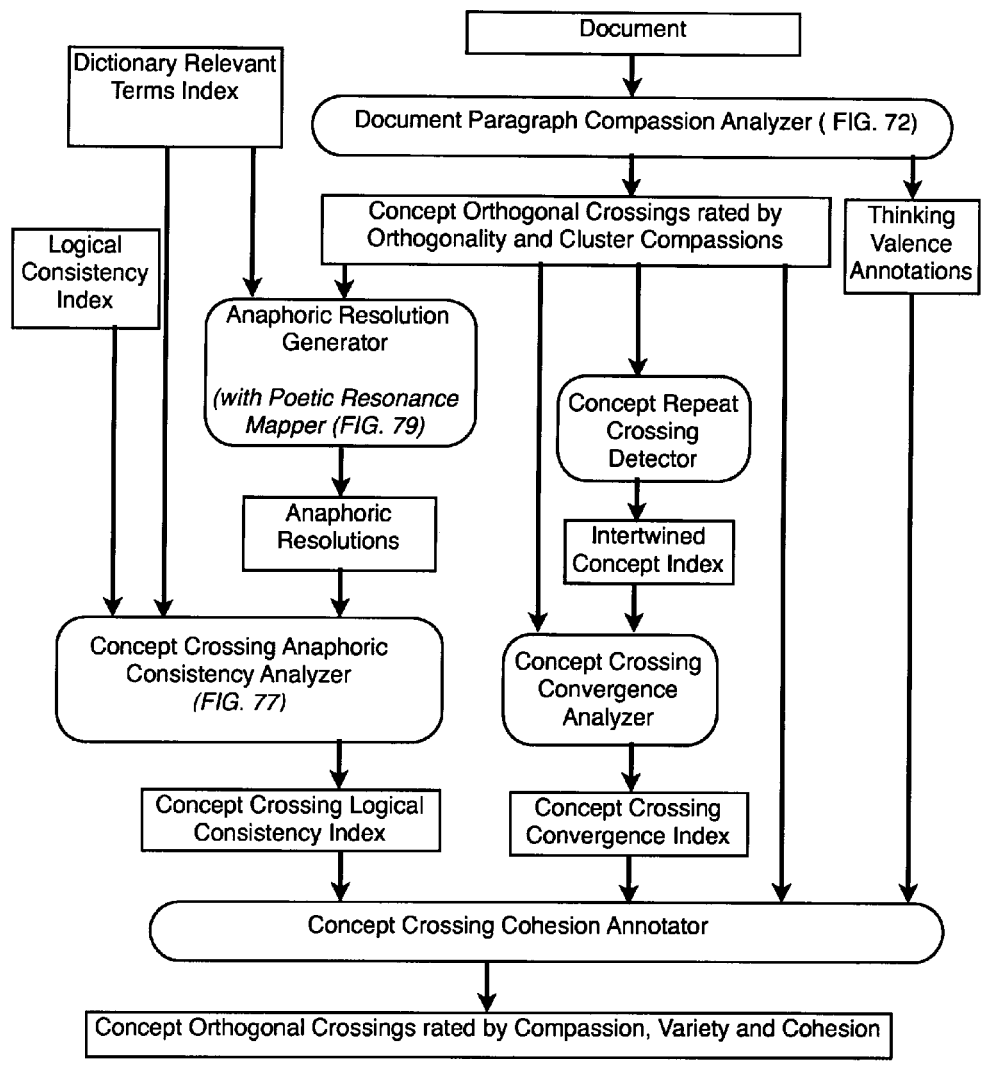
FIG. 75 Compassion Variety Cohesion Measurement Method

Documents are input to the method at the top of FIG. 76, and from that to a method in FIG. 75 which produces metrics on conceptual presentations within documents. By detecting paragraphs where independent concepts combine, conceptual variety can be computed. By detecting successive paragraphs where negative and positive sentiments are expressed around concepts, and measuring negative to positive ranges for balance and intensity, conceptual compassion can be computed. By detecting cohesion of conceptual presentation, either as logical consistency with known concepts (e.g. vampires drink blood and live forever) or self-consistency (e.g. an alcoholic that hates the taste of the taste of wine must only gradually grow to like it), flaws in narrative presentation that reduce credibility can be deducted from the Copyright Pricings. Individually measuring any of these three qualities would help in assessing the value of literature, yet coherence, compassion and variety are especially good at balancing each other's shortcomings. Balance is the inherent outcome of combining coherence, compassion and variety, and thus inherent balance ensures that long-term benefits of promoting them remain wholesome.

Exampled of inherent balance include: false compassion, detected as shallowness (low variety) and misconception (low coherence), false variety, detected as insincerity (low compassion) and confusion (low coherence) and false coherence, detected by cliche (low variety) and nullification (low compassion). By seeking simultaneous increases in coherence, compassion and variety within each document, the method of FIG. 76 promotes overall document quality.

Any of these conceptual presentation flaws can be discussed by commentaries, which are annotations or reviews of literature illuminating the deeper nature of literature, as well as guides to alternative works or authors. As with Socratic dialog, useful commentaries may take the form of questions and rhetorical questions, which can then be submitted to others to get answers to address the flaws, deepening the dialog by annotating the original literary works, especially when these annotations mitigate the flaws of the original works, or improve metrics of the original works. Or, if intense enough, Socratic questions can be suggestions for new works of literature.

Significantly, by combining targets for coherence, compassion and variety, to reduce flaws related to these qualities, the method of FIG. 76 is an automatic self-regulating value system to acquire useful knowledge, based on sentiments and logic, in which increasing system variety brings in new knowledge, while greater system compassion and coherence ensures that new knowledge is emotionally relevant and logically consistent. At the same time, the method of FIG. 76 is a effective filter for "black hat seo" and other attempts to publish spurious or misleading information, since spurious, misleading and biased documents generally are deficient in variety when strong in compassion or cohesion (narrow mindedness or obsession with detail), or deficient in cohesion when strong in compassion or variety (idiotic empathy or idiotic sensuality), or deficient in compassion when strong in variety or cohesion (chameleon heartlessness or heartless consistency).

The method of FIG. 76 is thus a dynamic homeostatic system whose parameters of coherence, compassion and variety (or concepts closely related to them) can serve not only to collect and disburse payments for knowledge, but also to regulate the synthesis of useful conversational dialog in response to conversational inputs, whether text, or speech converted to phonemes and text.

For instance, flaws can become the subject of conversations orchestrated through conversational robots or chatbots. Each flaw can be a topic of conversation, by posing a question seeking to redress the flaw. Upon detecting conceptual incoherence, a Conceptual Coherence Question Generator can ask for examples of consistency in a concept in the work, citing examples of conceptual consistency in the work, or if none, from other works in the Searchable Conceptual Compassion Trigrams Index. Similarly, upon detecting conceptual cruelty, a Conceptual Kindness Suggestion Generator can ask for examples of kindness, citing examples of conceptual compassion in the work, or if none, from other works. Again, upon detecting lower than normal variety in a work, a Conceptual Deeper Question Generator can ask for examples of more Concept Orthogonal Crossings, citing examples of Orthogonal Crossings in the work as examples, or if none, from other works.

Any methods for consistently calculating these homeostatic qualities within documents could implement the method of FIG. 76. For instance, these qualities could be calculated by teams of human readers with supervisors using statistical quality control methods to ensure consistency. However, labor for this would be very expensive. This expense could be reduced by limiting writings to a subject with a limited audience of readers, such as peer-reviewed medical journals. Yet any such manual effort would be too prohibitively expensive to handle the full literary output of this planet. Qualities of conceptual Compassion, Variety and Cohesion could also be computed for specific sub-classes of literature, using hand-coded logical, ontological, and hand-tuned statistical stylistic detection methods. However, variations in grammar, style, vocabulary, and associated differences in pragmatics makes this economically unattractive for sub-classes larger than travel-guides or do-it-yourself books.

To enable cross-indexing of concepts across all categories of literature, thus matching writers to readers for all possible concepts instead of just the few concepts which are published as commodities, requires a more flexible and cost-effective approach to calculating Compassion, Variety and Cohesion within documents.

A conversational chat could also be manually implemented with human chat operators supervised for qualities of coherence, kindness and boredom, using statistical quality controls, but this would be much more expensive than automated chat robots. Similarly, conversational chat could be implemented using hand-coded logical, ontological, and hand-tuned statistical stylistic detection methods, to enhance coherence, kindness and variety, but only covering a few topics and concepts, since variations in ontologies and pragmatics across concepts make consistency very hard to achieve on a cost-effective basis.

Fortunately, general purpose automated methods for computing coherence, compassion and variety can be applied to conversational chat, document indexing, and retrieval. These methods are describe in FIG. 58 through FIG. 75. Sentiment is a fundamental characteristic of cognition, as shown by cognitive psychology research, more fundamental than speech and logic capabilities. Correspondingly, the methods of FIG. 58 through FIG. 75 are constructed to detect sentiments on more fundamental levels than dictionary ontology and logical permutation of lexical definitions. On these more fundamental levels, language expresses sentiment expressions composed of rhythmic and tonal patterns.

A general map from rhythmic and tonal patterns in text to specific sentiments can be created in many ways, by categorizing sample sets of patterns. Which patterns most accurately categorize sentiments has yet to be fully established, yet further research identifying consistent correlations between sentiment and rhythmic or tonal patterns in text can be discovered using the methods described in the present invention. For instance, transitions between all phonemes of the English language could be mapped and examined for consistency of sentiment for each possible n-tuple of phonemes. Yet this approach might take years of research to find better accuracy than a pattern which has already been used for hundreds of years in most Mediterranean cultures, called Chaldean Numerology, which categorizes rhythmic transitions between letters of an alphabet. Though numerology attempts classify words and phrases into story archetypes, it also captures consistent resonances of sentiments behind those archetypes. The Chaldean algorithm has persisted simply because it works just well enough to get consistent hints of a story from a word or phrase. This algorithm associates with each letter a number. FIG. 58 shows a table of letters and their associated numbers. Notice that many similar sounding letters have similar numbers: a and i map to 1, d and t map to 4, v and w map to 6.

Using a Target Base of 10 with a variation of the Chaldean algorithm to generate a phonemic chord (see FIG. 59), samples of about 36 frequently occurring chords can be acquired by processing megabytes of text, since the algorithm produces a distribution of chord numbers favoring lower numbers near the Target Base. These chords themselves are only precursors to actual sentiments, just music chords such as C major and A minor are just precursors to tension and resolution in western tonal music. Samples of about 400 frequently occurring chord transitions can be acquired by processing megabytes of text, using the method of FIG. 60, using a Window N-size of three tokens. Although there would be theoretically 1296 possible distinct pairings of 36 chords, only about 400 show up in practice, as the others correspond to unused chord transitions, at least in English.

Examples of these samples are shown in FIG. 61. The names of these transitions, shown in bold, are created manually by carefully manually reviewing text samples which musically resonate to a specific chord transition such as from-chord 10 and to-chord 17. In addition to a common transition name, chord transitions are manually assigned a story-line category such as "mood", "ego" or "discovery" to describe which level on which the sentiment might affect a story. These story-line mood levels help chatbots to infer what line of conversation might be most responsive. And more significantly, vectors in various dimensions are assigned to describe the intensity of sentiment.

Specifically designed for story-telling analysis, these vectors, or valences for feeling, thinking and needs are manually assigned to each chord transition. In this design, Feelings represent in-the-moment emotions whose valence can be negative (sad), zero (neutral) or positive (happy). Needs represent long-term emotions whose valence can be negative (unfulfilled), zero (neutral), or positive (fulfilled). Thinking represents in-the-moment emotions about mental state whose valence can be negative (conflicted), zero (neutral) or positive (clear). Together, they succinctly describe fluctuations in sentiment for classical story development story-arcs, and form an accurate basis to measure compassion as resolved tension in story arcs.

For instance, in FIG. 61 sample A, the vectors for "reasoned satisfaction" are feeling of positive ¼, thinking ½, and needs 1, showing that fulfillment of needs is greater than the in-the-moment positive emotions for the sample set, and that significant clarity of thinking appears the sample set. Since the Window N-size was set to three for the method of FIG. 60, chord transition for this sample (and all samples given here) have six tokens (three consecutive tokens related to the from-chord followed by three tokens related to the to-chord).

For FIG. 61 sample B, the vectors for "mature advice" has lower feeling valence of 1/16, thinking ¼, and needs ⅛, reflecting little satisfaction except the long term utility of advice.

For FIG. 61 sample C, the vectors for "anticipating unmet needs" has clear thinking of ¼, but negative valences for feeling −⅜ and especially needs −⅞, reflecting a phrasing that generally leads into an unwanted situation.

Many chord transitions reflect sentiments which confirm sentiments of prior chord transitions. When these are sampled, the sentiment of prior chord transitions add their valences to the confirming sentiments, providing accumulations of sentiment which can build up to very strong sentiments. FIG. 62 shows samples of confirmation of chord transition sentiments, whose prior chord transitions have names in bold.

For instance, FIG. 62 sample D "unfair tradeoff" has feeling −3/16 and needs −⅜, reflecting the greater long-term negativity of a bad tradeoff. The small but positive thinking valence of 1/16 reflects a slightly informative phrasing. The prior chord transition example "charming and nice, but has" (inner conflict) is confirmed by the unfair tradeoff chord transition following it of "and nice, but has nothing".

FIG. 62 sample E "anomaly resolved" has feeling ⅛ and needs 3/16, reflecting the relief from resolving the phrasing of a questionable issue, slightly more for longer term than immediate reasons. The positive thinking valence of ⅛ reflects the clarity of resolution.

Figure 63:
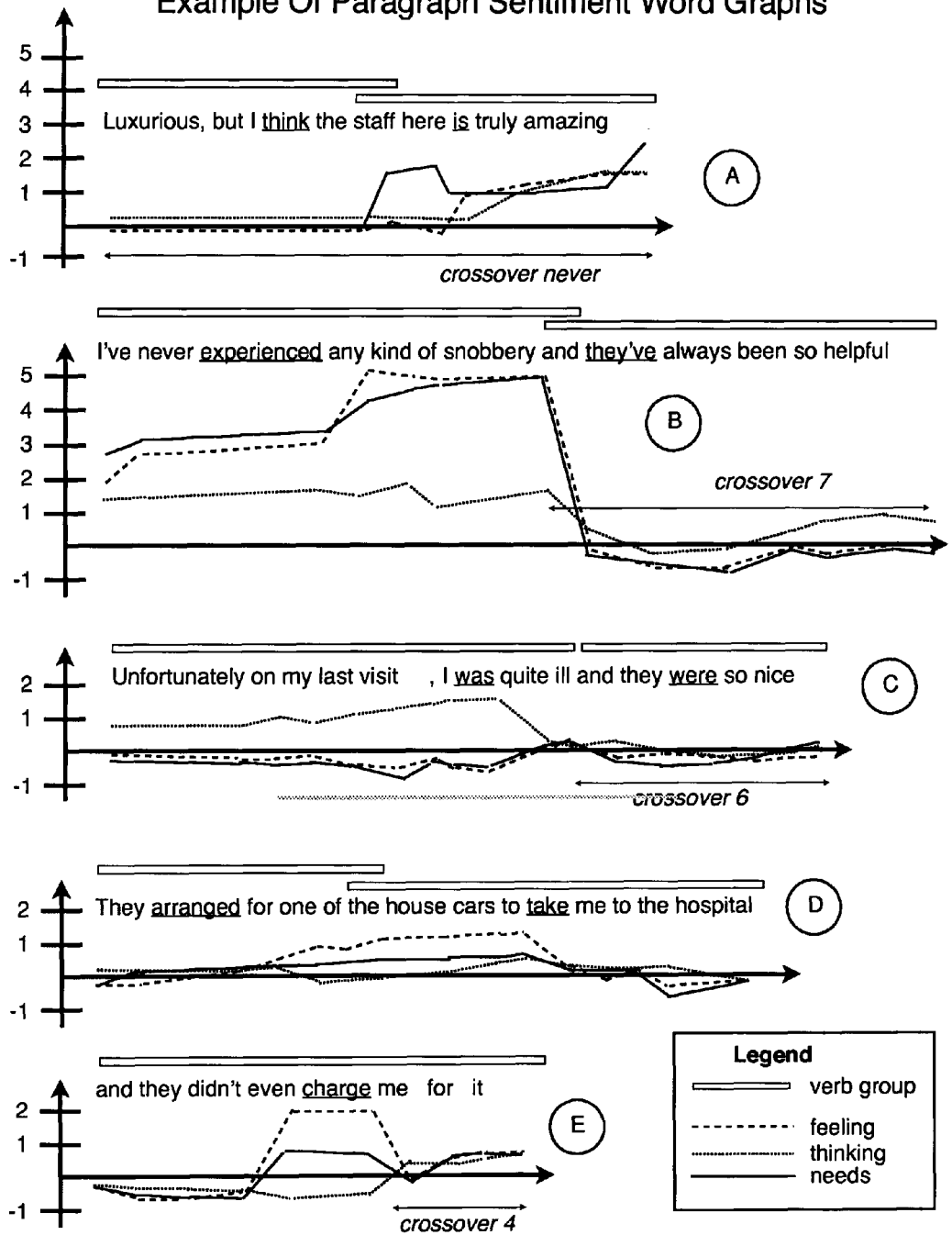
FIG. 63 Example Of Paragraph Sentiment Word Graphs

Since chord transitions annotations produce a new sentiment number for every token of text, these annotations can be graphed token-by-token to show fluctuations of sentiment for every token of text. FIG. 63 shows samples of actual annotations for a few sentences from consumer-written voice-of-the-customer Yelp hotel reviews. The vertical axis for each horizontal text has identical scale, however the texts with less valence amplitude have the unused portion of their vertical axes trimmed to save on display page space. In general, valences from the system generating these samples extend from about plus to minus five, in magnitude.

Since chord transition analysis is based on musical and rhythmic aspects of text, rather than lexical meanings, it bypasses many of the problems of ontological and latent semantic techniques, correctly identifying sentiments which are very hard to detect by measuring distances to words such as "never" and "but". For instance, luxurious is usually a positive word, and followed by "but" would logically signal negativity onset. However, in FIG. 63 sample A, the true sentiment goes more positive after the but, in "Luxurious, but I think the staff here is truly amazing."

Similarly, in FIG. 63 sample B, the word "snobbery" is usually a negative word, but the five token stream distance to its valence reversing term "never" is quite long in "I've never experienced any kind of snobbery and they've been so helpful." With such a long five token distance, it is hard to risk fully reversing the valence of "snobbery". Yet chord transition analysis easily detects the very strong positive sentiment expressed at the point in the sentence where "snobbery" comes in.

Chord transitions thus better identify the higher salience of "snobbery" in terms of sentiment, then traditional logic and ontology based systems.

Research shows that compared to ontological and logic based sentiment analysis, chord transition sentiment analysis is generally more accurate, especially working on new words and old words used with new meanings, where ontological analysis has no accuracy.

Chord transition analysis detects clarity (as positive valence) and confusion (as negative valence) of the thinking dimension of sentiment. For traditional ontological and logic-based analysis, clarity and conflict are so difficult to detect, that they are rarely analyzed. Yet for story analysis, conflict and clarity are important fluctuations. Well written, convincing text contains a mix of both. Conflict (or confusion) alone corresponds to jumbled, meandering text with lots of loose ends. Clarity alone corresponds to arrogance.

FIG. 63 gives some examples of Thinking Valence detection. For instance, "I've never experienced any kind of snobbery" starts with significant clarity, with valence around 1.3. It then transits to a much lower clarity of valence around 0.4 for "and they've always been so helpful." reflecting a slightly unclear thought. To be clearer, a smoother conceptual transition from "kind of snobbery" would be needed.

This pattern repeats in FIG. 63 sample C. "Unfortunately in my last visit, I was quite ill" start with significant clarity, with valence around 1.1. It then transits to much lower clarity of valence around zero for "and they were so nice," reflecting another slightly unclear thought. To be clearer, a smoother conceptual transition from "quite ill" to "so nice" would be needed.

For story analysis, any strongly negative valences build up a pressure for resolution. For instance in FIG. 63 sample E, "they didn't even charge me for it" has a thinking valence around −0.6, reflecting a slight conflict from possible open questions, such as why didn't they charge for it?

Such Thinking Valences, together with Needs and Feelings can be used to detect and correct for postural sentiments, in methods later discussed. Since Thinking and Needs and Feelings Valences as shown in FIG. 63 are expressions of rhythmic and musical patterns, they are have the ability to track rhetoric, in the sense that repetitions in positive to negative sentiments confirm a sense of flowing from one side to the other of a rhetorical picture, and therefore deepening the credibility.

For instance in sentence C of FIG. 63, "Unfortunately in my last visit, I was quite ill" has feeling and needs valences around −0.2 which are resolved later in "They arranged for one of the house cars" with feelings and needs valences around 0.8 and "even charge me" with feelings and needs valences around 1.2. With that swing from negative to positive valence, the rhetorical picture is completed, in Thinking, Feeling and Needs.

Good rhetoric presents both negative and positive valences each sentence, to imply that at least two sides to a picture have been considered. Points at which valences change sign are thus rhetorically important, and the more frequently they occur in the stream of text, the more powerful the rhetoric of the stream. At the same time, the distance from where rhetorical valences change sign to the end of a sentence shows how well that sentence ends on a completed rhetorical point.

For instance, there is no completed point in FIG. 63 sample A "Luxurious, but I think the staff here is truly amazing" where all three valences of feelings, thinking and needs change sign, because thinking remains positive throughout, displaying a mild arrogance, which reduces credibility until less arrogant negative thinking lend it a sense of balance. A sense of incompleteness pervades that sentence, because the reader cannot sense why the staff is amazing. Rhetorically, the meaning of the sentence is incomplete because there is less than a full cycle of sentiment valences.

This contrasts to sample E "and they didn't even charge me for it" which has all three valences changing sign before and after "me" for a crossover distance of only 4 tokens. Sample B with a crossover distance of 7 and sample C with a crossover distance of 6 show other crossover distances. Generally, a crossover distance of five or less is rhetorically complete enough to mark the rhetorical juncture of a balanced and competed end of a paragraph, even if no paragraph punctuation has been supplied. The maximum crossover distance for automatically marking ends of paragraphs can be adjusted by an average across a writer's stylistic rhetorical strength, to vary somewhat from five.

Figure 80:
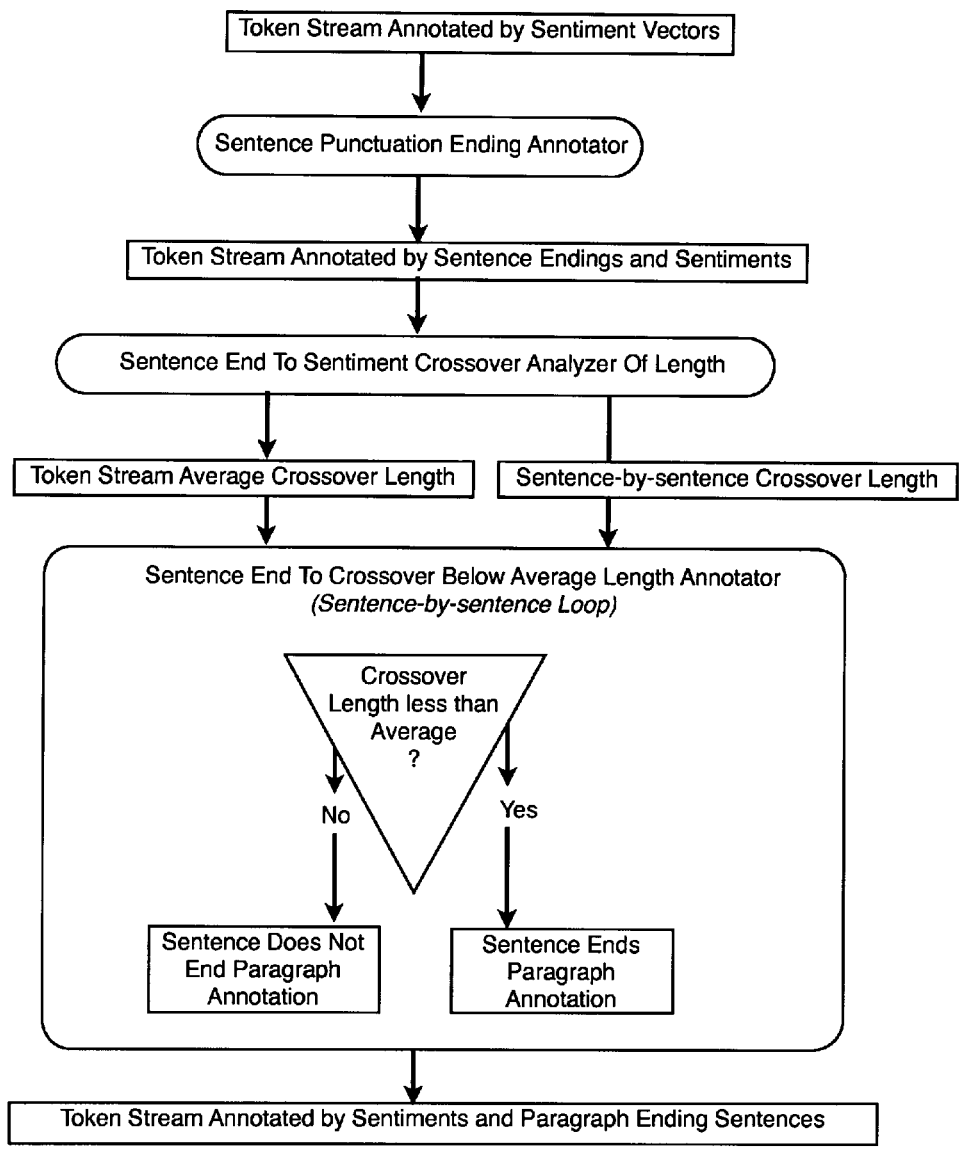
FIG. 80 Paragraph End Analysis By Sentiment Word Graphs

This method of annotating the rhetorical ends of paragraphs is shown in the flowchart of FIG. 80, as a standalone method for dividing documents into rhetorically sensible paragraphs, more consistently than a writer's manual paragraph annotations.

By consistently marking the end of paragraphs, a continuous stream of sentences can be broken into paragraph sections, so that ideas which are partially developed in one sentence can be fully explicated in subsequent sentences, until a rhetorical juncture has been reached. This Rhetorical Clustering enables search engine indices to index sentences together as mutually related units of meaning. Larger units of text may need be be analyzed, but paragraph sections are a good starting foundation for aggregating their annotations.

Sentences in disparate paragraph sections are not as closely related, but can still be related through the overarching weave of repetitive story arc thematic concepts, by annotating regions of compassion in which they occur. When disparate paragraphs are relevant to each other, through shared concepts, they portray a weave of those concepts through the fabric of a story.

For instance, for classic character-arc analysis, character names are concepts, and contextual sentiment valences around occurrences of the name of a character indicate whether a characters is clear (thinking) or happy (feeling) or satisfied (needs). Any accumulated negativity sets that characters' arc into tension, for instance, when introducing tragedy. For a story to be compassionate, a character's tension must later be resolved by accumulating positive offsetting valences. Extensive research including a novel judging contest using this method has shown that it is highly accurate for ranking the popularity of character-driven novels.

However, most other kinds of writing, including many novels, are not character but genre and theme driven. For these, the accumulated negativity and resolving positive values are associated with genre and thematic concept clusters instead of character names. There are many ways for forming concept clusters. Traditionally they are based on latent semantic probability analysis, but this limits analysis to concepts which are always presented with consistent terminology. Metaphors tend to violate this consistency, so they require a more flexible analysis.

For a more flexible concept analysis, additional related terms for poetic and metaphoric passages can be associated by traversing deeper into related poetic dictionary links, and for literal passages, a shallower interpretation can be used, yielding less words. The difference between poetic and literal passages can be computed by comparing the number of terms poetically related to a term in the dictionary. For instance, the terms "live", "life" and "one" have more related poetic terms than "marble", "column" and "Corinthian" so the phrase "one life to live" would be much more poetic than "marble Corinthian column".

Regardless of concept clusters are computed, they can be tracked throughout a stream of text, so tension and resolution can be tracked from contextual sentiment valences around cluster appearances in that stream. Just as each character has a character arc, each concept cluster can have a concept arc, and tension and resolution of the thinking, feelings and needs surrounding these concepts reflects the depth of meaning and compassion, for each concept within a stream of text. Just as with characters, a concept can be buried in confusion, or associated only with bad feelings, until balanced sentiments emerge to give depth to its meaning.

Figure 64:
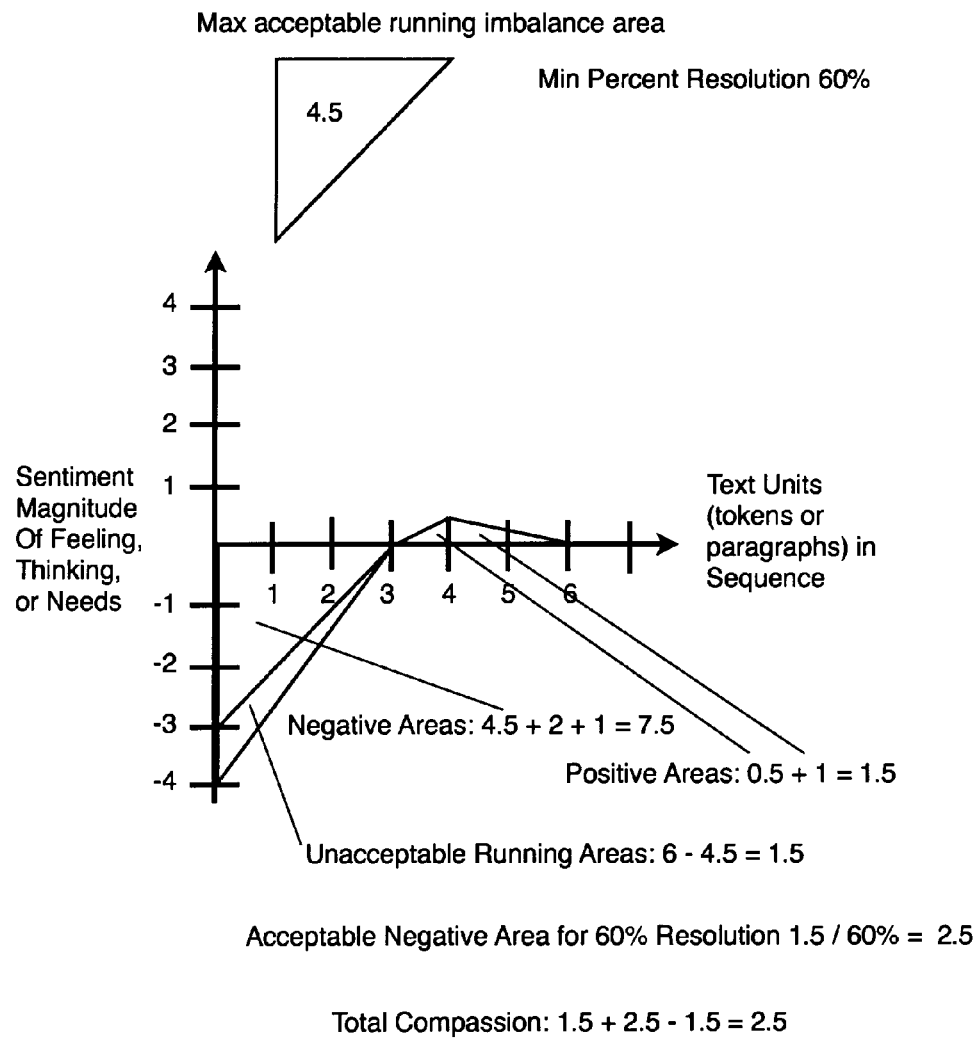
FIG. 64 Example Of Unresolved Text Tension Areas
Figure 65:
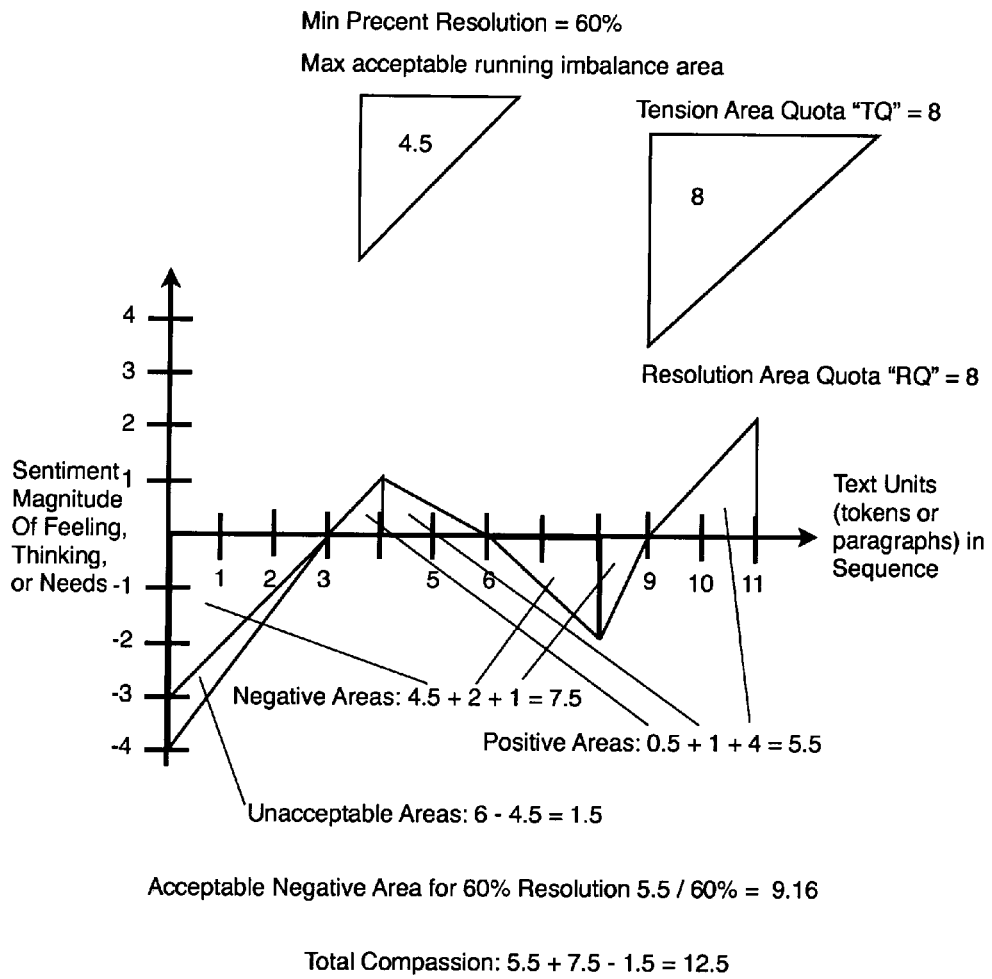
FIG. 65 Example Of Text Tension Balanced By Resolution Areas
Figure 66:
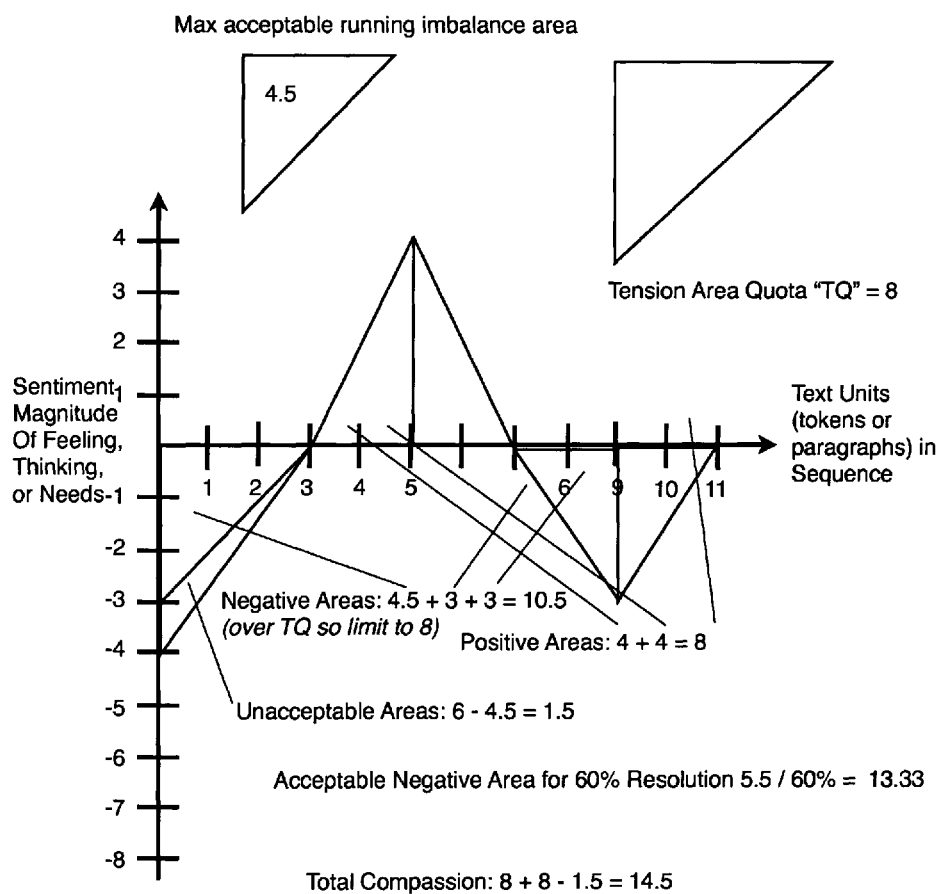
FIG. 66 Example Of Excessive Text Tension Areas

For instance, FIG. 64 shows how limits can be set for how much a one-sided stream of sentiment can contextualize a concept until credibility no longer increases with that one-sidedness. In this diagram, a maximum running imbalance in sidedness restricts areas of contribution from any one side. At the same time, the required 60% amount of resolution from the other side also restricts how much can come in from one side. Together with a limit of total contribution from any one side, (Tension area quota), these metrics produce a measure of total compassion, for either character-arcs or concept-arcs within a text stream.

In FIG. 64 a total compassion has been computed of 2.5 for a modest amount of resolution combined with a slightly excessive amount of tension. By increasing the amount of resolution, FIG. 65 drawn to the same scale shows a much greater total compassion of 12.5. The FIG. 66, drawn to the same scale, shows how these evaluation metrics limit a much more dramatic amount of tension and resolution, so that the extra drama yield only slightly higher total compassion of 14.5. Thus higher dramatic tension and resolution gets diminishing returns, deprecating excessive exaggerations.

Tension and resolution sentiments can be seen even within single paragraphs. For instance, in FIG. 63, the concept of "staff" starts with positive sentiments, which then acquires measurable compassion and depth of meaning from the negativity of "Unfortunately on my last visit, I was quite" and "hospital", and increases compassion with the positive valence of "charge". Together, these swings back and forth in valence allow the whole paragraph to be annotated for above average compassion, making it preferable to the average paragraph for search engine indexing and retrieval, as shown by the FIG. 73. If, for instance, the sentence about snobbery or the sentence about charge were removed from the paragraph, the remaining sentences would be far shallower in compassion, and the method of FIG. 72 would measure less than a fourth, since the balancing effect of the positive valences would be missing.

Figure 60:
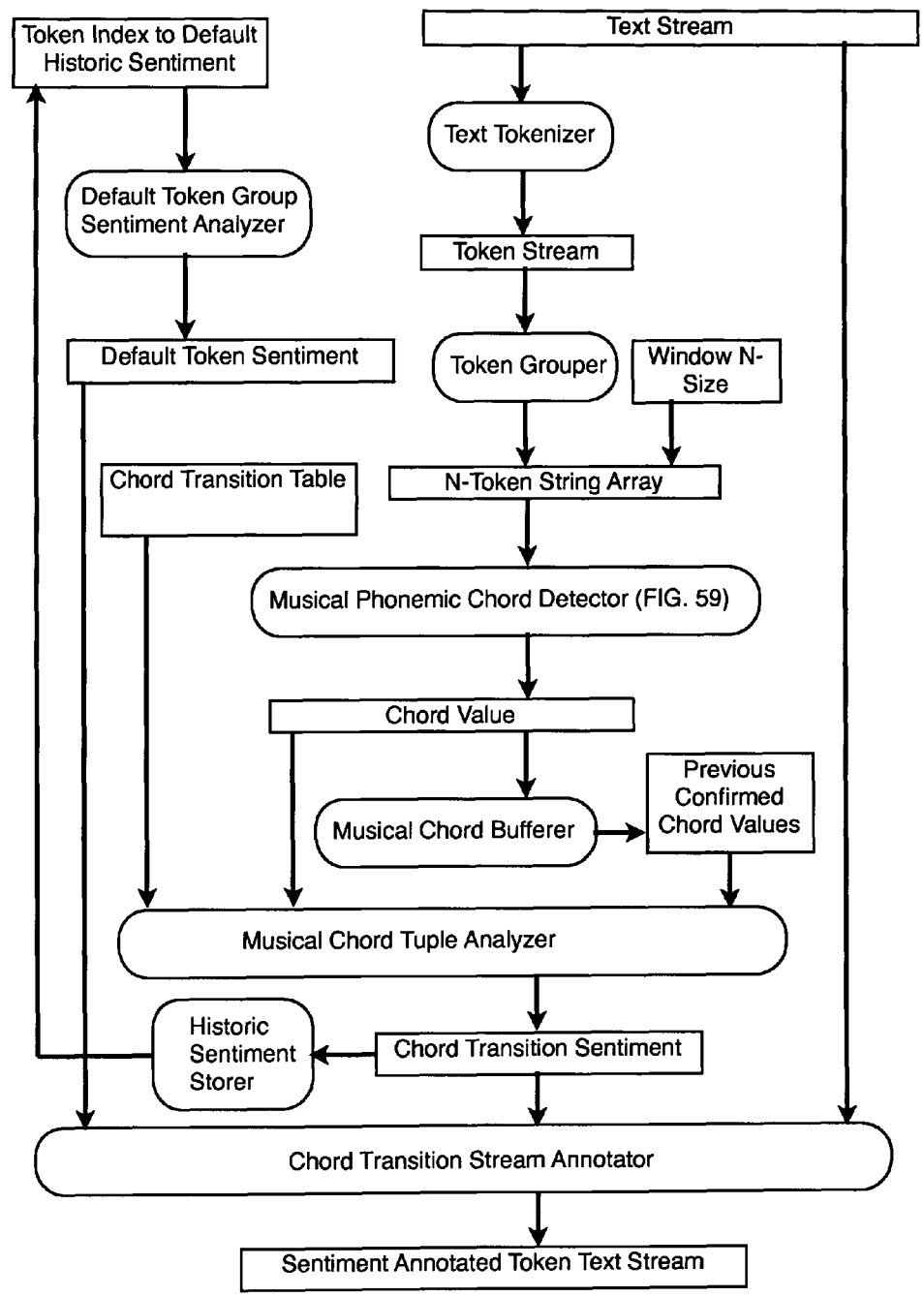
FIG. 60 Chord Transition Sentiment Annotation Method

Tension and resolution are innate to the the musical methods of FIG. 60, whose rhythmic nature shows up as frequently fluctuations across the zero axis, generally within the span of several sentences. While very useful for measuring rhetorical strength (as noted earlier), these fluctuations across the zero axis require interpretation when attributing valences to specific conceptual clusters of meaning. At times, these rhythmic swings push positive expressions such as "they've been so helpful" into negative valences. Correcting for this can be as simple as averaging the sentiments within the span of a verb and its nearby tokens, or (more complex) including imputed default sentiments valences of words from chord transition samples as shown in FIGS. 61 and 62.

For instance, "reasoned satisfaction" would impute its positive sentiments to words in sample A: day, bunch, people, Bohemian, energy, good, budget, prepared, clean, daily, nice, trendy. Although the word "negative" would also get positive sentiment from these samples, the majority of other text samples using the word "negative" would contribute negative chord transitions to cancel out the positive valence from sample A.

These imputed default sentiments are stored in a token or phrase index, as shown in FIG. 60: "Token Index to Default Historic Sentiment". "Default Token Sentiment" can then be added to "Chord Transition Sentiment" by the "Chord Transition Stream Annotator", for greater accuracy in sentiment detection, especially when starting annotation of a stream and less than six stream tokens have been processed, so no chord transition can yet be computed, and "Default Token Sentiment" has the only available valences.

Default sentiments can also be added to Chord Transition Sentiments for computing compassion as in FIG. 64, 65, 66. Yet default sentiments are not so useful for computing rhetoric and paragraph endings, since these are tied more directly to musical patterns in text. There is a subtle cognitive dissonance between rhetorical sentiments and dictionary sentiments, for rhetoric persuades through rhythm and repetition but need not be grounded in facts.

Figure 81:
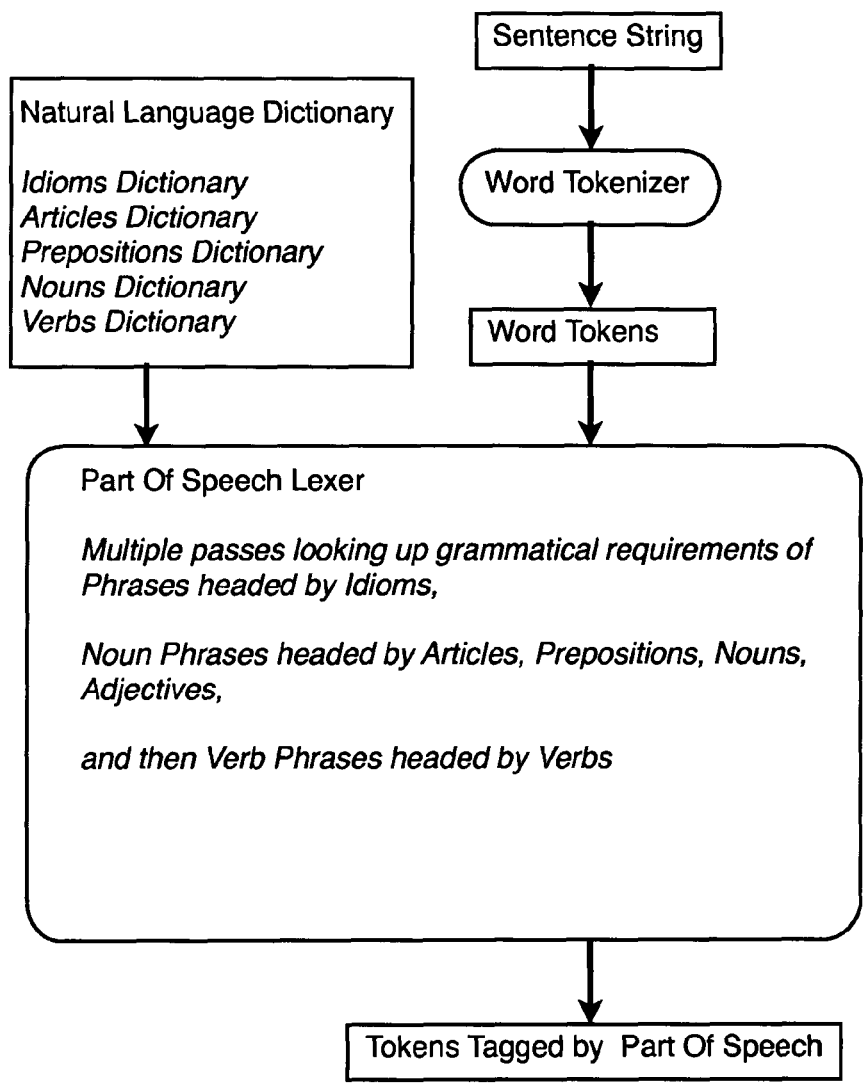
FIG. 81 Prior Art Part Of Speech Detector Method

To overcome this dissonance, the present invention uses a verb-centered technique for averaging valences combines valences, often from both sides of typical rhetoric cycles, while retaining tight focus on annotating specific phrases. (Verbs can be detected by many methods, including the standalone Prior Art Part Of Speech Detector Method flowchart of FIG. 81, shown as an existing method potentially useful to the present invention.)

Rhetorical cycles are short enough, that averaging across sections of text anchored by a verb and including non-verbs allocated to the nearest verb tend to combine valences from more than one rhetorical side, averaging out most of the effect of rhetorical rhythmic swings, to produce a more accurate valence for each section.

At the same time, these verb anchored sections of text represent true action-oriented components of concepts, whose sentiment valences can be combined with poetically relevant terms to efficiently index all conceptual clusters. Research into verbs and poetry have generally been overlooked by traditional concept indexing methods, primarily because nouns and literal meanings are more static, yielding more consistent results using ontology, grammar and logic. However, by using musical analysis to distinguish verbs by sentiment, with dictionary to traversals to compute poetically relevant terms, verb sections of text become consistent metaphoric units of meaning, which when combined as actionable search criteria, enable unprecedented search and retrieval accuracy, as well as lowering indexing costs.

Traditional indices treating all words of a document as peers are really wasteful since the strength of relationship between those words varies, so that most relations are so weak that they do not belong in an index, despite the fact that traditional search engines place them there, to the detriment of index storage efficiency and search results relevancy. Most grammar and ontology methods are poor predictors of the strength of these relations since writers often use new or permuted metaphors or analogies to define relations in a story line.

Since sentiment so directly affects human cognitive memory, remembering items of high valence more readily, sentiment is a better criteria for measuring the strength of relationship between concepts in search indexing, to keep up with the way people efficiently categorize. By segregating high valence items from low valence items, priority can be given to high valence items, both in the search index and among query terms, to reduce indexing costs and increase search results salience. Similarly, segregating high valence verbs from low valence verbs distinguishes verbs, to be more selective as search index terms. Since the meaning of verbs greatly differentiates actionable meanings of non-verbs, grouping high valence verbs together with nearby non-verbs into tuples of terms greatly distinguishes the meaning of terms while segregating terms, thus greatly reducing the number of relations between terms that need to be indexed. The reduction in the number of n-grams which are stored (to index documents) can be orders of magnitude lower by segregating terms this way.

Figure 68:
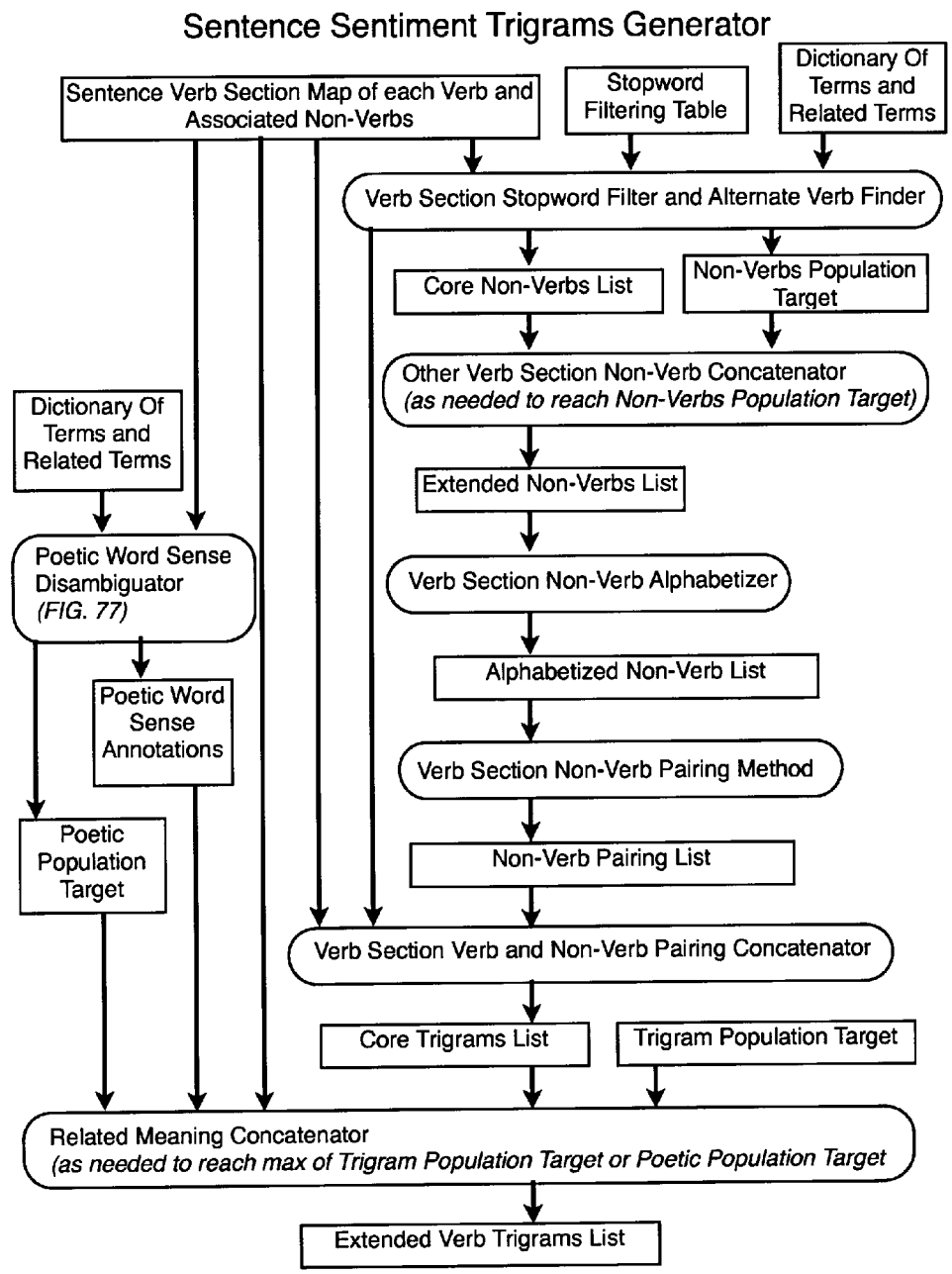
FIG. 68 Sentence Sentiment Trigrams Generator
Figure 82:
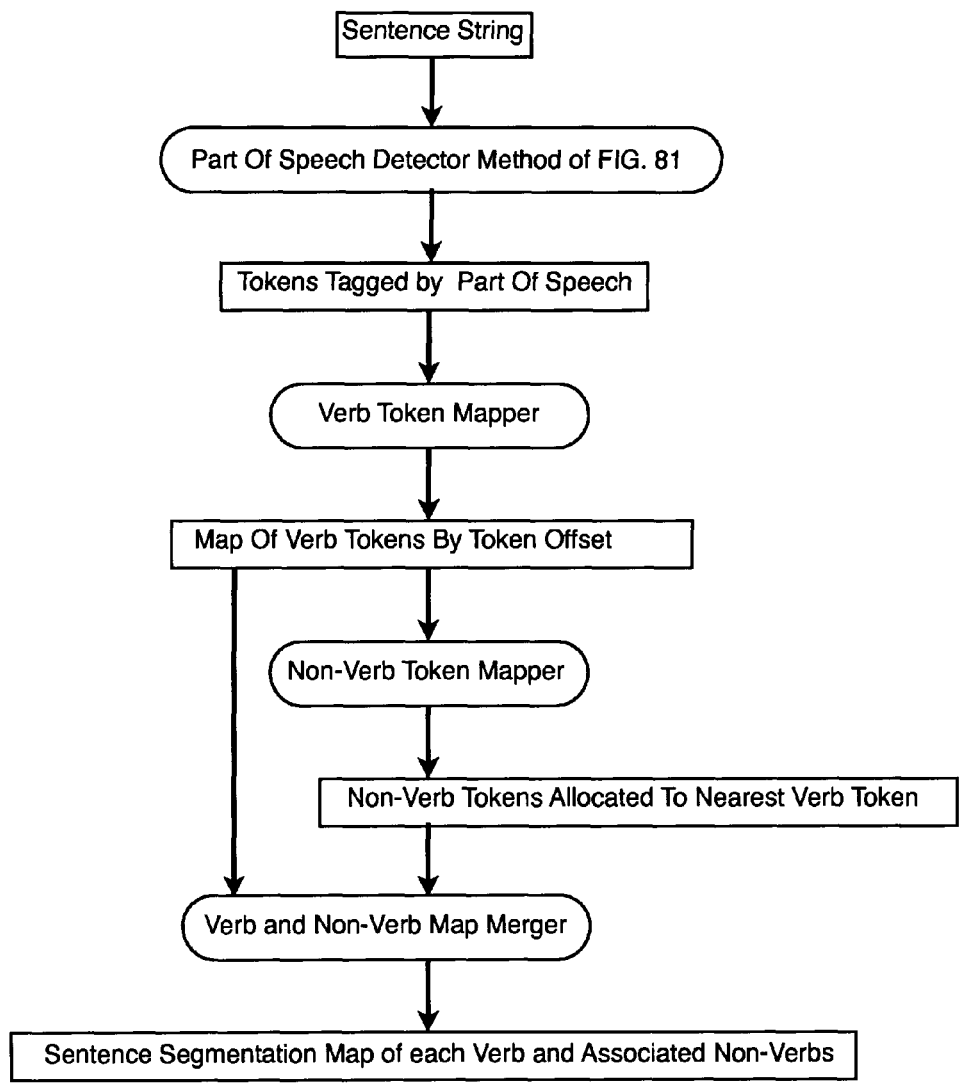
FIG. 82 Verb Segmentation Method

For example, the sentence of FIG. 63 sample B can be expanded into indexing trigrams using the method of FIG. 68. Using a prior art part-of-speech disambiguation algorithm (FIG. 81) based on syntax, grammar and dictionary entries, the two main verbs can be identified (shown as underlined in FIG. 67): experienced and they've. English has a word-order dominated syntax, so the other words nearest these two main verbs can be associated to whichever is the closest verb, measuring the distance along the stream of words making up the sentence. Words equidistant (such as "of" in FIG. 67) can be allocated to both verb sections. This association process produces a verb section boundary, for each verb, as indicated by the hollow lines above the sentence. The leftmost hollow line marks the first verb section "I've never experienced any kind of snobbery and" and the rightmost hollow line marks the second verb section "and they've always been so helpful". (This Verb Segmentation Method for partitioning sentences is shown by the flowchart of FIG. 82.)

The non-verbs in each verb section are filtered by a Verb Section Stopword Filter to remove words of vague intrinsic meaning, such as "and", "any", "of", "so", "they've", "I've". The remaining Core Non-Verb List is compared to the size of the Non-Verbs Population Target, set to about four, and if too small, non-verbs are imported from the nearest Verb sections in the text stream. For instance, after removing Stopwords only "never" and "kind" remain among non-verbs in "I've never experienced any kind of". So the non-verbs of kind, never, snobbery are imported from the subsequent Verb Section, which if necessary, could even be imported from the next sentence.

To product a canonical trigram ordering, Non-Verbs are then alphabetized and paired in alphabetical order to produce a small set of pairs which are then concatenated with the verb. This produces a Core Trigrams List which may be expanded, if needed, to reach a Trigram Population Target or Poetic Population Target. For instance, in FIG. 67, the verb "experience" has only one trigram with non-verbs "kind" and "never". By importing the nearest term of "snobbery" from the subsequent Verb Section, to reach a Trigram Population Target of 3, this expands to trigrams of "experience, kind, never", "experience, kind, snobbery" and "experience, never, snobbery". To reach a Poetic Population Target of 9, related verbs of "feel" and "participate" can be copied from a dictionary entry for "experience", to be used in place of that verb. The result is a set of trigrams which stand for the meaning of "I've never experienced any kind of snobbery". These trigrams, shown as Verb Section B1 in FIG. 67, are good for matching a wide variety of statements, yet is is very important to match them with the strongly positive sentiments averaged across the words of "I've never experienced any kind of snobbery". Otherwise, it would mistakenly match with negative statements about snobbery, which would be the majority, snobbery being a generally pejorative term.

Similarly, for the words "of snobbery and they've always been so helpful", Verb Section B2 in FIG. 67 expands its meaning to trigrams. For the verb "they've" which is a stopword, and therefore too indefinite for indexing, the FIG. 68 Verb Section Stopword Filter and Alternate Verb Finder looks up the meanings of Section non-verbs "snobbery" and "helpful" to find a most related verb meaning of "help", since snobbery is weakly related to any specific verb. This verb "help" takes the place of the stopword verb "they've" for indexing purposes. Then, with the verb term "help" and the non-verb term "snobbery", the FIG. 68 Other Verb Section Non-Verb Concatenator borrows terms of "kind" and "experience" to reach a Trigram Population Target of 3. To reach the Poetic Population Target of 9 trigrams, the FIG. 68 Related Verb Concatenator adds verbs of "encourage" and "accommodate" to expand on the meaning of "help".

Poetic Verb Sense Disambiguator of FIG. 68, (SEE related AU METAPHOR PATENT filing) which disambiguates verb meanings from contextual hints in other words of each sentence, enables the trigrams of Verb Section B1 and B2 in FIG. 67 to represent the meaning of Verb Sections through related terms, in a controlled way, to index a wider presence for each Verb Section than from indexing keywords alone. Since spreading into too many distantly related terms would allow irrelevant trigrams to be associated with a Verb Section, Poetic Population Target (set by Poetic Verb Sense Disambiguator) and Non-Verbs Population Target (set by Verb Section Stopword Filter) limits this spreading to a reasonable population, proportional to the number of non-stopwords in a Verb Section, and proportional to the poetic resonance of the terms.

The trigrams of B1 and B2 represent the meaning of Verb Sections by distillation to a kind of terse, almost haiku symbology. By enforcing inclusion of a verb meaning in each trigram, (shown in the first element of each trigram) each trigram represents some kind of action, and for associating Verb Sections to relevant Verb Sections, symbolic actions focus the search for salience upon actionable meanings. Since actionable meanings are closer to cause-and-effect meanings than noun oriented meanings of traditional search engines, results coming back from search are relevant to classic story line development and cognitive memory architecture, both of which are composed of actions and associated sentiments. Further, by distinguishing trigrams by sentiment valences, results coming back from search correspond to similar story lines, for better use of results in conversation chatbots replies.

For instance, the FIG. 67 trigrams under B1 and B2, are distinguished by their valence magnitudes. B1 has much greater magnitudes (absolute values of valences), showing that trigrams in B1 are cognitively primary in salience and much more likely to be remembered than trigrams in B2. B2 thus contains lower priority, secondary supporting trigrams, from both cognitive and search engine indexing perspectives. By distinguishing B1 from B2 in this way, results that also have greater valence in B1 trigrams and lesser valence in B2 valence have greater salience to sentence B as a whole.

Indeed, research shows that search results having intersecting trigrams with similar proportional valences will have exponentially greater salience. This exponentially greater salience enables culling rates to be over 99.9% for eDiscovery uses.

Figure 73:
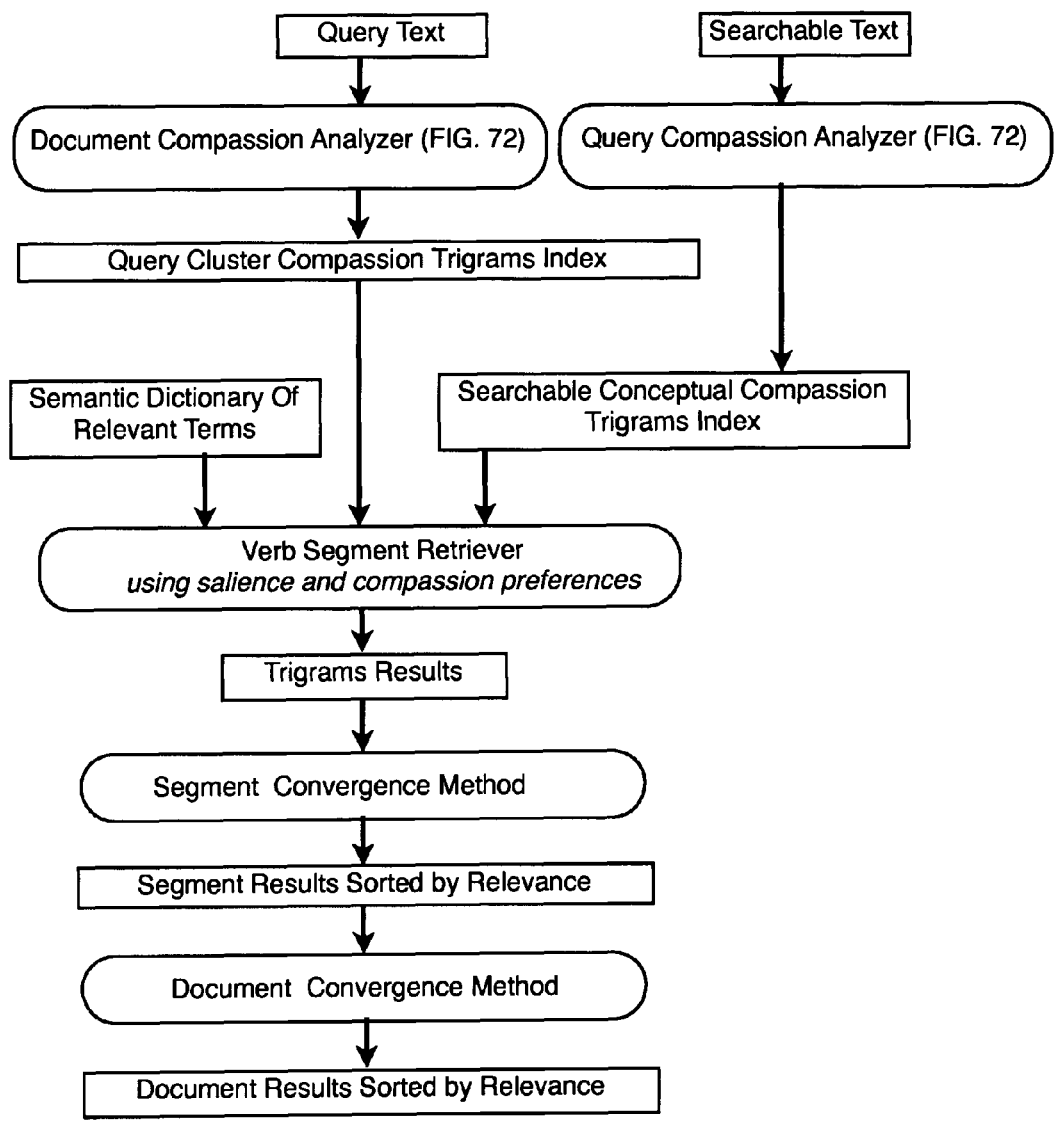
FIG. 73 Document Relevance Poetic Querying Method

When probing for relevant trigrams, the query method of FIG. 73 matches valence magnitudes to retrieve sentences with the same valence profiles, to retrieve sentences with matching primary salience trigrams. This avoids bad results where low salience results are reported ahead of high salience terms. Intersecting trigram result sets to find paragraphs with more than one high salience trigram match nearly guarantees salient paragraph results. When two or three trigrams intersect, pointing to the same paragraph, that paragraph very likely to be salient, particularly when valence profiles match.

Thus to retrieve search results of greater salience, trigrams can be matched for Feeling, Thinking and Needs valences, to match positive to positive and negative to negative, thus displaying search results according to whether they increase dramatic tension or decrease it for the same poetic trigrams. Search engine results of even greater salience can be displayed by reporting by reporting more compassionate, deeply expressive paragraphs (such as FIG. 63) ahead of less compassionate, shallowly written paragraphs.

Ordering result sets by three dimensions of sentiment similarity, plus compassion ratings can achieve an order of magnitude better salience than traditional search engines without sentiment analysis. At the same time, the ability to identify paragraphs which are salient to other paragraphs within a document is useful for grouping paragraphs under shared themes. Paragraph groupings can be displayed as summaries of themes within documents. Further, the tension and resolution of sentiments around group members can be tracked for compassion, measuring the quality of writing in terms of the depth of sentiment around them.

For instance, FIG. 70 shows a paragraph of three Verb Sections. Verb Section G1 has a positive 0.7 Thinking valence, positive 0.6 Feeling valence (from the reassuring tone of "experience" and "or") and a slightly positive 0.3 Needs valence (from the reassurance tone of "experience" and "snobbery"). The "experience, never, snobbery" trigram (underlined) at these moderately positive valences is similar enough in valence to the FIG. 67 "experience, never, snobbery" trigram at Thinking 1.6, Feeling 3.3, Needs 3.2 valences. The matching trigram words and similar enough valences trigger an annotation marking the two paragraphs, FIG. 67 and FIG. 70, as salient to each other.

For instance, the threshold for salience can be set to a three-word (exact) match in trigram words with at least a 50% similarity in valence absolute magnitude, or a two-word trigram match with at least 80% similarity in valance absolute magnitude. Higher, stricter thresholds are more useful for precision, and leads to smaller paragraph groupings. Lower, permissive thresholds permit greater recall and larger paragraph groupings. When clustering for highly precise queries, stricter thresholds are best, and when clustering to measure a background of sentiments effects, such as compassion, lower thresholds are best. For instance, a useful threshold for measuring tension-resolution of a human character (theme) may be as low as a two or even one-word match which includes the character name, regardless of similarity in valence. Research shows that the salience threshold is lowest for word-names of beings we have the most empathy for: lowest for other people, higher for pets and even higher for names of institutions. Significantly, especially for literature, high empathy proper names can be segregated from ordinary words, and tested for significant tension-resolution patterns of compassion, and only names of entities meeting a threshold of compassion, hence showing the writer has empathy for them, thus permitting salience clustering around low clustering thresholds, for human characters and anthropomorphic concepts.

Figure 78:
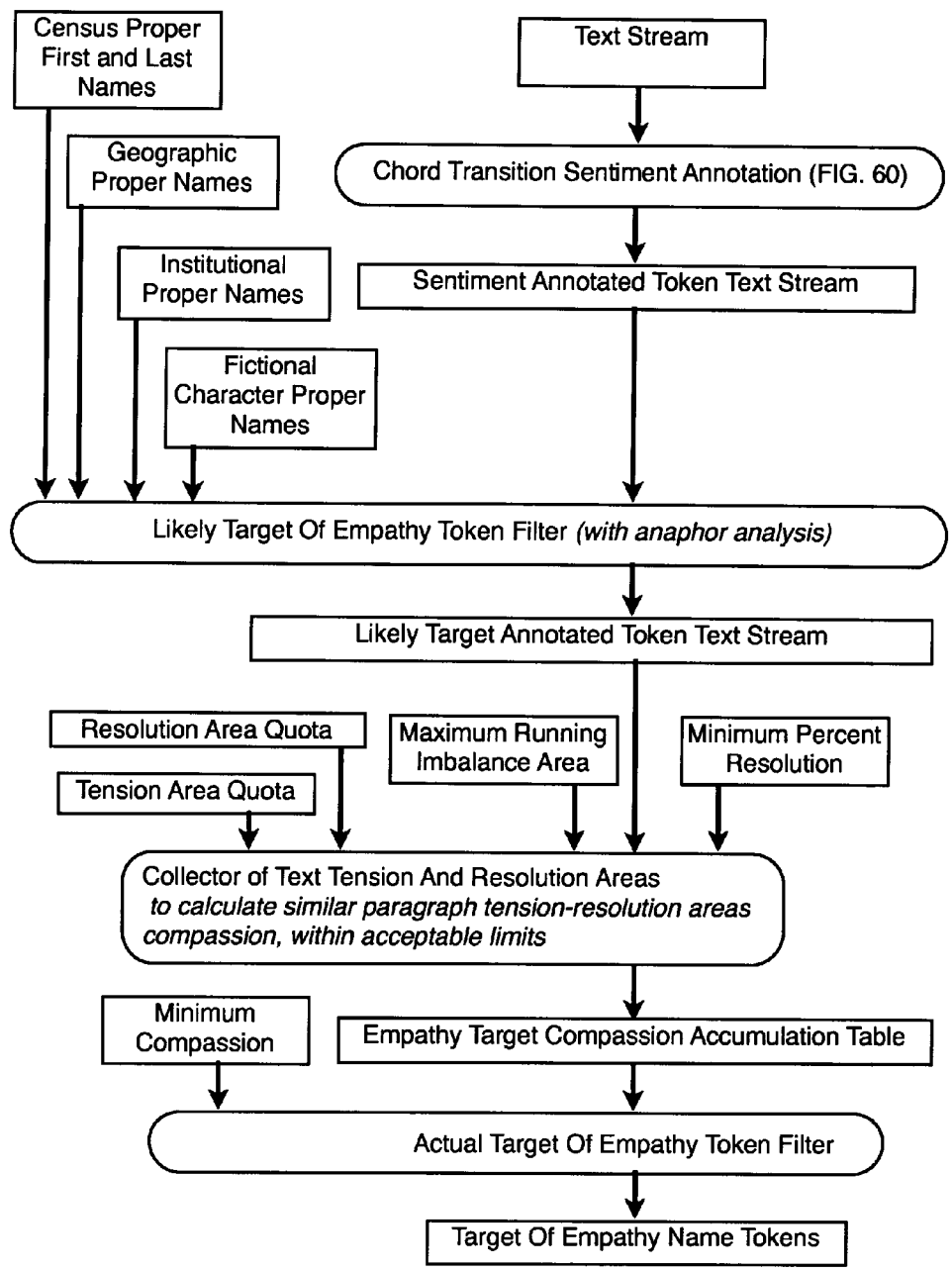
FIG. 78 Target Of Empathy Analysis Method

In FIG. 78, a method for computing which of the tokens in a document refer to entities for which empathy is shown. Since empathy is more likely to be shown to an entity with characteristics of a person, tokens in the Text Stream which match actual people's names are likely targets, as are tokens which match known fictional character names. Since anthropomorphism may extend these sentiments to other entities as well, Geographic Proper Names and Institutional Proper names are also likely targets. Since new names may appear in text, any words which are consistently spelled with uppercase even when not starting a sentence may also be treated as Likely Target Of Empathy tokens.

Anaphor analysis of pronouns can also help to identify likely targets. For instance in "Summer started early. She savored the moist, early morning air" the first sentence might mean that Summer is a season, and not a Likely Target Of Empathy. However the second sentence makes clear that Summer is likely a female person. Anaphor analysis uses pronouns such as "she", "he", and "they" to mark names in prior text, so they can be treated as Likely Target Of Empathy tokens.

Figure 72:
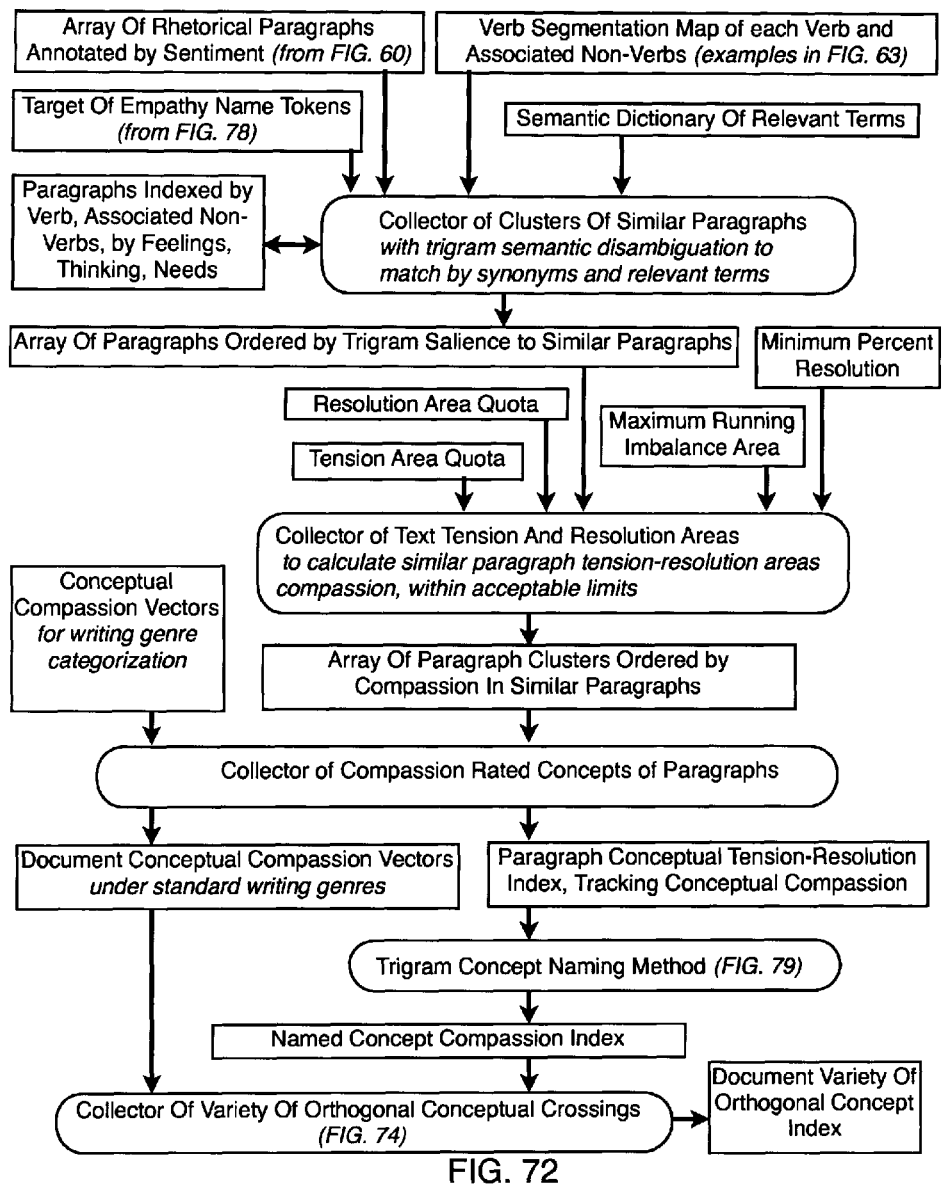
FIG. 72 Document Paragraph Compassion Analyzer

As in FIG. 72, Resolution Area Quota, Tension Area Quota, and other limits on sentiment imbalance calculated by Collector of Text Tension And Resolution Areas produce total Empathy Target Compassion Accumulation Table numbers for each Likely Target. Filtering this table for Minimum Compassion produces Target Of Empathy Name Tokens describing the names of entities for which empathy has been shown in the document. These entity names then control Collector Of Clusters Of Similar Paragraphs in FIG. 72, so that paragraphs can be clustered together using very low salience thresholds for specific concept names. For names of entities for which very high empathy has been shown, useful thresholds for measuring tension-resolution of a human character (theme) may be as low as a two or even one-word of a trigram in common regardless of similarity in valence.

Since each paragraph has multiple trigrams, each paragraph has multiple ways to match trigrams which cross the threshold for salience to another paragraphs. When multiple trigrams match and cross the threshold for salience between the same pair of paragraphs, each trigram match contributes its salience to the overall salience between that pair of paragraphs. Thus multiple possible matches can boost overall salience way over the threshold, even when some or all of the individual matches are far below the threshold.

Since multiple matches can allow other trigrams to string together paragraphs into clusters, which are then can be measured for compassion, it is important that salience thresholds be low enough to allow paragraphs of varying valences into clusters, so that valences can play within range large enough to exhibit compassion. Simultaneously, salience thresholds cannot be too low, or else unrelated paragraphs will be contribute to the compassion analysis. A separate, lower threshold can be defined in a pre-preprocessing pass (shown in FIG. 78) to collect entity names for which there is empathy, as described above, to provide a lower threshold for specific entities for which empathy is detected within a document.

After indexing every document paragraph as trigrams indexed under sentiment valences ("sentiment trigrams"), paragraph groupings can be detected by querying for each document's sentiment trigrams to find salient paragraphs passing the threshold for salience. This automatically generates an annotation showing which paragraphs are salient (relevant) to each other, such as the paragraph of FIG. 67 and paragraph of FIG. 70.

Paragraph clusters represent concepts and, as concepts, they ought to have names, for several reasons. The first reason is to create dictionary entries for concepts, which distill the meaning of concept into a phrase associated with its various meanings, also defined as phrases, so that people can look up the meaning of the concept, and so that subsequent natural language disambiguation processing can correctly disambiguate the meaning of the concept from other concepts. The second reason is to graph and report the compassion and other metrics associated with concepts, word-by-word or paragraph-by-paragraph in a document, so that a concept has some chartable name which visually distinguishes it from other concepts.

A concept detected via analyzing paragraphs may have various names from various methods of generating names. When forming concept clusters around trigrams, it is convenient to pick a representative trigram as a concept name to represent the cluster. The intersected words of the most prevalent trigram with the highest valences is usually the most resonant representative. For instance, the trigram which makes paragraph in FIG. 67 salient to the paragraph in FIG. 70, "experience, never, snobbery", is a good, strongly resonant set of words for suggesting a name. However, the canonical alphabetical order of that trigram gives it an unfamiliar sound. Since English is a word order language, following the order in which the words most often occur in the sample paragraphs produces a more familiar, resonant sound of "never experience snobbery". Similarly, to produce a more familiar sound in trigrams formed from poetic relevant terms, reverting to the original words found in sample paragraphs, in their original word order, can be preferable. For instance, the trigram "encourage, experience, kind" in FIG. 67 could be named "experience kind helpful".

For concepts which have formed around specific entities for which empathy was detected, the reduced threshold for salience permits intersected subsets of a trigram as short as a single word to drive the formation of paragraph clusters. Using an article such as "a" or "the" to distinguish these words as treated with empathy, concept names such as "the American" or "a Prophet" can be formed for entity words such as American or Prophet, even if "the" or "a" did not occur in the sample paragraphs in which American or Prophet were found. Since "a" and "not" are usually stopwords which are prevented from forming trigrams by Verb Section Stopword Filter in FIG. 68, using "a" or "not" in this manner immediately distinguishes entities for which empathy was detected.

For concepts which have formed around subsets of trigrams, such as two or even one word intersections, the one or two words themselves are often more vague than optimal, for a concept name. For instance, if only "experience" and "snobbery" were intersected from FIG. 67, the meaning of a name formed by concatenating these two words is vague. Do these words mean the experience of being a snob or rather, of being snobbed? To clarify the meaning of these two words, other words may be included between "experience" and "snobbery", from Sample B in FIG. 67, in the word order from that sample. For instance, "any" or "of" could be included, to generate concept names of "experience any snobbery" or "experience of snobbery". Words which are generally stopwords, such as prepositions, superlatives or diminutives are very useful in this role, since they are distinct from both articles "a" and "the", and distinct from the nouns, adjectives, verbs and adverbs which dominate trigram formation.

Figure 79:
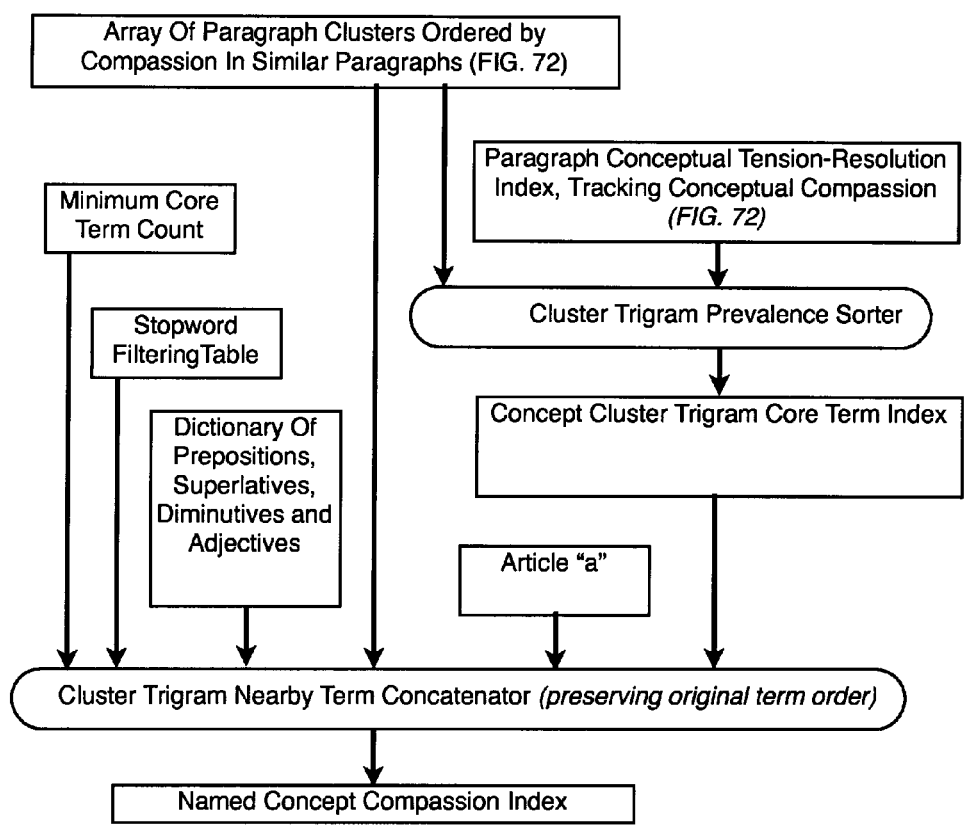
FIG. 79 Trigram Concept Naming Method

FIG. 79 shows a flowchart for naming concepts following the above examples. Both the original token sequences composing each of the paragraphs (in Array Of Paragraph Clusters Ordered by Compassion in Similar Paragraphs) and the intersecting trigram word sequences (Paragraph Conceptual Tension-Resolution Index) annotated with sentiment valences to form concept clusters are inputs to Cluster Trigram Prevalence Sorter, which selects the most prevalent trigram concept intersection terms for each concept, weighted for sentiment magnitude.

The Cluster Trigram Prevalence Sorter then produces the Concept Cluster Trigram Core Term Index, containing one sequence of Trigram Core terms per Concept. As noted above, this sequence can be as short as a single term, in the case of character names in novels, or other entities for which empathy is found, such as Prophet or American. For sequences in for which empathy is found, the article "a" or "the" is concatenated ahead of the term (by the Cluster Trigram Nearby Term Concatenator) to make it clear that the concept represents an entity for which empathy was found.

As mentioned above, a two term sequence might be the intersection around which a cluster of paragraph trigrams form, such as "experience snobbery". For these shorter sequences, the Cluster Trigram Nearby Term Concatenator can select nearby prepositions, superlatives, diminutives, and adjectives from incoming paragraphs, (earlier prevented by the Stopword Filtering Table from being trigram terms) to make concept names more distinctive, such as "experience any snobbery".

To make trigram generated names distinct from dictionary concept names, underscores or other markings may be used to show that trigram-generated names are concepts local to a particular document, such as "experience_any_snobbery". Later, if any trigram generated concepts are promoted to official dictionary concepts, these underscore markings can be replaced with blanks. The output of FIG. 79 Trigram Concept Naming method goes to FIG. 72 Collector of Variety Of Orthogonal Conceptual Crossings, so that relationships between Concept Clusters can be summarized by graphing their names. As described earlier in FIG. 76, not only compassion, but variety metrics are important to assessing the quality of written text. Variety can be computed from many perspectives, some entirely logical, or ontological, however the kinds of variety which are the best counterpoint to compassion are also, like compassion, based in sentiment and salience. So by analyzing relationships between concept clusters as computed by sentiment and salience, a very direct dynamic measure of variety can be computed for every document.

Variety could be computed by counting branches in ontologies or computed by counting modal humps in probability distributions and histograms. However, none of these dispassionate measures of variety have the authenticity of sentiment-based and salience-based variety computations. In human terms, things that feel alike are alike, and it is on that primal level of consciousness, that humans most sense variety.

Cognitive measures of variety using sentiment-based and salience-based variety computation are also a better basis for analyzing diversified investments, better than traditional probability-based diversification, since they shows where cognitive thinking is independent, instead of where than circumstantial price fluctuation histories are independent.

Further, sentiment-based and salience-based variety computation also helps to distinguish inspiring, poetic writing over pedestrian literal writing. The more poetic the writing, the easier for mutually irrelevant paragraphs to relate through as single poetic paragraph, since poetry supports a greater variety of inspiring meaning.

By following a more literary, human computation of variety, the Compassion Variety Cohesion Optimization Method of FIG. 76 can better detect Boring Concepts, enabling the Conceptual Deeper Question Generator to ask Interesting Deeper Questions about the Boring Concepts. Deeper Questions can be simply generated from stock scripts, such as the question "Have you always felt this way about" concatenated with the name of the Boring Concept.

Since each Concept computed by FIG. 72 is annotated by paragraph-to-paragraph salience links in the Named Concept Compassion Index, analyzing these links for intersections with other Concepts is an elegant method for measuring variety. Consider that each paragraph may contain a multiple Verb Sections, so some of a paragraph's Verb Sections will be salient to other paragraphs, which in turn are not salient to each other. For instance, the paragraph in FIG. 71 Verb Section H2 is salient to FIG. 70 Verb Section G2 through trigram "staff, experience, feel". Yet, though the paragraph of FIG. 67 is salient to the paragraph of FIG. 70, it is not salient through any Verb Section sentiment trigrams to the paragraph of FIG. 71.

Salience annotation thus shows that two paragraph clusters, the "experience, never, snobbery" cluster and the "staff, experience, feel" cluster intersect at the paragraph in FIG. 67 but are otherwise independent of each other. Clusters (themes) which diverge like this, but are connected at some paragraph, are annotated as orthogonal crossings of themes, by the method of FIG. 74. Each orthogonal crossing is a cross-weaving of a two (at least partly) independent themes. The presence of more crossings signify more weaving of themes within a document, showing that its presentation of themes is richer and less dependent upon any single theme, and thus more interesting and nuanced.

Figure 74:
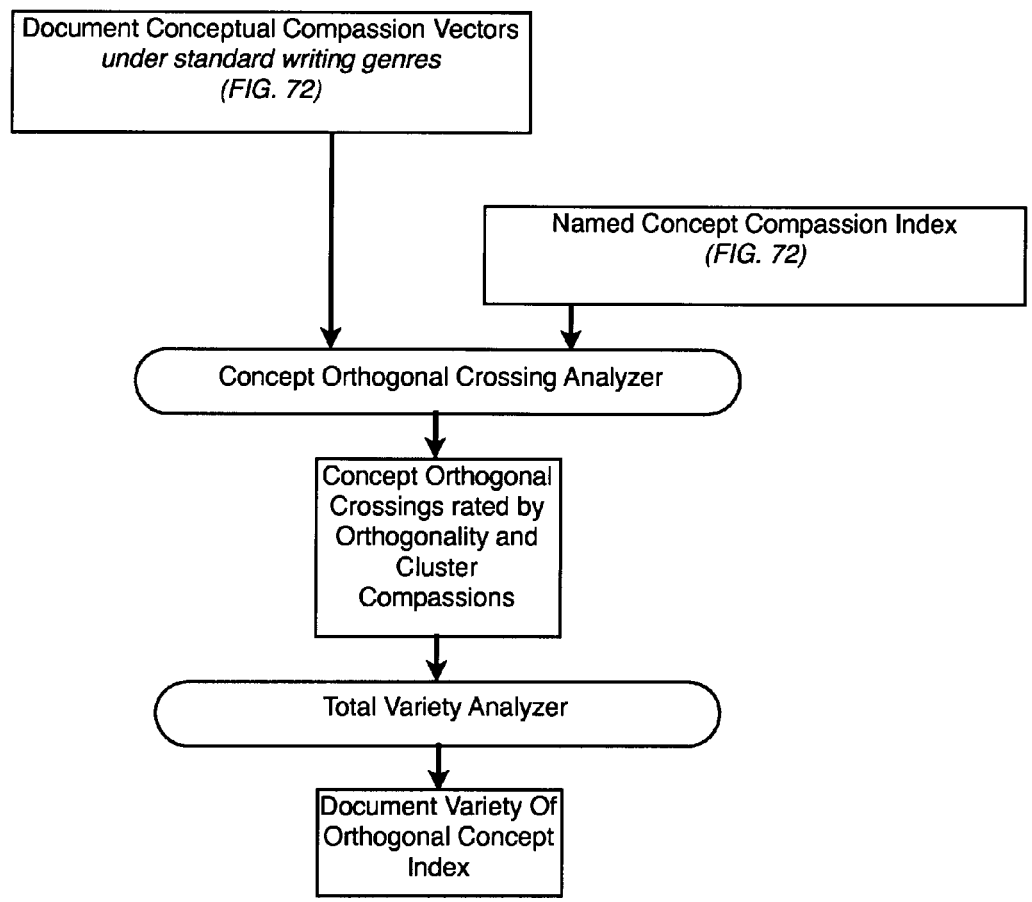
FIG. 74 Collector Of Variety Of Orthogonal Conceptual Crossings

In FIG. 74, the Concept Orthogonal Crossing Analyzer counts the number of orthogonal crossing paragraphs touched by a concept (theme cluster of paragraphs) to measure Variety, showing how interesting and nuanced that theme is. Counting the total number of orthogonal crossings in a document in the Total Variety Analyzer shows how interesting and nuanced that document is. Summaries of both document totals and concept-by-concept crossings into other concepts are passed as output to the Document Variety Of Orthogonal Concept Index, for later retrieval by search query engines.

The quality of themes (concepts) can be characterized, both on individual paragraph cluster (concept) levels and document levels, as their Variety (number of Conceptual Crossings) and their girth (population of paragraphs) and, as suggested by FIG. 76 mentioned earlier, their intrinsic Compassion.

Measuring themes for compassion involves the story-line sequence in which the themes play out, paragraph by paragraph. Just as a human character (theme) may appear in a book in paragraph 2 and not return until paragraph 22, a cluster of salient paragraphs may appear in paragraph 3 and not return until paragraph 30. For human character themes, a lot a action may occur while the character is away, action which may later weave into Conceptual Crossings with the character theme, yet that action does not immediately affect the human character's emotional sentiment state, nor affect the compassion expressed for that character. As soon as the character re-appears, though, the sentiment states of the paragraphs surrounding the character again color the character's emotional state. During extensive testing with strongly character-based novels, this connection between paragraphs and emotional character development was shown to be accurate. Intervals where the character was not present did not directly affect the character's emotional development, and could be ignored for that character.

Intervals where characters are not present do have one avenue to effect them, as these intervals sometimes develop interwoven themes which later cross the character, adding Variety and some bleed-through of emotional states from the related Orthogonal Concepts (themes). This bleed-through is especially strong for dominant characters interwoven with each other. Particularly when dominant characters differ strongly from each other, such a student/teacher or parent/child pairs, the Variety of related Orthogonal Concepts can grow so large as to dominate the characters themselves; the relationship between the characters thus overshadows their meaning as individuals. Yet research shows that even characters dominated by their interactions still benefit from a deeply compassionate presentation, as computed by tension-resolution compassion calculations outlined in FIG. 64 to FIG. 66, for each paragraph in which they appear, in the sequence they appear.

Conceptual themes are a generalization of human character themes, since they develop around any word meanings, not just the names of characters. Since the paragraphs annotated as belonging to a single conceptual theme sporadically appear as a sequence of sections, just like human character themes, the sentiment valences attributed to each section also can be inputs to the tension-resolution compassion calculations outlined in FIG. 64 to FIG. 66, bearing upon specific concepts. Each section in which a theme (concept) appears can be treated as a continuous extension of the previous section in which that theme occurred, and the sentiment valence fluctuations across all sections in which that theme occurs can thus be analyzed as the story-line of that theme, skipping the intervening document paragraphs which are not clustered into that theme. This thematic (conceptual) compassion analysis differentiates themes that are fully developed, from a sentiment perspective, or simply presented over and over again in a single narrow emotional light.

Combining compassion and variety analysis of themes can be done in a variety of ways. They can be computed separately to produce annotations, which are later combined when querying and summarizing documents. They can also be computed together, to share some of their intermediary calculations and to inform each other's calculations of significant interactions.

In the art of search engines, it is very important to automatically and consistently promote the display of higher quality search engine results over lower quality results, and measuring the quality of search engine results using the present invention's automatic metric of compassion is a very powerful way to distinguish higher quality results from lower quality results, to automatically improve the quality of search engine results. As previously said above in paragraph 0164: "Together, these swings back and forth in valence allow the whole paragraph to be annotated for above average compassion, making it preferable to the average paragraph for search engine indexing and retrieval, as shown by the FIG. 115."

FIG. 114-115 shows methods to implement a compassion metric for search engines. The compassion-search-engine implementation terminology is: Array Of Paragraph Clusters Ordered by Compassion In Similar Paragraphs. Collector of Compassion Rated Concepts of Paragraphs. Query Text. Search Text. Document Compassion Analyzer. Query Compassion Analyzer. Query Cluster Compassion Trigrams Index, Document Results Sorted by Relevance.

Details of the method to compute the Total Compassion metric for FIG. 114-115 are in FIG. 106, where the relevant implementation terminology is: Negative Areas, Positive Areas. Unacceptable Running Areas. Acceptable Negative Area. Resolution, Total Compassion.

All these techniques can be practiced and implemented using manual version of sentiment detection, but even crowd-sourcing to reduce costs, there is a huge issue of enforcing consistency of sentiment detection. Each section of text must be analyzed a enough times to create a statistical consensus before consistency can be a known quantity. When hundreds of manual readers detect sentiment in large amounts of text, inconsistencies occur so often and so randomly that statistical quality control techniques require a single long text to be annotated in dozens of redundant passes to find a statistical agreement. Similarly, traditional sentiment detection using ontology and grammar to annotate text may be used, but the drawback is an inability to correctly annotate for new meanings, new concepts, and sentiments expressed as musical rhythm and tone, without using traditionally sentiment-carrying words. With automated musical and rhythmic sentiment detection, consistency and full coverage of all utterances and texts is built-in.

Combining compassion, variety and cohesion measurements, as in FIG. 76, produces a dynamic homeostatic system with excellent overall balance. There are many methods for computing the cohesion of a document, and many levels on which cohesion exists within a document. Some are as simple as measuring the clarity of sentiment of text, as the Thinking valence computed by the method of FIG. 72. When this valence is highly negative, the text sounds conflicted or confused, but when this valence is highly positive, the text sounds assertively clear. FIG. 75 shows how Thinking Valence Annotations can inform the Concept Crossing Cohesion Analyzer, by showing which Concept Crossing paragraphs have higher (cohesion) or lower (cohesion) Thinking valences.

Another, slightly more complex measure of cohesion reflects the consistency of trends. Foreshadowing of inter-relatedness, whether in fiction or non-fiction writing, is a powerful and significant way to deepen the meaning of concepts. When a concept (theme) interacts (crosses) another theme with greater and greater frequency, the relationship between the intertwined themes becomes as meaningful as the individual themes themselves. Since the method of FIG. 72 computes Orthogonal Conceptual Crossings, the Concept Crossing Convergence Analyzer of FIG. 75 notes changes in frequency of crossings, to compute the degree to which themes (concepts) converge in a document, as another metric of cohesion. A document totally lacking in convergence also lacks conclusions and lacks any self-evident reason for being read, though it may be useful for its component data elements, as is a telephone book.

Another, potentially very complex measure of cohesion reflects logical consistency within a document. Logic can very cumbersome to compute, especially since some logical flaws in documents greatly detract from document quality, yet other logical flaws hardly matter, depending on the position within the document. To compute these logical cohesions from a consistent, verifiable basis, FIG. 75 shows a dictionary based approach to generating anaphoric dictionary entries, which exist only for the document. Since the quality of a document as analyzed by FIG. 72 is so concentrated on the paragraphs where Concepts Cross, computation of cohesion is focused on these crossing paragraphs, thus avoiding analysis of secondary paragraphs whose logical consistency is not crucial to the development of ideas in the document.

As an example of a Concept Crossing analysis of cohesion, the Concept Crossing between FIG. 67 and FIG. 70 involving the concept of "never experience snobbery" consistently relates to client-staff situations. If, however, a pronoun such as "You" in "You should never experience any snottiness" of FIG. 70 were to refer to something logically unrelated to client-staff situations, there would be a logical inconsistency. For instance, if the preceding sentence in the same paragraph were "Oh, you fading memories of summer, how I miss you" there would be a logical inconsistency between the two sentences. The anaphor of "you" means the season of summer in the first sentence, but it means a client in the second. To detect similar inconsistencies, the FIG. 75 Anaphoric Resolution Generator resolves the first sentence "you" to the season of summer, and the second sentence to "a client customer", using the Dictionary Relevant Terms Index with word-sense disambiguation algorithms to disambiguate the meanings of "you". The Concept Crossing Anaphoric Consistency Analyzer then compares the meanings of "you" from the first and second sentences to see that there is no overlap, and detecting there is none, annotates the sentences with zero consistency in the Concept Crossing Logical Consistency Index.

This Analyzer uses the Poetic Resonance Mapper of FIG. 79 for word sense disambiguation, so the more poetic the sentences, the more the poetic range of the meanings in the sentences which can easily overlap each other for consistency. Conversely, sequences of literal meaning sentences must stay close to the same topic, in order to overlap each other for consistency.

The Concept Crossing Cohesion Analyzer then annotates each Concept Crossing with a Total Cohesion magnitude computed from Concept Crossing Logical Consistency Index, Concept Crossing Convergence Index, and Thinking Valence Annotations. Total Cohesion can be simply the sum of these three, or it can be a weighted sum with weights adjusted for writing styles. The Concept Crossing Cohesion Annotator produces the Concept Orthogonal Crossings rated by Compassion, Variety and Cohesion, as output.

Anaphor, of course, can be more than meanings associated with pronouns. Anaphor can be symbols or abbreviations defined by a document, such as "hereinafter referred to as CRX" or "Elizabeth, who we called Betsy". Anaphor can also be meanings inferred by a process of deduction. For instance in, "Lunch was only six dollars and tip was a dollar. The total went on the credit card" the word "total" means seven dollars. The methods for implementing such deductions can be highly useful in specific situations, such as customer service chatbot conversational engines. By creating dictionary entries which exist only for the document, such as "total" meaning "seven dollars, the bill for lunch" later sentences such as "The bill was quite reasonable" can be disambiguated and distinguished with clearer meaning, drawing upon such document-specific or conversation-specific dictionary entries alongside permanent dictionary entries.

The precise use of dictionary entries also enables the Poetic Resonance Mapper of FIG. 77 to extend the meaning of tokens in a Text Stream, beyond prior art meaning disambiguation techniques, thus correctly computing the deeper meaning of poetry and metaphoric meanings. Similarly, the Poetic Resonance Mapper enables trigrams to be extended to cover metaphors parsed from text, so that salience connections (otherwise dropped) correctly connect to query metaphors to indexed content metaphors. (See FIG. 68 Sentence Sentiment Trigrams Generator.)

Cognitively, the brain resonates more deeply with poetry, affecting a greater range of possible meanings, which give poetry its power to inspire and move people. Specific meanings of words vary in poetic power, and those with greater power are cohesive with a larger range of concepts. For instance, the poetic meaning of "heart" has more abstract meanings which are cohesive with a wider range of meanings, whereas the medical meaning of "heart" has a more literal meanings which are cohesive with a narrower, specific range of meanings.

FIG. 77 contrasts a Poetic Sample sentence written by Mary Oliver to a Literal Meaning Sample sentence from a medical paper. In both sentences, abstract words are shown underlined, and above these words are arrows pointing to related poetic meaning annotations in italics. For instance, above "feel" in the poetic sample are related meanings of "being" (prefixed with "n" to show this is a noun meaning) and "perceive" (prefixed by a "v" to show this is a verb meaning). Among these lists of related meanings are underlined words, showing which of the related meanings overlap and cohere with other related meanings in the same sentence. These italicized, underlined words show that there are more overlapping, cohering meanings in the Poetic Sample than the Literal Meaning Sample. For instance, meanings of "heart" and "pertained" overlap via "important" and "connection", whereas meanings of "heart" and "surgery" in the medical sentence overlap only via "mechanical". The greater poetic frequency of the overlaps in the Poetic Sample enable it to resonate with a greater range of meanings. By detecting poetic overlaps, the Word Sense Resonator of the flowchart of FIG. 77 determines whether to associate further related dictionary meanings. For instance, feel's related meaning "feeling" overlaps with heart's related meaning "feeling", which in turn has a further related meaning "condition" causing a new overlap with pertain's related meaning "condition", which in turn has further association with "being" and "state", all which then annotate the sentence.

Concentrating poetic words of "feel", "heart" and "pertained" into a single sentence builds an overall poetic resonance, which the Word Sense Resonator detects as overlapping meanings, causing the Word Sense Resonator include further related meanings, which in turn, may cause further overlaps and still further dictionary entries to be included. Resonance thus adds annotations of deeper meanings from this reinforcement process until no further overlaps are detected.

When the same Word Sense Resonator is applied to the medical sentence, the words "surgery" and "heart" adds "mechanical" as an overlapping meaning, yet meanings related to "mechanical" do not resonate further with any of the words of the medical sentence, so the reinforcement process stops and no deeper annotations are added to the sentence.

These dynamics within computation of poetic resonance conform well with observations from cognitive memory research, which shows that items which are elaborated by connections to other items are better recalled than items which have no connections to other items. Just as the human mind stores connected items at a higher priority then non-elaborated items, the Word Sense Resonator annotates connected items with deeper meanings which into turn can be stored and saliently retrieved from a wider range of queries.

Since analysis of music and poetry has been overlooked by word sense disambiguation methods in prior art, the tracking of resonance to interpret poetic meaning has also been overlooked. The present invention combines aspects of music and poetry with insights from cognitive research to enable a superior form of language word sense disambiguation.

Research shows that for clarity and disambiguation purposes, dictionary meanings are best stored and retrieved as verb centered trigrams, as described above, associated with sentences defining these dictionaries, to enable salience computations to determine which dictionary meanings are most salient when disambiguating sentences, which may themselves be dictionary entries. Using salience computations to traverse a natural language dictionary architected in this manner enables poetic resonance to be quickly computed, for the greater poetic resonance of poetic meanings comes forth directly as greater salience. Such a dictionary may be called a Language Disambiguation Dictionary (or LDD): a dictionary especially architected to enable efficient word sense disambiguation methods.

Variations on both LDD construction and Word Sense Resonator are described in the "AU METAPHOR PATENT".

Combining sentiment metrics with word-sense disambiguation algorithms works best, when sentiment metrics are accurate on a word-by-word basis. Fortunately, Musical Phonemic Chord methods as in FIG. 59 to FIG. 63 are very accurate at word-by-word sentiment analysis of Feeling, Thinking and Needs valences. However, since sentiments and emotions are primal cognitive structures, they are a reflection of competing cognitive impulses, causing exceptions to straightforward presentation. Just as research into face expression sentiment detection found that people will smile when angry, as a postural way to compensate for their frustration, so too will people phrase things happily when they are angry, as a compensation.

In facial expression sentiment analysis, to compensate for such posturing, inconsistency clues such as a narrowing of the eyes can be combined with smile clues to detect the frustration of anger. Just as these inconsistencies in facial expression can be detected (such as crying when elated) inconsistencies between valences of Feeling, Thinking and Needs can signal exceptions where sentiment analysis can be interpreted and adjusted for postural conditions such as prissiness causing sentiments to be suppressed by formality, or where admiration causes sentiments to be exaggerated.

Some postures require a minimum degree of clarity (positive Thinking Valence). Other postures require a minimum degree of confusion (negative Thinking Valence). For instance, written sentiments may be presented with reversed valence signs when people are conflicted, showing subjunctive wishful sentiments, in words, the opposite of their actual internal sentiments. Prissiness is a posture where either true Needs expressed by Feelings are withheld, or Feelings are expressed but Needs are withheld. Sarcasm is a posture where Needs and Feelings are expressed in opposite signs and Thinking is within reasonable limits of clarity, so the true sentiments are an underlying negativity about a conflict between Needs and Feelings.

Figure 83:
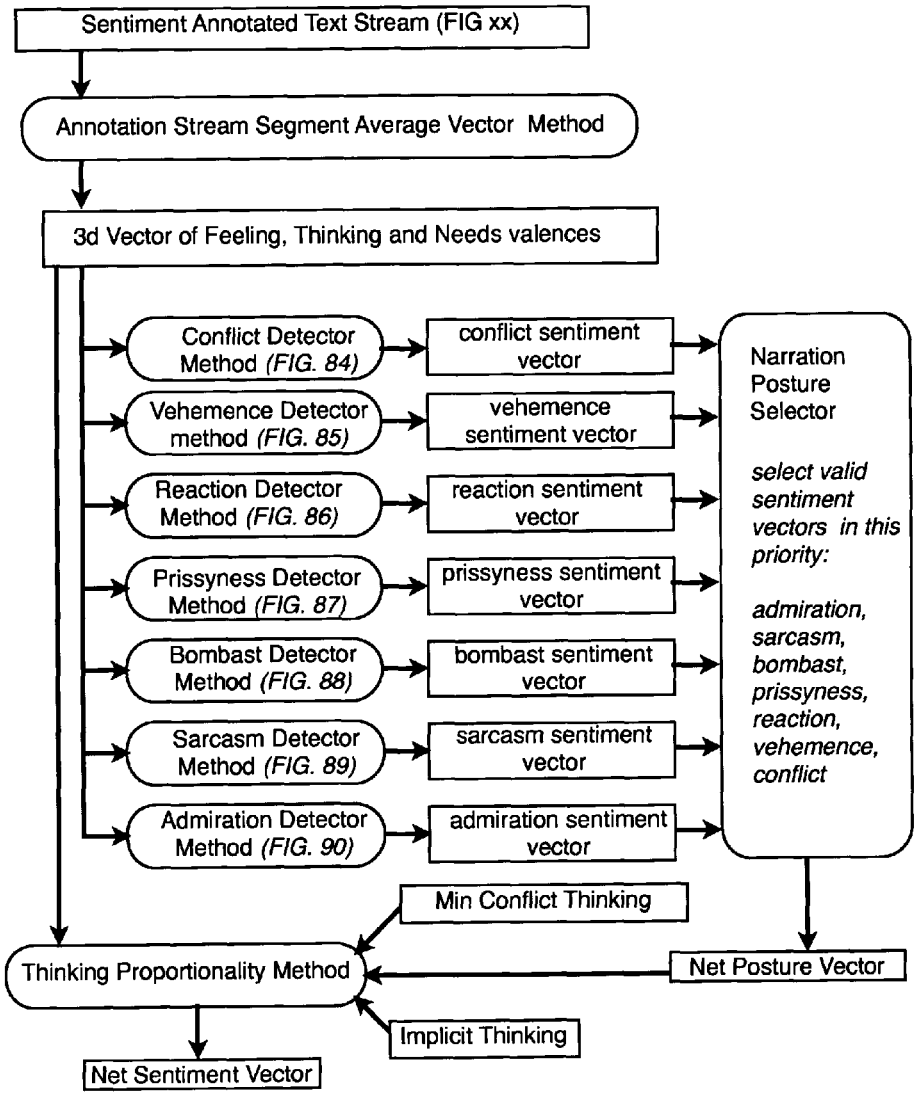
FIG. 83 Method To Adjust Net Sentiment Vector For Narrative Posture

FIG. 83 shows a method for detecting and interpreting a variety of postures and compensating for them, to produce a single Net Sentiment Vector. Each posture, when detected, has an intrinsic priority, so that the most dominant detected posture overrides any lesser priority postures detected. Each posture also has an intrinsic methods for compensating for its postural effect, producing a Net Posture Vector for any given valence triplet of Feeling, Thinking and Needs.

The Thinking Proportionality Method compensates for a general effect of low magnitude valence thinking, where the writer expresses a lack of confidence in what is written, showing up as a nearly zero Thinking valence. In contrast, a highly positive Thinking valence occurs when a writer expresses confidence in what is written, and a in a different contrast, a highly negative Thinking Valence occurs when a writer is passionate about what is written, yet suffers from a lack of cohesion and an underlying sense of conflict.

The Thinking Proportionality Method of FIG. 83 increases the Net Sentiment Vector when the magnitude of Net Posture Vector is large, whether large negative or large positive. This can be computed simply by multiplying the absolute value of the Thinking Valence by the Net Posture Vector. However, implicit residual emotion exists even for writing where the Thinking valence is zero, so a small Implicit Thinking valence is added to Thinking valences, before multiplying by the Net Posture Vector, to correctly value Needs and Feelings when Thinking valence is zero.

Figure 84:
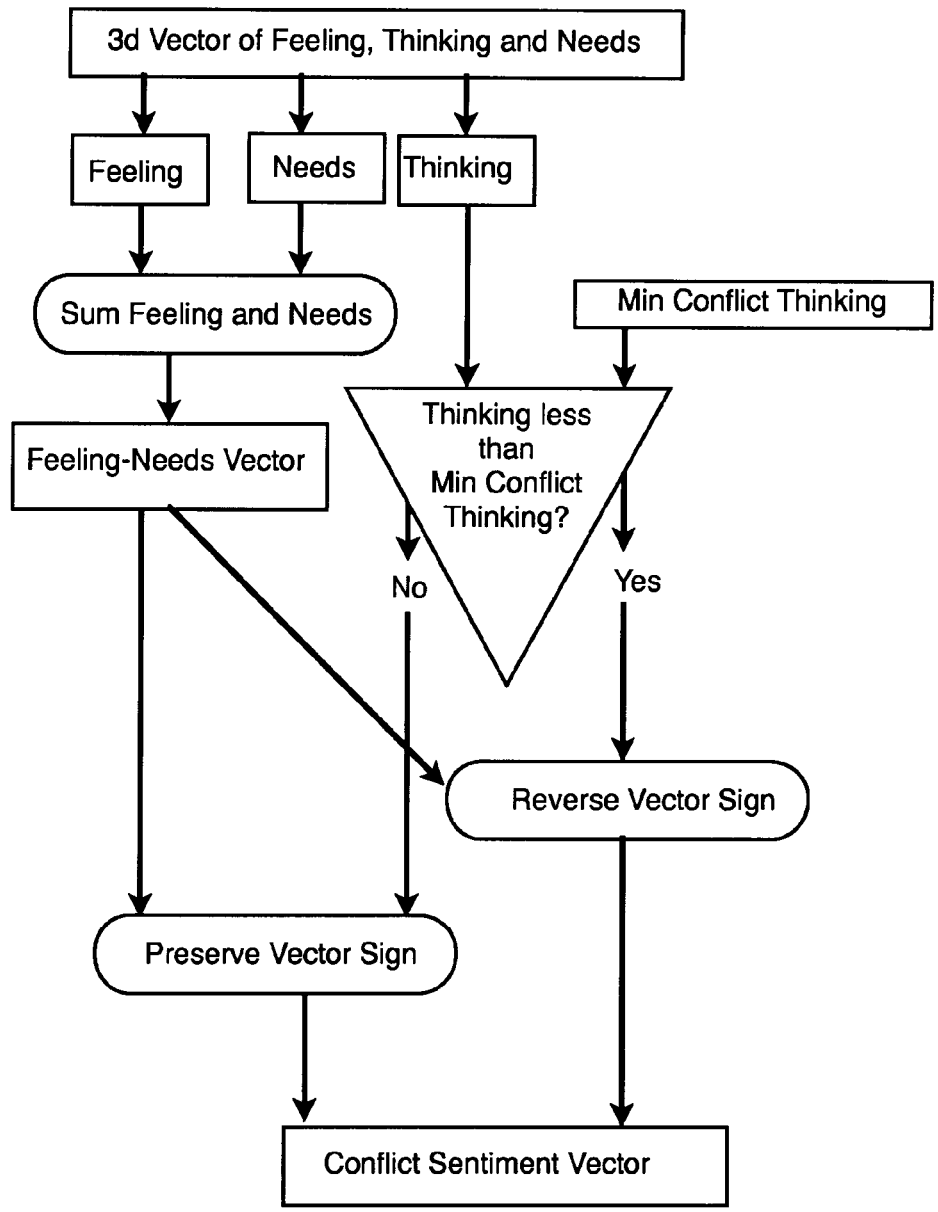
FIG. 84 Conflict Detector Method
Figure 85:
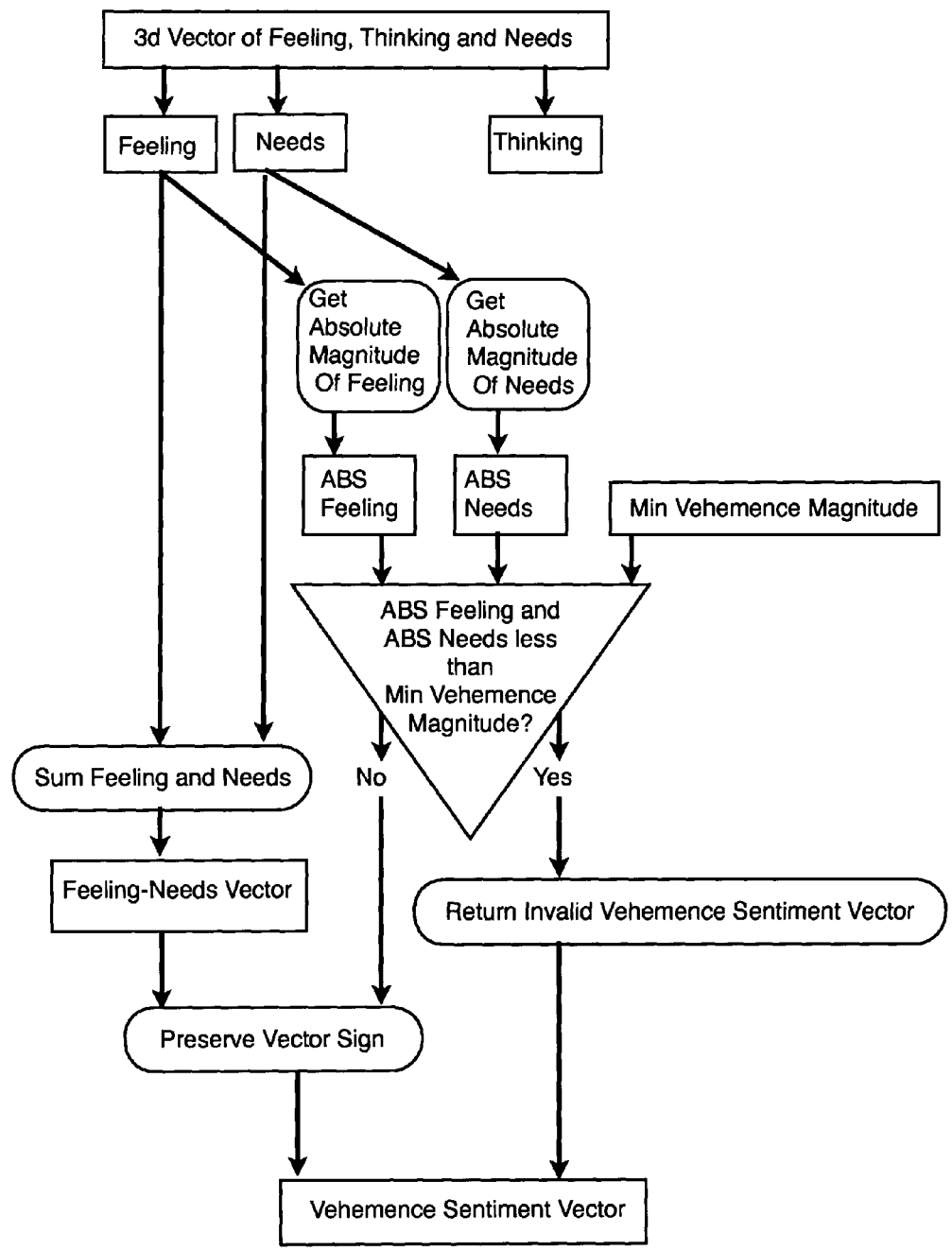
FIG. 85 Vehemence Detector Method
Figure 86:
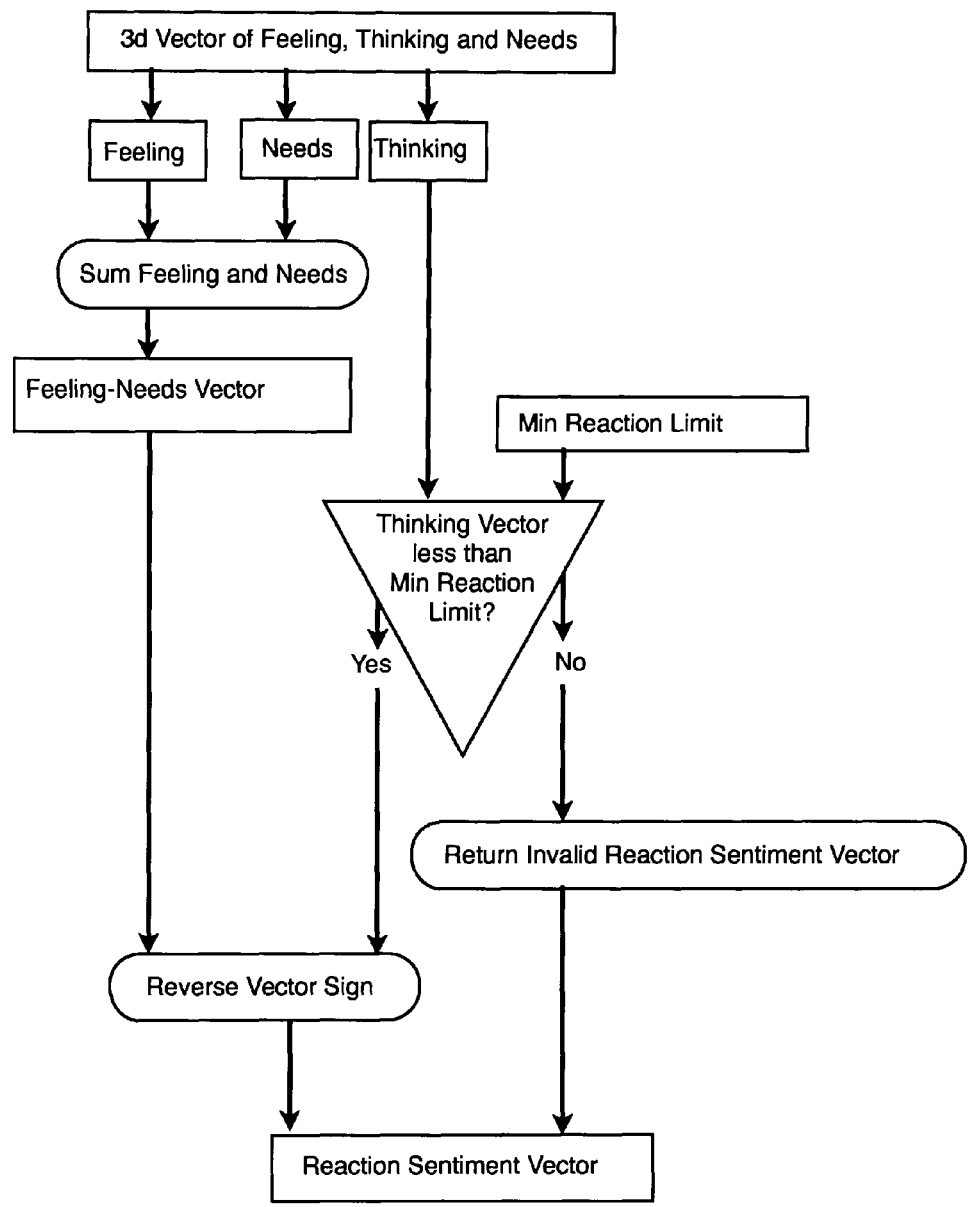
FIG. 86 Reaction Detector Method
Figure 87:
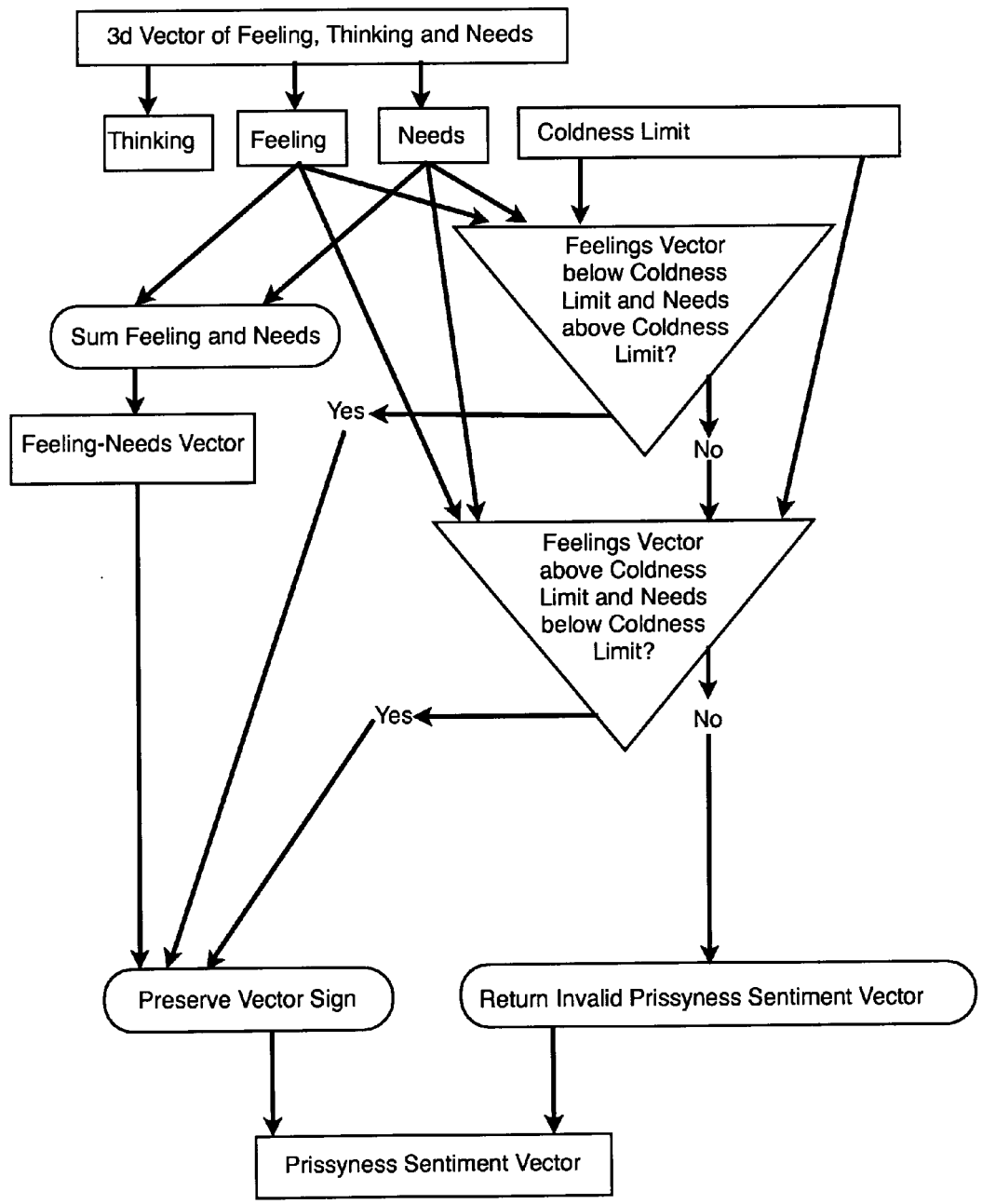
FIG. 87 Prissyness Detector Method
Figure 88:
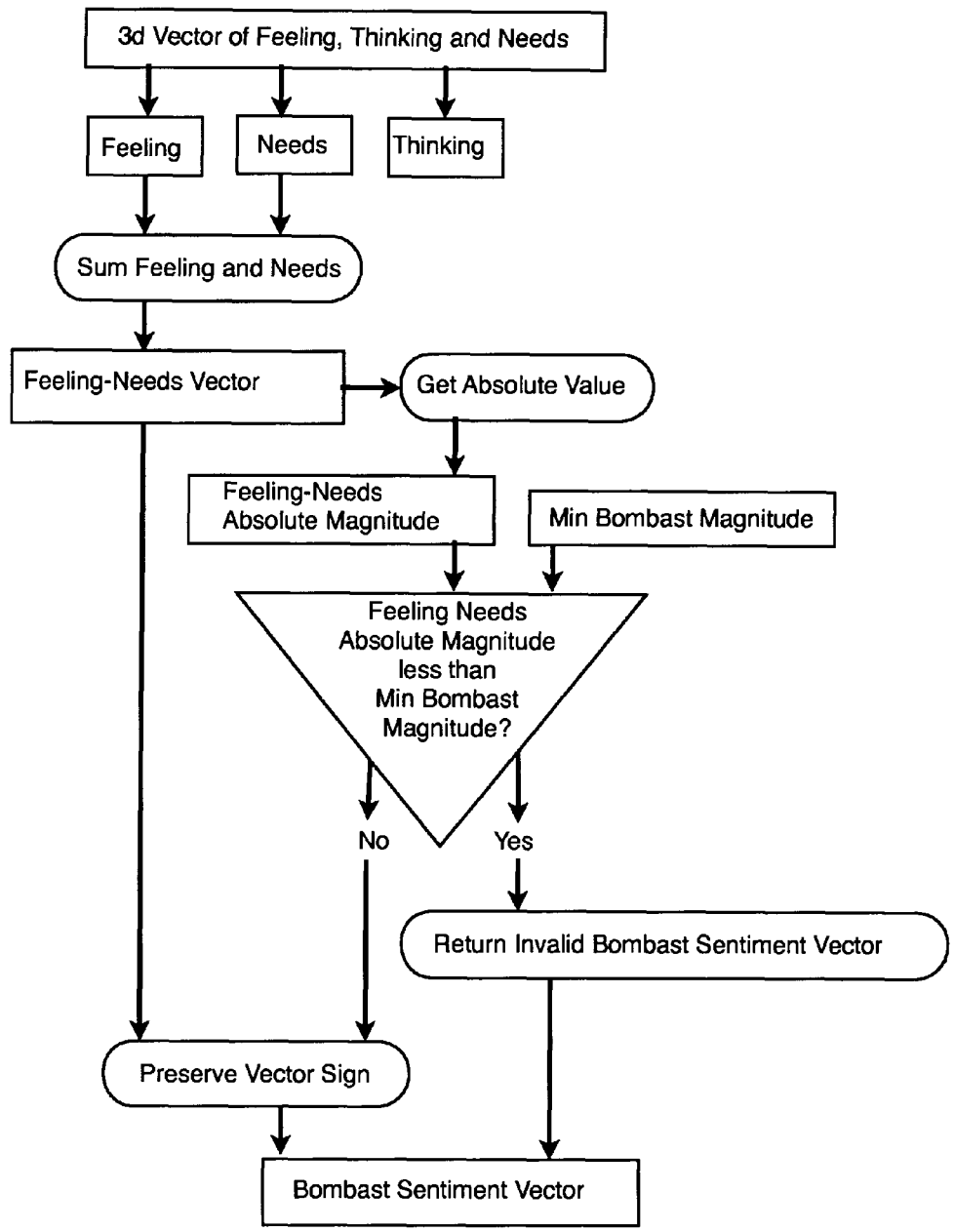
FIG. 88 Bombast Detector Method
Figure 89:
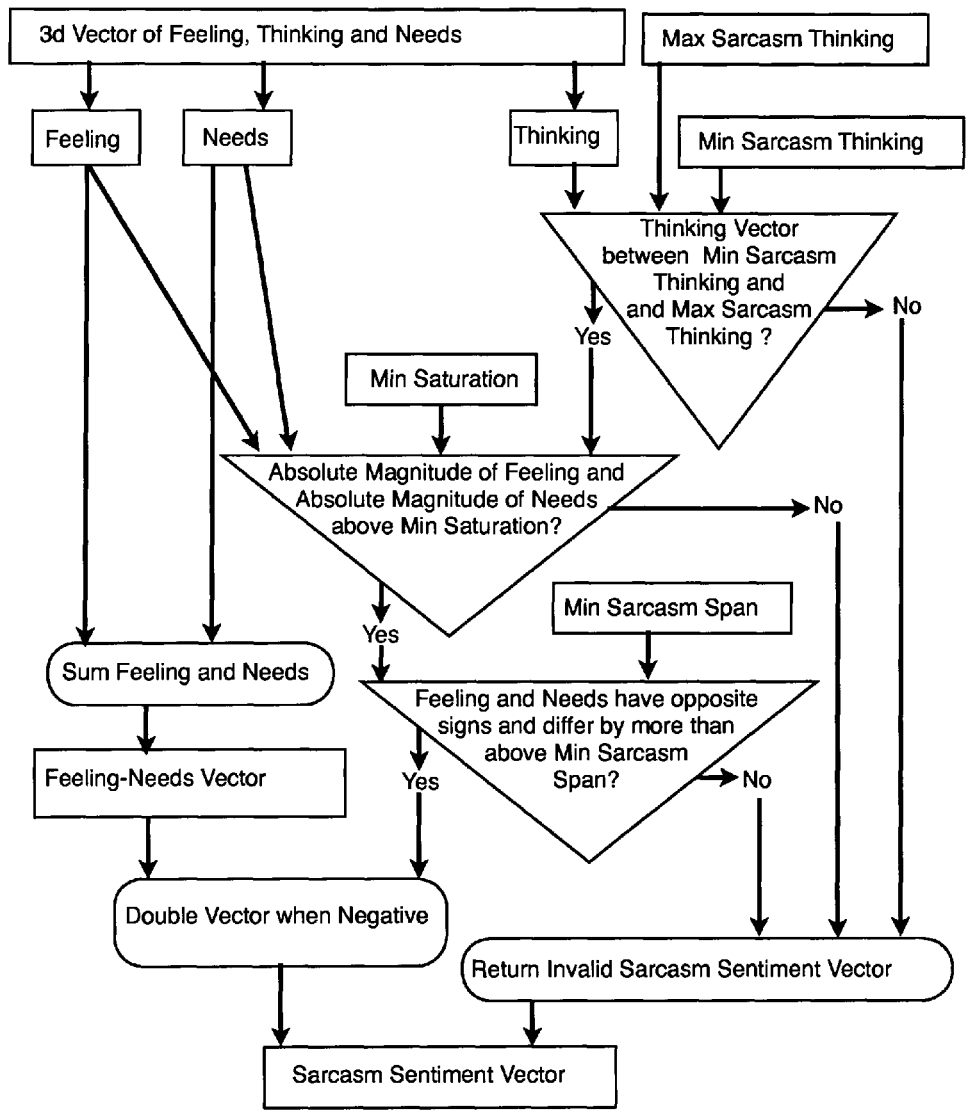
FIG. 89 Sarcasm Detector Method
Figure 90:
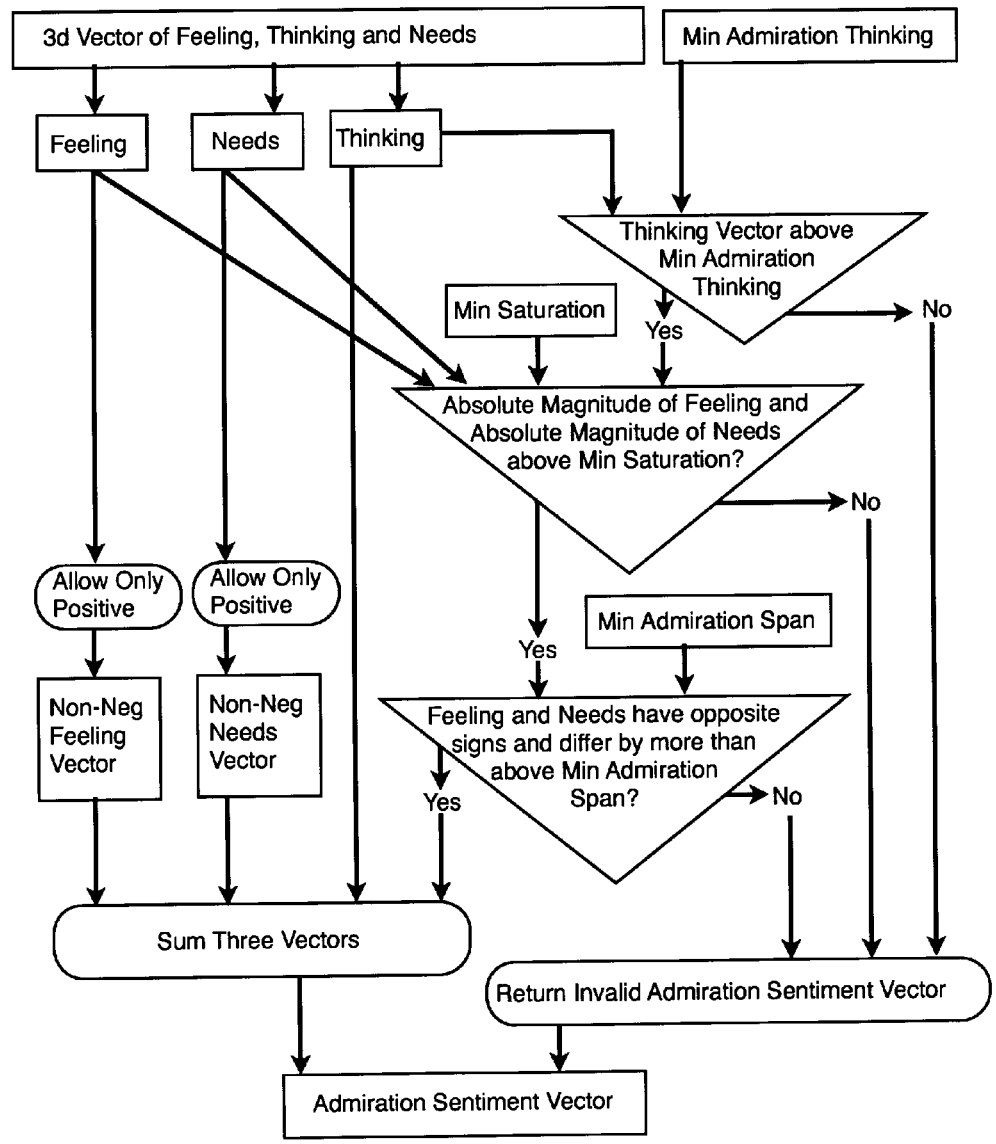
FIG. 90 Admiration Detector Method

In priority order, the Conflict Detector of FIG. 84, the Vehemence Detector of FIG. 8586, the Reaction Detector of FIG. 86, Prissyness Detector of FIG. 129, Bombast Detector of FIG. 88, Sarcasm Detector of FIG. 89 and Admiration Detector of FIG. 89 all contribute possible Net Posture Vectors to FIG. 83. Depending on the style of writing, all of these detectors may be needed, or only a subset of them, to increase accuracy of sentiment detection to over 80% on a word-by-word basis.

To give an example of working sentiment constant values for a particular set of sentiment Musical Phonemic Chord Detector method, FIG. 91 shows constants for values in FIG. 84 through FIG. 91. Higher priority detectors generally have higher constant values, reflecting the higher valence thresholds for triggering higher priority sentiment posture detections. For instance, Min Admiration Span has a value of 2.6 and Min Bombast Magnitude has a value of 3.6, whereas the low priority Min Confusion Thinking is only −0.18.

Figure 1:
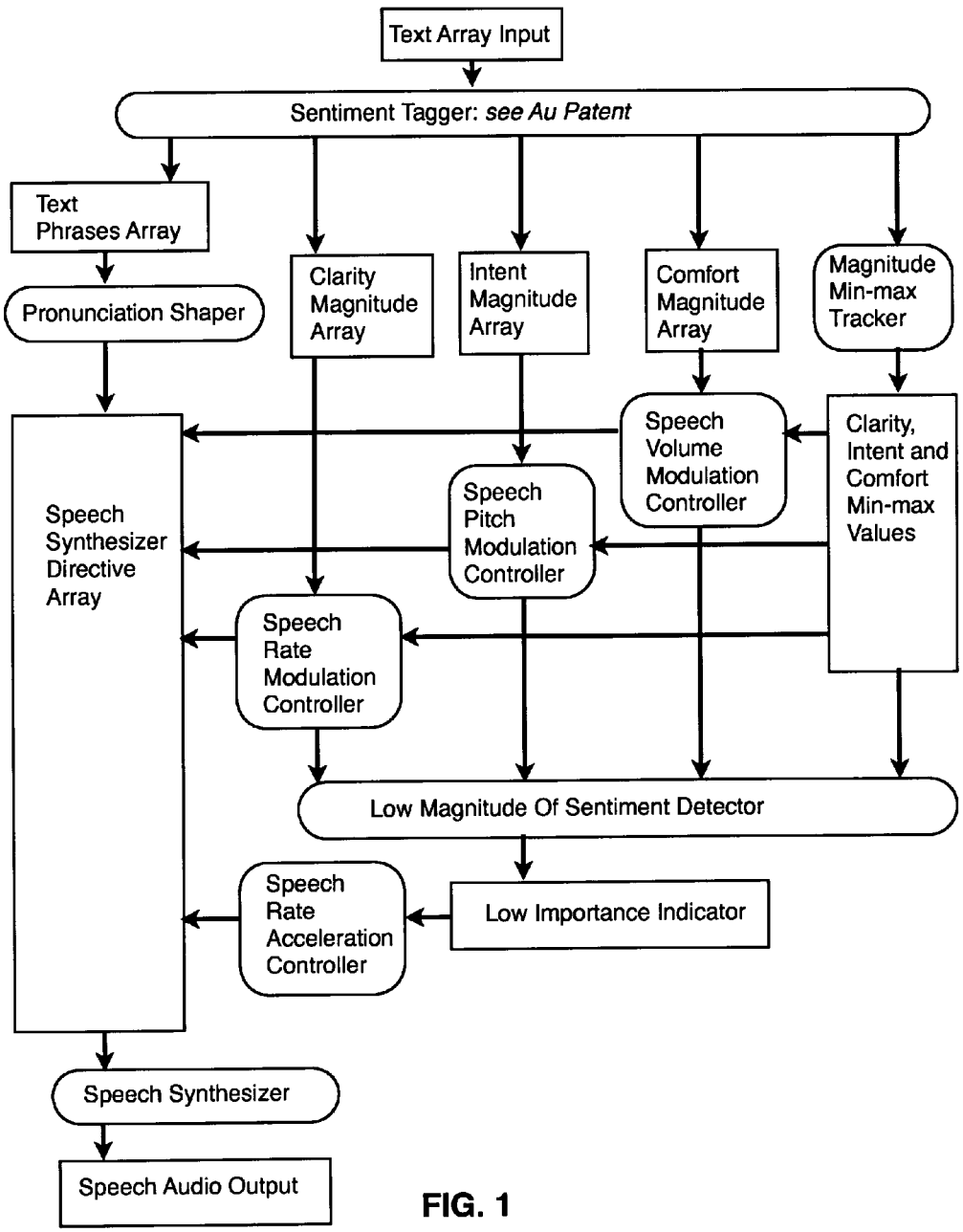
FIG. 1 shows a text to speech method for enhancing the comprehension of listeners who may need to better understand text while exercising, driving, or performing other tasks which preclude using a visual text display, or for the simple need to understand text with less effort than reading it visually.

The present invention also enables advances in user interfaces and automated dictionary constructs, as described by the AU MEMORY PATENT, and described by the present invention in FIG. 1 to FIG. 23 as follows:

Using the methods described in the Au Memory Patent application, the text to speech method of FIG. 1 reshapes the output of a text to speech synthesizer for greater listener comprehension, by phrasing the speech output to emphasize rhetorically significant text and to de-emphasize rhetorically trivial text. Since some of the methods described in the Au Memory Patent can generate three or more dimensions of sentiment tags for each word or phrase of text, the method of FIG. 1 shows each of three dimensions reshaping a specific aspect of speech output. The Clarity dimension controls speed, so easily understood passes are read faster and more difficult passages are read slower to allow the listener to consider their meaning over a greater period of time. The Intent dimension controls pitch, so that phrases tagged for significant intentions are read at a higher more stressful pitch, and phrases tagged for insignificant intentions are read at a lower more relaxed pitch. The Comfort dimension controls volume, so phrases tagged for significant comfort or discomfort are read at a higher more forceful volume, and phrases tagged for indifferent Comfort at read at a lower easy-going volume.

Clarity is shown controlling speech synthesizer output in the flowchart of FIG. 1, in the data flow from Text Array Input to Sentiment Tagger to Clarity Magnitude Array to Speech Rate Modulation Controller to Speech Synthesizer Directive Array. Intent is shown controlling speech synthesizer output in the data flow from Text Array Input to Sentiment Tagger to Intent Magnitude Array to Speech Pitch Modulation Controller to Speech Synthesizer Directive Array. Comfort is shown controlling speech synthesizer output in the data flow from Text Array Input to Sentiment Tagger to Comfort Magnitude Array to Speech Volume Modulation Controller to Speech Synthesizer Directive Array.

The method of FIG. 1 results in a smoothly varying, pleasingly natural diction, as well as a much easier to comprehend phrasing, since the rhetoric implied by the Text Array Input is spoken in a rhetorically meaningful pronunciation. Since there can be a varying number of types of sentiment dimensions produced by the methods described by the Au Memory patent, variations of the present invention includes methods mapping various numbers of types of sentiment dimensions to a various numbers of types of speech synthesizer directives. For instance, all sentiment dimensions could be averaged to a single dimension and that single dimensions used to control only a single synthesizer directive of Speech Rate. However, research has shown that using two or more sentiment dimensions to influence two or more synthesizer directive types produces a more melodious and easier to comprehend speech.

The method of FIG. 1 included data flows to fine-tune the quality of the speech output. For instance, some phrases, particularly loan words from foreign languages, may require special pronunciation. Since the methods of the Au Memory Patent and the present invention are dictionary based, it is convenient to use these same dictionaries to define pronunciation. Thus the data flow from Text Array input to Sentiment Tagger to Text Phrases Array to Pronunciation Shaper to Speech Synthesizer Directive Array allows for dictionary based corrections to be controlled by the Pronunciation Shaper method. In simplest form the Pronunciation Shaper method may be a simple lookup of dictionary based pronunciation overrides. In more complex form, the Pronunciation Shaper may take into account grammar or position relative to other text phrases in the same sentence to vary the pronunciation for distinct grammatical contexts. For instance the pronunciation a word grammatically used as a subject may be shaped for more emphasis than the same word grammatically used as an object.

In a second example, to make optimal use of the expressive range of a speech synthesizer, the ranges of relative magnitudes of the three dimensions of sentiment are tracked for a given Text Array Input span, typically one or two sentences long. Within this span, the lowest and highest values ranges are tracked so the Modulation Controllers can normalize the Magnitude Arrays within these ranges, so that the lowest and highest values correspond to the expressive range of the speech synthesizer for each dimension, and all other values fall within the expressive range of the speech synthesizer. This normalization correction is shown by the data flow from Text Array Input to Sentiment Tagger to Magnitude Min-Max Tracker and Clarity, Intent and Comfort Min-Max Values to each of Speech Volume Modulation Controller and Speech Pitch Modulation Controller and Speech Rate Modulation Controller. Since most speech synthesizers are capable of more then one voice, such as male or female, or British accent versus American Accent, and these voices vary in their useful expressive range, the present invention may improve the methods of FIG. 1 by varying the expressive range allowed in each dimension according to synthesizer voice. (Not shown).

In a third example, to accelerate past less important passages of text, thus saving listeners time, a Low Magnitude Sentiment Detector in FIG. 1 detects conditions when all or most of the normalized Clarity, Intent or Comfort magnitudes are below a threshold, indicating phrases which are less important to the rhetorical meaning of the text. For these less important phrases, the Speech Rate Acceleration Controller may optionally accelerate the rate at which text is spoken by the Speech Synthesizer.

A specific example of text processed by FIG. 1 is shown in FIG. 2. The Text Input Array is a quotation from Shakespeare's Hamlet, shown by number 1. The corresponding example of a Speech Synthesizer Directive Array is shown by numbers 2 through 4. Specific directives are enclosed by "[[" and "]]" to distinguish them from original input text. The directives start with headers such as volume, rate and pitch, or "inpt PHON" which indicates indicates that the next characters are literal phonemes to pronounce or "inpt TEXT" which indicates that the next characters to pronounce are words. The Speech Synthesizer takes all the Speech Synthesizer Directive Array to produce speech audio output, usually in a standard file format such as MP3.

The Pronunciation Shaper of FIG. 1 has substituted "tha question" for "the question" of the original text, and substituted "[[inpt PHON]] tt1 lHz [[inpt TEXT]]" for "tis" of the original text, at circled number 3. The Low Magnitude Sentiment Detector has sped up the text rate after "To be or not to be, that" at circled number 2 in boldface. This quickly reads through the soliloquy until the boldface directives at circled number 4 to read the next block of important text "rub, For in that sleep of death what dreams may come, When we have shuffled off this mortal coil, Must give us pause."

Figure 3:
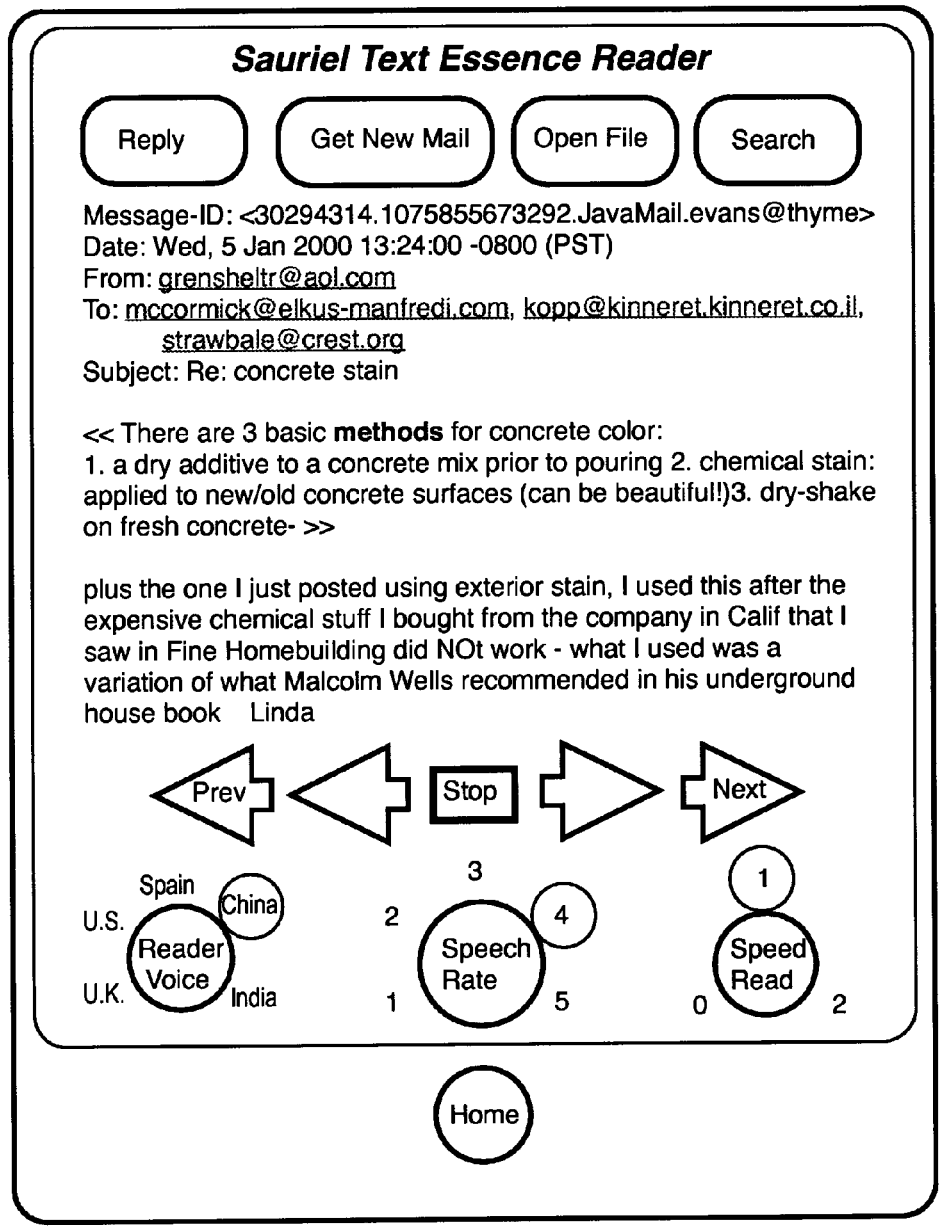
FIG. 3 shows an example of a user interface for a text to speech reader, allowing a user to easily browse emails and files, and to choose preferred language accents, speech rates and an optional speed-reading mode.

FIG. 3 shows an Example Of Speech Synthesizer User Interface, suitable for a hand-held device or computer monitor screen. The top row of touch-sensitive buttons of Reply, Get New Mail, Open File and Search change the context from the current context onscreen. The Reply button creates a new mail message replying to the current message viewed and allows the user to type or speak voicemail or speech-to-text a reply. The Get New Mail button fetches a list of incoming unread mail messages. The Open File button shows a file browser so the user can pick a file to be read by the text-to-speech reader. The Search button allows the user to speak or enter in a text string to search for in the current text, or in the file system or database of the hand-held device or computer, or even text fetched from the world wide web.

Underneath the top row of buttons is a text display area showing an email message being read, with the currently read word "methods" displayed in bold. The present invention reads any kind of textual content, for instance novels, poems, blogs, and captions of photos.

Below the text read showing an email message, the user interface shows Prev, Stop and Next buttons, to allow skipping back and forth in the current textual content being read. Below the Prev, Stop and Next buttons are three circular buttons of Reader Voice, Speech Rate and Speed Read. Research has shown than students of foreign languages learn faster when taught by teachers who have accents matching their native language. To increase comprehension by non-native speakers of the language of the text content, the present invention can allow a choice of reader voices with accents from multiple countries. Pressing the name of a country selects a voice accented by the language of that country.

Serious users of text-to-speech devices often became very skilled at listening to them. To save time, they will increase the base rate at which the text is read far beyond the a natural human rate. The pressing a number around the Speech Rate button adjust the base rate by a multiplier corresponding to the displayed number.

Serious users of text-to-speech devices also manually skip past section of unimportant text. The present invention can automate this skipping, by allowing users to select the services of the Low Magnitude Of Sentiment Detector to Low Important Indicator to Speech Rate Acceleration Controller of FIG. 1. By clicking the "0" button near the Speed Read button of FIG. 3, this service is turn off, but by clicking the "1" button the service is turned on, and by clicking the "2" button the Speech Rate Acceleration Controller directs the Speech Synthesizer Directive Array to run at an even higher rate for unimportant text.

As is common for hand held devices, the Home button navigates the user towards a home page or display, relative to the current page or display. Those with experience in the art of speech synthesis will recognize that amounts of speedup or acceleration in speech rate may be varied considerably from the examples given here, while still retaining the advantages of the user interface and speech method for enhanced comprehension.

As the method described in FIG. 1 accurately computes the relative importance of subsets of Text Input, the method of FIG. 1 is an excellent foundation for prioritizing the indexing of memory precursors existing in subsets of Text Input. As outlined above, any method of significantly winnowing out meaningless memory precursors can have outstanding advantages in reducing stored index size and query traversal elapsed time. As noted above, in a sentence of only eight unique words, there are eight factorial (40,320) word combinations whose syntax could potentially could be indexed. The present invention selects only about 6 to 10 of these combinations as significant enough to index. Thus for large input sets, the reduction in stored index size is many orders of magnitude. Furthermore, the same prioritization and selection method can be applied organize the query plan for traversing stored indices. For a query consisting of an eight word sentence, the present invention would select about 6 to 10 combinations as significant enough to seek in the stored indices. As a result even queries as long as two or three sentences can elicit the most relevant indexed text in only a few dozen index tree traversals, and each traversal returns results in top-down relevance order, so the union of tree traversals can be performed in relevance order, stopping automatically when a minimum level of relevance is no longer available.

FIG. 4 through FIG. 11 outline flowcharts of the present invention's methods for efficient indexing of syntactic objects, as well as examples of data for those flowcharts. It should be appreciated by those skilled in search engine indexing arts that components of the Syntactic Sentiment Parser flowchart of FIG. 8 can be implemented in a wide variety of ways, with useful but varied results. Polysemy Disambiguator methods can be dictionary meaning based, as shown in examples here, but also semantic network based or probability based or even neural network based. The present invention teaches dictionary meaning based disambiguation as a likely best practice for highest quality results, since the dictionary meanings themselves form well defined quality-control units for regression testing. The other methods of disambiguation are useful to the present invention, but quality control is harder to implement, so they may not scale as well to large vocabularies.

X-bar Tagger methods can be driven by part of speech tree analysis as shown here, but they may also be driven by spelling rule-based table-driven methods, or probability or semantic networks. The present invention recommends recursive dictionary-based part of speech analysis since dictionary entries form well defined quality control units for regression testing, and in most test cases efficiently share the same dictionary entries as quality control units for the Polysemy Disambiguator. Thus other methods for an X-bar Tagger many not scale as well to large tested vocabularies.

Figure 4:
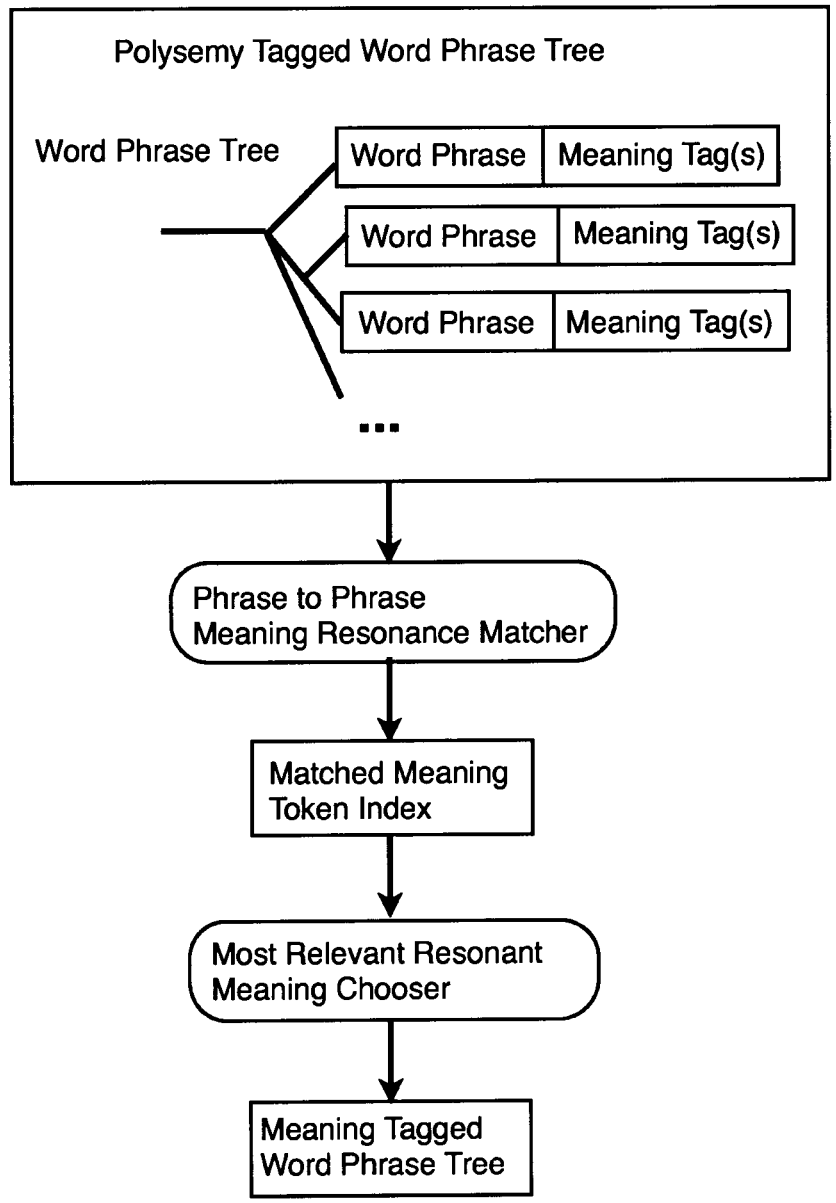
FIG. 4 shows a method of disambiguating polysemy in text, for more accurately identifying the true meaning of text despite the many meanings which may be symbolized by each spelling.
Figure 8:
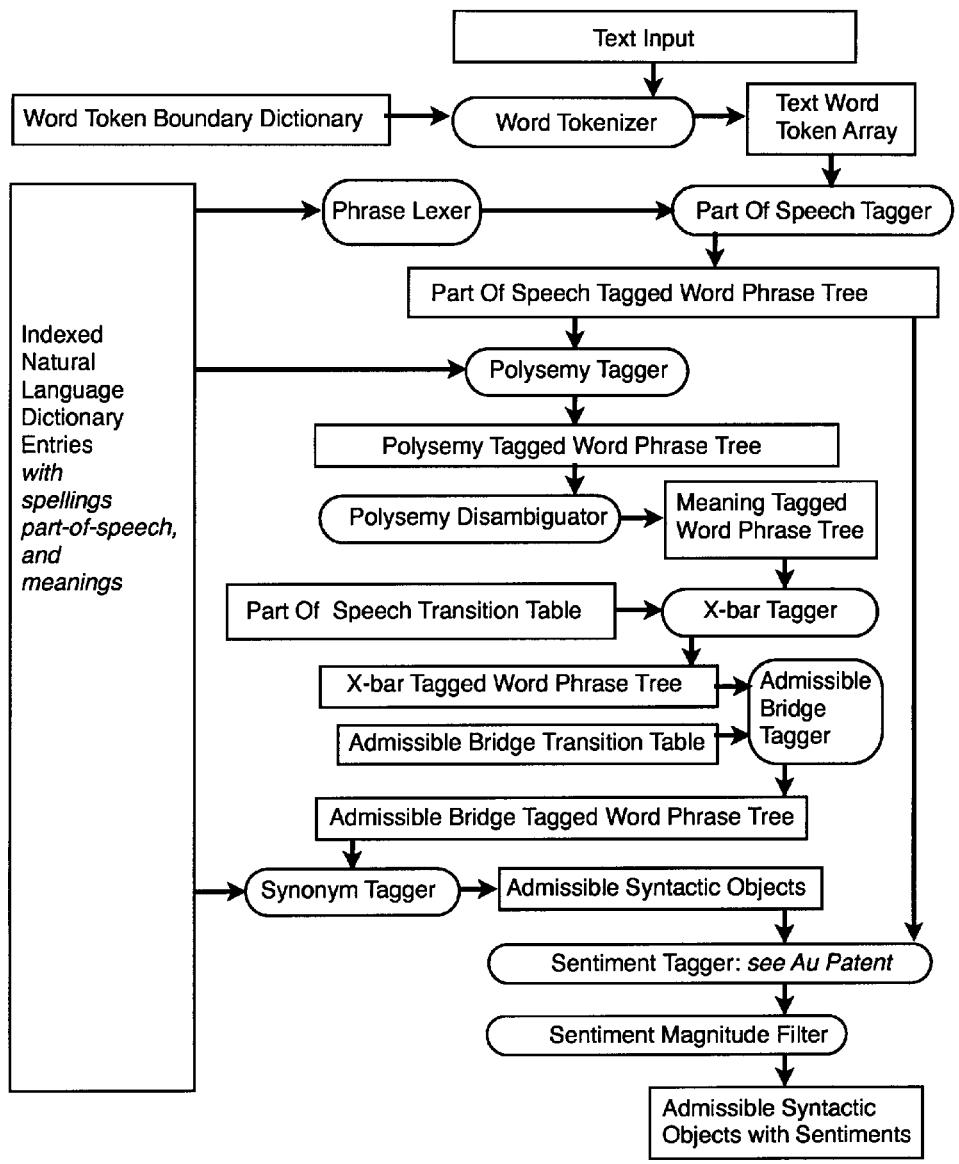
FIG. 8 shows a syntactic sentiment parser for processing text into a stream of admissible syntactic objects with sentiments, useful for more accurately identifying the true rhetorical meaning of text.

FIG. 4 shows a method of the present invention for a dictionary based Polysemy Disambiguator. In FIG. 8, after the Text Input is passed to a Word Tokenizer and then to a Part Of Speech Tagger and a Polysemy Tagger in FIG. 8, the Polysemy Tagged Word Phrase Tree is input to the method of FIG. 4. A tree structure is a naturally flexible and accurate format for parsing and annotating Text Input, at a variety of processing stages, since any number of subsets of Text Input can be arranged as tree branches, with any number of annotations as sub-branches at any level of the tree. For testing efficiency, a pointer to the parser's work-in-progress can simply be passed from stage to stage, and test cases of work-in-progress stored in arrays for regression testing suites to validate code fixes.

The Polysemy Tagged Word Phrase Tree at the top of FIG. 4 shows an outline of a Word Phrase branches, each containing a subset of Text Input, annotated by Meaning Tag(s) from affixed after polysemy dictionary lookup. The ellipsis indicates that any number of word-phrase meaning tags may be in the word-phrase tree. At this point in the processing, each subset of Text Input has already been marked with a part of speech and meanings corresponding to its spelling have been marked as well. Disambiguation of meaning requires removal of the less meaningful meanings from these Text Input subsets.

Figure 5:
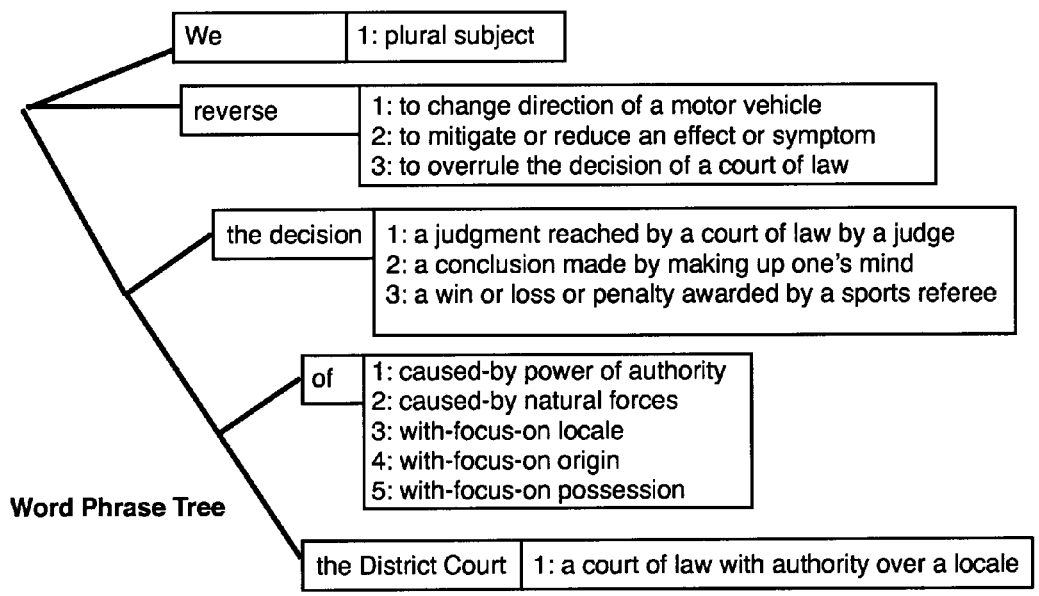
FIG. 5 shows an example of a polysemy tagged word phrase parse tree, showing a multiplicity of meaning which may be symbolized by the sentence "We reverse the decision of the District Court."

To make these structures clear, FIG. 5 shows an example of a Polysemy Tagged Word Phrase Tree for the sentence "We reverse the decision of the District Court." The verb "reverse" shows 3 polysemous meanings. The noun phrase "the decision" also has 3 of its own polysemous meanings. Note that the Part Of Speech Tagger of FIG. 8 has detected the plural Subject "We" to tag "reverse" as a verb, thus preventing "reverse" from collecting noun or adjective meanings such as "reverse gear." Some branches of FIG. 5 have only a single meaning, such as "the District Court" which has the meaning "a court of law with authority over a locale."

The method of FIG. 4 winnows out less meaningful meaning tags by tracking the number of overlapping phrases shared by competing meaning tags or the spelling of the branches themselves. Context is established by this voting mechanism, using the relative resonance of the phrases within each meaning tag. Meaning tags with the more resonant phrases float upwards, canceling tags with less resonant phrases. FIG. 6 shows an example of the precursors to this winnowing process for the Polysemy Tagged Word Phrase Tree example of FIG. 5. The Branch Phrase column of FIG. 6 shows the phrases to be disambiguated, and each row of the table shows a competing Meaning tag (in the Meaning Column) as well as a Match column showing which other meaning tag from the sentence resonates with a phrase with the Meaning tag. For instance, the phrase "court" resonates with "a judgment reached by a court of law by a judge" and the actual spelling of the branch "the District Court." The phrase "court of law" is resonates with Meaning tag "a judgment reached by a court of law by a judge" and the meaning tag "a court of law with authority over a locale". Those skilled in the art of word sense disambiguation will know that the accuracy of resonance matching may be usefully extended using morphology to match singular forms to plural forms, or using a synonym matcher to match, for example, "bus" to "public transit".

Figure 7:
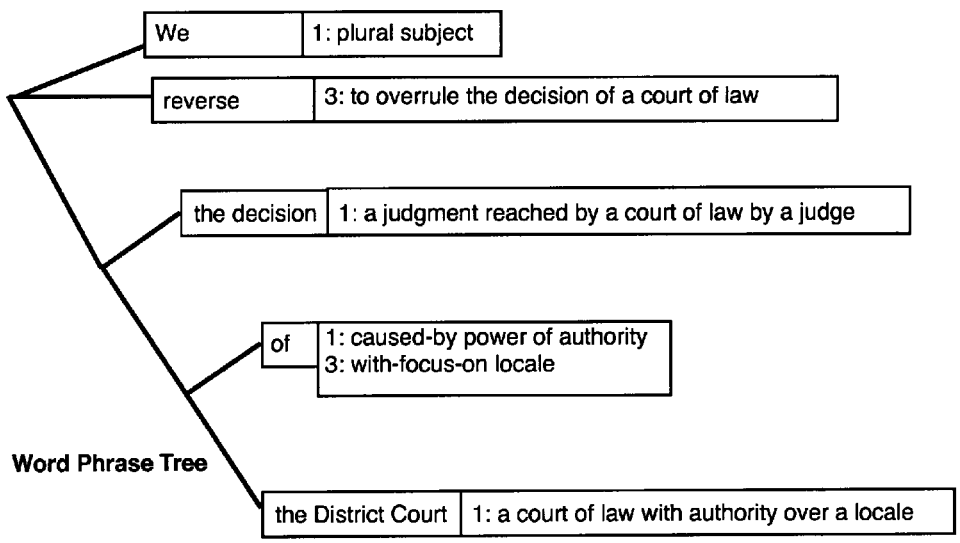
FIG. 7 shows an example of final output for FIG. 4 listing fully and partially disambiguated meanings for the sentence "We reverse the decision of the District Court."

Branch Phrase by Branch Phrase, the Meaning tag candidates with the most Match column matches are chosen over candidate meanings with less Match column matches. FIG. 4 Most Relevant Resonant Meaning Chooser performs this task, producing a Meaning Tagged Word Phrase Tree. FIG. 7 shows an example of a the Polysemy Tagged Word Phrase Tree of FIG. 5 winnowed down to the most relevant meanings. For instance, the meaning "to change direction of a motor vehicle" has been dropped since it has less Match column matches than "to overrule the decision of a court of law". Note that a tie between two meanings of "of" has allowed meanings 1 and 3 for that preposition to continue on. At a later stage of analysis, perhaps at the paragraph level, (not shown) this polysemy can be resolved using a similar resonance matching method, but expanded to nearby sentences. Anaphor resolution of anaphoric references such as "We" can be very helpful for this type of extended disambiguation analysis; having resolved the anaphoric meaning of "We", the sentence in which the anaphoric meaning occurs can supply meanings to be matched against the competing meanings of "of". Another way of handling the remaining polysemy of "of" is to admit both meanings on a equal basis in subsequent processing, though this can increase the number of data stored in the index.

Having disambiguated the meanings of phrases in the Input Text, the method of FIG. 8 groups phrases into X-bar grammar units. Theses units tag the more meaningful grammatical relationships within each sentence of Input Text, so that a list of most relevant relations can be indexed. Unlike traditional academic X-bar classifiers, whose purpose is to elicit an entertainingly provocatively large variety of grammatical relations, a search engine classifier must focus on the relations which contribute to relevance of meaning. Some parts of speech which academics generally recite are thus excluded, in favor of a small set of parts of speech, each contributing a highly relevant grammatical meaning. The classic parts of speech of verb, subject, object, article and preposition are included, as well as noun, adjective, and adverb. There are search engine parts of speech which are generalizations of specific conjunctions and prepositions. These funnel the meaning of these conjunctions and prepositions into specific relations for the meanings of caused-by, focusing-on and cause-of. For instance the conjunction "since" is funneled into caused-by.

FIG. 9 shows a Part Of Speech Transition Table which drives the X-bar tagger of FIG. 8. Those skilled in the art of search engine index construction will recognize that this example of a Part Of Speech Transition Table may include other rows for the sake of finer funnels for greater accuracy or coarser funnels for greater efficiency. For instance, focusing-on may be divided into two categories of meaning for greater accuracy: focusing-on-terminology and focusing-on-location. Or caused-by could be funneled into the same category as cause-of to reduce indexing storage costs at the expense of not being able to map causal direction at query time.

FIG. 10 shows an Admissible Bridge Transition Table for the method of FIG. 8. Of the X-bar relations mapped by the X-bar Tagger of FIG. 8, only a small subset of part of speech to part of speech transitions need to be considered relevant. Thus for instance the transition from article to noun would not be relevant. A transition from the preposition "and" would only be relevant if the context of the use of "and" showed causality or focus, e.g. "He stubbed his toe and yelled." In the sentence "Peter and Paul and Mary and Dick and Jane had breakfast" the conjunctive "and" would show neither causality nor focus. As with FIG. 9, the table of FIG. 10 may be expanded for greater accuracy or contracted for greater efficiency of indexing.

Figure 11:
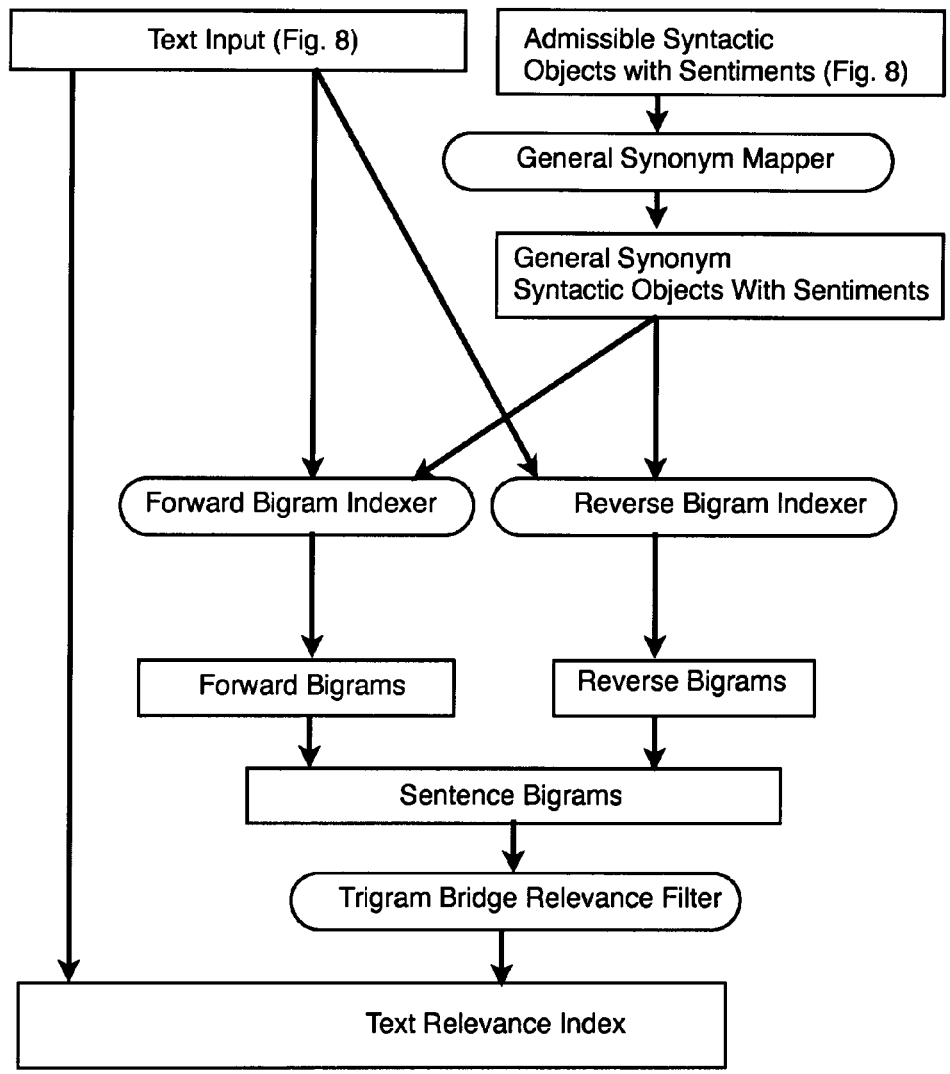
FIG. 11 shows a method of indexing syntactic objects, starting with the output of the method of FIG. 8 and updating a stored Text Relevance Index for later query retrievals.

FIG. 11 shows a method for storing the parse results of FIG. 8 in a Text Relevance Index for later retrieval by search engine queries. As with prior art indexing methods, synonym mapping provides a reduction in search space and speeds querying. However, the greater reduction in search space comes from a trigram bridge relevance filter, which winnows out all but the most relevance and meaningful trigrams in each sentence. As with prior art search engine indexing methods, syntactic units or words are grouped into bigrams which form the leading entry point to tree indices. For instance, the bigram of "We reverse" can be stored as an index path to record every sentence containing that bigram as well as point to every other significant bigram in those sentences, such as "reverse the decision" By greatly restricting the set of other significant bigrams, the present invention greatly improves upon the efficiency of the prior art indexing methods. Though prior art also filters by grammar objects and semantic constructs, the present invention differs from prior art by also ranking the importance of text using the magnitude of sentiments as described by Admissible Syntactic Objects with Sentiments from FIG. 8.

Thus the magnitude of sentiments of bigrams is computed for each bigram by summing its bigram sentiments. FIG. 12 shows an example the bigrams of the Word Phrase Tree of FIG. 7, produced by the Forward Bigram Indexer and Reverse Bigram Indexer of FIG. 11, and tagged by Sentiment Magnitudes and Bridge Phrase Type to create an example of Sentence Bigrams for FIG. 11. For instance, the first row is a bigram composed of "We" and "the decision" where "We" has a From Sentiment Magnitude of 10 and "the decision" has a To Sentiment Magnitude of 8. The total Bridge Relevance for this bigram is 10+8 which is 18. Compared to an alternative bigram in the fifth row of "We" and "reverse" with From Sentiment Magnitude of 10 and To Sentiment Magnitude of 10, for a total of 20, the first row bigram has less relevancy.

The Trigram Bridge Relevance Filter of FIG. 11 chooses a path through the Sentence Bigrams of FIG. 11 which covers each Text Input sentence with maximum sentiment and hence maximum meaningfulness and relevance. Starting with the bigrams with greatest Bridge Relevance, the Trigram Bridge Relevance Filter traverses the most relevant overlapping digrams until the each word of each Text Input sentence is covered. By covering the words of each Text Input sentence using only the most relevant bridges, other less relevant bridges are ignored, thus greatly reducing the size of the resultant Text Relevance Index. Simultaneously, the overall average relevance of bridges stored in the Text Relevance Index is greatly increased.

The highest Bridge Relevance bigrams in FIG. 12 cover the phrase "We reverse", with Subject/Verb and Verb/Subject bridges. The Bridge Relevance method of FIG. 11 starts with these bigrams and looks for the next highest Bridge Relevance bigrams which overlap them, and so on, until all words of the sentence "We reverse the decision of the District Court" have been covered. This tags the covering bigrams in the Bridge Order column, with ordinal numbers 1 through 4 indicating the order in which covering bigrams have been chosen. Significantly, the bigrams covering the preposition "of" are low in relevant compared to the bigrams covering "the decision" and "the District Court". Thus the the Trigram Bridge Relevance Filter skips over the preposition "of" to bridge between "the decision" and "the District Court" directly. Later, the the Trigram Bridge Relevance Filter backs up from "the District Court" to cover "of", since that bridge has higher relevance than the bridge from "decision" to "of".

By traversing bridges in relevance order, the present invention not only reduces the size of the resultant Text Relevance Index and increases the average relevance of bridges stored in the Text Relevance Index, but also stores the trigrams reflecting the relevant term's natural order for sentences with the same true meanings, improving upon prior art which accounts only for grammar or.

Figure 13:
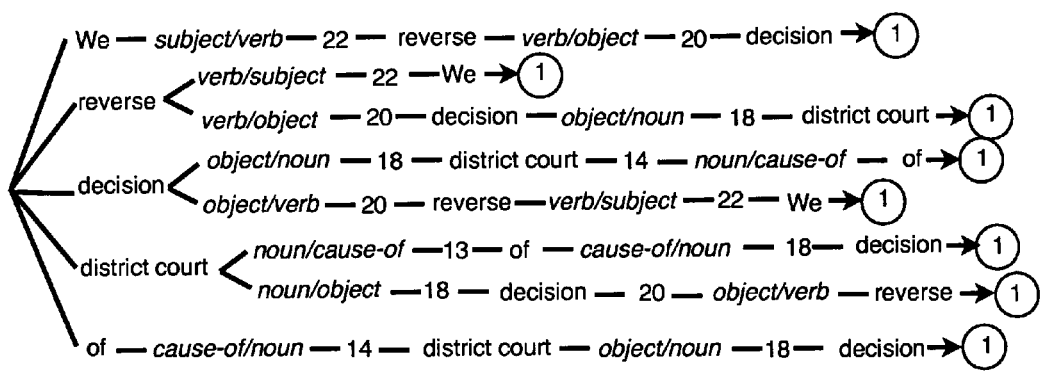
FIG. 13 shows an example of the most relevant Sentence Bigram syntactic objects of FIG. 12, as stored in a Text Relevance Index trigrams tree pointing to the source text sentence "We reverse the decision of the District Court."

FIG. 13 shows an example of this natural order for the bigrams of FIG. 12. Each trigram composed of a pair of overlapping covering bigrams in FIG. 12 are stored in Bridge Order, as in Index Path stored in the Text Relevance Tree. These index paths may take the form of the first bigram From Phrase, pointing to the Bridge Phrase Type, pointing to the Bridge Relevance, pointing to To Phrase, finally pointing to a sentence number or other pointer to the source of input text.

Those skilled in the art of search engine index construction will appreciate that storing the Bridge Relevance number in the index path enables subsequent queries to seek nearest values to a target value for Bridge Relevance, which in turn enables traversors of the index to prune branches from the traversal whose Bridge Relevance deviates too far from a target value. Thus a pruned treewalk of for a class of Bridge Phase Type under a specific From Phase can traverse the most relevant To Phrase branches directly, greatly increasing retrieval speeds over methods traversing all To Phrase branches before considering Bridge Relevance.

For instance, pairing overlapping bigrams into trigrams, the Trigram Bridge Relevance Filter stores "We reverse the decision" as the index path of "We" pointing to "subject/verb" pointing to Bridge Relevance to "22" to "reverse" pointing to a circled number 1 representing a pointer to the source of input text, for example the text of the sentence and/or pointer to the text file containing the sentence.

Each of the covering bigrams of FIG. 12 is stored with covering bigrams which overlaps it, to create eight distinct Index Paths as shown in FIG. 13. These eight paths are a significant reduction from the total set of possible trigrams generated from FIG. 12. By constraining the pairing of bigrams of FIG. 12, to the bigrams which are assigned Bridge Order, half of the less relevance bigrams are excluded. And by constraining the Bridge Order bigram to combining in ascending Bridge Order, less relevant trigrams are further excluded. A method for estimating some advantages of this reduction follows.

Comparing the number of trigrams generated by combining each distinct bigram with other bigrams of FIG. 12 generally creates, for N distinct bigrams, N times N minus one trigrams. It would create N times N trigrams except that bigrams are not allowed to combine with themselves. Thus for the 16 bigrams of FIG. 12, there would be 16 times 15 or 240 distinct trigrams to store in FIG. 13. Comparing that to the eight actually stored in FIG. 13, the reduction is 240 over 8, which is a 30 to one reduction.

This advantage grows for more complex sentences, or anaphoric sentence meanings, having more that 16 bigrams. Indeed the example given of "We reverse the decision of the District Court" is much shorter than the average sentence in English, which has closer to 30 bigrams. In general, the method of the Trigram Bridge Relevance Filter selects just twice as many big rams as needed to cover a sentence. Research shows that the average sentence of about 10 words can be covered in an average of about 13 bigrams. In contrast, the average sentence of about 10 words has about 25 distinct big rams which if stored directly to a Text Relevance Index would store a huge number of trigrams: 25 times 24 which equals 600 trigrams. So the average reduction is about 600 over 13 or 46 to one.

Figure 14:
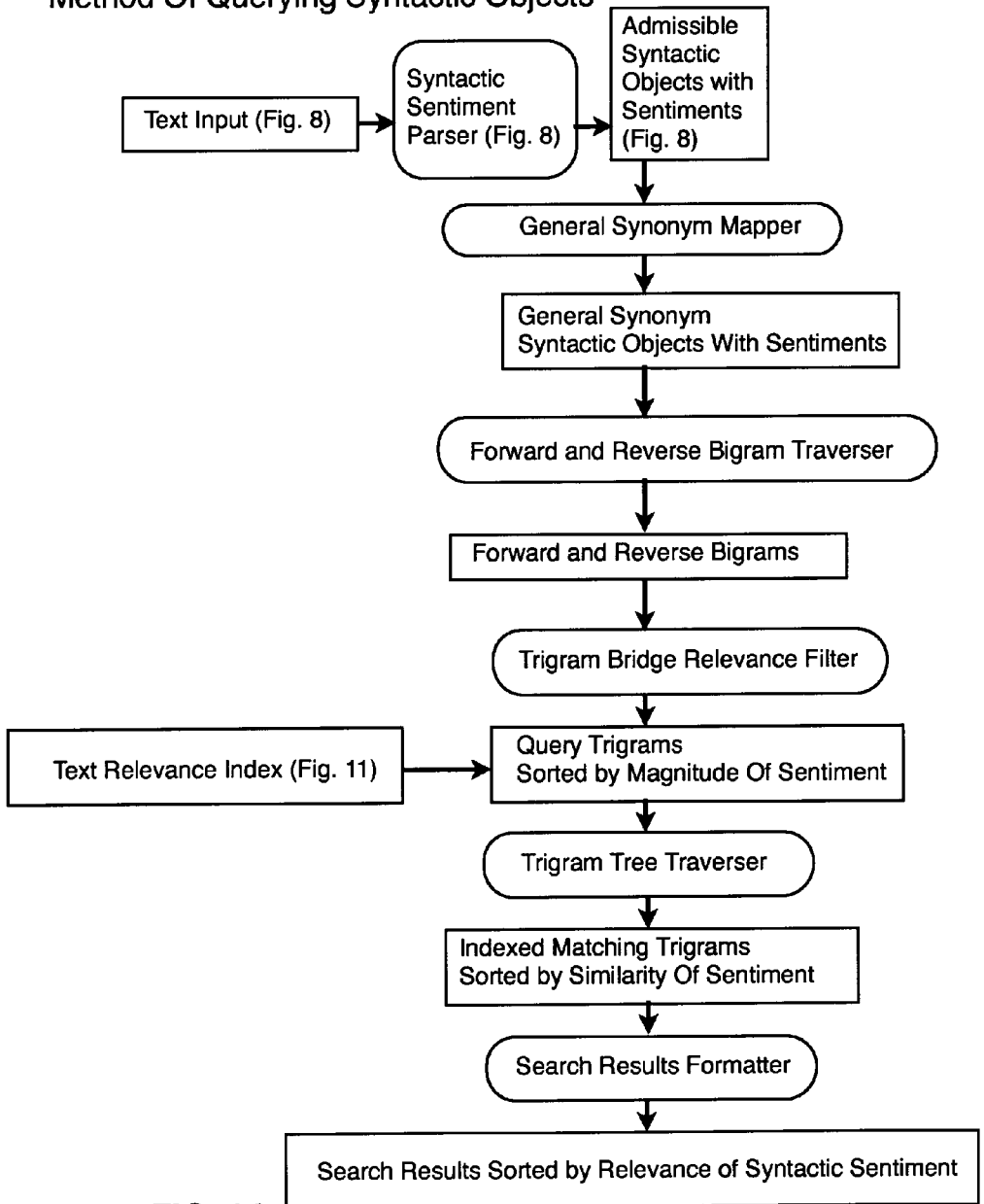
FIG. 14 shows a method of querying Syntactic Objects stored in a Text Relevance Index tree of FIG. 11, using a method of producing query bigram bridge syntactic structures and matching them to stored trigram bridge syntactic structures in Text Relevance Index of FIG. 11.

The advantage of the present invention is even greater when querying the Text Relevance Index. As FIG. 14 shows, Text Input, in this case a query string or natural language query-by-example, is processed into Admissible Syntactic Objects with Sentiments, General Synonym Syntactic Objects With Sentiments and Forward and Reverse Bigrams similar to FIG. 11. As in FIG. 11, a Trigram Bridge Relevance Filter selects only the few most relevant trigrams needed to cover the query string. For query strings identical to previously indexed sentences, the method of FIG. 14 produces an identical set of trigrams to the set of trig rams stored for those previously indexed sentences. Those familiar with the art of search engine indexing will recognize the advantage of using the same parsing method to parse queries as parse indexed text. Query content attributes can thus be matched to stored text attributes, and while querying, exhaustive set intersection methods can zero in on text which matches the most attributes. The cost of exhaustive set intersection is however prohibitively high for large data sets; since prior art methods cannot use a search engine index to predict which query attribute will most significantly match which stored text attribute, the intersection set must be fully traversed to find to search result with closest matching attributes.

This high cost of exhaustive set intersection is why large commercial search engines arbitrarily prune their comparison of matching attributes while traversing search results. For instance, if a query consists of ten words and traversing the search engine returns ten possible numeric values describing how that word is used, each search engine result must be compared to the query attributes to find the closest matching query. Not knowing which of the ten words is most relevant to the query, a comparison method would have to sequentially scan terabytes of search engine results to find a result that most closely matches the query. For this reason, large commercial search engines arbitrarily prune their traversals of search engine results long before all potentially relevant results are gathered, thus giving up the ability to find a closest matching result.

The present invention, in contrast, uses relevance calculations to optimize query phrases, computing the Bigram Bridge Order so as to identify which bigrams are most meaningful to query for, and by storing the Bridge Relevance in the Text Relevance Index, immediately retrieving the the stored text content most relevant to these Bridge Bigrams, by traversing the Text Relevance Index tree imbedded Bridge Relevance numbers in numeric order starting with numbers closest to target bigram Bridge Relevance numbers from the query Input Text. Thus even before completing traversal of all potentially relevant results, the query method of FIG. 14 can immediately produce an ordered list of the most relevant stored text, over the entire stored context index, ordered by relevance. By sorting results in the Search Results Formatter of FIG. 14, these results can be immediately displayed in sorted order.

Variations of the present invention can use a canonical Bridge Relevance numeric value based upon many different methods of calculating relevance. Relevance calculated on the basis of probability, neural nets, fuzzy logic, grammar rules, citations or semantic networks all could be used with varying degrees of success. However, the role of sentiment in human cognitive memory shows that relevance computed independently of sentiment is likely to deviate considerably from relevance useful to humans.

Thus the accuracy of relevance calculations may be improved by the use of probability, neural nets, fuzzy logic, grammar rules, citations or semantic networks, but will not be as generally useful as relevance calculation which include values for sentiment. For instance, the methods of incorporating values of sentiment as described in the present invention have been found to be especially accurate and general in applicability. Compared to citation methods such as used by Google, the present invention more accurate, especially when creating an index to text which has few citations. Compared with semantic network methods such as used by the semantic web, the present invention has greater flexibility and coverage since values of sentiment extend the meanings of a modest-sized dictionary to cover true meanings which in a semantic web approach would be handled by expensive, finely detailed and rigid hierarchies.

Those experienced in the art of search engine indexing will recognize that the present invention can also index deeper combinations of bigrams to speed the retrieval of more than two bigrams at a time. For instance, three bigrams could be combined into a 4-gram, or four bigrams combined into a 5-gram path to index the five most significant words in each sentence. The advantage of such a deep index is higher accuracy of relevance in search results. The disadvantage is that 4-gram and 5-gram indices require exponentially greater storage volume in the Text Relevance Index.

FIG. 15 through FIG. 21 show variations on the deployment of the methods of FIG. 11 and FIG. 14 for the present invention. FIG. 15 shows an example of a search engine portal web page displaying a large text entry box, large enough for the narrative query of "I'm looking for a yoga studio teaching the mind body connection." Underneath that is a larger box showing a summary of the parsed meaning of the text entry box. As described in FIG. 8 Syntactic Sentiment Parser, the query Text Input is parsed into Admissible Syntactic Objects With Sentiments. These Syntactic Objects are displayed with arrows pointing from their location in the query to vertical positions detailing their Bridge Phrase Types (as in FIG. 12). The same vertical positions show each syntactic object's relative sentiment value in the Sentiment column. With the user interface of FIG. 15, users can graphically see what Bridge Phrase Types are sought by the query engine, and understand the true meaning context for which Relevance Numbers are calculated in the Relevance column of the search results, where matching syntactic objects are shown in bold. The display of syntactic objects in FIG. 15 may also help writers of text to better understand which portions are rhetorically most significant and to allow writers to click on the less significant portions to see, as suggested improvements, more significant relevant alternatives fetched from a Text Relevance Index (FIG. 14).

Figure 16:
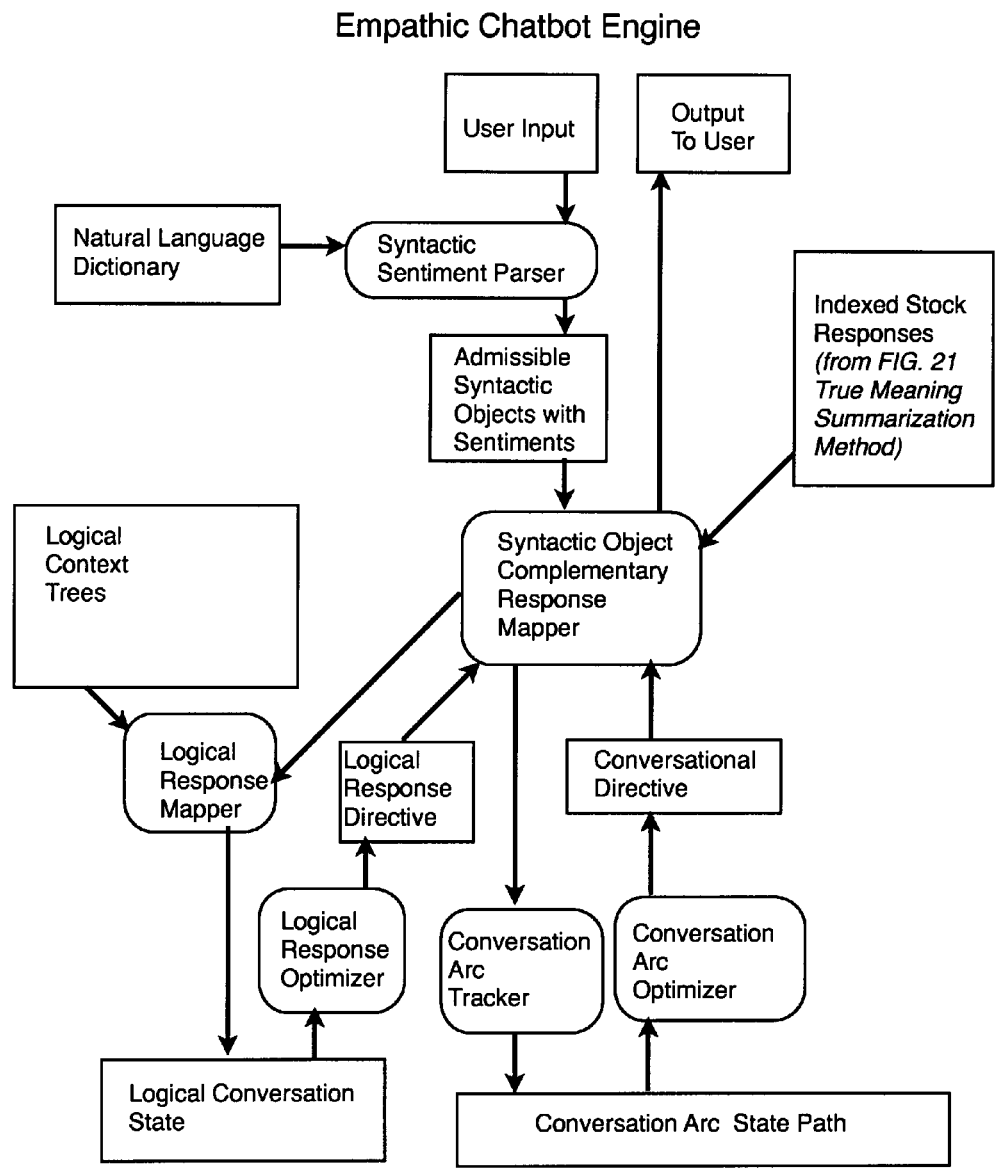
FIG. 16 shows a method for an empathic chatbot engine, using the method of FIG. 8 to match user input to most relevant empathic responses in an index of stock responses to support an empathic chatterbot conversation.

FIG. 16 shows a method for a empathic chatbot (or chatterbot) engine which is a generalization of an interactive computer-human interface. As in FIG. 8, text input, in this case User Input to a Syntactic Sentiment Parser, referencing a Natural Language Dictionary, produces Admissible Syntactic Objects with Sentiments. These are input to a Syntactic Complementary Response Mapper which chooses Indexed Stock Responses via a relevance analysis as in the method FIG. 14. The present invention's support for matching User Input to relevant stock responses via the method of FIG. 14, as well as story arc analysis as in the Au Memory Patent Application are combined here in FIG. 16 to guide a chatbot toward appropriate conversation. Just as a novel is more engaging and inspiring with a well developed and resolved story arc, a successful customer service conversation, editorial assistance conversation, and a sales assistance conversation all have topic development and resolution components. Combining stock responses with high relevance while filtering them to increase sentiments around relevant topics catches the User's interest. Later filtering high relevance responses to decrease negative sentiments can help close sales, confirm customer support case resolution, or provide constructive criticism.

The Logical Context trees maps expected input categories to expected outcomes, so that the chatbot is constrained to a particular job to perform, as directed by the Logical Response Mapper and Logical Response Optimizer. These Response methods may be rule or table driven or some combination of fuzzy logic and tables and rules. For instance, a customer service chatbot is constrained to conversing about issues raised by the customer. An editorial assistant chatbot is constrained to conversing about improving the quality of a text document. A sales assistant chatbot is constrained to conversing about items for sale. These logical constraints steer the envelope of the conversation, but texture of the conversation is steered by the Conversation Arc Tracker and Conversation Arc Optimizer of FIG. 16 via Conversational Directives to the Syntactic Object Complementary Response Mapper. Conversational Directives optimize the Conversation Arc State Path, choosing responses which initially increased sentiment, then later, for arc resolution, choosing responses which decreasing negative sentiments for a positive outcome.

Figure 17:
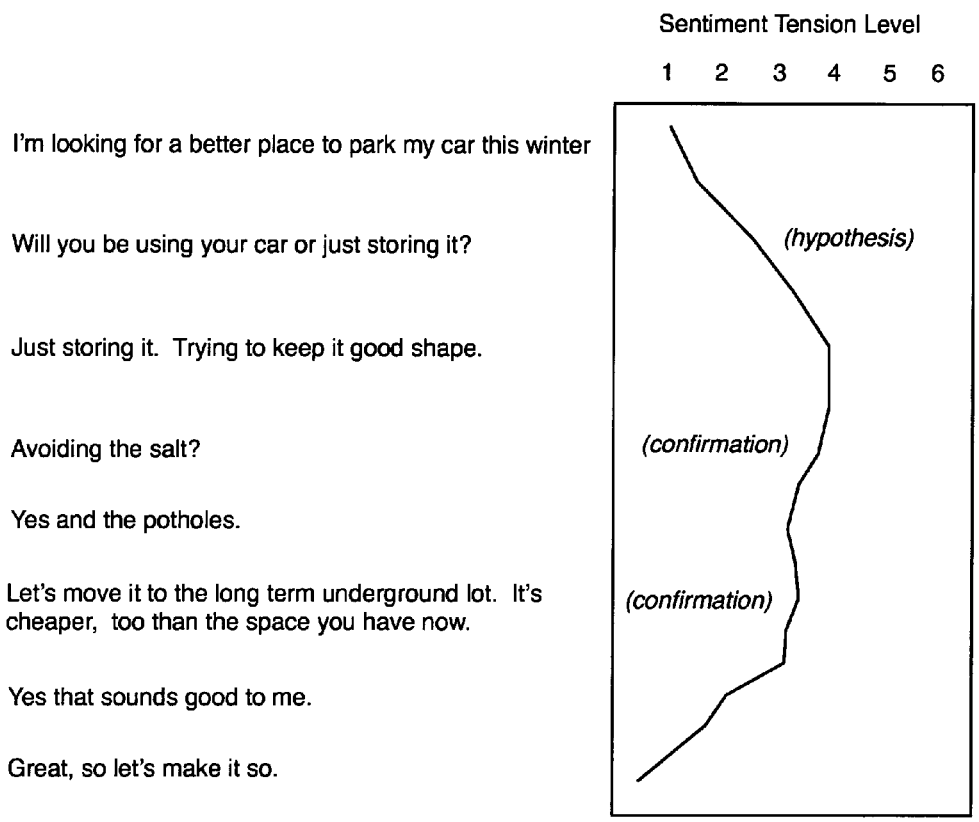
FIG. 17 shows an example of a customer service conversation arc state path for FIG. 16, where the conversation arc state is balanced by stock confirmation responses and then converges in stock resolution responses.

FIG. 17 shows an example of a customer service chatbot conversation. The Conversational Directives for initial dialog filter out Indexed Stock Responses to increase the Sentiment Tension Level, to probe into what the real issue is. Directives for the next two lines try to keep Sentiment Level nearly constant, while confirming the real issue and proposing a resolution. The closing line Directive seeks a reduction in Sentiment Tension Level, via a positive sentiment. The sentence "Great, so let's make it so." provides a confirming positive sentiment need to logically close out a customer service conversation.

Figure 18:
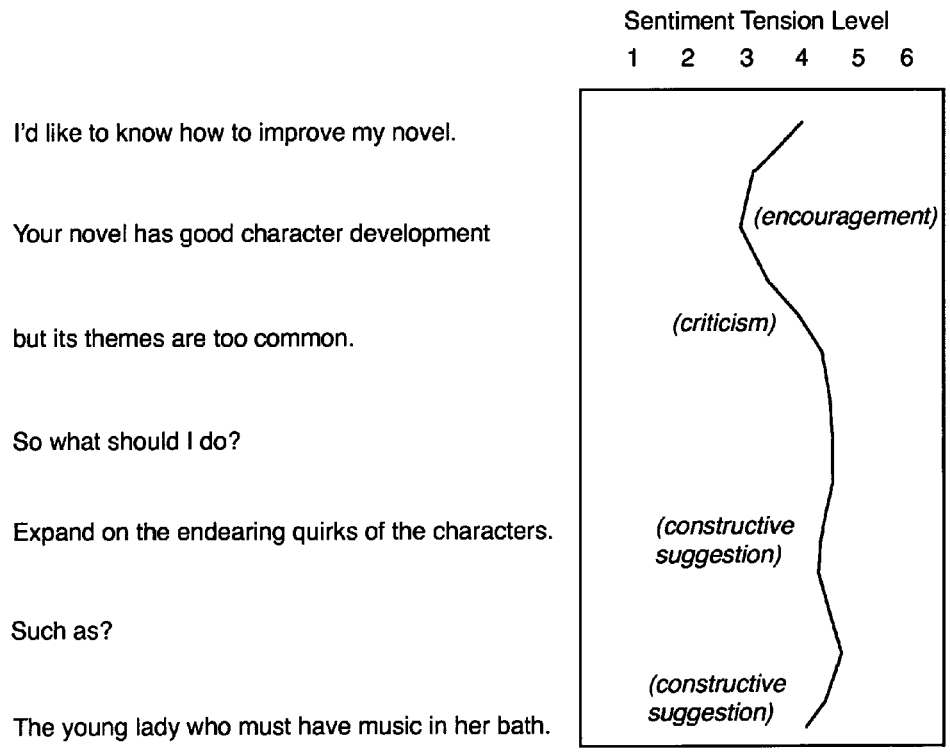
FIG. 18 shows an example of an editorial assistant conversation arc state path for FIG. 16, where the conversational arc state is balanced by stock criticism followed by stock constructive criticism responses.

FIG. 18 shows an example of an editorial assistance chatbot conversation. The Conversational Directives for initial dialog filter out Indexed Stock Responses to decrease the Sentiment Tension level, to establish a rapport with the author. This is immediately followed by constructive criticisms which then increases the Sentiment Tension Level, but the Conversational Directives try to keep Sentiment Tension Level within a narrow range near the initial author's input; if the Sentiment Tension Level drops too low there is not longer any criticism, but if it grows too large, criticism is not constructive anymore.

Figure 19:
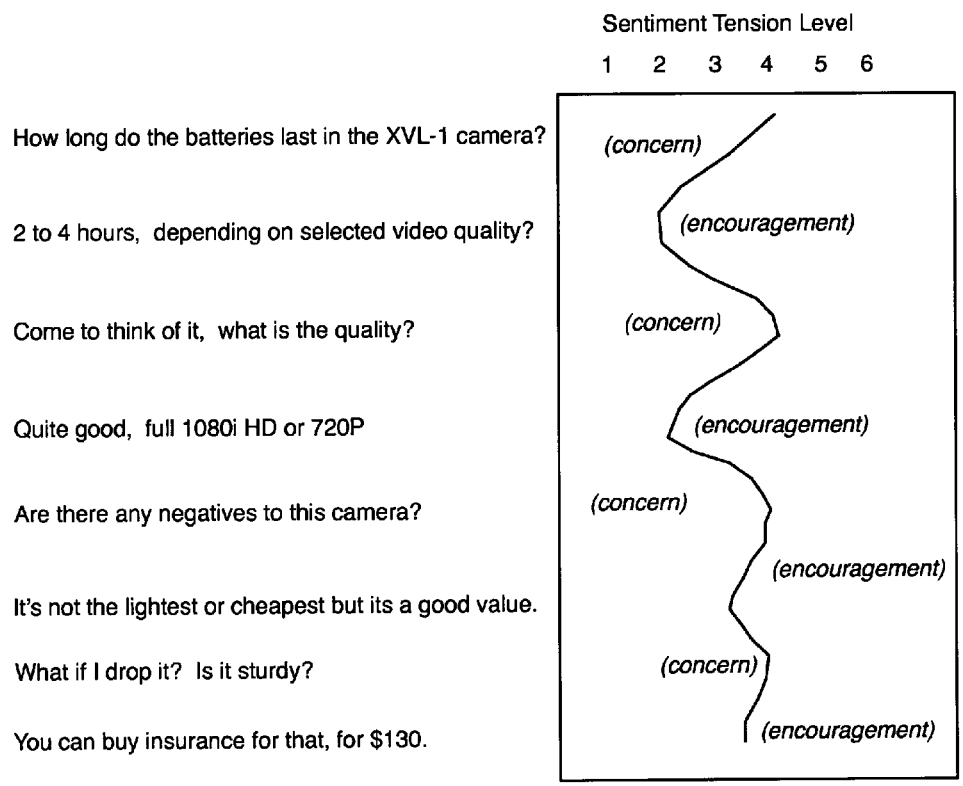
FIG. 19 shows an example of a sales assistant conversation arc state path for FIG. 16, where the stock encouragements are followed by stock pricing suggestions.

FIG. 19 shows an example of a sales assistant chatbot conversation. The Conversational Directives filter out Indexed Stock Responses to keep Sentiment Tension Level within an acceptable range from 2 to 4. This as a wider range than allowed for the Editorial Assistant above because conversations about negative talk about merchandise is less likely to be taken badly, compared to negative talk about a person's own writing. As with prior art sales assistance chatbots, the Logical Response Optimizer will actually try to close a sale as in the last line of dialog of FIG. 19.

In the art of chatbots. the use of compassion metrics enables more satisfying conversations as shown in FIG. 17-19. FIG. 117-118 flowcharts show how to to implement the use of compassion metrics for chatbots. From the flowchart of FIG. 118, "Compassion Variety Cohesion Optimization Method" the compassion-chatbot implementation terminology is: Document Compassion Variety Measurement Method (FIG. 117), Searchable Conceptual Compassion Trigrams Index (FIG. 115), Concept Orthogonal Crossings rated by Compassion. (same as Orthogonal Conceptual Crossings in FIG. 114). Average Compassion Detector. Average Concept Compassion. Conceptual Kindness Suggestion Generator, Conversational Response And Question Prioritizer, Conversational Chatbot Interfacer.

From the flowchart of FIG. 117, the compassion-chatbot implementation terminology is: Document Paragraph Compassion Analyzer (FIG. 114). Since FIG. 114 summarizes how to compute Total Compassion, FIG. 117 and FIG. 118 show how a chatbot can be based on the metric of Total Compassion.

Figure 20:
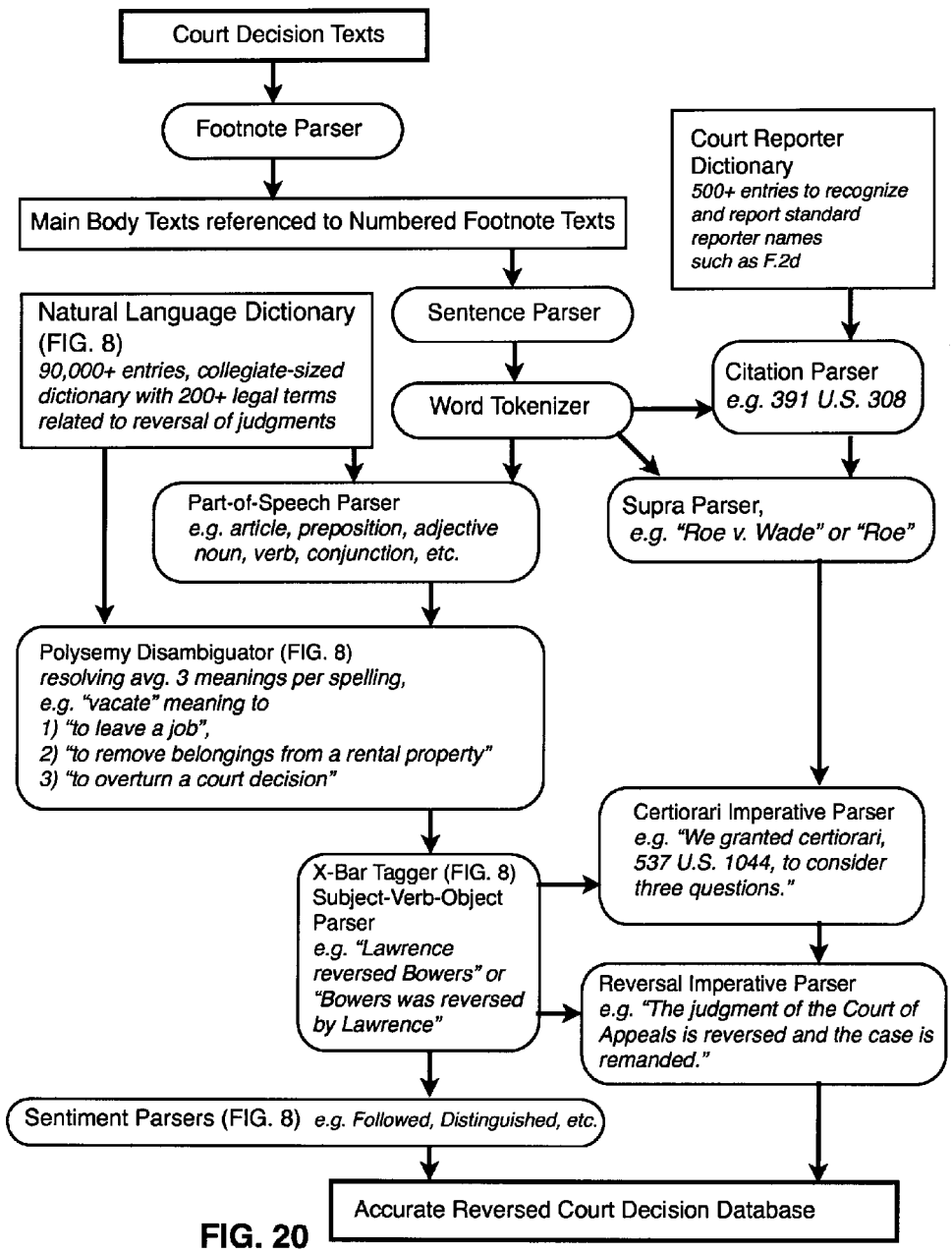
FIG. 20 shows a method of categorizing citations, where portions of the method of FIG. 8 enable categorization of specific types of legal citations such as reversed, distinguished and followed.

FIG. 20 shows an example of a Legal Citation Categorization Method which uses portions of the method of FIG. 8 for its Polysemy Disambiguator and Subject Verb Object Parser. The sentiment values computed by FIG. 8 are used in the Sentiment Parser of FIG. 20 to categorize citations which follow or agree with a decision via the presence of positive sentiment, and to categorize citations which differ from or are legally distinguished by a decision, via presence of negative sentiment. The method of FIG. 20 is used to reduce the immense amount of labor used by prior art to manually classify legal citations, by fully automating that categorization process. The grammar of legal court decisions uses a special syntax for footnoting. This is handled by the Footnote Parser of FIG. 20, to correctly associate footnoted text to reference locations in the main text of each decision document. The grammar of legal court decisions uses a special syntax to name each decision, handled by the Citation Parser of FIG. 20. There is also an informal syntax to use short synonyms for decision names, handled in the Supra Parser of FIG. 20. The formal grammar courts use to overrule decisions is handled by the Certiorari Imperative Parser and Reversal Imperative Parser of FIG. 20.

Librarians and Encyclopedia creators have long recognized a need for easily used summaries of knowledge, which can be traversed to guide people seeking knowledge to the appropriate text resources. Unfortunately the digital age has lowered the cost of publication to the point where no librarian or encyclopedia can can keep up with volume of publication on the web. Prior art search engines, especially keyword search engines are poor substitutes for a librarian or encyclopedia, since it only indexes the word N-grams without mapping the hierarchy of meanings those N-grams symbolize. Via the present invention's accurate sentence to sentence relevance calculation, clusters of mutually relevant sentences can be computed by the Cross-Relevance Scanner of FIG. 21 to produced a Text-to-Text Cluster Relevance Index. The Meaning-Depth Scanner then searches this Index for the deepest or more relevant N-grams which are relevant to these clusters, to produce a Text-to-Text Meaning Hierarchy of N-grams related by relevance and ordered by relative diversity of the N-grams which are related to them. This diversity shows the true strength of knowledge associated with any N-gram, since the strongest factual knowledge is supported by a diversity of related facts, rather than an abundant repetition of the same few related facts over and over. To summarize this strength of knowledge, for a particular User Input Query in FIG. 21, a True Meaning Query Engine produces a True Meaning Summary, a summary of the most pithy examples of truly diverse N-grams relevant to a User Input Query parsed by the method of FIG. 8 and FIG. 14.

Figure 21:
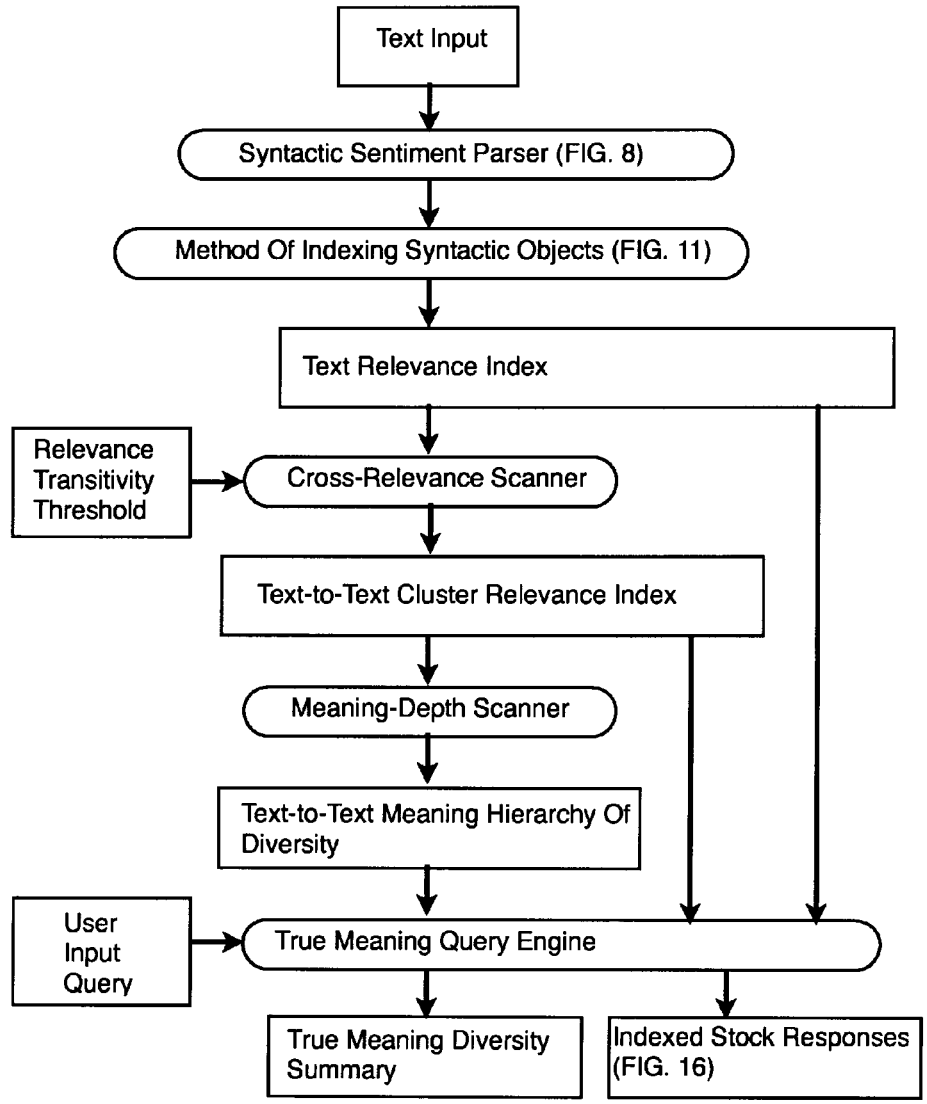
FIG. 21 shows a machine learning method of indexing and retrieving the true meaning of text, using methods of FIG. 8 and FIG. 11 to produce a summary of true meanings, or an Indexed Stock Responses for FIG. 16.
Figure 22:
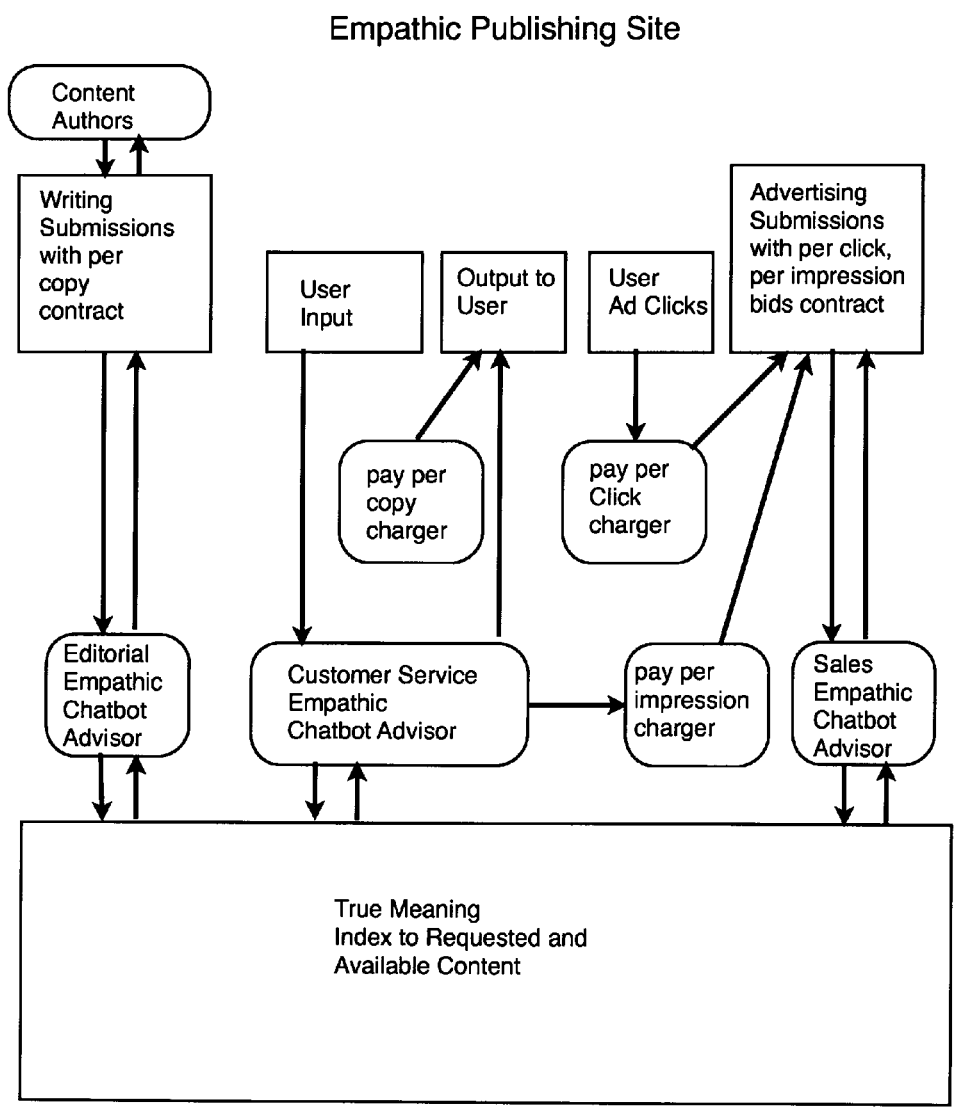
FIG. 22 shows a method for automating business transactions within a empathic publishing site, using the empathic chatbot engine of FIG. 16.

For the automated production of Index Stock Responses, the True Meaning Query Engine of FIG. 21 can also collect these pithy examples and corresponding high sentiment value quotations from their source texts into Indexed Stock Responses. (FIG. 21 and FIG. 16).

Competition from blogging and other freely available content has pushed the worldwide publishing industry to seek alternative bundles to the traditional newspaper and magazine formats. Via the present invention's improvements to relevance calculations, particularly text-to-text relevance calculations, the traditional bundles of newspapers, magazines and books can be replaced by a single bundle of a True Meaning Query Engine as in FIG. 21, where media content is monetized on a click-by-click basis, or a by Writing Submission basis vetted by an Editorial Empathic Chatbot Advisor (FIG. 22) similar to the Editorial Assistant Chatbot of FIG. 18. Via a FIG. 22 central True Meaning Index to Requested and Available Content, similar to FIG. 21 Text-to-Text Meaning Hierarchy of Diversity but additionally tracking the True Meaning of Requests for content and the True meaning of Available Content, media content is served directly to Users and acquired directly from Content Authors of FIG. 22. In summary, the Empathic Publishing Site Method of FIG. 22 extends the bundling model of moderns search engines such as Google from the realm of keyword indexing to the realm of true meaning indexing. Since true meaning relevance indexing of the present invention tracks closer to the longer tail true value of content then keyword indexing, the monetizing auctioning mechanisms enable a longer tail fully automated publishing business that is more flexible, accurate and cost-efficient.

Figure 23:
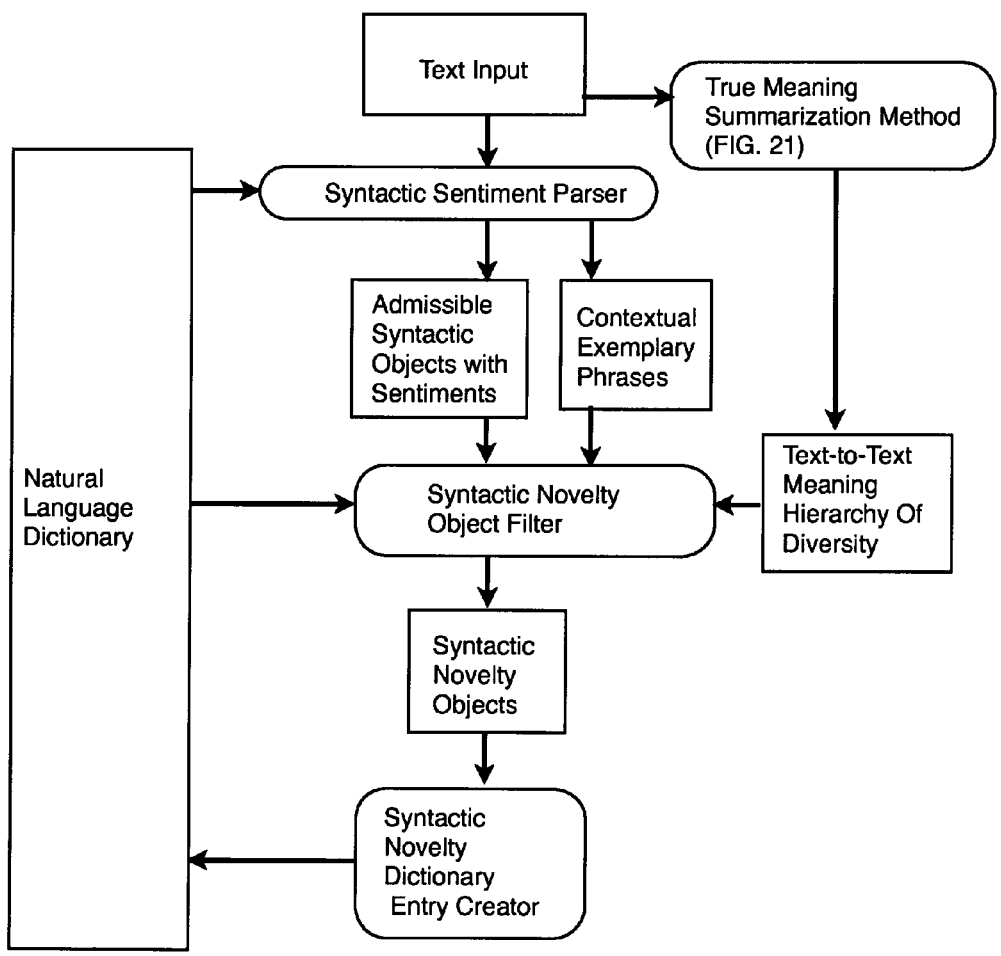
FIG. 23 shows a method for automating dictionary construction, to expand the natural language dictionary of FIG. with additional meanings automatically computed from text input.

Since the methods of FIGS. 8 and 14 rely greatly on the coverage of a natural language dictionary and its natural language dictionary meanings, the present invention includes a method to automatically extend coverage of an existing natural language dictionary using the Syntactic Sentiment Parser of FIG. 8 to produce Admissible Syntactic Objects with Sentiments alongside with Contextual Exemplary Phrases of their usage, as shown by FIG. 23. A Syntactic Novelty Object Filter ignores Syntactic Objects whose sentiments are already represented by the Natural Language Dictionary, relative to to the Text-to-Text Meaning Hierarchy Of Diversity. However, Syntactic Objects whose diversity is not fully represented by the Natural Language Dictionary of FIG. 23 are passed onward as Syntactic Novelty Objects to be stored as new dictionary entries by Syntactic Novelty Dictionary Entry Creator.

The present invention also enables advances in user interfaces and automated dictionary constructs, as described by the AU METAPHOR PATENT, and described by the present invention in FIG. 24 to FIG. 57 as follows:

An essential part of every automated language disambiguation system is a central, computer indexed natural language dictionary. These dictionary definitions are created in the form of word sequences, or better yet, meanings sequences defining each word sense. FIG. 24 shows an example of prior-art dictionary definitions with significant shortcomings overcome by the present invention. Typical for dictionaries design with human readers in mind, the FIG. 24 dictionary senses listed for the verb meanings of "feel" and the verb meanings of "beat" are merely suggestive of definitions rather than precise in terms of relevance to meaning. They do not follow any mathematical standard for relevance or pithiness. Consequently they tend to be overly long and include meanings which are not always relevant to their definitions. For human readers inclusion of many tangential examples of usage in definitions can be a plus, but for automated language disambiguation, definitions with tangential examples of usage lead to irrelevant computed results.

For instance, in FIG. 24, the verb meaning of feel sense 1 is "to be aware of a general emotion within oneself." Yet the concept of general is too broad for this definition, and sentences with the concept of general within them do not necessarily contextualize to the sense 1 of feel. Thus in the sentence "He generally feels the beat from the music, but hits his notes at the wrong time every once in a while" the sense for feel should be 4 and not 1. The word general is thus too conceptually abstract to be used in the definition.

Similarly, in FIG. 24, the verb meaning of beat in the sense 7 is "to physically punish or intimidate" and here the adverb physically is conceptually much more abstract than punish or intimidate. Thus physically is also dangerously abstract in the context of sense 7 as used by automated disambiguation methods.

There are examples of overly concrete definitions as well as overly abstract definitions in FIG. 24. Herding and hunt are much more concrete than strike and repeatedly, so they are dangerously concrete and narrow for use in disambiguation. Thus in the sentence "Tommy beat Jill in the hunt for Easter eggs" beat sense 8 is much better than sense 2 yet the presence of hunt in the sentence would erroneously suggest sense 2 during automatic disambiguation of the sentence.

FIG. 24 has examples definitions which would be clearer if they were grouped under common abstract covering concepts. For instance, herding, strike, scare, intimidate and overcome all involve some display of power. The covering concept of power can clarify many of the meanings of beat. Grouping all meanings of power that involve displays of power helps to delineate exactly how members of the group differ from each other, so that these sense members can be disambiguated more accurately in source text.

There is an example of logical conflict in the abstract meanings in FIG. 24. Sense 3 of beat "to make a precise musical rhythm by wildly hitting something" puts the words precise and wildly within the same definition, so that at high levels of meaning a sense of conflict weakens this definition. The abstract concept of "precision" involves a degree of care and such care is logically absent from the concept of "wildly".

Throughout the examples of dictionary entries given for the present invention herein, the square brackets [ ] enclose related synonym dictionary entries. Thus in FIG. 24 "care" is given as a synonym to "feel" in the sense 1 of feel. In WordNet these spellings in brackets are called synset spellings.

FIG. 25 through FIG. 32 show examples of how the present invention corrects for dictionary issues presented by FIG. 24. Dictionary entries in FIG. 25 through 32 have been normalized using the method of FIG. 38 and a dictionary quality control user interface of FIG. 52. The top third of the user interface shows the nine senses of beat from FIG. 24, as imported into a dictionary of the present invention for normalization. Since the present invention seeks to group senses into clusters of meaning sharing common abstract concepts, sense numbers are followed by letter, so that a cluster of meaning can have a number, such as 1, and members of the cluster can be denoted by a letter, such as a. For instance, the first sense of beat, to strike, has the sense 1a. There are no members of the first group, yet, so the second sense of beat, to scare, has been automatically labelled 2a.

The definitions of beat have been automatically parsed into token phrases by natural language disambiguation, so the part of speech in parenthesis and the sense number after the colon indicates, for each word or phrase, exactly which dictionary entry sense resulted from the disambiguation. For instance in sense 1a (v)hitting:1b refers to the cluster 1 member b verb sense of hit.

Figure 53:
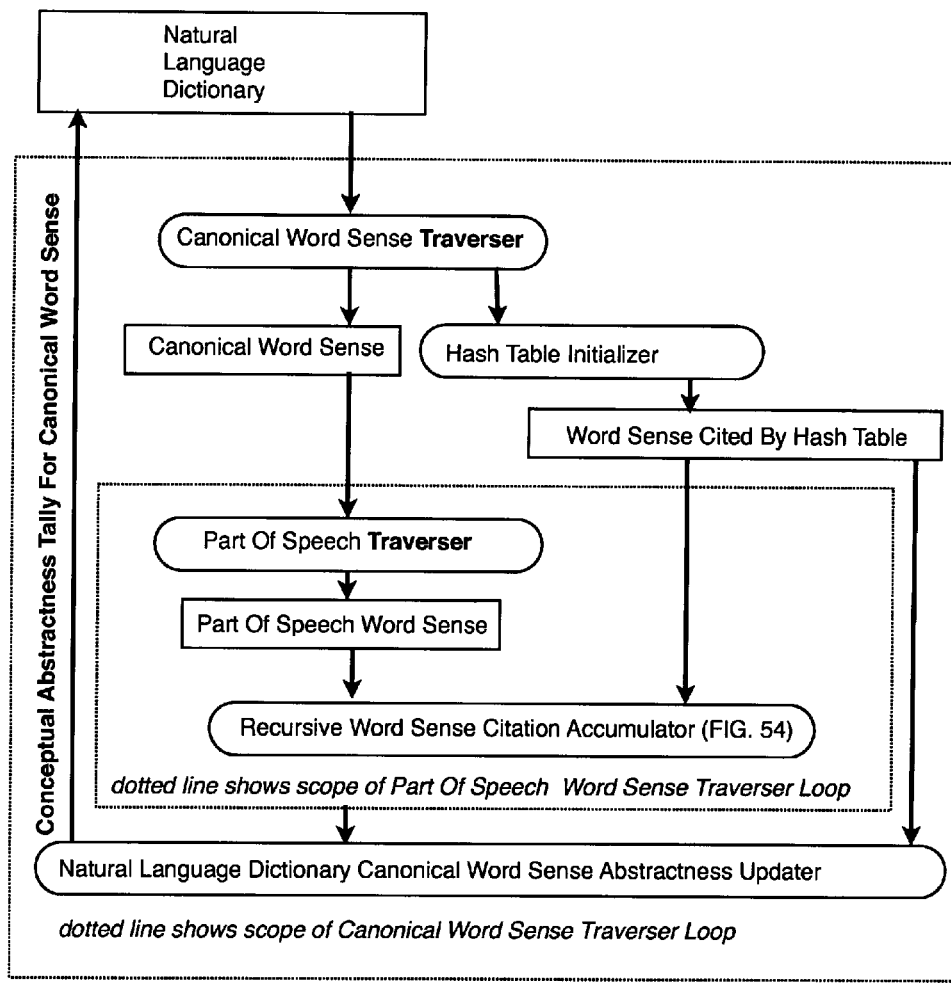
FIG. 53 Method Of Calculating Sense Conceptual Abstractness

The relative font size of words hints at their relative conceptual abstractness, which is automatically calculated in the present invention by the method of FIG. 53. Words which are problems are underlined, such at hitting and herding. These problems are explained in the lower two-thirds of the user interface of FIG. 52.

Figure 38:
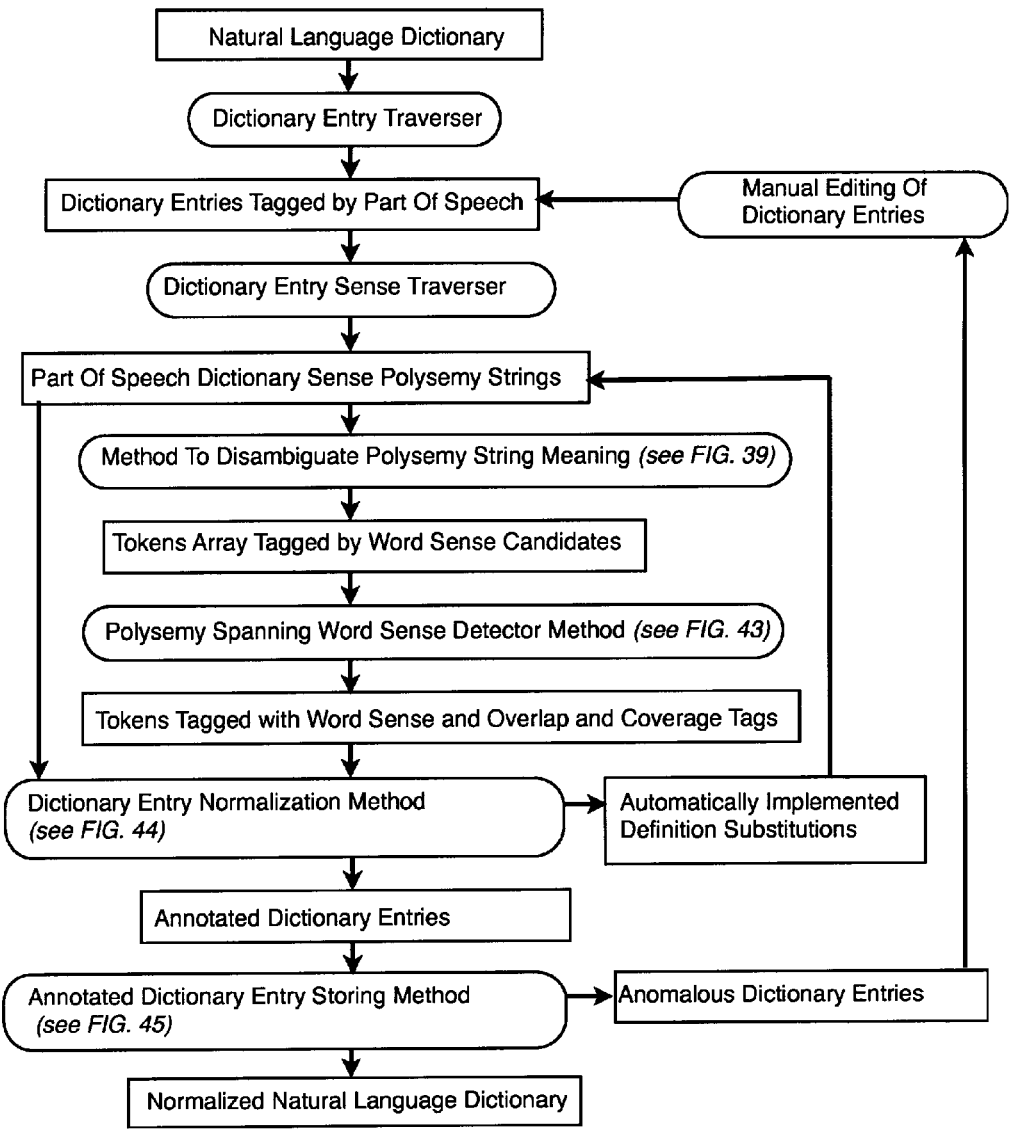
FIG. 38 Method To Normalize Polysemy Of Dictionaries

For instance, in sense 2a the noun hunt does not match the verb part of speech of beat, so the method of FIG. 38 has chosen the verb hunt as a recommended substitution. Using the same part of speech in definitions of a sense as the dictionary entry helps to clarify meaning. It also makes FIG. 53 calculations of conceptual abstractness more accurate, which in turn makes FIG. 38 function FIG. 42 conceptual resonance traversal more accurate.

Other recommended substitutions come from FIG. 38 calculations finding preferable abstract concepts connected to terms in the sense definitions. For instance, the sense (adv) repeatedly:1a is more abstract than (v)hitting:1b, and since the abstractness 80 of hitting is below the FIG. 44 Minimum Relative Abstractness, the method of FIG. 44 (function of FIG. 38) recommends using the more abstract term repeatedly as a common abstract concept for the meanings of beat.

Figure 44:
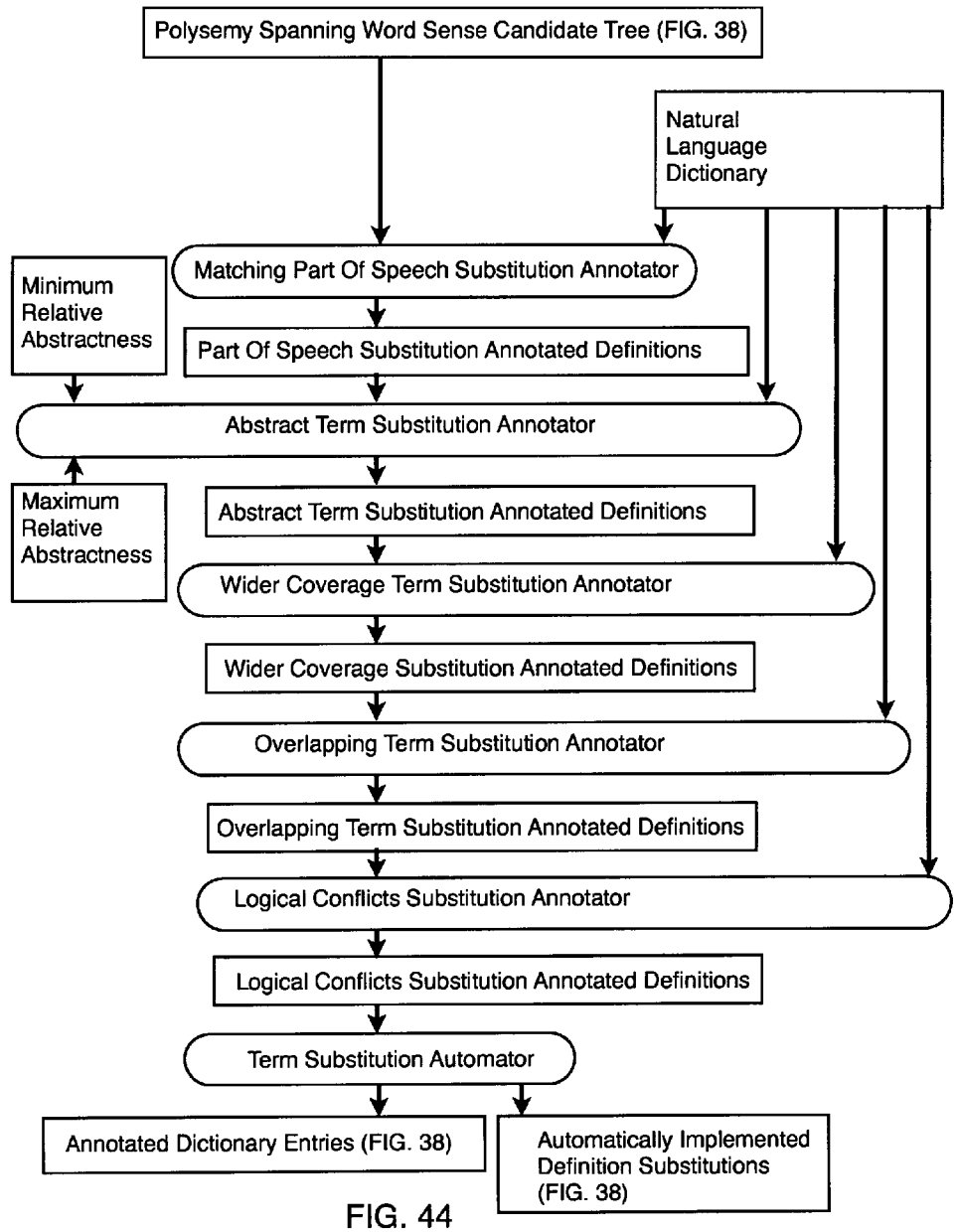
FIG. 44 Dictionary Entry Normalization Method, a function of FIG. 38

Similarly the method of FIG. 44 recommends the abstract term (n)power:1a as a common abstraction to cover less abstract terms of (v)herding:2b, (v)strike:1a and (v)scare:1a. By making these recommendations, FIG. 44 shows human dictionary editors which words of which terms to exchange to achieve quality control targets supporting consistent disambiguation of metaphors. In cases where human labor to make the edits is not available, the present invention can use recommendations calculated by FIG. 44 to automatically edit to sense definitions, although the results of automatic editing may not read as cleanly as results of human editing.

Since the method of FIG. 44 traverses higher conceptual abstractions connected to definition terms, logical inconsistencies between higher terms can be detected. For instance a higher term which is an antonym of another higher term presents a logical inconsistency. Also, a higher term which is a negation of another higher terms presents a logical inconsistency. For instance, (adv)wildly:a1 can be defined as "not controlled" and (adj)precise:1a can be defined as "produced by a controlled process".

Figure 57:
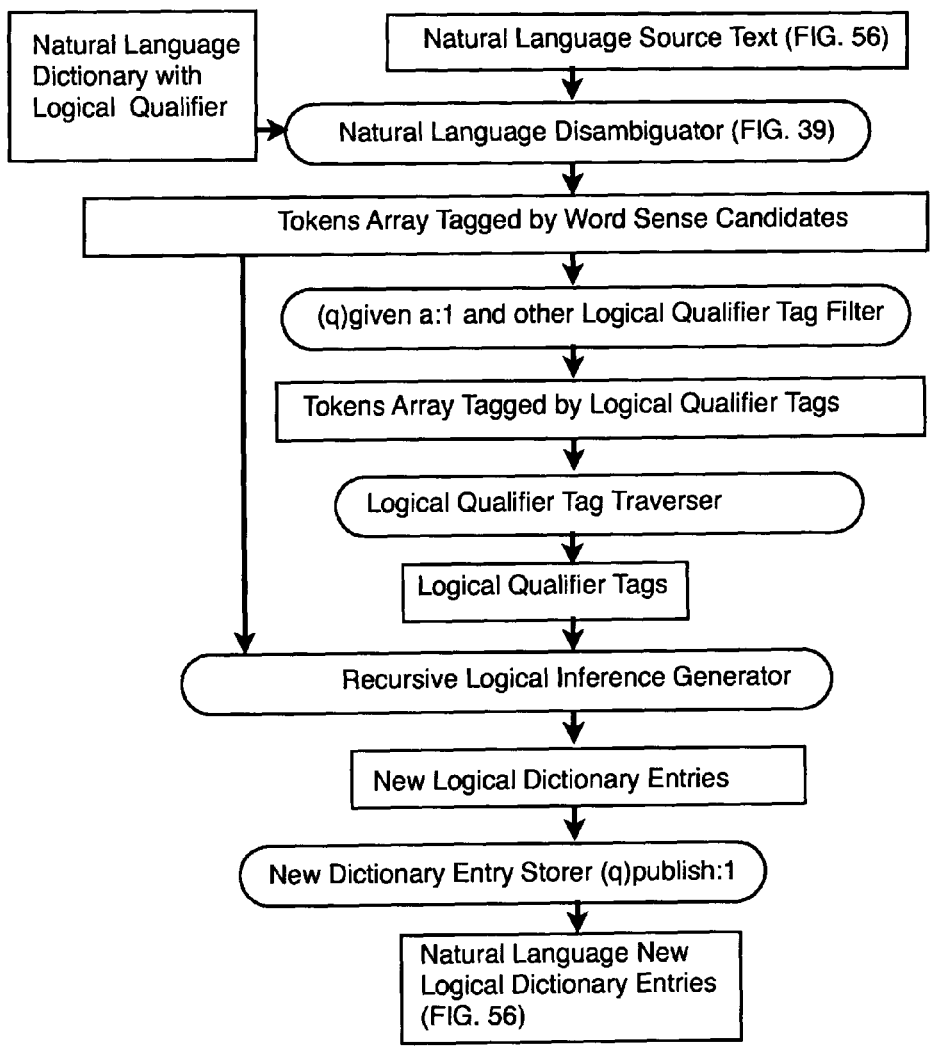
FIG. 57 Method to Compute New Dictionary Definitions, a function of FIG. 56
Figure 59:
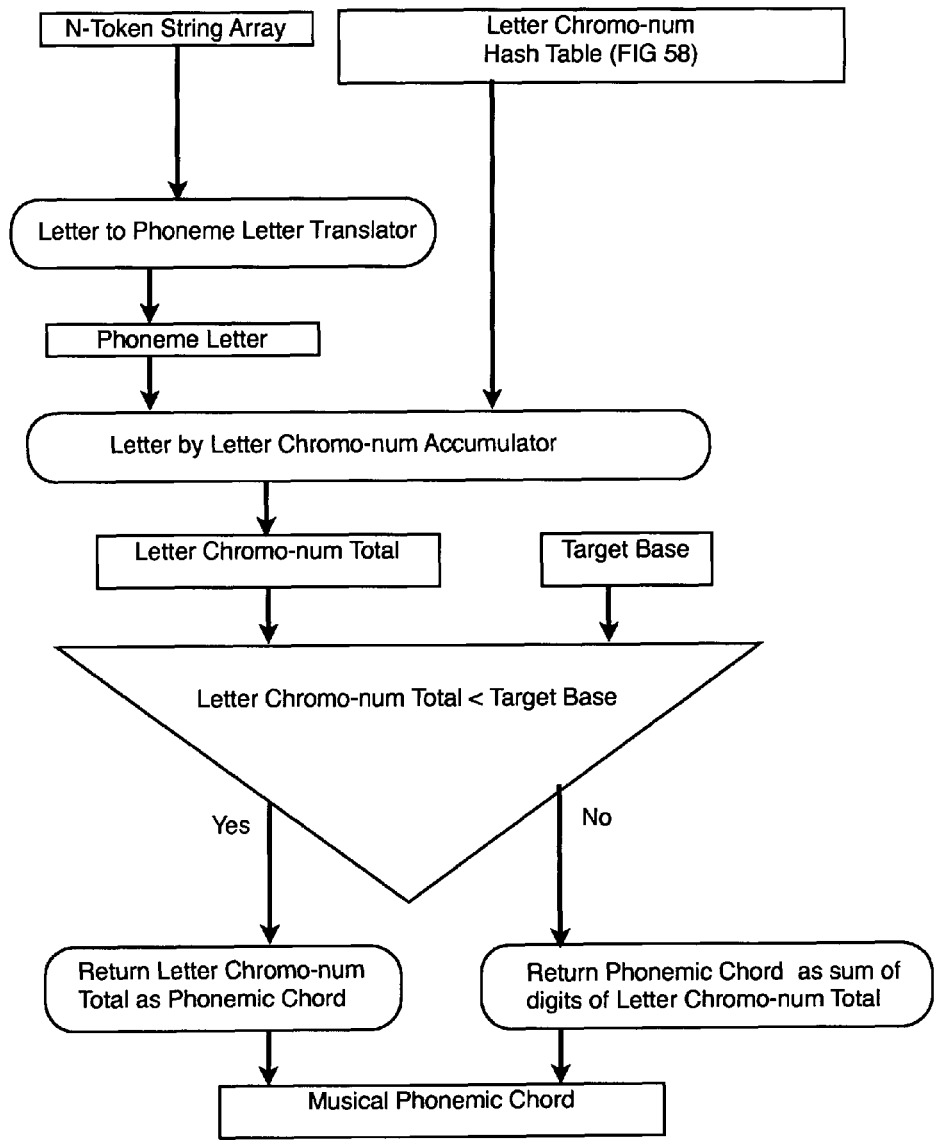
FIG. 59 Musical Phonemic Chord Detector Method

Such inconsistencies weaken the purity of a definition's meaning, and when used by automatic disambiguation methods, these inconsistencies lead to inconsistent disambiguation results, especially when disambiguating logical meanings by producing dictionary definitions in the method of FIG. 57. Therefore, in FIG. 52, conflicting terms such as (adv)wildly:a1 should be avoided, in preference to related terms such as (adv)loudly:1a which do not conflict with (adj)precise:1a.

The overall effect of purifying dictionary definitions using the method of FIG. 38, whether using human editors to apply final edits or automatically applying final edits, is to simplify choices in words senses when disambiguating meanings. FIG. 37 shows how these simplifications look in venn diagrams. Ordinary prior art word sense terms overlap in every possible way. FIG. 37 (a) shows possible overlaps between three senses. In the middle region "Z" stands for terms common to all 3 senses. Region "1" stands for terms only in sense 1, region "2" stands for terms only in sense 2, and "3" stands for terms only in sense 3. Region "n" stands for terms common to senses 1 and 3, region "m" stands for terms common to senses 3 and 2, region "p" stands for terms common to senses 1 and 2. Each region presents a potential disambiguation candidate.

After purifying dictionary entries by choosing common conceptual terms within a recommended range of abstractness relative to other terms in the dictionary entry, and grouping terms around these common conceptual terms, each conceptual group resembles the venn diagram FIG. 37 (b). The normalized overlaps of this venn diagram show common conceptual terms in region "1", and terms only in group member "a" in region "a", terms only in group member "b" in region "b", terms only in group member "c" in region "c". There are no shared terms between group members other than region "1". This simplification greatly reduces the choices in word sense when disambiguating meanings. At the same time, by carefully choosing region "1" terms to be in a recommended range of relative abstractness, region "1" provides a reliable bridge to metaphoric and poetic meanings associated with the group.

Figure 33:
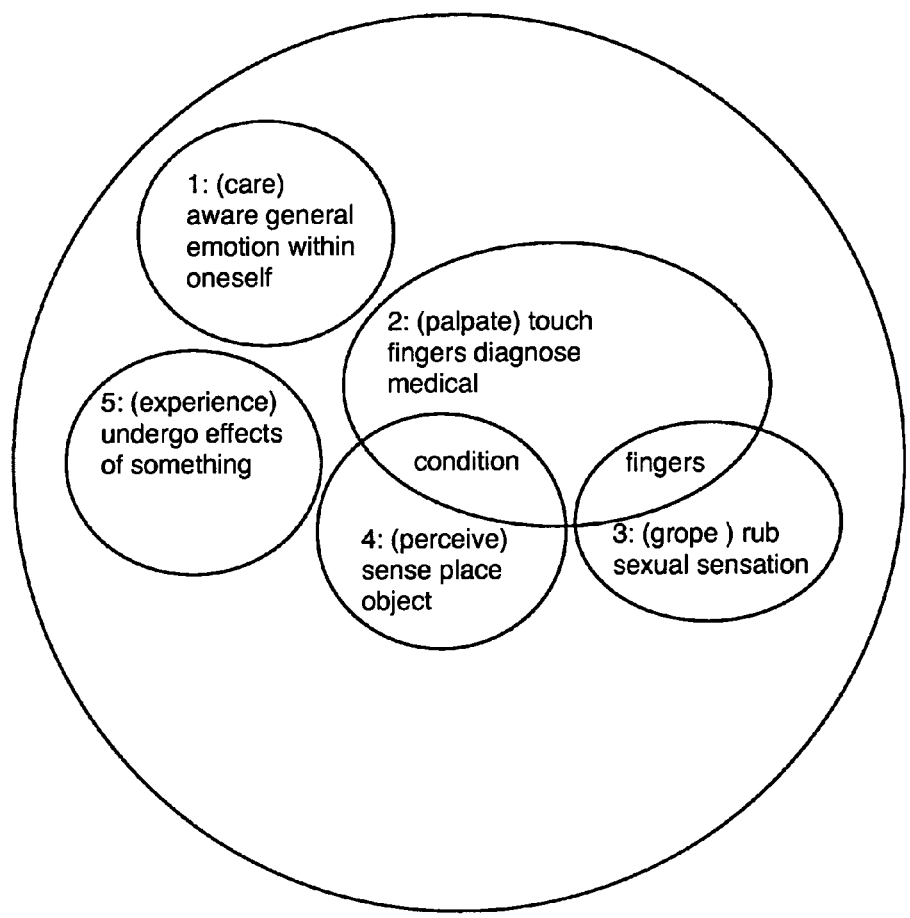
FIG. 33 Prior Art Venn Diagram Of Verb Meanings of Feel

FIG. 33 shows a prior art venn diagram for the verb meanings of feel. The two common terms of "condition" and "fingers" are outliers: "condition" is too abstract and "fingers" is too concrete. For lack of other obvious common abstractions, there are two senses, sense 1 and sense 5, seemingly unrelated to the other three senses related by "condition" and "fingers". This chaotic layout of senses is typical of dictionary entries created for human use.

FIG. 34 shows a present invention normalized venn diagram for the verb meanings of feel, after normalization by the method of FIG. 38 with some manual editing. Outlier common abstractions of "condition" and "fingers" have been replaced by abstractions within the recommended range of the method of FIG. 44. Since FIG. 44 optimizes around abstractions with greatest coverage of other terms, the two newly chosen related abstractions of feeling and sense cover all the meanings. Though "feeling" has only one member in its group, "feeling" still provides a bridge to greater metaphoric abstraction.

FIG. 35 shows a prior art venn diagram for the verb meanings of beat. The common terms of strike, hitting, repeatedly do not cover most of the meanings, fragmenting the polysemy of beat. Partial overlap between hitting and strike causes additional complexity in the relationship between senses. FIG. 36 shows the verb meanings of beat, after normalization by the method of FIG. 38 with some manual editing. As in FIG. 32, partial overlaps between common terms such as "hitting" and "strike" have been removed, and broader covering terms have reduced the number of unconnected meanings, to clarify the common abstractions of the dictionary entry. Thus the common abstractions of "repeatedly move", "mix", "greater power" and "avoid" cover all the meanings, grouping meanings neatly into four groups. These common abstractions provide a bridge to even more abstract concepts related to the senses of "beat".

FIG. 25 to FIG. 32 show examples of dictionary definitions after normalization using the method of FIG. 38. Examples are given for nouns, adjectives, verbs and conjunctions. Those skilled in the art of computational linguistics will recognize that the method of FIG. 38 handle all additional parts of speech, including but not limited to adverbs, proper nouns, prepositions and determiners.

FIG. 38 shows a flowchart of a method to normalize the polysemy of dictionary entries, one dictionary entry at a time. For notational standards herein, a dictionary entry may be considered a group of sense definition sharing a common set of symbolic word forms that look the same, so that occurrences of these symbolic word forms must be disambiguated by choosing from the group of sense definitions. Since part of speech can be determined by collocation with determiners such as "the" or "a" for nouns and collocation with adverbs for verbs, many implementations of the present invention will consider part of speech to segregate polysemy groups of senses.

Also for notational standards herein, the flowchart rounded corner boxes represent operators upon data sets represented by square corner boxes. Arrows pointing toward operator boxes show inputs and arrows pointing away from operator boxes show outputs.

The first operator of method (Dictionary Entry Traverser) of FIG. 38 thus has a Natural Language Dictionary as input and as it traverses the Natural Language Dictionary it produces, in sequence, Dictionary Entries tagged by Part Of Speech.

In turn, a Dictionary Entry Definition Traverser traverses each Dictionary Sense to produce Part Of Speech tagged Dictionary Sense Polysemy Strings. These are essential dictionary sense definitions in simple character string format. These in turn are passed to the Method to Disambiguate Polysemy String Meaning in FIG. 39.

Figure 39:
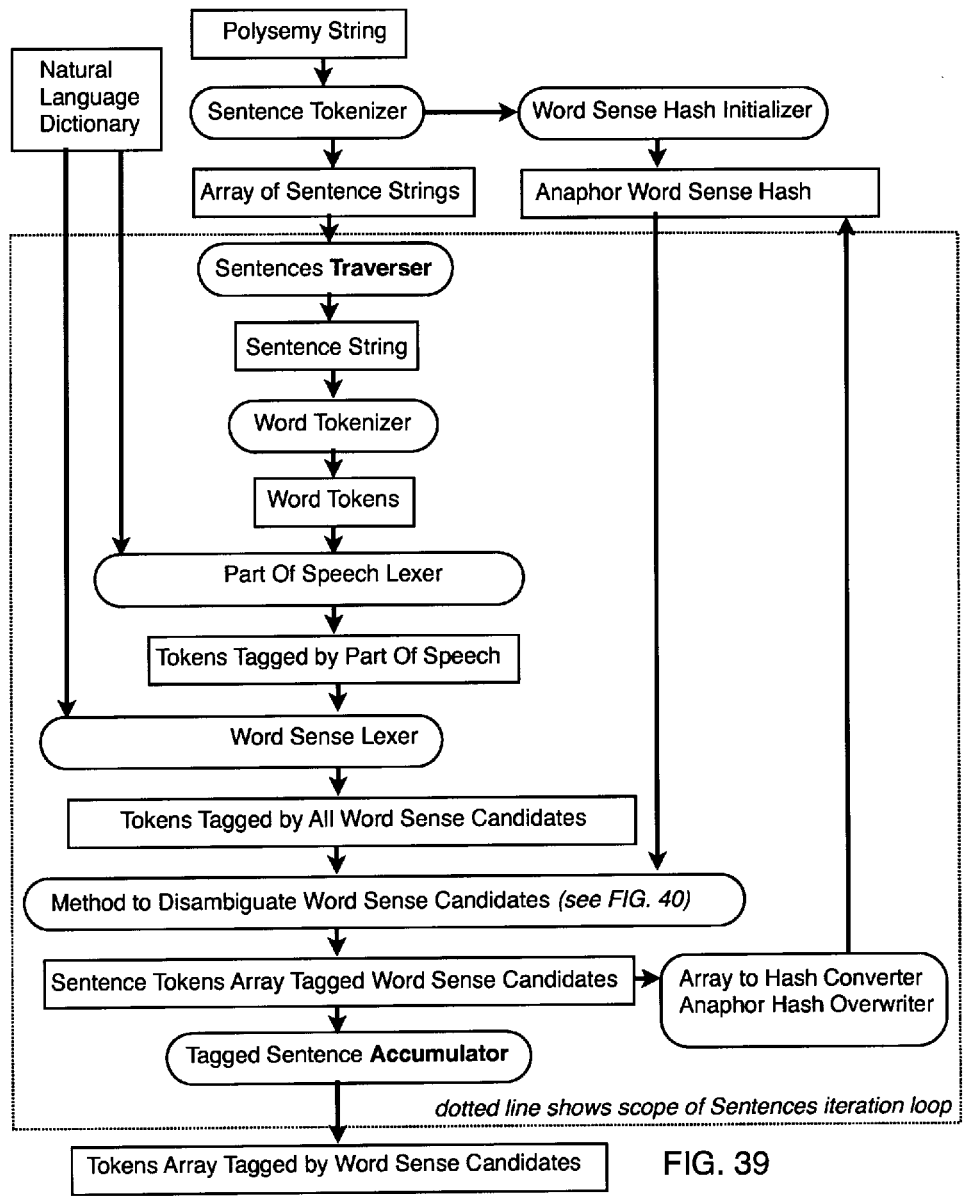
FIG. 39 Method To Disambiguate Polysemy String Meaning, a function of FIG. 38

The method of FIG. 39 takes a character string of text as input and segments it into tokens tagged with possible polysemous meanings. This method is a general purpose natural language processor used by the methods of FIG. 38, FIG. 56 and FIG. 57.

Starting with segmentation into sentences, the FIG. 39 Sentence Tokenizer outputs an Array Of Sentence Strings, as well as initializing an intra-sentence Anaphor Word Sense Hash for the array of sentences. This anaphor hash is used to cache meanings from sentence to sentence, resolving anaphoric references in dictionary senses. For instance the word "he" could have a sense "(n)anaphor:1a for a (adj)male: 1a (n)person:1a". The definition for (n)anaphor:1a could be "<<-find match:1a" which triggers a search in previous text for the anaphoric match.

Within the dotted line box of FIG. 39, the sentences are traversed in order of occurrence, first traversed as Sentence String, then tokenized into Word Tokens, which are looked up in the Natural Language Dictionary to find part of speech markers, (such as "the" and "a" and adverbs and adjectives) which show which Word Tokens have which parts of speech. Then the Tokens tagged by part of Speech are scanned by a Word Sense Lexer using the part of speech tags to direct the lookup of word sense candidates in the Natural Language Dictionary. For instance, word preceded by "the" are tagged by the part of speech "noun" and this tag direct the Word Sense Lexer to look up the word spelling in the "noun" part of speech dictionary. All candidates for the word senses found in the dictionary are then passed to the Method to Disambiguate Word Sense Candidates in FIG. 40 along with the Anaphor Word Sense hash.

Figure 40:
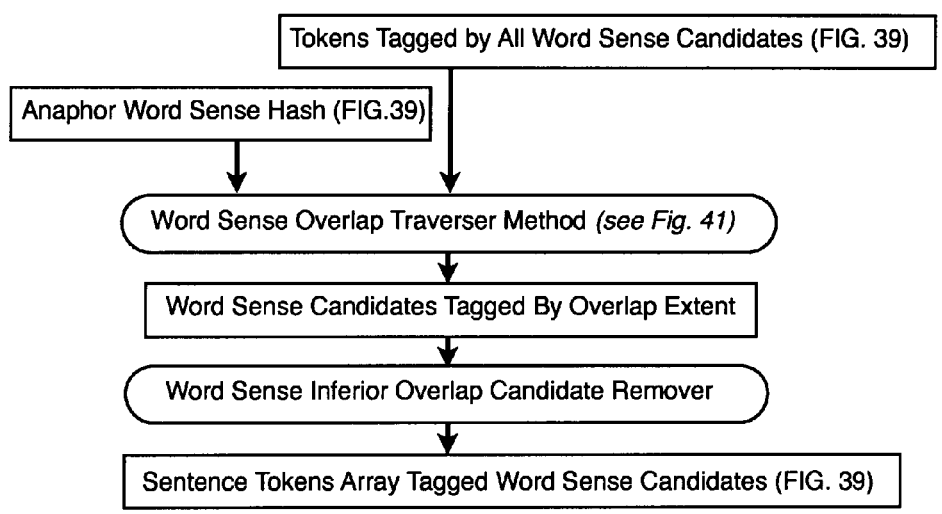
FIG. 40 Method To Disambiguate Word Sense Candidates, a function of FIG. 38
Figure 41:
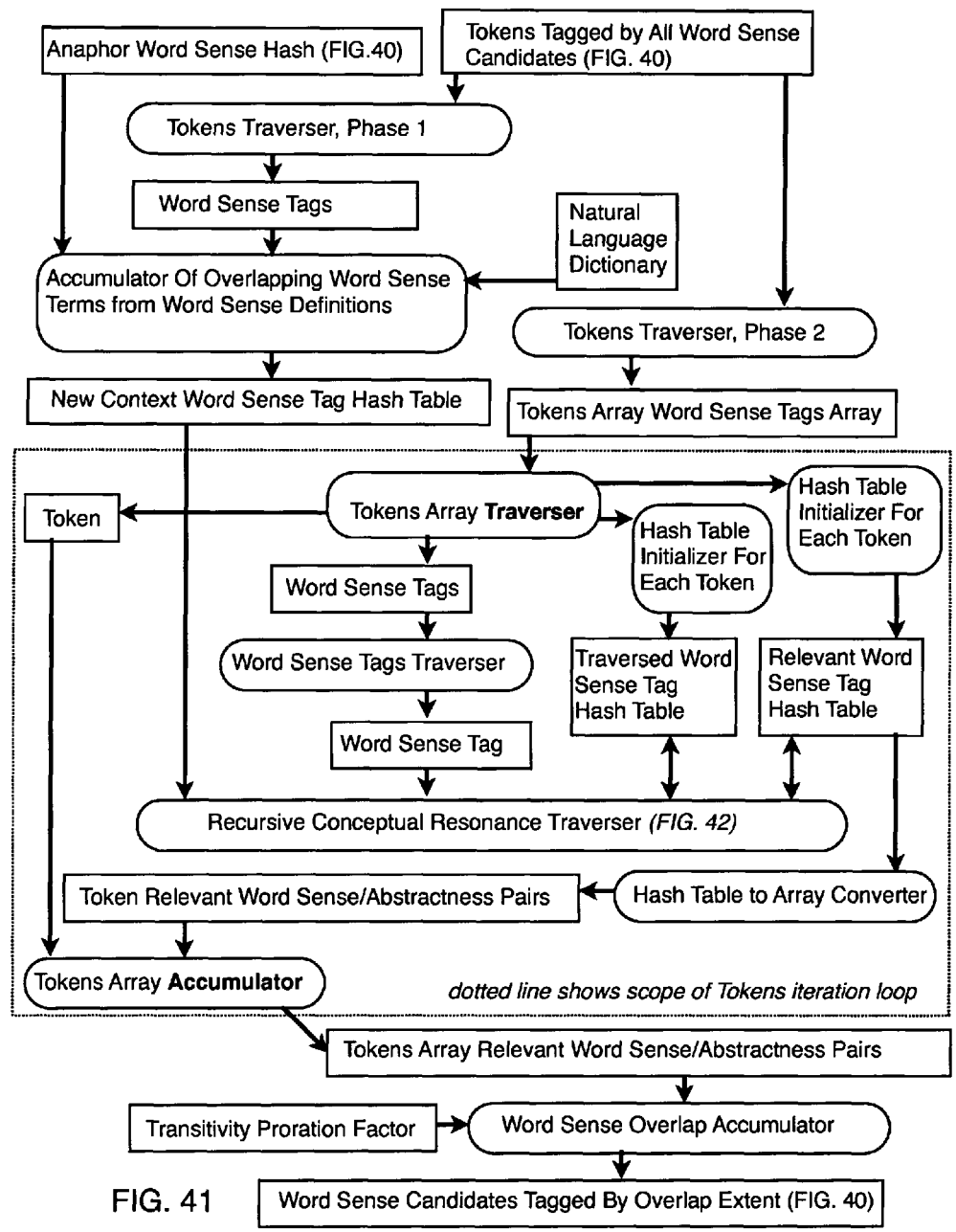
FIG. 41 Word Sense Overlap Traverser Method, a function of FIG. 38

FIG. 40 combines the Anaphor Word Sense Hash meanings previously disambiguated from the previous sentence with current candidates for polysemy resolution in FIG. 41. In Phase 1, the method of FIG. 41 traverses all candidate word senses to combine them with previous Anaphor meanings in a new Context Word Sense Tag hash Table. This hash table forms the resonance chamber for calculating Recursive Conceptual Resonance in FIG. 42. The Phase 1 formation of this chamber enables the FIG. 41 Phase 2 traversal to start with fairly large resonance set for the average length of sentence. Since this causes the directly connected words sense candidates to resonate with some candidates which will be later weeded out, it is possible that some false positive resonances will occur this way. Yet for small dictionaries and little or no Anaphora in the Anaphor Word Sense Hash this may be the preferred variation of the present invention.

For large well populated dictionaries and copious anaphora in the Anaphor Word Sense Hash, the FIG. 41 Phase 1 may be largely skipped, making the New Context Word Sense Tag hash Table a simple copy of the Anaphor Word Sense Hash, for greater accuracy. As a compromise, the present invention may allow only candidate word sense tags definition terms which overlap with candidate word sense tag definitions from other definition, or overlap with Natural Language the Anaphor Word Sense Hash word senses (shown in FIG. 41 as Accumulator Of Overlapping Word Sense Terms from Word Sense Definitions).

FIG. 41 Phase 2 traverses each candidate word sense, initializing a Traversed Word Sense Tag Hash Table. This hash table prevents second traversals of the same Word Sense, thus preventing infinite recursion loops in FIG. 42. In FIG. 41 Phase 2 traversing each Word Sense begins with also initializing a Relevant Word Sense Tag Hash table, to keep track of all conceptually abstract terms associated with the Word Sense by the Recursive Conceptual Resonance Traverser in FIG. 42.

Figure 42:
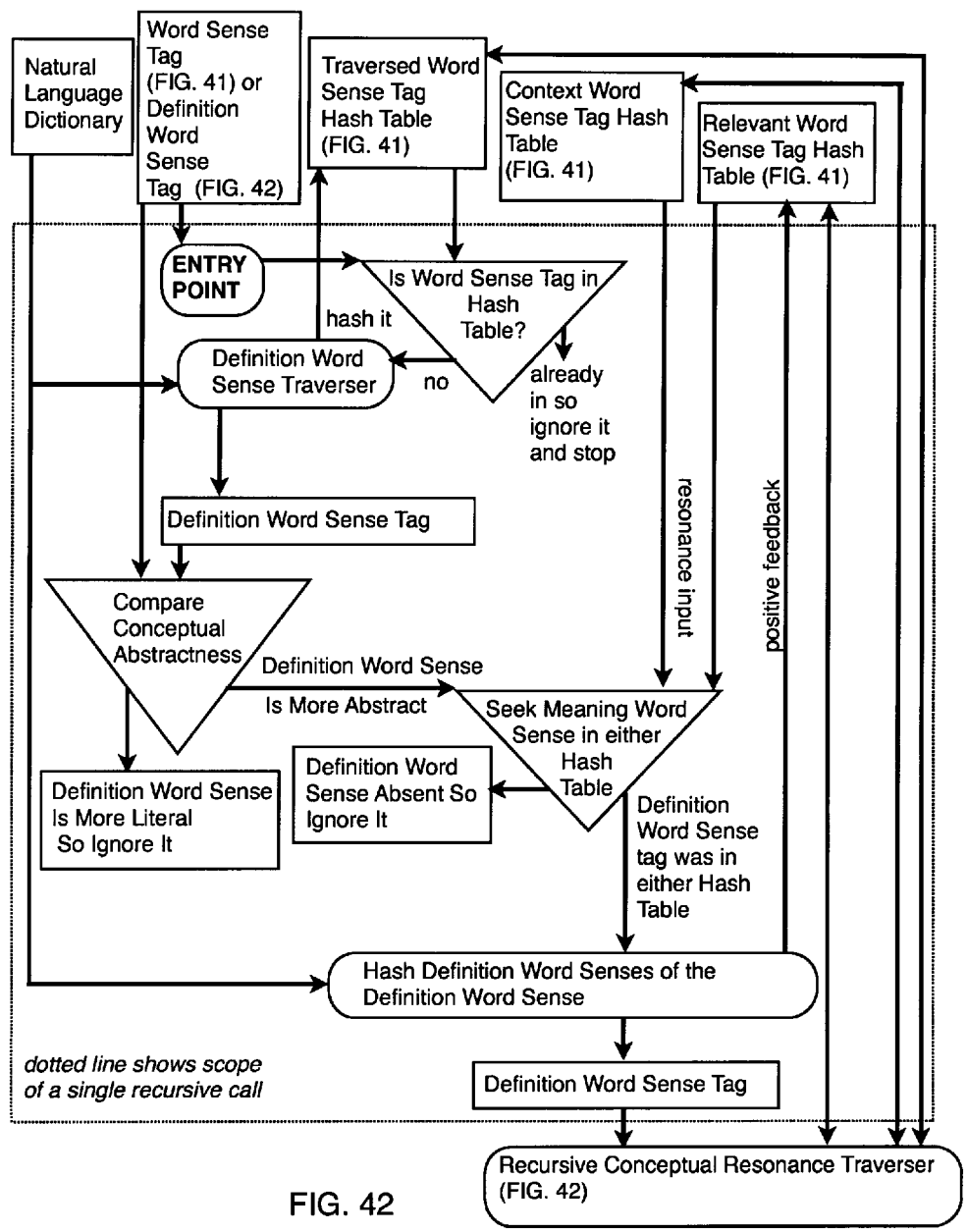
FIG. 42 Recursive Conceptual Resonance Traverser, a function of FIG. 38

The method of FIG. 42 uses recursion to recursively traverse a Natural Language Dictionary seeking conceptually abstract terms which resonate with the conceptual context of the Word Sense candidate in FIG. 41. By seeking out and storing pointers to these terms in the Relevant Word Sense Hash table, each additional meaning stored in that hash table increases the known contextual resonance of the Word Sense Candidate. The ENTRY POINT in FIG. 42 shows that first off the Word Sense Tag input is immediately checked for existing inclusion in the Traversed Word Sense Hash table. If so, the method of FIG. 42 stops and relinquishes program control to its caller. If not so, the method of FIG. 42 continues and reads the Natural Language Dictionary to traverses all word sense terms in the dictionary definition of the Word Sense Tag. For instance, for a Word Sense Tag of (v)beat:1a the Definition Word Sense Traverser would read (v)hit:1a, skipping the stopword "to", read (adv)repeatedly:1a, skip the stopword "and" and read (adv)quickly:1a and read (v)move:1a. The Conceptual Abstractness of these Definition Word Sense Tags would be compared the average abstractness of the Word Sense Tag (computed by the method of FIG. 53). The present invention uses variations in stopwords lists to skip over words such as "and" and "or" which typically are too generally applicable to be used as relevant terms.

By comparing the average abstractness of the Word Sense Tag to its component word sense terms, the method of FIG. 42 is able to skip over the relatively concrete terms which are specific examples of meaning which would otherwise cause false positive resonances. More abstract word sense terms are then further tested to see if they are in the Context Word Sense hash table or the Relevant word sense hash table. Only if they resonate in that manner are they approved as abstract resonant concepts. Once approved, their complete Natural Language Dictionary definition terms are stored in the Relevant Word Sense Tag hash table, thus providing "positive feedback" to support that concept in the hash table for the next recursive call to the method of FIG. 42.

By recursing further and further into the natural language dictionary, with a larger and larger Relevant Word Sense Tag hash table the method of FIG. 42 seeks more and more abstract relevant meanings to associate with the Definition Word Sense Tag. For instance, FIG. 46 through FIG. 48 show results of a recursive traversal into poetic meanings of the words "feel", "heart", "how", "pertained" and "everything" from a sentence of a Mary Oliver poem called The Swan. The sentence goes: "And did you feel it, in your heart, how it pertained to everything?"

The Poetic Resonance in First Level of FIG. 46 shows output of FIG. 41 Accumulator Of Overlapping Word Sense Terms from Word Sense Definitions. FIG. 46 shows that the polysemous meanings of heart have been winnowed down to 1, 1a, 3 and 3a. The other meanings of heart did not have overlaps with other definition Word Sense Terms and an empty Anaphor Word Sense Hash.

In an example of Phase 2 tokens traversal, FIG. 41 traverses the Word Sense Tags of (v)feel:1, (v)feel:1a, (v)feel:2a, (v)feel:2b, (n)heart:1, (n)heart:1a, (n)heart:3, (n)heart:3a, (conj)how:1, (conj)how:1a, (v)pertain:1, (v)pertain:1a, (v)pertain:1b, (n)everything:1, (n)everything:1b as shown in FIG. 46. Each of these is passed as a Word Sense Tag of FIG. 41 to the FIG. 42 Recursive Conceptual Resonance Traverser, to accrete relevant conceptual meanings in the Relevant Word Sense Tag Hash table. In the first level of recursion, the (v)feel:1a term (n)feeling:1a overlaps with the (n)heart: 3a term (n)feeling:1a. To emphasize this resonance overlap, FIG. 46 shows the (v)feel: 1a term (n)feeling:1a followed by "(n)heart:3a" in italics. FIG. 46 also shows resonance overlap in the other direction, with the (n)heart:3a term (n)feeling:1a followed by [(v)feeling:1a] in italics. Other overlaps are notated similarly in FIG. 46: (n)condition:1a, (n)something: 1a and (n)being:1a.

Each of the terms of definitions in which overlap is found were fully added to the Relevant Word Sense Tag Hash table for the originating Word Sense Tag of FIG. 41. Then, FIG. 42 traversed further into the Natural Language Dictionary by calling itself recursively with each of the terms of definitions as Definition Word Sense Tag in FIG. 42. Further traversal continued as long as there were overlapping word sense encountered which resonated with the Context Word Sense Hash Table and Relevant Word Sense Tag Hash Table. For poetic terms which resonate with each other, such as the words from the Mary Oliver poem, this traversal reached far into the dictionary into very abstract concepts before that resonance stops.

FIG. 47 shows an example of the very abstract poetic resonance terms for the sentence of the Mary Oliver poem as the method of FIG. 42 traversed further and further in second, third and fourth recursive call to FIG. 42. Before stopping, that recursion has added many terms including (adj)important:1a and (adj)mysterious:1a to the Relevant Word Sense Tag Hash Table. These term tags then become part of the disambiguated meaning of the sentence, at the FIG. 41 Token which initiated each recursion. This is done in output operators via FIG. 41 Tokens Array Accumulator, the FIG. 41 Word Sense Overlap Accumulator, and the FIG. 40 Word Sense Inferior Overlap Candidate Remover which removes candidate meanings with lesser overlap. Waiting for conceptually abstract terms to accumulate to FIG. 41 Word Sense Tags before removing weaker candidates allows the abstract concepts to contribute to overlaps, greatly increasing disambiguation accuracy for poetic and metaphoric meanings.

FIG. 41 Transitivity Proration Factor allows Word Sense Overlap Accumulator to adjust for the degree of transitivity allowed for each successive recursive call of the method of FIG. 42. For most cases, 90 to 100% transitivity is appropriate, but when bootstrapping a dictionary normalization from a rough draft dictionary, the Transitivity Proration Factor may be set as low as 70% to avoid disambiguation errors from poorly constructed definitions.

FIG. 48 shows a summary of conceptually abstract terms as accumulated for feel, heart and pertained tokens in the sentence of the Mary Oliver Poem. For "feel" and "heart", the terms are shown exactly as calculated in FIG. 42. For "pertained" the terms are shown as mapped to a canonical root term which stands for all parts of speech and synonym symbols representing the concept. Canonical root terms have advantages over raw terms as calculated in FIG. 42. Canonical standards typically choose one part of speech, or a preference list of parts of speeches to be canonical root term. For instance, by standardizing around the noun form of concepts, for instance, there is no longer any need to display the valid part of speech for the term's spelling: the "(n)" can be omitted from display, to simplify the user interface. More significantly, the indexing of the term in an n-gram search engine index is simpler, since a concept will only ever show up in the index in its root noun form. Thus the index size is reduced and the querying the index for the contextual presence of the concept is faster since only one part of speech needs to be queried instead of four or more parts of speech.

For comparison purposes, an example of Literal Meaning is given in FIG. 49. This a slightly longer sentence, "Bypass surgery on a beating heart is no more effective than traditional surgery." Despite the longer length of the sentence, there is less abstract conceptual resonance to the candidate terms, greatly reducing the total number of concepts relevant to the sentence. The longer length of the sentence make the Poetic Resonance in First Level longer than the poem sentence First Level. Yet the resonance definitions of (n)bypass:1a, (n)surgery:1a, (v)beat:1b, (n)heart:4a, (adj)effective 1a, (prep)than:1 and (adj)traditional:1a and (adj)traditional:1b do not resonate or overlap each other at high levels as do the poetic terms. Consequently the FIG. 50 Poetic Resonance in Second Level is the final stopping point in traversing the Natural Language Dictionary for the Literal Meaning sentence of FIG. 49.

Similarly to FIG. 48, FIG. 51 shows a summary of conceptually abstract terms as accumulated for the Literal Meaning sentence of FIG. 49. FIG. 51 shows that not only are the terms less numerous, they are more specific and less abstract in nature, than the terms in FIG. 48 calculated for the Mary Oliver poetry sentence.

As a writer's tool, this display is very useful in showing the degree to which prose soars into inspiring abstract ideas. By accurately characterizing, word by word, the metaphoric conceptual extent of each word as used, the present invention accurately depicts the degree to which prose is a conceptually soaring metaphor. By showing which abstract concepts already resonate with each word, a writer can explore one of the existing abstractions as a brainstorming suggestion and immediately use it in the same sentence. Using of any of the displayed higher level concept words displayed in FIG. 51 above the arrows automatically raises the metaphoric abstractness of the sentence and that editing change will add even higher metaphoric words to the display. For instance, if the sentence were amended to say "Bypass surgery on a beating moving heart is no more effective than traditional conventional surgery" not only would the sentence be more poetic, it would pass on more meaning via anaphora to any sentence that followed it.

Writers and editors have many other uses for output such as FIG. 48 and FIG. 51. In FIG. 48, there is significant overlap in abstract terms associated with "need", "heart" and "pertained". These overlaps give the sentence its strongly focused tone, which balances the abstract nature of its concepts. In contrast, FIG. 28 shows just a little overlap in the meanings of "method" and "perform". In short passages absence of overlaps is acceptable. However if a dozen words are parsed and few overlapping concepts are detected, this would indicate that the writing has non-sequiturs on a conceptual basis. If three dozen words are parsed with few overlapping concepts, the non-sequiturs can be accumulated to calculate a metric for cheesy writing. For instance, here is a short quote from a deliberately cheesy text written by Gene Wiengarten for the Washington Post in 2008:

She was not a gold digger after all, he thought, an insight as blinding as what happens if you look at a solar eclipse without one of those homemade pinhole boxes which makes the sun look like a pale orange disc on a piece of cardboard, but really that's the best you get.

Few if any of the words above have common abstract concepts. After reading the first dozen conceptual non-sequiturs, readers expect the writing to circle back and connect back to earlier concepts to justify the whimsical flow. Yet after a reader gets as far as "pinhole boxes" this circling back to "gold digger" does not happen, and by "piece of cardboard" an automated non-sequitur accumulator can easily trigger a cheesy writing warning.

Detection of humorous writing can also be enabled by analyzing output such as FIG. 48 and FIG. 51. In humorous writing the conceptual overlaps shift rapidly but still circle back occasionally. For instance, here is a stand-up comic joke written by Stephen Wright:

"I went to a restaurant that serves 'breakfast at any time.' So I ordered French Toast during the Renaissance."

The sudden shift from the conceptual overlaps between "breakfast" and "French Toast" to the concept overlaps between "during" and "Renaissance" powers this joke. For additional humorous punch, "Renaissance" concepts circle back to "time". There is a variation in humorous text in which conceptual shifts occur on top of logically inferred concepts and not just metaphorically inferred concepts. The present invention includes methods to disambiguate logically inferred concepts in FIG. 56 and FIG. 57 which are discussed later. Logically inferred concepts in conjunction with metaphorically inferred concepts are a powerful combination for detecting and responding to actionable requests. To clarify how the present invention creates these combinations, outputs flowcharts of FIG. 41, FIG. 40, FIG. 39 and FIG. 38 show how data computed on conceptual shifts are gathered and used.

All of the FIG. 41 Relevant Word Sense Tag Hash Table tags for each entire sentence are passed as output via the Hash Table to Array Converter to Token Relevant Word Sense/Abstractness Pairs to the Tokens Array Accumulator. From there they are passed as output to the Tokens Array Relevant Word Sense/Abstractness Pairs, the Word Sense Overlap Accumulator and return to FIG. 40 as Word Sense Candidates Tagged by Overlap Extent. FIG. 40 passes the superior candidate Relevant Word Sense Tag Hash Table tags via the Word Sense Inferior Overlap Candidate Remover, in the Sentence Tokens Array Tagged Word Sense Candidates in FIG. 39. Completing the path back to the Anaphor Word Sense Hash for the next Sentence String in FIG. 39, the Array to Hash Converter Anaphor Hash Overwriter overwrites the Anaphor Word Sense Hash with the most recent Anaphoric Word Senses, in preparation to disambiguate the next Sentence String.

In FIG. 39, when all Sentence Strings have been processed, the Tagged Sentence Accumulator outputs the Tokens Array Tagged by Word Sense Candidates to FIG. 38. The Tokens Array Tagged by Word Sense Candidates output is useful not only to the method of FIG. 38. The method of FIG. 39 provides broadly useful disambiguation of plain text strings, whether the meanings to be disambiguated are literal, metaphoric or poetic. The present invention uses the output of FIG. 39 as a basis for disambiguating logical meanings, and for disambiguating query input to search engines.

Figure 43:
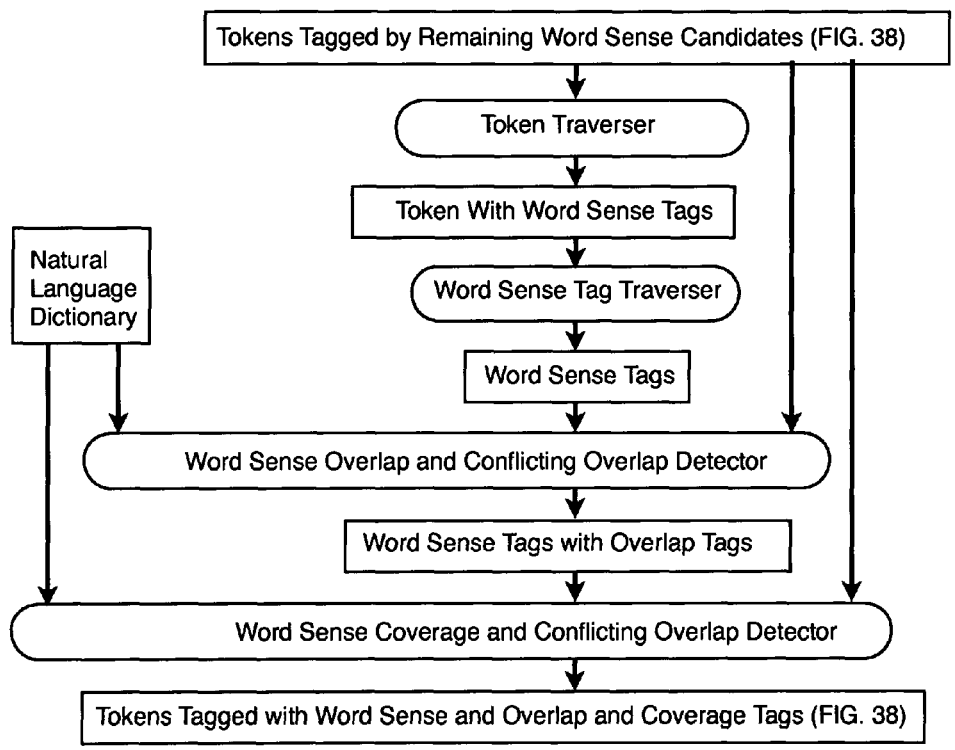
FIG. 43 Polysemy Spanning Grouping Method, a function of FIG. 38

The present invention also uses the output of FIG. 39 as a basis for normalizing natural language dictionaries. As in FIG. 52, logical conflicts between terms and the coverage some terms may give over other terms must be computed. FIG. 43 computes these factors token by token and word sense by word sense. The FIG. 43 Word Sense Overlap and Conflicting Overlap Detector looks for occurrences of a Word Sense Tag in tokens other than the Token currently traversed by the Token Traverser. Since the Tokens Tagged by Remaining Word Sense Candidates contains not only directly attributed Word Sense meaning but also conceptually abstract Word Sense meanings computed by FIG. 42, these Overlaps extend to metaphoric and poetic concepts.

The Word Sense Overlap and Conflicting Overlap Detector also checks in the Natural Language Dictionary for possible logical conflicts. For instance, if Word Senses overlap but one is used as a negation within its citing definition, that conflict would be reported and tagged by the Word Sense Overlap and Conflicting Overlap Detector. In FIG. 52 the meaning of beat:6a is to not (v)compensate:1a. "Not" is a negation word applied to (v)compensate:1a. If the word sense of (v)compensate:1a tagged two tokens, but only through definition where a negation word applied, that would be a reported conflict.

Similarly, if Word Sense and its dictionary antonym were used in the same definition, that would be a logical conflict reported by Word Sense Overlap and Conflicting Overlap Detector.

The Word Sense Coverage and Conflicting Overlap Detector seeks sufficiently abstract Word Senses tagging a definition which are be tags for other definitions. Such abstract Word Senses are reported as possible covering concepts around which definitions may be grouped. For instance, in the polysemous definitions of (v)beat, (adv)repeatedly:1a and (n)power are abstract covering concepts. As with the Word Sense Overlap and Conflicting Overlap Detector, potential covering concepts are check for logical conflicts which are either from citations with negation or from presence of antonyms. These conflicts are reported as additional tags on the Word Sense tags.

Reporting Tokens Tagged with Word Sense and Overlap and Coverage Tags back to FIG. 38 enables the FIG. 44 Dictionary Entry Normalization Method to compute annotations suggesting changes to the current dictionary definitions. These annotations are detailed enough that if needed, the suggestions can be implemented automatically to increase dictionary definition quality. However, some of the more complex suggestions may be best implemented by a human editor, who can suggest changes from a basis of experiences not recorded in the dictionary.

The FIG. 44 Part Of Speech Substitution Annotator check for matches between the part of speech of the definition and its defining Word Senses. If these do not match, it seeks the corresponding matching part of speech Word Sense in the Natural Language Dictionary and suggests it. For example, in FIG. 52, a substitution of (v)hunting:1a for (n)hunt:1a arises since the part of speech of the definition is verb and not noun.

The FIG. 44 Abstract Term Substitution Annotator computes the average abstractness of each definition by averaging the abstractness of each of its defining Word Senses. The abstractness of each Word Sense has to be previously stored in the Natural Language Dictionary by the method of FIG. 53, so it can be sought by FIG. 44 by indexed lookup. The limits of Minimum Relative Abstractness and Maximum Relative Abstractness are applied to ensure that definitions do not mix word senses from too wide a range of abstractness. This in turn ensures that when the method of FIG. 42 traverses toward abstract meanings, such traversals gradually rise in abstractness rather than jumping prematurely and skipping over intermediary abstractions which may be needed for accurate disambiguation. For instance, it is not appropriate to use an abstract term such as "thing" to define "repayment" even though a repayment is clearly a thing. Instead, a less abstract term should be used, such as "payment".

Similarly, the Abstract Term Substitution Annotator reports the use of defining terms which are overly concrete. Such terms tend to be specific examples which may not always be relevant to the meaning of a definition. For instance, repayments may be made by "automatic drafts", but the concept of "automatic drafts" are just a minor example of the many kinds of repayments, and should not be used in a definition of "repayment" for use by an automatic disambiguation process. Instead, "automatic drafts" can reference "repayment" in one of its polysemous definitions. By segregating Word Senses so that they participate in definitions with peer abstract concepts of close to the same abstractness, a Natural Language Dictionary becomes accurate enough in its metaphoric representations to support storage and retrieval of metaphoric meanings in a search engine.

The FIG. 44 Wider Coverage Substitution Annotator uses results from the FIG. 43 Word Sense Coverage and Conflicting Overlap Detector to report possible Word Sense substitutions at the widest possible coverage using Word Senses approved by the FIG. 44 Abstract Term Substitution Annotator.

Similarly, the FIG. 44 Overlapping Term Substitution Annotator uses results from the FIG. 43 Word Sense Overlap and Conflicting Overlap Detector to report possible Word Sense substitutions using Word Senses approved by the FIG. 44 Abstract Term Substitution Annotator.

The FIG. 44 Logical Conflicts Substitution Annotator uses conflict reports from the FIG. 43 Word Sense Coverage and Conflicting Overlap Detector and the FIG. 43 Word Sense Overlap and Conflicting Overlap Detector to suggest Word Senses which should be replaced because of conflicts detected. When two Word Senses conflict, it is best to replace the least useful of the two. The least useful of the two will have been less frequently proposed as a substitute Word Sense up to the this point in the method of FIG. 44. Replacement Word Senses can be automatically chosen using the method of FIG. 42 to find related Word Senses which do not have the conflict.

The FIG. 44 Term Substitution Automator automatically edits Dictionary entries following results from all the Annotated Definitions of FIG. 44. Since this automated text editing may involve changes in the grammar affecting the precise meaning of the definitions, these in turn are fed back to FIG. 38 for the Method To Disambiguate Polysemy String Meaning, to double check for correct normalization again.

The FIG. 44 Term Substitution Automator also outputs Annotated Dictionary Entries back to FIG. 38, so that the method of FIG. 38 may report Anomalous Dictionary Entries for Manual Editing of Dictionary Entries.

In FIG. 38 the Annotated Dictionary Entry Storing Method will either store a Dictionary entry in the Normalized Natural Language Dictionary or report it among Anomalous Dictionary Entries for Manual Editing of Dictionary Entries.

Figure 45:
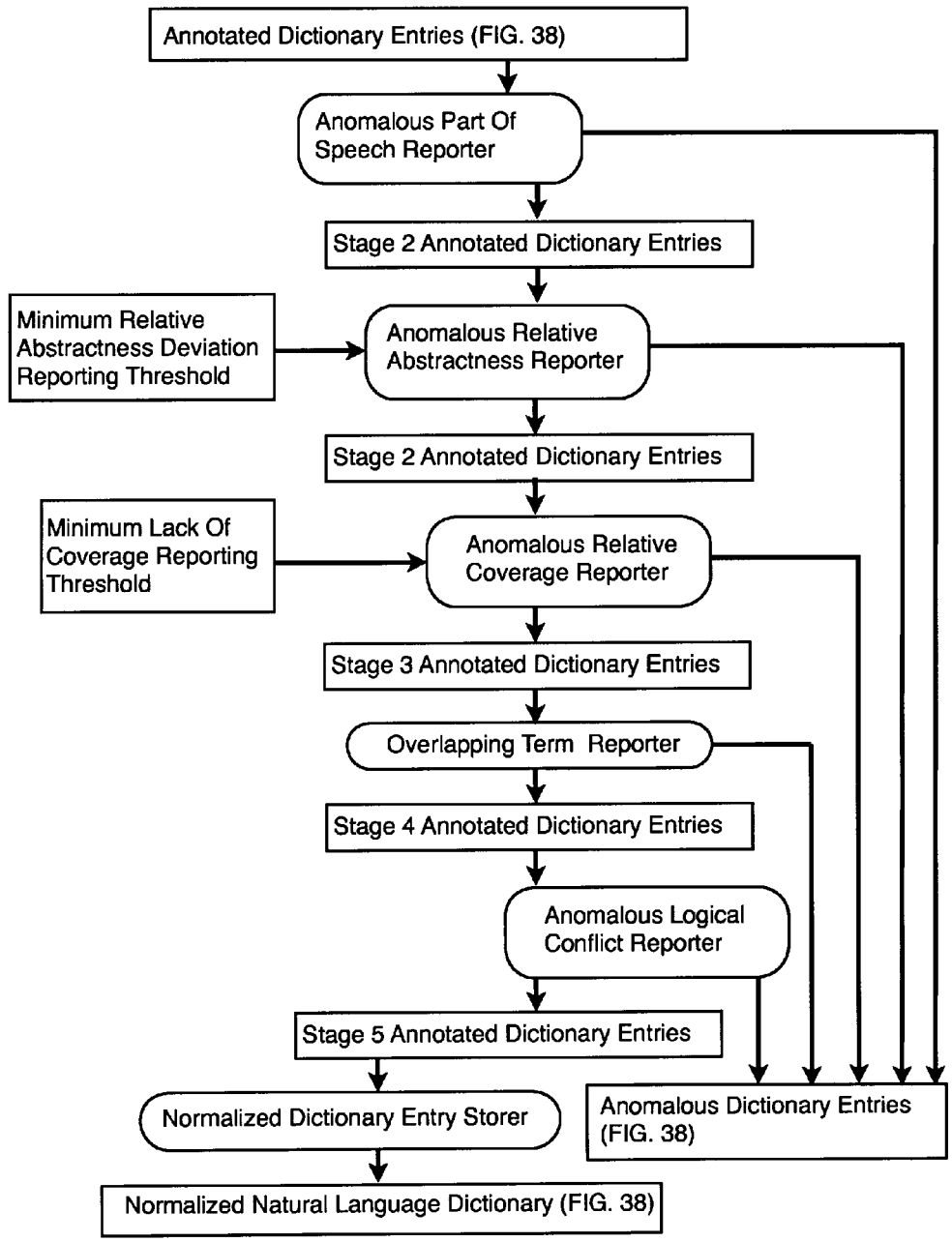
FIG. 45 Annotated Dictionary Entry Storing Method, a function of FIG. 38

In FIG. 45, the thresholds of Minimum Relative Abstractness Deviation Reporting Threshold and Minimum Lack Of Coverage Reporting Threshold determine which Dictionary Entries have abstractness deviations or a lack of covering concepts that must be reported rather than stored in the Normalized Natural Language Dictionary. Overlapping terms which cannot be merged into common abstract covering concept sets are reported by the Overlapping Term Reporter. This helps to remove any confusing partial overlaps in abstract terms as shown in FIG. 37 (*a*). Logical Conflicts calculated in FIG. 44 are always reported in FIG. 45 rather than stored in the Normalized Natural Language Dictionary.

Since Word Sense conceptual abstractness is so crucial to automated and manual Dictionary Normalization for abstract metaphoric search engines, the present invention includes a FIG. 53 Method Of Calculating Sense Conceptual Abstractness customized to calculated metaphoric abstractness. The present invention's metaphoric conceptual abstractness is based upon recursive tallying, for a given Word Sense "a", the number of other Words Senses of the same part of speech which cite Word Sense "a" in the dictionary. The more a Word Sense is cited, the greater its abstractness. Since these citations themselves may be cited, these additional citations, though less abstract in themselves, increase the Word Sense "a" abstractness. The method of FIG. 53 thus traverses towards more and more specific and concrete definitions, since the method of FIG. 38 does not allow definitions to cite overly concrete terms.

Summation transitivity of conceptual abstractness should not extend across parts of speech. Thus definitions of nouns which cite adjectives do not contribute to the conceptual abstractness of those adjectives, and vice versa. An adjective definition may inform a noun definition or a noun definition may inform an adjective definition. However, an adjective definition cannot represent a noun definition, and the noun definition cannot represent an adjective definition.

For instance, the definition of (n)atomic number:1a could be: a (n)number:1a of (n)protons:1a in the (adj)neutral:1a (n)state:1a of an atom:1a. This definition would contribute to the conceptual abstractness of the nouns (n)number:1a, (n)proton:1a, (n)state:1a and (n)atom:1a. Atomic number can represent an example of (n)number:1a, (n)atom:1a, in the sense of atoms identified by their atomic number, (n)state:1a in the sense of atomic state, (n)proton:1a in the sense of a count of protons.

It would not contribute to the conceptual abstractness of (adj)neutral:1a since atomic number cannot represent neutral. It would be overreaching to say that atomic number represents an example of a neutral state, since atoms have atomic numbers regardless of their state.

In another example, the definition of (v)perform:2a from FIG. 50 is (v)accomplish:1a [method:1a] OF (v)execute:1a (n)task:1a [(v)accomplish:1a] OF (n)function:1a. The verb action of perform:2a may represent verb actions of accomplish:1a and execute: 1a. It would be overreaching to say that the verb action of (v)perform:2a (also known as performance: 1a) may represent an example of (n)task:1a.

Yet the example of (v)perform:2a shows another aspect of summation of conceptual abstractness. Since the noun form of a verb represents the same concept in a different part of speech, the conceptual abstractness of a verb sense is summed not only by counting definitions which cite that verb sense, but summed also from noun sense definitions which cite the verb's corresponding noun form, as well as all other parts of speech for which there are corresponding forms of the verb. A neat consequence of this sharing of sums is that the conceptual abstractness of every part of speech form of a concept has a consistent summation number, so no matter now the concept is encountered in grammar construction, it is seen as equally abstract.

Each verb form has a standard past participle adjective form, from which it gains some of its conceptual abstractness. Each noun form may have a standard adjective form, from which it gains some of its conceptual abstractness. For instance, atom and atomic, or heart and heartfelt. Some of these are irregular but most can be computed by morphology, such as box and boxlike or boxy, heaven or (adj)heavenly or (adv)heavenward.

For consistency, the abstractness of a Word Sense is summed for all citations of a canonical form of the Word Sense. The FIG. 53 Hash Table Initializer starts each Canonical Word Sense with an empty hash table.

Using a Canonical Word Sense organized the tallying around a single conceptual entity per word sense. Thus if canonical forms are standardized to be nouns, then the abstractness of each verb meaning of "beat" must include tallies of citations of the corresponding adjective and noun word senses of beat. Since "beat" in FIG. 46 has five word senses, for each of these five, a separate set of corresponding word senses for every other part of speech must be tallied. The FIG. 53 Part Of Speech Traverser loops through each part of speech for a Canonical Word Sense, and calls the Recursive Word Sense Citation Accumulator in FIG. 54.

Figure 54:
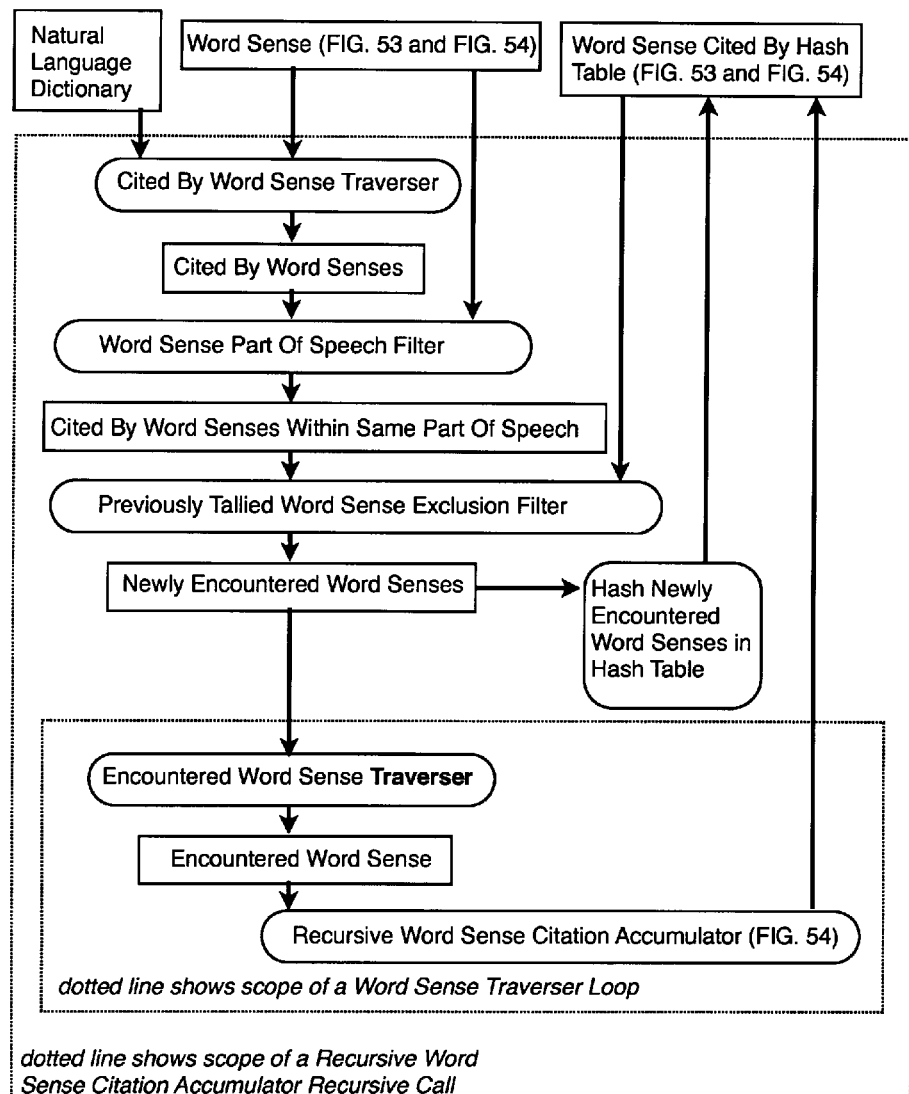
FIG. 54 Recursive Word Sense Citation Accumulator, a function of FIG. 53

The method of FIG. 54 seeks citations of the Word Sense indexed by the Natural Language Dictionary. These citations, which are themselves Cited By Words Senses are looped through by the Cited by Word Sense Traverser and filtered by the Word Senses Part of Speech Filter to output the Cited By Word Senses within Same Part Of Speech as Word Sense input to FIG. 54. Unless previous tailed by the Word Sense Cited By Hash, these Cited By Word Senses within Same Part Of Speech are output by the Previously Tallied Word Sense Exclusion Filter as Newly Encountered Word Senses which are hashed into the Word Sense Cited By Hash. The Encountered Word Sense Traverser loop through Newly Encountered Word Senses to recursively call the Recursive Word Sense Citation Accumulator of FIG. 54, further increasing the number of Word Senses in the Word Sense Cited By Hash, until all citations have been tallied.

When recursion ceases upon tallying all citations, the FIG. 53 Natural Language Dictionary Canonical Word Sense Abstractness Updater stores the tally of Word Senses in the Word Sense Cited By Hash Table as the Conceptual Abstractness for the Canonical Word Sense. After the Canonical Word Sense Traverser has traversed each Canonical Word Sense in the Natural Language Dictionary, the Dictionary has been completely updated. Those skilled in the art of computational linguistics will recognized that incremental versions of the method of FIG. 53 may easily be implemented to quickly update the Dictionary when only one or a few Word Senses have changed or have been added to the Dictionary.

Since a searches are done for concept, indexing and retrieving under a single conceptual concept is more efficient than indexing under different parts of speeches and then merging results back together. Canonically, a specific order of parts of speeches can serve to choose which is the dominant single conceptual concept and dominant synonym. Usually this is the noun form, although it can be other parts of speech if more convenient. For instance (adj)brackish (or (adj)salty could be indexed under the concept (n)saltiness. This is an advantage in the display of poetic metaphors as well, since all metaphor components can be listed only as the dominant canonical part of speech, thus omitting the part of speech (in parenthesis) from the display, saving display space and presenting a cleaner less clutter.

As described above, search engines can be greatly improved by the present invention. Both the search queries and the processes for returning relevant results should incorporate a more complete and consistent view of language than the prior art of keyword indexing and analysis. The present invention utilizes the output of the method of FIG. 52 to consistently index and retrieve the full range of meanings of words in a sentence from literal to abstract meanings. FIG. 55 shows an example of a search engine portal web page providing full sentence querying and relevance indexing of results. In the box labeled "Enter your sentence" the query sentence from the Mary Oliver poem is shown as entered. Above that box are displayed the abstract conceptual term results as shown in FIG. 48 for that sentence, using the method of FIG. 39. Since these abstract conceptual terms are relevant to the sentence, the search engine index is probed for their co-occurrence in the indexed content sentences. Under the column labeled "More Abstract" are numbers 218 and 26 showing the range of conceptual abstractness of the abstract conceptual terms, which are displayed in top-down abstractness order. By automatically probing for conceptually related abstractions of all the disambiguated word senses, the present invention saves users the labor of thinking of these words, querying for them as keywords, merging results sets, and winnowing out spurious keyword results from hundreds of keywords searches per sentence.

As taught by the Au Memory Patent, for relevance analysis these occurrences should be characterized by rhetorical relevance and any differences between the content rhetorical relevance values and query rhetorical relevance values should proportionally diminish the relevance of the results.

Below the FIG. 55 "Enter Your Sentence" box of are examples of word senses citing the disambiguated word senses of "feel", "heart" and "pertained". As with the abstract concepts shown above the query sentence, these results are calculated in a method similar to FIG. 52 but running traversing in a limited sense in the other direction toward the nearest more concrete related terms. And as with the abstract concepts shown above them, the column header "Less abstract" displays the numbers 23 and 10 shows the range of abstractness of the nearest concrete conceptual terms.

In the bottom third of FIG. 55 is a section headed "Results sorted by Relevance". Here quotations sorted by relevance to the query sentence are listed. The boldface words such as "Heart", "feel" and "pertained" show the relevant tokens in these quotations. In some variations of the present invention, the actual prorated relevance percentage is also displayed alongside these words, to show users which of the words contributed most to the Relevance column percentage in FIG. 55.

The right arrows pointing to "source" in italics indicates a button to press to navigate to the source of the quotation, with the quotation in bold. The left and right arrows flanking "previous" and "next" in italics navigate to other pages of results in multipage result sets.

The FIG. 55 Query column "radio" style buttons, when pressed, choose the corresponding quotation text to be the new query sentence in the "Enter Your Sentence" box. Since the present invention is able to handle complete sentences or even a short paragraph of sentences as query input text, indexing and retrieving the full contextual meanings disambiguated from that text, this is a shortcut for users to probe into quotations which may be more interesting to them. In this way, they can search by thinking in complete sentences, rather than mentally converting their thoughts to keyword sets.

The present invention recognizes that any recursive implementation may be replaced with an equivalent iterative implementation to save stack memory and reduce stack operation overhead. However, recursive design has fewer potential bugs in correctness, so if hardware resources are plentiful then recursive designs as shown throughout are preferred. The present invention thus includes both recursive and equivalent iterative implementation variations on these designs.

Figure 56:
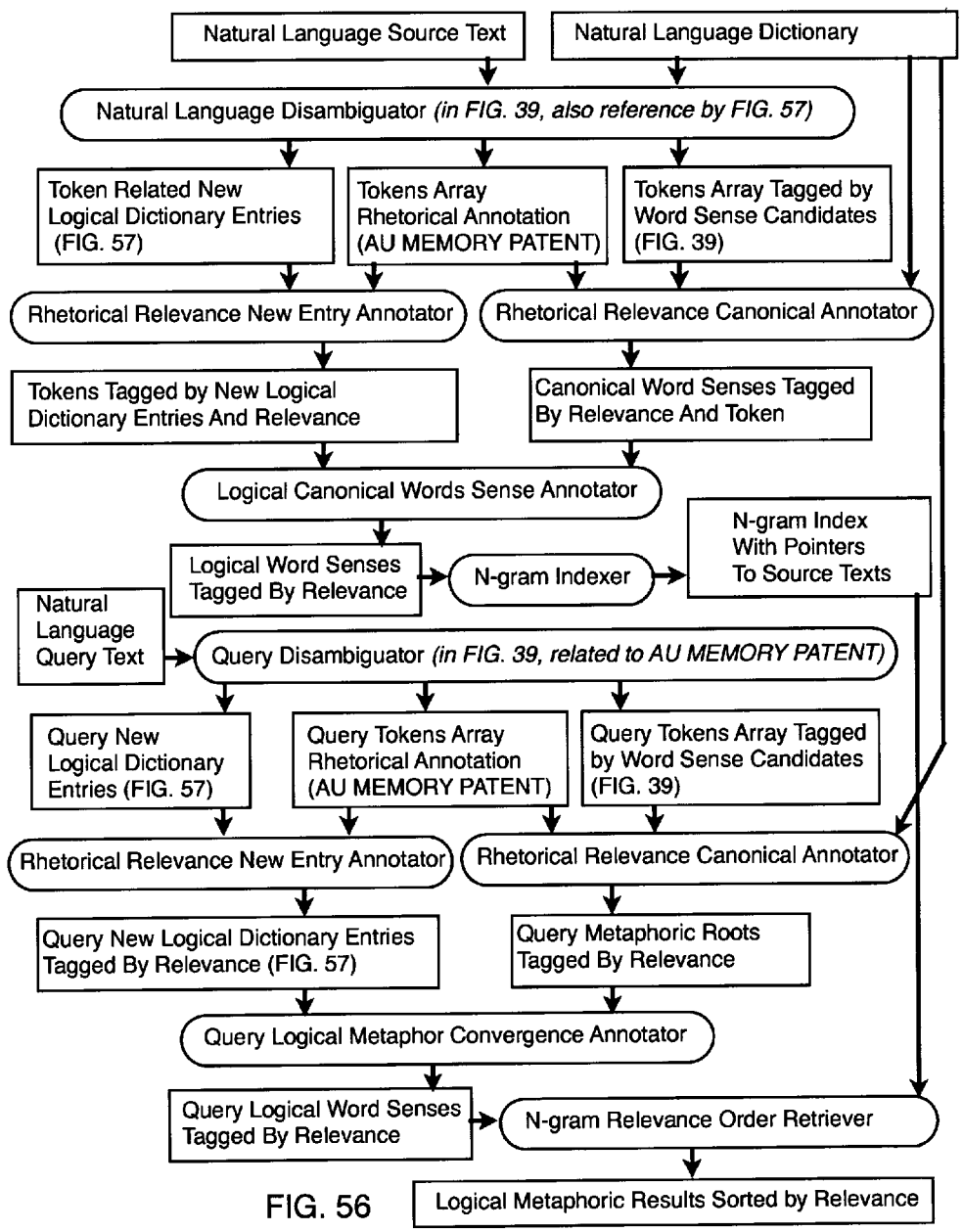
FIG. 56 Method To Compute Logical and Rhetorical and Metaphoric Relevance

The method to enable the user interface of FIG. 55 is shown in FIG. 56. A hybrid Natural Language Disambiguator receives Natural Language Source Text as input. In this hybrid, methods of FIG. 39 and FIG. 57 are applied to this input, and methods of the Au Memory Patent are separately applied to this input. The method of FIG. 39 produces Tokens Array Tagged by Word Sense Candidates, and the method of FIG. 57 produces New Logical Dictionary Entries. The methods of the Au Memory Patent produce the Tokens Array Rhetorical Annotation. Since rhetorical annotation is a fundamental way to indicate relevance token by token, rhetorical annotations are merged with Token Related New Logical Dictionary Entries on a token by token basis by the Rhetorical Relevance New Entry Annotator to output the Tokens Tagged by New Logical Dictionary Entries and Relevance.

Similarly, the rhetorical annotation is merged with Tokens Array Tagged by Word Sense Candidate by the Rhetorical Relevance Canonical Annotator to output the Canonical Word Senses Tagged By Relevance and Token. Words Senses are mapped to Canonical Words Senses here by lookup in the Natural Language Dictionary.

This Canonical Word Senses Tagged By Relevance and Token is merged on a token by token basis with Tokens Tagged by New Logical Dictionary Entries And Relevance by the Logical Canonical Word Sense Annotator to output Logical Word Senses Tagged By Relevance.

These are in turn input to a N-gram Index as described in the Au Memory Patent. The rest of the method of FIG. 56 is similar, using Natural Language Query text as input to a Query Disambiguator, essentially similar to the Natural Language Disambiguator above. All the processing to produce the Query Logical Word Senses Tagged by Relevance is essentially similar to the processing to produce the Logical Word Senses Tagged by Relevance. This is to ensure that indexed sentences used as query sentences retrieve themselves with close to 100 percent relevance.

Since some sentences are relevant to each other for logical rather than metaphoric reasons, to fully calculate possible relevance relations between sentences, a search engine must calculate logical consequences of sentence statements and related them to other meanings parsed from the same documents. After much research into shortcomings of prior art logical parsing techniques, the present invention has developed a new and more consistent, dictionary based method to compute logical meanings.

Unlike prior art logic parsers which map directly as possible from disambiguated meanings into rigid predefined logical frameworks, the present invention uses flexible unlimited staging leading to specific logical meanings. The most significant stage is the pre-definition of logical receptors in a subset of the main Natural Language Dictionary Words Senses. This stage mirrors the natural ability of humans to construct new logical concepts based upon pre-existing concepts. By defining new logical concepts as minor variations upon existing concepts, human quickly build entirely new sciences. For instance, chemistry was built upon logical concepts of atoms from physics. Atoms were concepts that allowed connections to them in the form of links to other atoms, to form molecules of chemistry. Once a definition of molecule was created with logical placeholders for the atoms defining specific molecules, an unlimited number of molecules could be defined by filling in theses placeholders with different sets of atoms.

Frequently these new definitions are temporary, since only testing can verify how useful any new logical definition will be. Therefore, the first time a new definition is created, it may be held back from the main Natural Language Dictionary until can logically tested. The present invention thus uses a temporary dictionary for the storage of newly created entries. These new logical meanings are created by the resonant interaction of logical inferences parsed from metaphoric meanings in a document.

By basing logical meanings on metaphor, the existential quantifiers in logical definitions can be extended to track the full set of inferences that people commonly make. The most common existential quantifiers in math proofs are "for all" and "given a". The prior art computer language of Prolog allowed existential quantifiers to automatically link through logical statements. However, Prolog was limited by inability to deal with metaphor, and also limited because logical statements were encoded by a rigid programming language syntax. The present invention accepts logical statements in the form of natural language, translating natural language into dictionary entries which then resonate with traversals orchestrated by a method similar to FIG. 39. By enabling both the initiating existential quantifiers and subsequent logical links to be shaped by metaphor resonance, the present invention overcomes the limitations of Prolog and extend Prolog's crude logical programming capabilities into seamless natural language logical inference capabilities.

In the present invention traditional logical quantifiers are recast as "logical qualifiers" which are useful both as processing directives and logical linguistic directives for creating new dictionary entries.

The general form of existential qualifiers in the present invention are "(q)for all:1" and "(q)given a:1". The (q) part of speech stands for qualifier, and shows that a dictionary entry is specially enabled to initiate logical inferencing when definitions citing this qualifier Word Sense are disambiguated from text. Of course qualifiers could be spelled in any way at all in any language, as variations of the present invention, but are spelled here in English following conventions that make them resemble the other parts of speech definitions.

These two existential qualifiers which initiate logical inferencing in the present invention differ in scope. Inferencing initiated by (q)for all:1 searches the main Natural Language dictionary for synonyms of definitions to traverse, whereas inferencing by (q)given a:1" also searches the document local temporary synonyms of dictionary entries for a definition to traverse, with preference given to meanings tagging tokens closest to the token in the document when the (q)given:1 tag is disambiguated. For instance, meanings in the same sentence are closer than meanings in adjoining sentences, and meaning in adjoining sentences are closer than meanings in sentences separated by intervening sentences.

To output definitions from the local domain to the main Natural Language dictionaries, there is the operator: (q)publish:1 which copies local document inferred synonyms of a definition to the main dictionary.

For instance, one might want to logically infer the names of overturned court decisions from the text of United States court decisions which overturn them. Since there is no published restricted format that judges adhere to when reversing decisions, the syntax of reversal is a grammar that has evolved for hundreds of years, much like any other part of American English Grammar. In this reversal grammar, judges refer to notational definitions they create within the text of their judgments, in order to compel lower courts to obey a decision.

The present invention accurately disambiguates the legal court meaning of "(v)reverse:3a" from non-legal meanings such as "put a car's transmission into reverse" and "travel the reverse route homeward", using the method of FIG. 39.

The legal court sense of "(v)reverse:3a" is defined as "[(v) overturn:1a] (q)given a:1 (n)this opinion:1a, (q)given a:1 (adv)incorrectly:1a (adj)decided:2a (adj)court:3a (n)decision:2a, (v)vacate:3a (n)decision:2a and (v)remand:1a (n)decision:2a for (n)consistency:1b with (n)this opinion:1a".

The present invention uses, as a placeholder, an actual Natural Language word sense such as "(n)decision:2a instead of the prior art programming language arbitrarily created placeholder variable names. Thus the three occurrences of (n)decision:2a all refer to exactly the same thing, as if (n)decision:2a were a placeholder variable name, and if synonyms are created for (n)decision:2a, that definition applies to all such synonyms. The present invention thus ensures that logically inferred meanings stay grounded in widely accepted meanings, for any locally created synonyms of (n)decision:2a have all the metaphoric meanings of (n)decision:2a.

The present invention may include other logical operators: (q)not:1, (q)and:1 (q)or:1. for defining logical meanings. For defining specific types of phrase, (q)phrase:1 which then lists qualifying text objects separated by (q)followed by:1 separators to indicate the order in which qualifying text objects must be found to create a new local definition.

For defining qualified text objects the present invention may include (q)literal:1 followed by a literal string. which matches the literal string given in the definition up to the next listed Word Sense.

To further define qualified text objects the present invention may also include the definition (q)capitalized phrase:1a. which matches any collocated capitalized phrase in the source text.

For logically parsing the text below, the present invention may include these dictionary definitions:

The definition of (n)this opinion:1a [(n):opinion of this court:1a] (q)first named:1a (q)volume reporter page:1a.

The definition of (n)decision:2a [(n)court decision:1b] (n)court level:1a (q)or:1 (n)legal party:1a (q)or:1 (q)notation numeral:1.

The definition of (n)volume reporter page:1a [(n)uniform court case citation:1a] (q)a phrase:1 (q)numeral:1 (q)followed by:1 (n)uniform court reporter:1 (q)followed by:1 (q)numeral:1.

The definition (n)notation numeral:1a [(n)notation marker:1b] (q)a phrase:1 (n)number prefix:1a (q)followed by:1 (q)numeral:1.

The definition (n)number prefix:1 [ ] #:1a (q)or:1 (n)number:1a (q)or:1 (n)no.:1a (q)or:1 (n)nos.:1a.

The definition (n)legal party:1a [ ] (q)a phrase:1 (q)capitalized phrase:1a (q)followed by:1 (q)literal:1 v. (q)followed by:1 (q)capitalized phrase:1a.

The definition (n)overturned court decision:1a [ ] (q)given a:1 (v)reverse:3a (n)volume reporter page:1a (q)publish:1.

The following six excerpts are from a single U.S. Supreme Court Decision, starting from the top of that decision's text, and excerpting downward. These excerpts provide an example of text traversed by logical inferencing of the present invention:

(Excerpt 1)
309 U.S. 106
60 S.Ct. 444
84 L.Ed. 604
HELVERING, Com'r of Internal Revenue
v.
HALLOCK et al. (two cases). SAME v. SQUIRE, Superintendent of Banks of Ohio. ROTHENSIES, Collector of Internal Revenue for Pennsylvania, v. HUSTON. BRYANT et al. v. HELVERING, Com'r of Internal Revenue. Nos. 110; 112, 183, and 399.
Argued and Submitted Dec. 13, 14, 1939.
Decided Jan. 29, 1940.
In Nos. 110 and 112:
Mr. Arnold Raum, for petitioner.
Messrs. Walker H. Nye and Ashley M. Vau Duzer, both of Cleveland, Ohio, for respondents Hallock.
Mr. W. H. Annat, of Cleveland, Ohio, for respondent Squire.
In No. 183:
Mr. Arnold Raum, of Washington, D.C., for petitioner.
Mr. Wm. R. Spofford, of Philadelphia, Pa., for respondent Huston.
In No. 399:
Messrs. J. Gilmer Korner, Jr., of Washington, D.C., and David S. Day, of Bridgeport, Conn., for petitioners Bryant.
Mr. Arnold Raum, for respondent Helvering.
(Excerpt 2)
Because of the difficulties which lower courts have found in applying the distinctions made by these cases and the seeming disharmony of their results, when judged by the controlling purposes of the estate tax law, we brought the cases here. Helvering v. Hallock, 308 U.S. 532, 60 S.Ct. 82, 84 L.Ed.—

Rothensies v. Cassell, 308 U.S. 538, 60 S.Ct. 94, 84 L.Ed.—Bryant v.

Commissioner of Internal Revenue, 308 U.S. 543, 60 S.Ct. 141, 84 L.Ed.—.

(Excerpt 3)

In Nos. 110, 111 and 112 (Helvering v. Hallock) the decedent in 1919 created a trust under a separation agreement (Excerpt 4)

In No. 183 (Rothensies v. Huston) the decedent by an ante-nuptial agreement in 1925 conveyed property in trust (Excerpt 5)

in No. 399 (Bryant v. Helvering), the testator provided for the payment of trust income to his wife (Excerpt 6)

In Nos. 110, 111, 112 and 183, the judgments are Reversed.

In No. 399, the judgment is Affirmed.

Upon disambiguation of (v)reverse:3a in "In Nos. 110, 111, 112 and 183, the judgments are Reversed", the present invention traverses definition of (v)reverse:3a to find the existential quantifier "(q)given a:1 (adv)incorrectly:1a (adj)decided:2a (adj)court:3a (n)decision:2a". The present invention metaphorically queries the document local dictionary for a (n)decision:2a" starting with the same sentence, referencing the definition of (n)decision:2a which lists (q)notation numeral:1 which matches Nos. 110, 111, 112 and 183 in the sentence.

The present invention then creates four local synonyms for (n)notation numeral: 1a, so that the dictionary word sense for notation numeral is now [110:1a, 111:1a, 112:1a 183:1a] (q)a phrase:1 (n)number prefix:1a (q)followed by:1 (q)numeral:1.

The present invention also creates new local synonyms as local dictionary entries:

110:1a [(n)notation numeral:1a] (n)decision:2a (v)reverse: 3a

111:1a [(n)notation numeral:1a] (n)decision:2a (v)reverse: 3a

112:1a [(n)notation numeral:1a] (n)decision:2a (v) reverse:3a

183:1a [(n)notation numeral:1a] (n)decision:2a (v)reverse: 3a

399:1a [(n)notation numeral:1a] (n)decision:2a (v)affirm: 2b

Quoting from the parsed input, the present invention creates a new local dictionary entry synonym to (v)reverse:3a:

(v)judgments are Reversed:1a [(v)reverse:3a] 110:1a, 111:1a, 112:1a 183:1a.

The present invention thus builds a conceptual map of the logical inferences needed to identify a decision reversal in the natural language dictionary. This inferencing continues until no more entries can be created. As in the method of FIG. 42, conceptually relevant terms are explored until exhausted, but in FIG. 57 these explorations reveal logical inferences.

The present invention then continues to metaphorically query the document local dictionary for additional inferences relevant to these notation numerals. In this pass, tokens parse from Excerpt 3 resonate with the numerals Nos. 110, 111 and 112 to and with the parties (Helvering v. Hallock) and tokens from Excerpt 4 with the the numeral No. 399 and with the parties (Bryant v. Helvering). In this pass, the present invention creates two local dictionary entries:

(n)Helvering v. Hallock:1a [(n)decision:2a] 110:1a 111:1a 112:1a 183:1a (n)Bryant v. Helvering:1a [(n)decision:2a] (n)decision:2a 399:1a In a deeper pass, traversing tokens of Excerpt 2, the parties "Helvering v. Hallock" resonate with the (n)volume reporter page:1a synonym "308 U.S. 532". In this pass, the present invention creates two local dictionary entries:

308 U.S. 532:1a [(n)decision:2a] (n)Helvering v. Hallock: 1a

308 U.S. 543:1a [(n)decision:2a] (n)Bryant v. Helvering: 1a

Finally the definition (n)overturned court decisional a metaphorically resonates with newly created dictionary entries 308 U.S. 532:1a and 110:1a 111:1a 112:1a 183:1a which resonate in a method like FIG. 42 through (n)Helvering v. Hallock:1a [(n)decision: 2a] 110:1a 111:1a 112:1a 183:1a. Driven by this metaphoric resonance, the present invention create a new synonym for (n)overturned court decisional a:

308 U.S. 532:2a [(n) (n)overturned court decision:1a] n)Helvering v. Hallock:1a.

Since the definition (n)overturned court decision:1a has a (q)publish:1 word sense, for which the above synonym is created, this new synonym is published in the main natural language dictionary for output. The present invention thus logically infers and outputs "308 U.S. 532" as a reversed court decision.

Since the present invention uses metaphoric as well as literal meanings to converge on the correct logical meaning, it follows a path more similar to the path humans use to deduce logical relationships, which often are based on existential qualifiers which can only be deduced metaphorically.

The present invention's fully automatic creation of temporary dictionary entries follows the same recommended suggestions as dictionary quality control method above: matching of part of speech, and optionally choosing more abstract and covering terms to cover as much meaning as possible. However, to fully automated creation of logical dictionary entries, recommended suggestions are automatically implemented without human intervention.

Since these newly defined terms start out lacking any definitions depending on them, they may have really small conceptual abstractness and really small lexical scope. Logical attributes of these terms may be focused on just a few possible "logical" meanings. Yet if they are defined as being synonyms to something else, they metaphorically inherit, via synonym link, the full conceptual abstractness of an existing synonym abstract term in the main dictionary.

FIG. 57 is a flowchart of the method to compute new logical dictionary definitions. As with the example of inferencing just given, Natural Language Source Text is input to the Natural Language Disambiguator of FIG. 39, which outputs Tokens Array Tagged by Word Sense Candidates, which are input to (q)given a:1 and other Logical Qualifier Tag Filter. This Filter outputs Tokens Array Tagged by Logical Qualifier Tags which are the focus of logical inferencing as described in the legal decision example above. The Logical Qualifier Tag Traverser loops over each of these possible starting points for Logical Inferencing to output a Logical Qualifier Tags such as the (q)a phrase:1 and (q)followed by:1. These starting points generate new local definitions in Recursive Logical Inference Generator which outputs New Logical Dictionary Entries for example such as "308 U.S. 532:2a [(n) (n)overturned court decision:1a] n)Helvering v. Hallock: 1a."

The method of FIG. 57 New Dictionary Entry Storer (q)publish:1 publishes new dictionary entries by traversing instances of (q)publish:1 inherited by synonyms of New Logical Dictionary Entries, to create Natural Language New Logical Dictionary Entries as output.

The present invention also includes methods to compute imputed sentiments. Unlike sentiments computed from directly from phonemes as in the Au Memory Patent, specific sentiments can also be indirectly calculated from the phonemic values of quotations. After logically and metaphorically disambiguating the word senses those quotations these words senses can be linked to sentiments calculated from the phonemes of quotations in which they were parsed. Thus statistics of usage determines the imputed sentiments of word senses. With sufficient sampling sizes of source input text, these imputed sentiments become accurate enough to impute emotions of words senses input as queries, even for queries too short for the methods of the Au Memory Patent to compute directly from phonemes.

I claim:

1. A computer implemented search engine which automatically generates a plurality of search results from an input text and a query text, the search engine comprising a processor, a search index for retrieving matches in meaning between an input text and query text, and a user interface for receiving the query text and displaying search engine results, the method comprising:
   receiving the input text and query text;
   performing, via the processor, and a token-by-token analysis of the query text and input text, a computation of a map of sentiment valences to successive areas of text therein;
   computing, via the processor, a summation of a negative area from negative valences and a summation of a resolution area from positive valences, based on the map of sentiment valences;
   computing an unacceptable area, via the processor, based on a difference between the negative area and the positive area;
   computing an unacceptable running area, via the processor, based on an excess of the unacceptable area which is beyond a max acceptable running imbalance area;
   computing, via the processor, an acceptable negative area for 60% resolution, based on the positive area, wherein the acceptable negative area is within 60% of the positive area;
   computing a total compassion, via the processor, based on the acceptable negative area, the negative area, the positive area, wherein total compassion is the subtraction of the unacceptable running area from the sum of the positive area and the acceptable negative area;
   computing, an array of paragraph clusters ordered by compassion in similar paragraphs, via the processor, based on the total compassion in token-by-token analysis of the query text and input text;
   computing a query cluster compassion trigrams index based on the array of paragraph clusters ordered by compassion in similar paragraphs;
   retrieving a set of segment results sorted by relevance based on search engine intersection of input text and query text within the query cluster compassion trigrams index;
   outputting, via the user interface, the set of segment results sorted by relevance;
   wherein the computer analysis includes a classification, a categorization, or sorting of the segment results ordered by compassion.

2. The method of claim 1, further comprising a Conversational Chatbot interface with a chatbot input and a chatbot output, a Conversational Response, an Average Concept Compassion, a Conceptual Kindness Suggestion Generator, and a set of Kindness Suggestion Questions, wherein the chatbot input is the query input, and further computing, via the processor:
   comparing the total compassion produced to the Average Concept Compassion; upon detection of a concept cruelty based on the comparison of the total compassion to the average concept compassion,
   computing, via the processor, a set of Kindness Suggestion Questions from the Conceptual Kindness Suggestion Generator, and
   outputting at least one Kindness Suggestion Question, via the chatbot output as a Conversational Response.

* * * * *